US010789553B1

(12) United States Patent
Bhatwadekar et al.

(10) Patent No.: US 10,789,553 B1
(45) Date of Patent: Sep. 29, 2020

(54) EXPERIENCE ORCHESTRATION

(71) Applicant: ACCENTURE GLOBAL SOLUTIONS LIMITED, Dublin (IE)

(72) Inventors: Suchit Vishnupant Bhatwadekar, Pune (IN); Pankaj Shrikant Nikumb, Pune (IN); Karthik Srinivasan, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 16/730,150

(22) Filed: Dec. 30, 2019

(51) Int. Cl.
*G06N 20/00* (2019.01)
*G06F 16/23* (2019.01)
*G06F 16/9535* (2019.01)

(52) U.S. Cl.
CPC ......... *G06N 20/00* (2019.01); *G06F 16/2379* (2019.01); *G06F 16/9535* (2019.01)

(58) Field of Classification Search
CPC .. G06N 20/00; G06F 16/2379; G06F 16/9535
See application file for complete search history.

(56) References Cited

U.S. PATENT DOCUMENTS

| 10,038,788 B1* | 7/2018 | Khalatian | H04L 65/1069 |
| 10,452,992 B2* | 10/2019 | Lee | G06N 20/00 |
| 2011/0282964 A1* | 11/2011 | Krishnaswamy | G06Q 30/02 709/217 |
| 2014/0189539 A1* | 7/2014 | St. Clair | G06Q 50/01 715/753 |
| 2017/0221072 A1* | 8/2017 | Athuluru Tlrumala | H04W 4/029 |
| 2019/0102747 A1* | 4/2019 | Terra | G06Q 10/1095 |
| 2019/0139086 A1* | 5/2019 | Kiladis | G06N 3/08 |

* cited by examiner

*Primary Examiner* — Kamran Afshar
*Assistant Examiner* — Ying Yu Chen
(74) *Attorney, Agent, or Firm* — Mannava & Kang, P.C.

(57) ABSTRACT

Examples of a digital orchestration system are provided. The system may obtain orchestration data on a real-time basis. The system may identify a plurality of events for offering a plurality of user services across a plurality of user interaction stages. The system may identify a plurality of actions associated with each of the plurality of events. The system may create a recipe associated with each of the plurality of actions. The system may identify and implement the associated recipe. The system may create an event sequence for each of the plurality of user interaction stages. The system may create a user service sequence comprising the plurality of user services associated with the event sequence. The system may generate a user experience result based on the event sequence and the user service sequence.

17 Claims, 74 Drawing Sheets

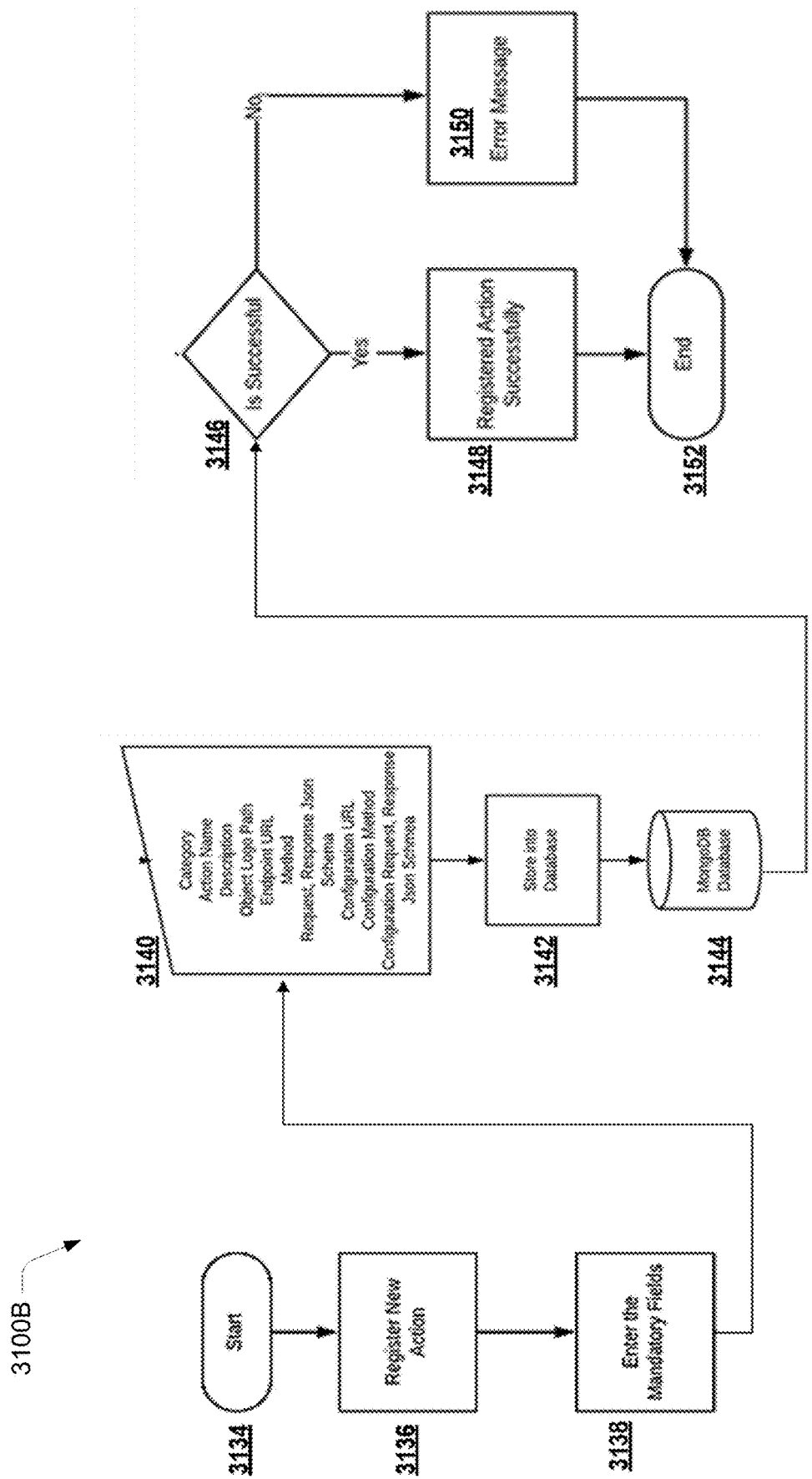

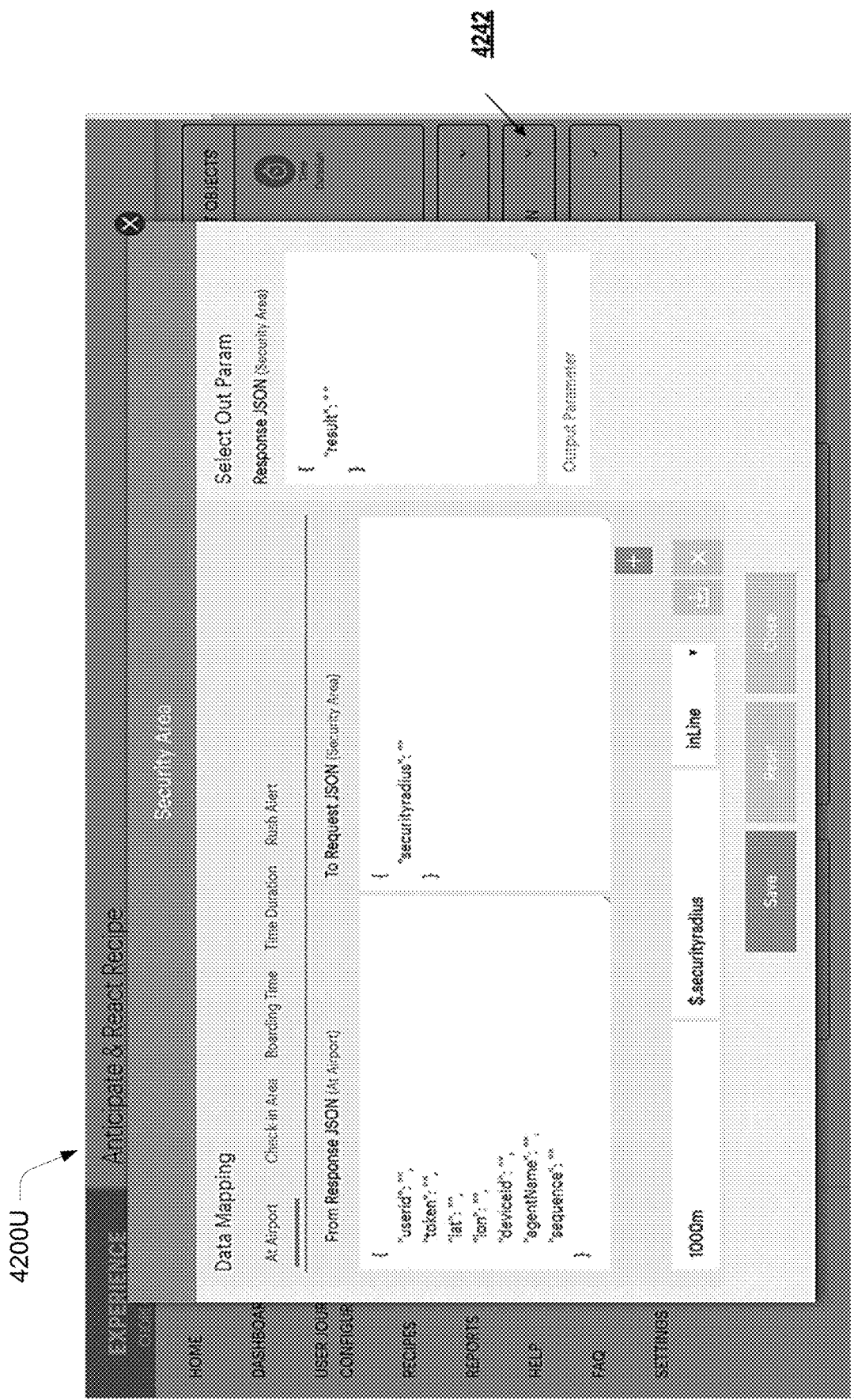

EXPERIENCE ORCHESTRATION

BACKGROUND

The rapid development of information technologies and artificial intelligence technologies has allowed various service providers to provide a wide range of services remotely to consumers. While remote management of services across various devices have its advantages, service providers may constantly need to develop new services and new methods for providing those services to consumers in an effort to stay competitive in the market.

Currently, if a service provider may wish to add support for a new service and create the aforementioned service as part of a consumer experience for a particular situation, the service provider would have to expend considerable resources to alter an existing platform or develop a new platform providing support for the new service. This may lead to high infrastructure costs as the market may present demands for new services presented in an automated manner. Implementing a flexible platform that provides support for virtually any type of service integration into a consumer experience may be a difficult technical challenge.

Accordingly, a problem with existing systems may be an inability to seamlessly integrate new services and implement the new services over existing platforms in a user-friendly manner. Therefore, to ensure efficiency and completeness, a digital orchestration technique may be required to enable the creation of new context-aware applications that may dynamically adapt to the increasingly variable expectations of consumers. There is a requirement for an experience choreography platform that may envision services not as discreet features operating in silos across various platforms but a collection of horizontal data and services that can be mashed up to generate newer experiences for consumers. There is a need for a digital orchestration, which may facilitate choreography of newer experiences by leveraging mashed-up data services across different systems along with real-time context such as presence, location, vision, Artificial Intelligence, analytic insights, and other such features. The digital orchestration system may allow pushing new mashed-up data and services to customers' channels of preference.

Accordingly, a technical problem with the currently available systems for the generation of new consumer services and seamlessly integrating the same over an existing platform may be inefficient, inaccurate, and/or not scalable. There is a need for a digital orchestration system that may account for the various factors mentioned above, amongst others, for creating dynamic industry-agnostic experiences by formation of journey maps, engagements, moments, and recipes by registering entities such as events, context, services and actions, and the like and by dragging and configuring objects in an efficient, and cost-effective manner.

BRIEF DESCRIPTION OF DRAWINGS

FIG. 31B illustrates a flow diagram for an action registration using a digital orchestration system, according to an example embodiment of the present disclosure.

FIG. 42U illustrates a pictorial representation of mapping object parameters for the creation of new recipes as deployed by a digital orchestration system, according to an example embodiment of the present disclosure.

DETAILED DESCRIPTION

Figure 1:
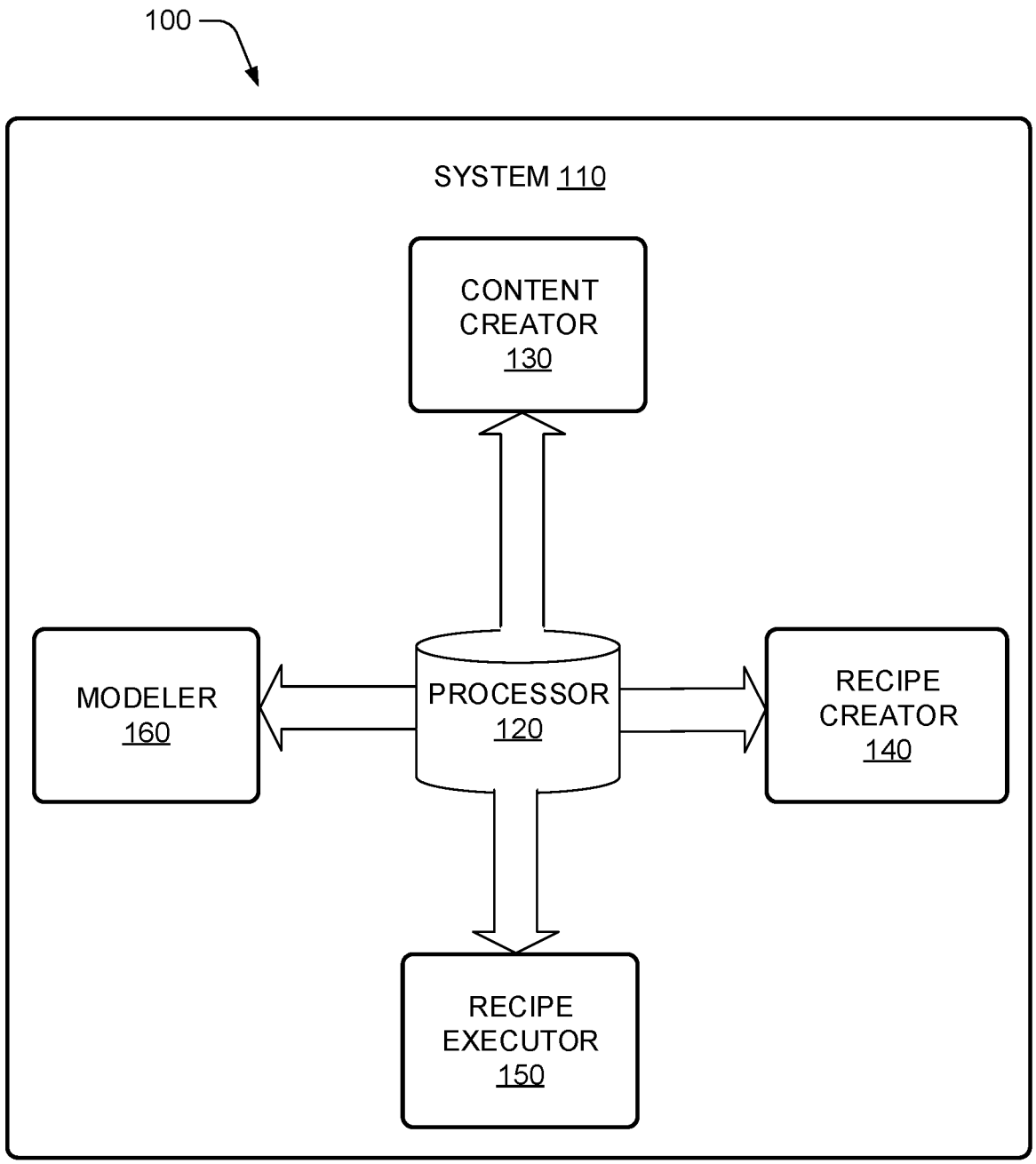
FIG. 1 illustrates a diagram for a digital orchestration system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure describes systems and methods for digital experience orchestration. The digital orchestration system (referred to as "system" hereinafter) may be used for creating dynamic industry-agnostic experiences by forming journey maps, engagements, moments and recipes and by registering entities such as events, context, services and actions, and the like by dragging and configuring objects in an efficient, and cost-effective manner. The system may facilitate choreography of newer experiences by leveraging mashed up data services across different systems along with real-time contexts like presence, location, vision, AI, analytic insights, and the like. The digital orchestration system may allow pushing new mashed-up data and services to customer's channels of preference.

The system may include a processor, a content aggregator, a recipe creator, a recipe executor, and a modeler. The processor may be coupled to a content aggregator, a recipe creator, a recipe executor, and a modeler. The content aggregator may obtain a query from a user. The query may indicate an experience orchestration requirement comprising a plurality of user services and a plurality of user interaction stages. Each of the plurality of user services may be associated with a user interaction stage from the plurality of user interaction stages. The content aggregator may obtain orchestration data associated with the query from a plurality of data sources on a real-time basis. The content aggregator may implement an artificial intelligence component to identify a plurality of events based on the plurality of user interaction stages from the orchestration data. Each of the plurality of events may be associated with the plurality of user services. The content aggregator may implement an artificial intelligence component to sort the orchestration data based on the plurality of events into a plurality of data domains. Each of the plurality of data domains may comprise a data point associated with an event from the plurality of events. The content aggregator may implement an artificial intelligence component to update the plurality of domains based on a change in the orchestration data indicated by a data source from the plurality of data sources.

The recipe creator may implement a first cognitive learning operation on each of the data points associated with the plurality of events to identify an event result comprising a plurality of actions associated with each of the plurality of events. Each of the plurality of actions may include driving a user service from the plurality of user services in response to the associated event from the plurality of events. The recipe creator may create a recipe associated with each of the plurality of actions. The recipe may comprise a plurality of rules to retrieve the orchestration data from the plurality of data domains to offer an associated user service from the plurality of user services based on an associated user interaction stage from the plurality of user interaction stages. The plurality of rules may be based on a context relevant to an action from the plurality of actions.

The recipe executor may identify an action activator based on the event result and associated with each of the plurality of actions, the action activator to prompt an action from the plurality of actions. The recipe executor may implement a second cognitive learning operation to identify the recipe associated with the action prompted through the action activator. The recipe executor may implement the recipe associated with the action prompted through the action activator by retrieving the orchestration data from the plurality of data domains based on the associated plurality of rules and offer to an end-user the associated plurality of user services based on the associated plurality of user interaction stages.

The modeler may create an event sequence for each of the plurality of user interaction stages. The event sequence may comprise the plurality of events associated with a user interaction stage from the plurality of user interaction stages. The modeler may create a user service sequence comprising the plurality of user services associated with the event sequence. The modeler may generate a user experience result based on the event sequence and the user service sequence. The user experience result comprising the plurality of user interaction stages orchestrated to retrieve the associated orchestration data from the plurality of data domains in response to the associated action activator on a real-time basis.

The embodiments for the experience orchestration requirement presented herein are exemplary in nature and should be treated as such. For the sake of brevity and technical clarity, the description of the digital orchestration system may be restricted to few exemplary embodiments, however, to a person skilled in the art it should be clear that the system may be used for the fulfillment of various experience orchestration requirements other than those mentioned hereinafter.

Accordingly, the present disclosure aims to provide a digital orchestration system that may account for the various factors mentioned above, amongst others, for creating dynamic industry-agnostic experiences by formation of journey maps, engagements, moments and recipes and by registering entities such as events, context, services and actions, and the like and by dragging and configuring objects in an efficient, and cost-effective manner.

FIG. 1 illustrates a system for digital orchestration system 110 (referred to as system 110 hereinafter), according to an example implementation of the present disclosure. In an example, the system 110 may include a processor 120. The processor 120 may be coupled to a content aggregator 130, a recipe creator 140, a recipe executor 150, and a modeler 160. The processor may be coupled to the content aggregator 130, the recipe creator 140, the recipe executor 150, and the modeler 160.

In accordance with an embodiment of the present disclosure, the content aggregator 130 may obtain a query from a user. The query may indicate an experience orchestration requirement comprising a plurality of user services and a plurality of user interaction stages. Each of the plurality of user services may be associated with a user interaction stage from the plurality of user interaction stages. The experience orchestration requirement may be associated with at least one of a process, an organization, and an industry-relevant for providing various services to various users. In an example, the experience orchestration requirement may be to choreograph new journey maps, experience, and recipes.

In an example, the experience orchestration requirement may be to register new events, actions and services to create newer dynamic experiences for various consumers. In accordance with an embodiment of the present disclosure, the experience orchestration requirement may be to facilitate configuration & execution of newer dynamic processes to take effect without any code rebuild and newer deployments. In accordance with an embodiment of the present disclosure, the experience orchestration requirement may be to mash-up up a context to a service to provide personalized experiences. In accordance with an embodiment of the present disclosure, the experience orchestration requirement may be to construct in order to choreograph the business events and digital services in a loosely coupled manner to create new experience dynamically based on various events and locations. In accordance with an embodiment of the present disclosure, the experience orchestration requirement may be to augment a context of an event or action through artificial intelligence to make runtime decisions. In accordance with an embodiment of the present disclosure, the experience orchestration requirement may be to create a unique experience for a consumer based on consumer behavior & situational insights at that moment.

As mentioned above, the orchestration requirement may include a plurality of user services and a plurality of user interaction stages. The plurality of user services may refer to various user services that an organization may provide to a consumer, for example, living services. The living services may be sophisticated, contextually-aware digital services designed to anticipate and respond to the needs of a user. The living services may react in real-time to changes in the environment and patterns of behavior. The plurality of user services may include various health services, transportation, insurance, utilities, and security services. The plurality of user services may be based on predicting and reacting to consumers changing needs and circumstances. The plurality of user interaction stages may include various discrete touchpoints where a consumer may interact with a digital environment. For example, the plurality of user interaction stages may include booking a transport service to an airport, a security check at an airport, booking a holiday, and the like. In accordance with an embodiment of the present disclosure, the system 110 may associate each of the plurality of user services with each of the plurality of user interaction stages. In an example, each of the plurality of user services may be associated with a user interaction stage from the plurality of user interaction stages. In an example, a user service from the plurality of user services may be associated with more than one user interaction stage from the plurality of user interaction stages. For example, a user service pertaining to ordering food may be available to a user across the plurality of user interaction stages.

In accordance with an embodiment of the present disclosure, the experience orchestration requirement may pertain to selecting the plurality of user services for providing to an end-user at an associated user interaction stage from the plurality of user interaction stages. For example, the experience orchestration requirement may be selecting a plethora of services associated with booking a transport service to an airport such as calculating an estimated time of arrival at the airport, travel insurance services, food pick up services en route, various shopping vouchers, and shopping associated services and the like. For the purpose of this document, the user of the system 110 may be an organization, a service provider, a service manager, and the like. The end-user of the system 110 may be a set of consumers catered to by the user of the system 110. The system 110 may be deployed by the user for orchestrating various experiences for end-users. Therefore, the system 110 may have a user interface, wherein the user of the system 110 may configure various interactions and orchestrations. The system 110 may have an end-user interface, which the end-user may access.

The content aggregator 130 may obtain orchestration data associated with the query from a plurality of data sources on a real-time basis. The orchestration data may be present in multiple systems across various geographical locations. The orchestration data may have multiple forms. The orchestration data may be available as a JavaScript Object Notation (JSON) formatted data file. For the sake of brevity and technical clarity, various formats of the orchestration data have not been mentioned herein, but should be clear to a person skilled in the art. The orchestration data may be generated by multiple digital touchpoints. The orchestration data may be in-transit from one system to another. The orchestration data may reside in large database systems such as, for example, a knowledge base. The orchestration data may reside in a simple form. The orchestration data may be referred to as an entity. A user of the system 110 may combine orchestration data and perform operations such as for example, arithmetic, logical and the like to decide a suitable intelligent action to be performed. The orchestration data may include data related to any of the plurality of user services. The orchestration data may include data related to any of the plurality of user interaction stages. The orchestration data may be a dataset relevant to the plurality of user services and the plurality of user interaction stages In an example, the system 110 may identify the orchestration data from the plurality of sources based on a user preference, a consumer preference, the plurality of user services and the plurality of user interaction stages. The orchestration data may be updated based on a user preference, a consumer preference, a modification in any of the plurality of user services, a modification in any of the plurality of user interaction stages. In accordance with an embodiment of the present disclosure, the orchestration data may be updated based on user input for the plurality of user services. The orchestration data may be updated based on user input for the plurality of user interaction stages. The system 110 may be configured such that the content aggregator 130 may obtain the updated orchestration data on a real-time basis. The orchestration data may be updated at any stage while implementing the system 110 and the system 110 may reflect the update across all components of the system 110 and across all interactions of the system 110 with the user and various end-users.

In accordance with an embodiment of the present disclosure, the plurality of data sources may further include a natural language data directory. The natural language data directory may be a pre-existing text corpus stored in the system 110. The text corpus may refer to a large and structured set of texts that may be used to do a statistical analysis, hypothesis testing, checking occurrences or validating linguistic rules within a specific language territory. In an example, the text corpus may be the Stanford Natural Language Inference (SNLI) text corpus comprising a collection of labeled sentence pairs. For the sake of brevity and technical clarity, various natural language data directories have not been mentioned herein, by should be clear to a person skilled in the art.

The content aggregator 130 may implement an artificial intelligence component to identify a plurality of events based on the plurality of user interaction stages from the orchestration data. Each of the plurality of events may be associated with the plurality of user services. An event from the plurality of events may be a message sent by the user to signal the occurrence of an action. The action may be caused by user interaction, such as for example, a button click, automated detection of a change in a geographical location of an end-user or consumer. An event may be an action or occurrence recognized by the system 110, which may be originating asynchronously from an external environment, that may be handled by the software. The plurality of events may be generated or triggered by the system 110, by the user or in other ways. Additionally, the event may be handled synchronously with the program flow, and the system 110 may have one or more dedicated places referred to as an event catalog where the plurality of events may be stored or cataloged. The artificial intelligence component may create inter-relations amongst the plurality of events such that an event loop may be created wherein, an event from the plurality of events may be followed by another specified event from the plurality of events. In an example, the event loop may terminate based on input from the end-user or a consumer on a real-time basis. In an example, the user may specify a set of criteria for automated termination of the event loop. In an example, a source of events may include the end-user or consumer, who may interact with the system 110. The system 110 may, in turn, interact with the event catalog to drive further event-driven interaction. In an example, the event source may be a hardware device such as a timer. The content aggregator 130 may trigger any of the plurality of events from the event catalog and into the event loop. As mentioned above, each of the plurality of events may be associated with the plurality of user services. For example, a user service may be to provide a communication alert to a user when a user may be delayed for boarding a flight from an airport. For such a user service the plurality of events may include calculating the time at across the plurality of user interaction stages, for example, the time required to reach the airport, time required for the security check-in, the time required for commuting up to a boarding terminal. In accordance with an embodiment of the present disclosure, the user may create an event library for each of the plurality of user services. The system 110 may be configured so that each of the event libraries may be stored in the event catalog. The event library may be updated based on user input. The event library may be updated based on a modification in the orchestration data. The content aggregator 130 may obtain the orchestration data associated with each of the plurality of events present in the event loop for providing a user service from the plurality of user services. The content aggregator 130 may update the event loop based on a modification in any of the plurality of user services or across any of the plurality of user interaction stages.

In accordance with various embodiments of the present disclosure, the artificial intelligence component may include various artificial intelligence techniques, for example, a Natural Language Processing (NLP) model. In an example, the NLP model may be the development of a neural network with open information extraction systems like Knowledge graphs, and Never-Ending Language Learning (NELL), that may be used in mining the vast repository of the web and building a knowledge system, in the form of interrelated facts or a knowledge graph. This extracted knowledge may be used to provide reasoning and inference on the set of entities, their attributes, and their interrelations. The system 110 may deploy any of the NLP models not mentioned herein for identifying the plurality of events based on the plurality of user interaction stages from the orchestration data. The NLP model may be an interactive goal-oriented model, which may change the behavior of the plurality of events and the event loop in response to a modification in any of the plurality of events. For the sake of brevity and technical clarity further details regarding various NLP models may be not be described herein, however, the same should be clear to a person skilled in the art.

The content aggregator 130 may implement the artificial intelligence component to sort the orchestration data based on the plurality of events into a plurality of data domains. The content aggregator 130 may implement the NLP model to map the orchestration data with each of the plurality of events and create the plurality of data domains therefrom. The plurality of data domains may include the orchestration data associated with the plurality of user services, the user of the system 110, the end-user of the system 110, across the plurality of user interaction stages categorized based on the plurality of events associated with each of the plurality of user services across the plurality of user interaction stages for all the end-users of the system 110. The plurality of data domains may be accessible to the user of the system 110. The content aggregator 130 may update the plurality of data domains based on an update in the orchestration data. As mentioned above, the orchestration data may be updated on a real-time basis. Each of the plurality of data domains may be comprising a data point associated with an event from the plurality of events. As mentioned above, a user of the system 110 may combine the orchestration data and perform operations such as for example, arithmetic, logical and the like to decide a suitable intelligent action to be performed. The data point for each of the plurality of events may constitute the aspect of the orchestration data that may be used for performing the aforementioned operations to decide a suitable intelligent action to be performed. In an example, the plurality of data domains may be a collection of data points for performing the aforementioned operations.

The recipe creator 140 may implement a first cognitive learning operation on each of the data points associated with the plurality of events to identify an event result comprising a plurality of actions associated with each of the plurality of events. The first cognitive learning operation may further include implementing various machine learning techniques and machine learning algorithms such as TensorFlow, SpaCy, PyTorch and the like for deriving a self-updating self-sustaining neural attention model. In an example, the first cognitive learning operation may deploy a Recurrent Neural Network (RNN type of Neural Network wherein, the output from a previous step may be fed as input to a current step. The RNN may be deployed to predict an event from the plurality of events, to predict a user service from the plurality of user services, to predict a user interaction stage from the plurality of user interaction stages. Hence, there may be a need to remember orchestration data related to all previous plurality of events, a previous plurality of user services, a previous plurality of user interaction stages. The system 110 may deploy various RNN based models as part of the first cognitive learning operation on each of the data points associated with the plurality of events to identify an event result comprising a plurality of actions associated with each of the plurality of events. In accordance with an embodiment of the present disclosure, action from the plurality of actions may include pushing a user service from the plurality of user services towards the end-user in response to an event from the plurality of events. In accordance with an embodiment of the present disclosure, each of the plurality of actions may include driving a user service from the plurality of user services in response to the associated event from the plurality of events. The recipe creator 140 may create an action catalog for each of the plurality of events. In accordance with an embodiment of the present disclosure, the action catalog may be updated based on input from the user of the system 110. In an example, the action catalog may be updated in an automated manner based on an update in the plurality of events, an update in the plurality of user services, and an update in the plurality of user interaction stages. In accordance with an embodiment of the present disclosure, the event result may comprise the plurality of actions that may be construed to be possible based in the context of the event. For example, as mentioned above, a user service may be to provide a communication alert to a user when a user may be delayed for boarding a flight from an airport. For such a user service the plurality of events may include calculating the time at across the plurality of user interaction stages, for example, the time required to reach the airport, time required for the security check-in, the time required for commuting up to a boarding terminal. The plurality of actions may include comparing the flight departure time with the current time. The plurality of actions may further include comparing the time required to complete each of the plurality of user interaction stages with the flight departure time. Additionally, the plurality of actions may also include updating the flight departure time based on an update from the associated airport, airline and the like before repeating the plurality of actions mentioned above to provide a real-time update.

The recipe creator 140 may create a recipe associated with each of the plurality of actions. The recipe may be a set of reusable pre-built industry/functional template created by mash-up of different data from different systems to address certain problems to provide a better user experience The recipe may be comprising a plurality of rules to retrieve the orchestration data from the plurality of data domains to offer an associated user service from the plurality of user services based on an associated user interaction stage from the plurality of user interaction stages. The creation of a recipe may be explained in detail by way of subsequent Figs. As mentioned above, the plurality of data domains may include the orchestration data associated with the plurality of user services, the user of the system 110, the end-user of the system 110, across the plurality of user interaction stages categorized based on the plurality of events associated with each of the plurality of user services across the plurality of user interaction stages for all the end-users of the system 110. The recipe creator 140 may create the plurality of rules for retrieving orchestration data from the plurality of data domains in an automated manner. The plurality of rules may be based on a context relevant to an action from the plurality of actions. The recipe constituted by the plurality of rules may be used to pull relevant orchestration data from the plurality of data domains in order to execute an action from the plurality of actions in response to an event from the plurality of events for offering a user service from the plurality of user services across a user interaction stage from the plurality of user interaction stages. The recipe creator 140 may update the plurality of rules thereby updating the associated with the recipe based in a modification in any of the plurality of user services, the plurality of user interaction stages, the plurality of events, the plurality of actions, user input, an end-user input and the like. The process of updating a recipe may be explained in detail by way of subsequent Figs. The recipe creator 140 may create a new recipe for each of the aforementioned modifications. The recipe creator 140 may publish each of the recipes onto a recipe database. The process of publishing a recipe may be explained in detail by way of subsequent Figs. In accordance with an embodiment of the present disclosure, the recipe creator 140 may create a new set of the plurality of rules thereby creating a new recipe based in on an output generated by the system 110 after implementation of the first cognitive learning operation on the data points from the plurality of data domains. In accordance with an embodiment of the present disclosure, action from the plurality of actions may include a user service from the plurality of user services pushed towards the end-user in response to an event based on the recipe. The recipe creator 140 may create the plurality of rules for retrieval of the orchestration data associated with each of the plurality of actions. In accordance with various embodiments of the present disclosure, the recipe creator 140 may update the event result and the recipe based on the update in the plurality of data domains indicated by a change in the orchestration data indicated by a data source from the plurality of data sources.

In accordance with various embodiments of the present disclosure, the recipe creator 140 may obtain user input to implement a first cognitive learning operation on each of the data points. For example, in the example mentioned above, wherein the user service may be to provide a communication alert to a user when a user may be delayed for boarding a flight from an airport. For such a user service the plurality of events may include calculating the time at across the plurality of user interaction stages, for example, the time required to reach the airport, time required for the security check-in, the time required for commuting up to a boarding terminal. The plurality of actions may include comparing the flight departure time with the current time. The plurality of actions may further include comparing the time required to complete each of the plurality of user interaction stages with the flight departure time. The user may wish to provide an additional user service such as food pick up en-route the airport. Additionally, the user may wish to provide various shopping vouchers, discounts or marketing deals related to various shopping outlets en-route the airport, and within the airport. The recipe creator 140 may obtain user input based on above the user services to implement a first cognitive learning operation on each of the data points and create the plurality of rules for retrieval of relevant orchestration data.

The event result may be determined to include the plurality of rules and the recipe creator 140 may create the plurality of rules for each of the plurality of actions. The recipe executor 150 may identify an action activator based on the event result and associated with each of the plurality of actions, the action activator to prompt an action from the plurality of actions. In accordance with an embodiment of the present disclosure, the action activator may be a selection of a user service from the plurality of user services made by the user, a selection of a user service from the plurality of user services made by the end-user. The action activator may be a moment that may be a perceivable unit in time where the end-user may interact with the components of the system 110. The action activator may prompt a selection of an action from the plurality of actions in response to an event from the plurality of events for providing a user service from the plurality of user services at a user interaction stage from the plurality of user interaction stages. The process deployed by the action activator may be explained in detail by way of subsequent Figs.

The recipe executor 150 may implement a second cognitive learning operation to identify the recipe associated with the action prompted through the action activator. The second cognitive learning operation may further include implementing various machine learning techniques and machine learning algorithms such as TensorFlow, SpaCy, PyTorch and the like for deriving a self-updating self-sustaining neural attention model. In an example, the second cognitive learning operation may deploy a Recurrent Neural Network (RNN type of Neural Network wherein, the output from a previous step may be fed as input to a current step. The RNN may be deployed to predict or select a recipe for an action prompted by the action activator in response to an event from the plurality of events for providing a user service from the plurality of user services at a user interaction stage from the plurality of user interaction stages. Hence, there may be a need to remember orchestration data and recipe related to all previous plurality of actions, a previous plurality of events, a previous plurality of user services, and a previous plurality of user interaction stages. The system 110 may deploy various RNN based models as part of the second cognitive learning operation on the recipe database for selecting a recipe for an action prompted by the action activator in response to an event from the plurality of events for providing a user service from the plurality of user services at a user interaction stage from the plurality of user interaction stages.

The recipe executor 150 may implement the recipe associated with the action prompted through the action activator by retrieving the orchestration data from the plurality of data domains based on the associated plurality of rules and offer to an end-user the associated plurality of user services based on the associated plurality of user interaction stages. The process details for implementation of the recipe may be described by way of subsequent Figs. In accordance with various embodiments of the present disclosure, the recipe executor 150 may implement the second cognitive learning operation to identify a multitude of recipes associated with the action prompted through the action activator. For example, in the example mentioned above, wherein the user service may be to provide a communication alert to a user when a user may be delayed for boarding a flight from an airport. For such a user service the plurality of events may include calculating the time at across the plurality of user interaction stages, for example, the time required to reach the airport, time required for the security check-in, the time required for commuting up to a boarding terminal. The user of the system may want to further provide, for example, en-route shopping services. The plurality of actions may include comparing the flight departure time with the current time. The plurality of actions may further include comparing the time required to complete each of the plurality of user interaction stages with the flight departure time. As mentioned above, the recipe creator 140 may create a recipe for each of the plurality of actions. The recipe executor 150 may implement the second cognitive learning operation to identify a multitude of recipes from the recipe database pertaining to each of the plurality of actions including comparing the time required to complete each of the plurality of user interaction stages with the flight departure time. The multitude of recipes may include a recipe for time calculation at each of the plurality of user interaction stages involved herein, a recipe for delay alert generation for a user at airport security, a recipe for an 'ample time for shopping' alert generation, a recipe for 'no time for shopping' alert generation, a recipe for 'food pick up' alert generation, a recipe for 'no time to eat' alert generation, and the like. In accordance with various embodiments of the present disclosure, the recipe executor 150 may execute a recipe from the multitude of recipes associated with the action prompted through the action activator based on a result from any of the plurality of user interaction stages for an individual end-user. For example, the recipe executor 150 may implement the second cognitive learning operation to detect the location of the individual end-user, which may be for example, at the security check-in counter of an airport. The recipe executor 150 may retrieve the recipe for calculating the time required to navigate the security check-in counter and reach the boarding terminal. Further, the recipe executor 150 may retrieve the recipe to compare the time calculated above with a boarding gate closing time. The recipe executor 150 may implement the second cognitive learning operation to decide a recipe to implement from the recipe for delay alert generation for a user at airport security, the recipe for an 'ample time for shopping' alert generation, the recipe for 'no time for shopping' alert generation, the recipe for 'food pick up' alert generation, the recipe for 'no time to eat' alert generation, and the like based on the location of individual end-user. In an example, the recipe executor 150 may obtain an end-user input from the individual end-user for executing a recipe from the multitude of recipes.

The modeler 160 may create an event sequence for each of the plurality of user interaction stages. The event sequence comprising the plurality of events associated with a user interaction stage from the plurality of user interaction stages. As mentioned above, each of the plurality of events may be associated with the plurality of user services. Additionally, as mentioned above, the system 110 may associate each of the plurality of user services with each of the plurality of user interaction stages. Therefore, each of the plurality of user interaction stages may be associated with the plurality of user services, and each of the plurality of user services may be associated with the plurality of events. The modeler 160 may identify the event sequence comprising the plurality of events associated with the plurality of user services that may be offered to an end-user at each of the plurality of user interaction stages. In an example, the modeler 160 may update the event sequence based on a modification in any of the plurality of data domains. The modeler 160 may update the event sequence based on a change in the plurality of user interaction stages.

The modeler 160 may create a user service sequence comprising the plurality of user services associated with the event sequence. As mentioned above, each of the plurality of user interaction stages may be associated with the plurality of user services, and each of the plurality of user services may be associated with the plurality of events. The modeler 160 may amalgamate the plurality of user services that may be offered to an end-user at each of the plurality of user interaction stages. The modeler 160 may chronologically arrange each of the plurality of user services such that a user service that may be required foremost may be provided first to an end-user. In an example, the modeler 160 may update the user service sequence based on a modification in any of the plurality of data domains.

The modeler 160 may generate a user experience result based on the event sequence and the user service sequence. The user experience result comprising the plurality of user interaction stages orchestrated to retrieve the associated orchestration data from the plurality of data domains in response to the associated action activator on a real-time basis. The user experience result may be explained in detail by way of subsequent Figs. In accordance with various embodiments of the present disclosure, the modeler 160 may create a unique journey map for an individual end-user comprising the user experience result with the plurality of user interaction stages, the associated event sequence, and the associated recipe sequence applicable to the individual end-user. The user experience result may be explained in detail by way of subsequent Figs.

In accordance with various embodiments of the present disclosure, the modeler 160 may create a recipe sequence for each of the plurality of events. The recipe sequence comprising a plurality of recipes associated with the plurality of actions associated with each event from the plurality of events. As mentioned above, each of the plurality of events may be associated with the plurality of user services. The content aggregator 130 may obtain the orchestration data associated with each of the plurality of events present in the event loop for providing a user service from the plurality of user services. In an example, each of the plurality of user services may have an associated event loop. The modeler 160 may create the recipe sequence to include the plurality of recipes for encompassing the event loop associated with each of the plurality of user services. The recipe sequence may include the plurality of recipes for each of the plurality of actions associated with each of the plurality of events included in the event loop. In an example, the modeler 160 may update the recipe sequence based on a modification in any of the plurality of data domains. In an example, the event sequence may include the recipe sequence for each of the plurality of events comprised therein. In accordance with various embodiments of the present disclosure, the modeler 160 may update the recipe sequence based on the updated event result.

The embodiments for the artificial intelligence component, the first cognitive learning operations, and the second cognitive learning operations presented herein are exemplary in nature and should be treated as such. For the sake of brevity and technical clarity, the description of the digital orchestration system may be restricted to few exemplary embodiments, however, to a person skilled in the art it should be clear that the system may be used for the fulfillment of various answer generation and textual entailment requirements other than those mentioned hereinafter.

Figure 2:
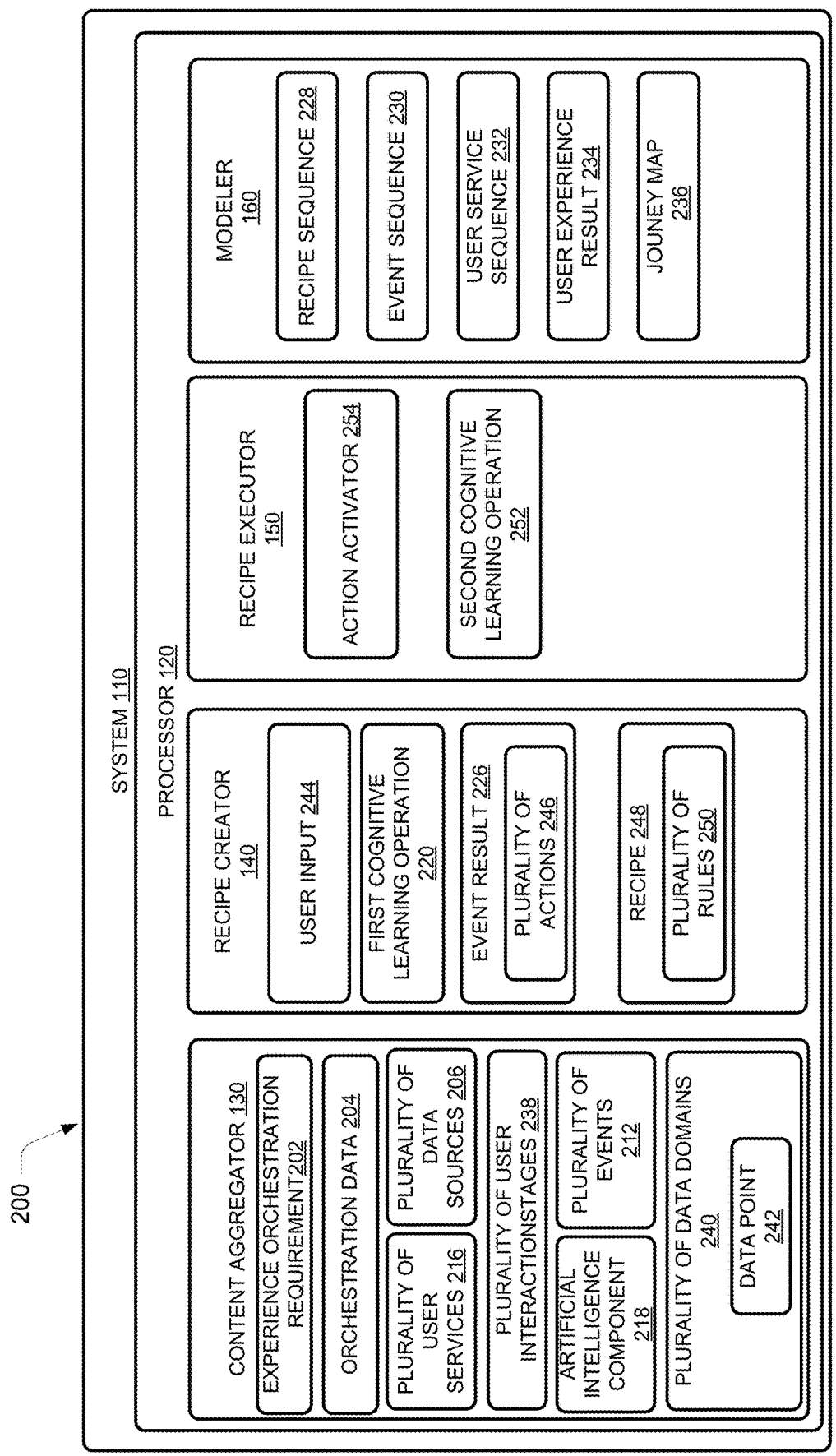
FIG. 2 illustrates various components of a digital orchestration system, according to an example embodiment of the present disclosure.

FIG. 2 illustrates various components of the digital orchestration system 110, according to an example embodiment of the present disclosure. In an example, the system 110 may include the processor 120. The processor 120 may be coupled to the content aggregator 130, the recipe creator 140 and the modeler 160.

In accordance with an embodiment of the present disclosure, the content aggregator 130 may obtain a query from a user. The query may indicate an experience orchestration requirement 202 comprising a plurality of user services 216 and a plurality of user interaction stages 238. Each of the plurality of user services 216 may be associated with a user interaction stage from the plurality of user interaction stages 238. The experience orchestration requirement 202 may be associated with at least one of a process, an organization, and an industry-relevant for providing various services to various users. In an example, the experience orchestration requirement 202 may be to choreograph new journey maps, experience, and recipes. In an example, the experience orchestration requirement 202 may be to register new events, actions and services to create newer dynamic experiences for various consumers. In accordance with an embodiment of the present disclosure, the experience orchestration requirement 202 may be to facilitate configuration and execution of newer dynamic processes to take effect without any code rebuild and newer deployments. In accordance with an embodiment of the present disclosure, the experience orchestration requirement 202 may be to mash-up up a context to a service to provide personalized experiences. In accordance with an embodiment of the present disclosure, the experience orchestration requirement 202 may be constructed in order to choreograph the business events and digital services in a loosely coupled manner to create a new experience dynamically based on various events and locations. In accordance with an embodiment of the present disclosure, the experience orchestration requirement 202 may be to augment a context of an event or action through artificial intelligence to make runtime decisions. In accordance with an embodiment of the present disclosure, the experience orchestration requirement 202 may be to create a unique experience for a consumer based on consumer behavior & situational insights at that moment.

As mentioned above, the orchestration requirement may include a plurality of user services 216 and a plurality of user interaction stages 238. The plurality of user services 216 may refer to various user services that an organization may provide to a consumer, for example, living services. The living services may be sophisticated, contextually-aware digital services designed to anticipate and respond to the needs of a user. The living services may react in real-time to changes in the environment and patterns of behavior. The plurality of user services 216 may include various health services, transportation, insurance, utilities, and security services. The plurality of user services 216 may be based on predicting and reacting to consumers changing needs and circumstances. The plurality of user interaction stages 238 may include various discrete touchpoints where a consumer may interact with a digital environment. For example, the plurality of user interaction stages 238 may include booking a transport service to an airport, a security check at an airport, booking a holiday, and the like. In accordance with an embodiment of the present disclosure, the system 110 may associate each of the plurality of user services 216 with each of the plurality of user interaction stages 238. In an example, each of the plurality of user services 216 may be associated with a user interaction stage from the plurality of user interaction stages 238. In an example, a user service from the plurality of user services 216 may be associated with more than one user interaction stage from the plurality of user interaction stages 238. For example, a user service pertaining to ordering food may be available to a user across the plurality of user interaction stages 238.

In accordance with an embodiment of the present disclosure, the experience orchestration requirement 202 may pertain to selecting the plurality of user services 216 for providing to an end-user at an associated user interaction stage from the plurality of user interaction stages 238. For example, the experience orchestration requirement 202 may be selecting a plurality of services associated with booking a transport service to an airport such as calculating an estimated time of arrival at the airport, travel insurance services, food pick up services en-route, various shopping vouchers, and shopping associated services and the like. For the purpose of this document, the user of the system 110 may be an organization, a service provider, a service manager, and the like. The end-user of the system 110 may be a set of consumers catered to by the user of the system 110. The system 110 may be deployed by the user for orchestrating various experiences for end-users. Therefore, the system 110 may have a user interface, wherein the user of the system 110 may configure various interactions and orchestrations. The system 110 may have an end-user interface, which the end-user may access.

The content aggregator 130 may obtain orchestration data 204 associated with the query from a plurality of data sources 206 on a real-time basis. The orchestration data 204 may be present in multiple systems across various geographical locations. The orchestration data 204 may have multiple forms. The orchestration data 204 may be available as a JavaScript Object Notation (JSON) formatted data file. For the sake of brevity and technical clarity, various formats of the orchestration data 204 have not been mentioned herein, by should be clear to a person skilled in the art. The orchestration data 204 may be generated by multiple digital touchpoints. The orchestration data 204 may be in-transit from one system to another. The orchestration data 204 may reside in large database systems, for example, a knowledge base. The orchestration data 204 may reside in a simple form. The orchestration data 204 may be referred to as an entity. A user of the system 110 may combine orchestration data 204 and perform operations such as for example, arithmetic, logical and the like to decide a suitable intelligent action to be performed. The orchestration data 204 may include data related to any of the plurality of user services 216. The orchestration data 204 may include data related to any of the plurality of user interaction stages 238. The orchestration data 204 may be a dataset relevant to the plurality of user services 216 and the plurality of user interaction stages 238

In an example, the system 110 may identify the orchestration data 204 from the plurality of sources based on a user preference, a consumer preference, the plurality of user services 216 and the plurality of user interaction stages 238. The orchestration data 204 may be updated based on a user preference, a consumer preference, a modification in any of the plurality of user services 216, a modification in any of the plurality of user interaction stages 238. In accordance with an embodiment of the present disclosure, the orchestration data 204 may be updated based on user input for the plurality of user services 216. The orchestration data 204 may be updated based on user input for the plurality of user interaction stages 238. The system 110 may be configured such that the content aggregator 130 may obtain the updated orchestration data 204 on a real-time basis. The orchestration data 204 may be updated at any stage while implementing the system 110 and the system 110 may reflect the update across all components of the system 110 and across all interactions of the system 110 with the user and various end-users.

In accordance with an embodiment of the present disclosure, the plurality of data sources 206 may further include a natural language data directory. The natural language data directory may be a pre-existing text corpus stored in the system 110. The text corpus may refer to a large and structured set of texts that may be used to do a statistical analysis, hypothesis testing, checking occurrences or validating linguistic rules within a specific language territory. In an example, the text corpus may be the Stanford Natural Language Inference (SNLI) text corpus comprising a collection of labeled sentence pairs. For the sake of brevity and technical clarity, various natural language data directories have not been mentioned herein, by should be clear to a person skilled in the art.

The content aggregator 130 may implement an artificial intelligence component 218 to identify a plurality of events 212 based on the plurality of user interaction stages 238 from the orchestration data 204. Each of the plurality of events 212 may be associated with the plurality of user services 216. An event from the plurality of events 212 may be a message sent by the user to signal the occurrence of an action. The action may be caused by user interaction, such as for example, a button click, automated detection of a change in a geographical location of an end-user or consumer. An event may be an action or occurrence recognized by the system 110, which may be originating asynchronously from an external environment, that may be handled by the software. The plurality of events 212 may be generated or triggered by the system 110, by the user or in other ways. Additionally, the event may be handled synchronously with the program flow, and the system 110 may have one or more dedicated places referred to as an event catalog where the plurality of events 212 may be stored or cataloged. The artificial intelligence component 218 may create inter-relations amongst the plurality of events 212 such that an event loop may be created wherein, an event from the plurality of events 212 may be followed by another specified event from the plurality of events 212. In an example, the event loop may terminate based on input from the end-user or a consumer on a real-time basis. In an example, the user may specify a set of criteria for automated termination of the event loop. In an example, a source of events may include the end-user or consumer, who may interact with the system 110. The system 110 may, in turn, interact with the event catalog to drive further event-driven interaction. In an example, the event source may be a hardware device such as a timer. The content aggregator 130 may trigger any of the plurality of events 212 from the event catalog and into the event loop. As mentioned above, each of the plurality of events 212 may be associated with the plurality of user services 216. For example, a user service may be to provide a communication alert to a user when a user may be delayed for boarding a flight from an airport. For such a user service the plurality of events 212 may include calculating the time at across the plurality of user interaction stages 238, for example, the time required to reach the airport, time required for the security check-in, the time required for commuting up to a boarding terminal. In accordance with an embodiment of the present disclosure, the user may create an event library for each of the plurality of user services 216. The system 110 may be configured so that each of the event libraries may be stored in the event catalog. The event library may be updated based on user input. The event library may be updated based on a modification in the orchestration data 204. The content aggregator 130 may obtain the orchestration data 204 associated with each of the plurality of events 212 present in the event loop for providing a user service from the plurality of user services 216. The content aggregator 130 may update the event loop based on a modification in any of the plurality of user services 216 or across any of the plurality of user interaction stages 238.

In accordance with various embodiments of the present disclosure, the artificial intelligence component 218 may include various artificial intelligence techniques, for example, a Natural Language Processing (NLP) model. In an example, the NLP model may be the development of a neural network with open information extraction systems like Knowledge graphs, and Never-Ending Language Learning (NELL), that may be used in mining the vast repository of the web and building a knowledge system, in the form of interrelated facts or a knowledge graph. This extracted knowledge may be used to provide reasoning and inference on the set of entities, their attributes, and their interrelations. The system 110 may deploy any of the NLP models not mentioned herein for identifying the plurality of events 212 based on the plurality of user interaction stages 238 from the orchestration data 204. The NLP model may be an interactive goal-oriented model, which may change the behavior of the plurality of events 212 and the event loop in response to a modification in any of the plurality of events 212. For the sake of brevity and technical clarity further details regarding various NLP models may be not be described herein, however, the same should be clear to a person skilled in the art.

The content aggregator 130 may implement the artificial intelligence component 218 to sort the orchestration data 204 based on the plurality of events 212 into a plurality of data domains 240. The content aggregator 130 may implement the NLP model to map the orchestration data 204 with each of the plurality of events 212 and create the plurality of data domains 240 therefrom. The plurality of data domains 240 may include the orchestration data 204 associated with the plurality of user services 216, the user of the system 110, the end-user of the system 110, across the plurality of user interaction stages 238 categorized based on the plurality of events 212 associated with each of the plurality of user services 216 across the plurality of user interaction stages 238 for all the end-users of the system 110. The plurality of data domains 240 may be accessible to the user of the system 110. The content aggregator 130 may update the plurality of data domains 240 based on an update in the orchestration data 204. As mentioned above, the orchestration data 204 may be updated on a real-time basis. Each of the plurality of data domains 240 may be comprising a data point 242 associated with an event from the plurality of events 212. As mentioned above, a user of the system 110 may combine the orchestration data 204 and perform operations such as for example, arithmetic, logical and the like to decide a suitable intelligent action to be performed. The data point 242 for each of the plurality of events 212 may constitute the aspect of the orchestration data 204 that may be used for performing the aforementioned operations to decide a suitable intelligent action to be performed. In an example, the plurality of data domains 240 may be a collection of data points 242 for performing the aforementioned operations.

The recipe creator 140 may implement a first cognitive learning operation 220 on each of the data points 242 associated with the plurality of events 212 to identify an event result 226 comprising a plurality of actions 246 associated with each of the plurality of events 212. The first cognitive learning operation 220 may further include implementing various machine learning techniques and machine learning algorithms such as TensorFlow, SpaCy, PyTorch and the like for deriving a self-updating self-sustaining neural attention model. In an example, first cognitive learning operation 220 may deploy a Recurrent Neural Network (RNN) type of Neural Network wherein, the output from a previous step may be fed as input to a current step. The RNN may be deployed to predict an event from the plurality of events 212, to predict a user service from the plurality of user services 216, to predict a user interaction stage from the plurality of user interaction stages 238. Hence, there may be a need to remember orchestration data 204 related to all previous plurality of events 212, previous plurality of user services 216, a previous plurality of user interaction stages 238. The system 110 may deploy various RNN-based models as part of the first cognitive learning operation 220 on each of the data points 242 associated with the plurality of events 212 to identify an event result 226 comprising a plurality of actions 246 associated with each of the plurality of events 212. In accordance with an embodiment of the present disclosure, an action from the plurality of actions 246 may include pushing a user service from the plurality of user services 216 towards the end-user in response to an event from the plurality of events 212. In accordance with an embodiment of the present disclosure, each of the plurality of actions 246 may include driving a user service from the plurality of user services 216 in response to the associated event from the plurality of events 212. The recipe creator 140 may create an action catalog for each of the plurality of events 212. In accordance with an embodiment of the present disclosure, the action catalog may be updated based on input from the user of the system 110. In an example, the action catalog may be updated in an automated manner based on an update in the plurality of events 212, an update in the plurality of user services 216, and an update in the plurality of user interaction stages 238. In accordance with an embodiment of the present disclosure, the event result 226 may comprise the plurality of actions 246 that may be construed to be possible based in the context of the event. For example, as mentioned above, a user service may be to provide a communication alert to a user when a user may be delayed for boarding a flight from an airport. For such a user service the plurality of events 212 may include calculating the time at across the plurality of user interaction stages 238, for example, the time required to reach the airport, time required for the security check-in, the time required for commuting up to a boarding terminal. The plurality of actions 246 may include comparing the flight departure time with the current time. The plurality of actions 246 may further include comparing the time required to complete each of the plurality of user interaction stages 238 with the flight departure time. Additionally, the plurality of actions 246 may also include updating the flight departure time based on an update from the associated airport, airline and the like before repeating the plurality of actions 246 mentioned above to provide a real-time update.

The recipe creator 140 may create a recipe 248 associated with each of the plurality of actions 246. The recipe 248 may be a set of reusable pre-built industry/functional template created by mash-up of different data from different systems to address certain problems to provide a better user experience The recipe 248 may comprise a plurality of rules 250 to retrieve the orchestration data 204 from the plurality of data domains 240 to offer an associated user service from the plurality of user services 216 based on an associated user interaction stage from the plurality of user interaction stages 238. The creation of a recipe 248 may be explained in detail by way of subsequent Figs. As mentioned above, the plurality of data domains 240 may include the orchestration data 204 associated with the plurality of user services 216, the user of the system 110, the end-user of the system 110, across the plurality of user interaction stages 238 categorized based on the plurality of events 212 associated with each of the plurality of user services 216 across the plurality of user interaction stages 238 for all the end-users of the system 110. The recipe creator 140 may create the plurality of rules 250 for retrieving orchestration data 204 from the plurality of data domains 240 in an automated manner. The plurality of rules 250 may be based on a context relevant to an action from the plurality of actions 246. The recipe 248 constituted by the plurality of rules 250 may be used to pull relevant orchestration data 204 from the plurality of data domains 240 in order to execute an action from the plurality of actions 246 in response to an event from the plurality of events 212 for offering a user service from the plurality of user services 216 across a user interaction stage from the plurality of user interaction stages 238. The recipe creator 140 may update the plurality of rules 250 thereby updating the associated with the recipe 248 based in a modification in any of the plurality of user services 216, the plurality of user interaction stages 238, the plurality of events 212, the plurality of actions 246, user input, an end-user input and the like. The process of updating a recipe 248 may be explained in detail by way of subsequent Figs. The recipe creator 140 may create a new recipe 248 for each of the aforementioned modifications. The recipe creator 140 may publish each of the recipes onto a recipe 248 database. The process of publishing a recipe 248 may be explained in detail by way of subsequent Figs. In accordance with an embodiment of the present disclosure, the recipe creator 140 may create a new set of the plurality of rules 250 thereby creating a new recipe 248 based in on an output generated by the system 110 after implementation of the first cognitive learning operation 220 on the data points 242 from the plurality of data domains 240. In accordance with an embodiment of the present disclosure, action from the plurality of actions 246 may include a user service from the plurality of user services 216 pushed towards the end-user in response to an event based on the recipe 248. The recipe creator 140 may create the plurality of rules 250 for retrieval of the orchestration data 204 associated with each of the plurality of actions 246. In accordance with various embodiments of the present disclosure, the recipe creator 140 may update the event result 226 and the recipe 248 based on the update in the plurality of data domains 240 indicated by a change in the orchestration data 204 indicated by a data source from the plurality of data sources 206.

In accordance with various embodiments of the present disclosure, the recipe creator 140 may obtain user input 244 to implement a first cognitive learning operation 220 on each of the data points 242. For example, in the example mentioned above, wherein the user service may be to provide a communication alert to a user when a user may be delayed for boarding a flight from an airport. For such a user service the plurality of events 212 may include calculating the time at across the plurality of user interaction stages 238, for example, the time required to reach the airport, time required for the security check-in, the time required for commuting up to a boarding terminal. The plurality of actions 246 may include comparing the flight departure time with the current time. The plurality of actions 246 may further include comparing the time required to complete each of the plurality of user interaction stages 238 with the flight departure time. The user may wish to provide an additional user service such as food pick up en-route the airport. Additionally, the user may wish to provide various shopping vouchers, discounts or marketing deals related to various shopping outlets en-route the airport, and within the airport. The recipe creator 140 may obtain user input 244 based on above the user services to implement a first cognitive learning operation 220 on each of the data points 242 and create the plurality of rules 250 for retrieval of relevant orchestration data 204.

The event result 226 may be determined to include the plurality of rules 250 and the recipe creator 140 may create the plurality of rules 250 for each of the plurality of actions 246. The recipe executor 150 may identify an action activator 254 based on the event result 226 and associated with each of the plurality of actions 246, the action activator 254 to prompt an action from the plurality of actions 246. In accordance with an embodiment of the present disclosure, the action activator 254 may be a selection of a user service from the plurality of user services 216 made by the user, a selection of a user service from the plurality of user services 216 made by the end-user. The action activator 254 may be a moment that may be a perceivable unit in time where the end-user may interact with the components of the system 110. The action activator 254 may prompt a selection of an action from the plurality of actions 246 in response to an event from the plurality of events 212 for providing a user service from the plurality of user services 216 at a user interaction stage from the plurality of user interaction stages 238. The process deployed by the action activator 254 may be explained in detail by way of subsequent Figs.

The recipe executor 150 may implement a second cognitive learning operation 252 to identify the recipe 248 associated with the action prompted through the action activator 254. The second cognitive learning operation 252 may further include implementing various machine learning techniques and machine learning algorithms such as TensorFlow, SpaCy, PyTorch and the like for deriving a self-updating self-sustaining neural attention model. In an example, the second cognitive learning operation 252 may deploy an RNN wherein, the output from a previous step may be fed as input to a current step. The RNN may be deployed to predict or select a recipe 248 for an action prompted by the action activator 254 in response to an event from the plurality of events 212 for providing a user service from the plurality of user services 216 at a user interaction stage from the plurality of user interaction stages 238. Hence, there may be a need to remember orchestration data 204 and recipe 248 related to all previous plurality of actions 246, a previous plurality of events 212, a previous plurality of user services 216, and a previous plurality of user interaction stages 238. The system 110 may deploy various RNN based models as part of the second cognitive learning operation 252 on the recipe 248 database for selecting a recipe 248 for an action prompted by the action activator 254 in response to an event from the plurality of events 212 for providing a user service from the plurality of user services 216 at a user interaction stage from the plurality of user interaction stages 238.

The recipe executor 150 may implement the recipe 248 associated with the action prompted through the action activator 254 by retrieving the orchestration data 204 from the plurality of data domains 240 based on the associated plurality of rules 250 and offer to an end-user the associated plurality of user services 216 based on the associated plurality of user interaction stages 238. The process details for implementation of the recipe 248 may be described by way of subsequent Figs. In accordance with various embodiments of the present disclosure, the recipe executor 150 may implement the second cognitive learning operation 252 to identify a multitude of recipes associated with the action prompted through the action activator 254. For example, in the example mentioned above, wherein the user service may be to provide a communication alert to a user when a user may be delayed for boarding a flight from an airport. For such a user service the plurality of events 212 may include calculating the time at across the plurality of user interaction stages 238, for example, the time required to reach the airport, time required for the security check-in, the time required for commuting up to a boarding terminal. The user of the system may want to further provide, for example, en-route shopping services. The plurality of actions 246 may include comparing the flight departure time with the current time. The plurality of actions 246 may further include comparing the time required to complete each of the plurality of user interaction stages 238 with the flight departure time. As mentioned above, the recipe creator 140 may create a recipe 248 for each of the plurality of actions 246. The recipe executor 150 may implement the second cognitive learning operation 252 to identify a multitude of recipes from the recipe 248 database pertaining to each of plurality of actions 246 including comparing the time required to complete each of the plurality of user interaction stages 238 with the flight departure time. The multitude of recipes may include a recipe 248 for time calculation at each of the plurality of user interaction stages 238 involved herein, a recipe 248 for delay alert generation for a user at airport security, a recipe 248 for an 'ample time for shopping' alert generation, a recipe 248 for 'no time for shopping' alert generation, a recipe 248 for 'food pick up' alert generation, a recipe 248 for 'no time to eat' alert generation, and the like. In accordance with various embodiments of the present disclosure, the recipe executor 150 may execute a recipe 248 from the multitude of recipes associated with the action prompted through the action activator 254 based on a result from any of the plurality of user interaction stages 238 for an individual end-user. For example, the recipe executor 150 may implement the second cognitive learning operation 252 to detect the location of the individual end-user, which may be for example, at the security check-in counter of an airport. The recipe executor 150 may retrieve the recipe 248 for calculating the time required to navigate the security check-in counter and reach the boarding terminal. Further, the recipe executor 150 may retrieve the recipe 248 to compare the time calculated above with a boarding gate closing time. The recipe executor 150 may implement the second cognitive learning operation 252 to decide a recipe 248 to implement from the recipe 248 for delay alert generation for a user at airport security, the recipe 248 for an 'ample time for shopping' alert generation, the recipe 248 for 'no time for shopping' alert generation, the recipe 248 for 'food pick up' alert generation, the recipe 248 for 'no time to eat' alert generation, and the like based on the location of individual end-user. In an example, the recipe executor 150 may obtain an end-user input 244 from the individual end-user for executing a recipe 248 from the multitude of recipes.

The modeler 160 may create a recipe sequence 228 for each of the plurality of events 212. The recipe sequence 228 may comprise a plurality of recipes associated with the plurality of actions 246 associated with each event from the plurality of events 212. As mentioned above, each of the plurality of events 212 may be associated with the plurality of user services 216. The content aggregator 130 may obtain the orchestration data 204 associated with each of the plurality of events 212 present in the event loop for providing a user service from the plurality of user services 216. In an example, each of the plurality of user services 216 may have an associated event loop. The modeler 160 may create the recipe sequence 228 to include the plurality of recipes for encompassing the event loop associated with each of the plurality of user services 216. The recipe sequence 228 may include the plurality of recipes for each of the plurality of actions 246 associated with each of the plurality of events 212 included in the event loop. In an example, the modeler 160 may update the recipe sequence 228 based on a modification in any of the plurality of data domains 240. In accordance with various embodiments of the present disclosure, the modeler 160 may create the recipe sequence 228 based on obtaining user input 244. In an example, the user may deploy a drag and drop mechanism for arranging the plurality of recipes in the desired sequence. The modeler 160 may retrieve data points 242 associated with each action from the plurality of actions 246 associated with each recipe 248 from the plurality of recipes to perform appropriate mapping of the entities used in the recipe sequence 228. The recipe sequence 228 may also be referred to as a recipe tree.

The modeler 160 may create an event sequence 230 for each of the plurality of user interaction stages 238. The event sequence 230 may comprise the plurality of events 212 associated with a user interaction stage from the plurality of user interaction stages 238. As mentioned above, each of the plurality of events 212 may be associated with the plurality of user services 216. Additionally, as mentioned above, the system 110 may associate each of the plurality of user services 216 with each of the plurality of user interaction stages 238. Therefore, each of the plurality of user interaction stages 238 may be associated with the plurality of user services 216, and each of the plurality of user services 216 may be associated with the plurality of events 212. The modeler 160 may identify the event sequence 230 comprising the plurality of events 212 associated with the plurality of user services 216 that may be offered to an end-user at each of the plurality of user interaction stages 238. The event sequence 230 may include the recipe sequence 228 for each of the plurality of events 212 comprised therein. In an example, the modeler 160 may update the event sequence 230 based on a modification in any of the plurality of data domains 240. In accordance with various embodiments of the present disclosure, the modeler 160 may update the recipe sequence 228 based on the updated event result 226. The modeler 160 may update the event sequence 230 based on a change in the plurality of user interaction stages 238. In accordance with various embodiments of the present disclosure, the modeler 160 may create the event sequence 230 based on obtaining user input 244. In an example, the user may deploy a drag and drop mechanism for arranging the plurality of events 212 in the desired sequence. The modeler 160 may retrieve data points 242 associated with each of the plurality of actions 246 associated with each of the plurality of events 212 to perform appropriate mapping of the entities used in the event sequence 230. The recipe sequence 228 may also be referred to as an event tree The modeler 160 may create a user service sequence 232 comprising the plurality of user services 216 associated with the event sequence 230. As mentioned above, each of the plurality of user interaction stages 238 may be associated with the plurality of user services 216, and each of the plurality of user services 216 may be associated with the plurality of events 212. The modeler 160 may amalgamate the plurality of user services 216 that may be offered to an end-user at each of the plurality of user interaction stages 238. The modeler 160 may chronologically arrange each of the plurality of user services 216 such that a user service that may be required foremost may be provided first to an end-user. In an example, the modeler 160 may update the user service sequence 232 based on a modification in any of the plurality of data domains 240.

The modeler 160 may generate a user experience result 234 based on the event sequence 230 and the user service sequence 232. The user experience result 234 may comprise the plurality of user interaction stages 238 orchestrated to retrieve the associated orchestration data 204 from the plurality of data domains 240 in response to the associated action activator 254 on a real-time basis. The user experience result 234 may be explained in detail by way of subsequent Figs. In accordance with various embodiments of the present disclosure, the modeler 160 may create a unique journey map 236 for an individual end-user comprising the user experience result 234 with the plurality of user interaction stages 238, the associated event sequence 230, and the associated recipe sequence 228 applicable to the individual end-user. The user experience result 234 may be explained in detail by way of subsequent Figs. In accordance with various embodiments of the present disclosure, the modeler 160 may create an experience sequence (also referred to as an "experience tree") based on obtaining user input 244. In an example, the user may deploy a drag and drop mechanism for arranging the plurality of user interaction stages 238 in the desired sequence. In an example, the user may deploy the drag and drop for arranging each of the plurality of recipe 248 associated with each of the plurality of user interaction stages 238. The modeler 160 may retrieve data points 242 associated with each plurality of user interaction stages 238 from the plurality of data domains 240 and perform appropriate mapping to construct the experience tree. The user of the system 110 may publish each of the user experiences for each of the plurality of user interaction stages 238 by the way of the experience sequence. In an example, the modeler 160 may generate a plurality of user experience result 234$s$ for each of the plurality of user interaction stages 238. The modeler 160 may identify the user experience result 234 for an individual end-user from amongst the plurality of user interaction stages 238 based on an input obtained from the user of the system or an end-user of the system.

The embodiments for the artificial intelligence component 218, the first cognitive learning operation 220, and the second cognitive learning operation 252 presented herein are exemplary in nature and should be treated as such. For the sake of brevity and technical clarity, the description of the digital orchestration system may be restricted to few exemplary embodiments, however, to a person skilled in the art it should be clear that the system may be used for the fulfillment of various answer generation and textual entailment requirements other than those mentioned hereinafter.

In operation, the system 110 may include the content aggregator 130 that may obtain the experience orchestration requirement 202 from the user of the system 110. The experience orchestration requirement 202 may be associated with the plurality of user services 216 and the plurality of user interaction stages 238. In accordance with an embodiment of the present disclosure, each of the plurality of user services 216 may be associated with each of the plurality of user interaction stages 238. The content aggregator 130 may obtain the orchestration data 204 from the plurality of data sources 206 on a real-time basis. The content aggregator 130 may identify the plurality of events 212 associated with each of the plurality of user services 216 across each of the plurality of user interaction stages 238. The content aggregator 130 may implement the artificial intelligence component 218 to sort the orchestration data 204 into a plurality of data domains 240 comprising a data point 242 that may be associated with the plurality of events 212. The plurality of events 212 may be associated with the plurality of user services 216. The content aggregator 130 may implement the artificial intelligence component 218 to update the plurality of domains based on a change in the orchestration data 204 indicated by a data source from the plurality of data sources 206. The artificial intelligence component 218 may include the NLP model, which may track the orchestration data 204 on a real-time basis and continue to update the orchestration data 204 based on various parameters mentioned above. The system 110 may further include the recipe creator 140 that may implement the first cognitive learning operation 220 over each of the plurality of events 212 and determine the event result 226. The event result 226 may include the plurality of actions 246 associated with each of the plurality of events 212. The recipe creator 140 may create the recipe 248 for each of the plurality of actions 246. The recipe 248 includes the plurality of rules 250 for retrieving the orchestration data 204 from the plurality of data domains 240 to offer an associated user service from the plurality of user services 216 based on an associated user interaction stage from the plurality of user interaction stages 238. The system 110 may further include the recipe executor 150 that may identify the action activator 254 as described above. The action activator 254 may prompt an action from the plurality of actions 246 in response to an event from the plurality of events 212 in order to offer a user service from the plurality of user services 216 across the plurality of user interaction stages 238. The recipe executor 150 may implement the second cognitive learning operation 252 to identify the recipe 248 associated with action prompted by the action activator 254. In an example, as mentioned above, the recipe executor 150 may implement the second cognitive learning operation 252 to identify a multitude of recipes associated with the action prompted through the action activator 254. The recipe executor 150 may execute a recipe 248 from the multitude of recipes associated with the action prompted through the action activator 254 based on a result from any of the plurality of user interaction stages 238 for an individual end-user. The system may further include a modeler 160 that may create the recipe sequence 228, the event sequence 230, and the user service sequence 232 as described above. The modeler 160 may generate the user experience result 234 based on the event sequence 230 and the user service sequence 232. The user experience result 234 may be comprising the plurality of user interaction stages 238 orchestrated to retrieve the associated orchestration data 204 from the plurality of data domains 240 in response to the associated action activator 254 on a real-time basis. In accordance with an embodiment of the present disclosure, the modeler 160 may create a unique journey map 236 for an individual end-user comprising the user experience result 234 with the plurality of user interaction stages 238, the associated event sequence 230, and the associated recipe sequence 228 applicable to the individual end-user. The unique journey map 236 may include the user experience result 234 including the plurality of user interaction stages 238 with the associated the user service sequence 232, the associated event sequence 230. Further, the event sequence 230 may include the recipe sequence 228 corresponding the associated plurality of actions 246 that may, in turn, correspond to an event loop associated with the user service from the plurality of user services 216 for a user interaction stage from the plurality of user interaction stages 238.

The system 110 may be deployed by constructing the user experience result 234. The user experience result 234 may include generation of personalized user experience for an end-user for various situations such as traveling, socializing, and the like. The experience generation may include an experience construction and an experience execution. The experience construction may include constructing the experience for the end-users. The experience construction may include registration of events, entities and actions to form objects as performed by the content aggregator 130 by way of identifying the plurality of user services 216, the plurality of user interaction stages 238, and the plurality of events 212 based on the plurality of user interaction stages 238 and associated with the plurality of user services 216. The experience construction may further include arrangement of these objects in right manner to perform arithmetic and logical operations as performed by the content aggregator 130 by creating the plurality of data domains 240 and the recipe creator 140 by the creating the plurality of actions 246 associated with each event from the plurality of events 212 and by creating the recipe 248 associated with each of the plurality of actions 246. The experience construction may further include attaching various actions to be triggered on the basis of the outcome of the operations as performed by the recipe executor 150 by identification of the action activator 254.

The experience execution may include executing the experience in real-time as done by the system 110. The experience execution may include analyzing the plurality of events 212, performs the first cognitive learning operation 220 to create the recipe 248, and the second cognitive learning operation 252 to identify the recipe 248 to be executed and fires the plurality of actions 246 based on an associated recipe 248 all in a synchronous way. The system 110 may deploy an event-driven architectural pattern (explained below by way of subsequent Figs). The event-driven architectural pattern may have event listener services, components to execute the arithmetic and logical operations and action performer services to perform the various actions. In accordance with an embodiment of the present disclosure, the plurality of events 212 may get generated from multiple digital touchpoints, for example, a mobile application, various beacons, various system triggers such as printer malfunction, and the like. In real-time, when such events may get triggered with the event sequence 230 (also referred to as "event schema" hereinafter) and associated orchestration data 204, the event listeners may receive those events in a queue. On the basis of those events in the queue, the recipe executor 150 may implement (also referred to as "event equation executor" hereinafter) the respective recipes (also referred to as "logical equations" hereinafter) by invoking the plurality of rules 250 to take informed decisions and to perform respective actions. The recipe executor 150 (also referred to as "actions executor" hereinafter) may perform these actions by invoking an external system API to provide data on multiple digital channels such as Bot, SMS, a push notification, JSON cards, stream data on WebSocket, and the like. Various exemplary embodiments of deploying the system 110 may be described by way of FIGS. 3-44C.

Accordingly, the system 110 and various embodiments thereof may provide an effective and efficient system for digital orchestration system that may facilitate choreography of newer experiences by leveraging mashed up data services across different systems along with real-time context like presence, location, vision, AI, analytic insights, etc. The digital orchestration system may allow pushing new mashed-up data and services to customer's channels of preference. All components described by way of FIG. 1 and FIG. 2 may be used for explaining any of the FIG. 3-FIG. 44C and may not be repeated hereinafter for the sake of brevity and technical clarity.

In accordance with various embodiments of the present disclosure, the system 110 may be deployed across various sectors such as education, healthcare, aeronautical, finance, management, and the like. A few exemplary embodiments for deployments of the system 110 in the educational sector are presented herein.

In an example, a person named Alex may a student and a football fanatic. He may use multiple social media platforms to connect with his friends. His favorite football team may be from Manchester. He may be currently in sixth-form college and may be looking for a university to pursue after his senior year. Alex may be a well-rounded student. He may have academic and athletic proficiencies that may have been noticed well at school and Alex may have received a scholarship for football for sixth-form college. Alex may frequently visit Old Trafford in Manchester to watch his favorite team train or play. One day on the way to a match he may notice an advert for a university open day to be held on the next day. He may decide to register and go to the university the following day to check it out. He may not be familiar with the campus as he may live north of Manchester and doesn't usually travel to the south of the city. Alex may have wanted to attend a few seminars mentioned on the open day schedule, but it may be difficult for them to find the lecture theatres by themselves and hence, they may find themselves around the seminars they weren't really interested in. In such a scenario, the system 110 may be deployed to create a seamless user-friendly experience for Alex so that he may be able to get the best possible services the university may offer. In the scenario mentioned herein, we may consider the user experience for Alex without the deployment of the system 110, wherein, Alex and his friends may reach the open day and read the schedule for the open seminars and activities. They may plan to see three (3) course seminars and visit the engineering lab. Their experience for events mentioned above may be neutral, which may be expected. However, without the deployment of the system 110, wherein, the location of the seminar halls may not have been made clear. Alex and his friends may have ended up in the right building due to various navigation platforms but may have found it difficult to find the right room and right floor for the course seminars. In an example, eventually, they may get to the welcome seminar late. Their experience for events mentioned above may be "irritated" due to wasted time to find a particular seminar and arrived late. Also, without the deployment of the system 110, wherein, the welcome seminar went over its time limit and they may need to hurry to their next event. The campus may be large and unfamiliar, and they may not have accounted for the time it would take to travel to, for example, the engineering department. They may have gone past many other seminars that may have been of interest which they hadn't seen on the schedule and had to miss one they had planned. Their experience for events mentioned above may be "annoyed", as their plan didn't account for travel time and they missed a seminar they wanted to see as well as others of interest. Additionally, without the deployment of the system 110, wherein, they were unable to make the most of the open day and they had the match tomorrow so couldn't attend the next day. They did not feel that the experience warranted applying to the university over the more positive experience they had at other institutions. Their experience for events mentioned above may be "disappointed", overall negative experience contributed to their choices of the university for the next year.

However, in an example, Alex or any of his friends may have access to the system 110. The system 110 may generate a "CALL TO ACTION", wherein during registration for the open day Alex may be prompted to download the open day app and is given a brief outline of the features. Herein, the system 110 may identify a real-time event "As a prospective student, I want to be able to get the most information about the open day at my convenience". The plurality of events 212 may refer to various contexts and context objects mentioned throughout this document. The system 110 may identify an action for the aforementioned event to be "Registering on the website with an email address, prompt to download open day app. Action Card: Push App download prompt".

The system 110 may generate a notification to "SETS HIS PREFERENCES", wherein Alex may set his course preferences in the app onboarding and the app may give personalized suggestions of seminars and events. Herein, the system 110 may identify a real-time event "As a University, I want prospective students to make the most out of their open day visit and provide them with details of seminars and events that match their course preferences". The system 110 may identify an action for the aforementioned event to be "Prior to the open day they get alert with bus route details and expected time to reach the location along with traffic condition". The system 110 may create the recipe 248 that may be related to a "Deliver" for Alex for the above situation. The system 110 may create the recipe 248 that may be related to an "Alert" and "Deliver" for Alex for the above situation. In an example, the system 110 may create the recipe 248 that may be related to an "Alert" for Alex for the above situation by following steps. Herein, the system 110 may get "Get the list of Students registered for Open Day". The system 110 may "Fetch the topic of Interest of particular Student". The system 110 may "Retrieve seminars based on the interest and map them to student's itinerary". The system may get "Get registered student details/home address". The system 110 may get "get bus details for the next day to pick Alex up from home to University". The system 110 may perform a logical operation over data collected for this event and "Send alert to registered Student informing the Seminars selected, time, venue and the Bus details to commute".

The system 110 may generate a "PERSONALIZED TOUR", wherein Alex may be provided with a suggested itinerary for the day integrated with various navigation platforms such as for example, Google Maps®. As each seminar ends the itinerary adjusts based on his current timing and suggests transport to get to his next destination. Herein, the system 110 may identify a real-time event "As a prospective student, I need to keep track of all the related seminars happening around me and when they commence/end". The system 110 may identify an action for the aforementioned event to be "Send the Alert 15 min prior to the seminar with expected time to walk from the current location to the hall. And show the walking direction". The system 110 may create the recipe 248 that may be related to an "Alert" for Alex for the above situation. The system 110 may create the recipe 248 that may be related to an "Alert" for Alex for the above situation. In an example, the system 110 may create the recipe 248 that may be related to an "Alert" for Alex for the above situation by following steps. Herein, the system 110 may get "Enter University premises". The system 110 may "Calculate Present Location using, for example, Google Maps® API, and calculate the distance and route to the Seminar from current location". The system 110 may perform a logical operation over data collected for this event and "send Alex alert for the route and time to the seminar app to use Google map app to show the route details".

The system 110 may generate "AD-HOC SESSIONS" for Alex, wherein, whenever Alex may be in close proximity to a seminar of interest a notification may pop up to tell him it is starting soon. For example, he may join an ad-hoc event run by the football society over lunch. Herein, the system 110 may identify a real-time event "As a University, I want to recommend relevant seminars to prospective students to attend". The system 110 may identify an action for the aforementioned event to be "Based on user preferences, in any new seminar setup, recommend the users about those". The system 110 may create the recipe 248 that may be related to a "Recommend" for Alex for the above situation.

The system 110 may create the recipe 248 that may be related to a "Recommend" for Alex for the above situation. In an example, the system 110 may create the recipe 248 that may be related to a "Recommend" for Alex for the above situation by following steps. Herein, the system 110 may get a "New Seminar setup". The system 110 may "Fetch Next Seminar and Fetch the list of interested persons for those seminars". The system 110 may "Retrieve Get Person Details". The system may get "Get registered student details/home address". The system 110 may perform a logical operation over data collected for this event and "Make Alex select any newly added seminars at that moment and route him to the seminar hall". The system 110 may facilitate in providing Alex with an overall happy experience as opposed to a varying spectrum of experiences Alex may go through without deployment of the system 110.

In an example, there may be an event wherein, there may be a workshop event in University and students have enrolled for the workshop. Due to changes in workshop timings, students will receive notification of the changed workshop date, time and venue. In such an example, the system 110 may create the recipe 248 for "WorkshopScheduleChange". The system 110 may "Fetch Next Seminar and Fetch the list of interested persons for those seminars". The system 110 may "Retrieve Student List". The system may get a "Get Bus Schedule". The system 110 may perform a logical operation over data collected for this event and "generate detailed notification".

In an example, a person named Amy may be an adventure-seeking high-school student investigating opportunities to go to university to study Engineering. Her study would be dependent on a university bursary to pay part of her tuition. She has dyslexia and wants to know how the university may support this. Amy may have been to a few university open days this summer and has been through several fairly similar university open day experiences. So far nothing has differentiated itself from the crowd and she has a lot of paper leaflets to check out. Her next open day in her calendar is at the University of Manchester, it's one of her top choices and is ranked favorably in the league tables this year. She is looking forward to seeing what the university has to offer. When she got to Manchester with her parents, they found it difficult to park. When they finally found a spot, they had to walk 15 minutes to the campus using Google Maps® for directions. Arriving at the welcome point she is given another bag of prospectus materials for all the courses on offer at Manchester. Before setting off they planned what they wanted to see using the online schedule for the day. When they arrived to see a seminar on student finance and bursaries there were no seats in the lecture theatre, and they had to wait for the next session. In such a scenario, the system 110 may be deployed to create a seamless user-friendly experience for Amy so that she may be able to get the best possible services the university may offer. In the scenario mentioned herein, we may consider the user experience for Amy without the deployment of the system 110, wherein, Amy may sign up for the open day through the university website using her personal email address. Her experience for events mentioned above may be neutral, which may be expected. However, without the deployment of the system 110, wherein, Amy and her parents may plan the day using the static PDF schedule of events, the names of the event locations may be unfamiliar. Their experience for events mentioned above may be neutral, which may be expected. Also, without the deployment of the system 110, wherein, they struggle to find a car parking space in Manchester as there is a lot of traffic from the open day, since without the system 110 a currently manual process for looking for parking space may not be broadcasted to attendees. Their experience for events mentioned above may be "worried", as she doesn't want to be late. Additionally, without the deployment of the system 110, wherein, Amy gets given a lot of leaflets and a heavy paper prospectus covering all of the courses on offer. Their experience for events mentioned above may be "irritated", as she has to carry the prospectus around all day, and it is not relevant to her. Additionally, without the deployment of the system 110, wherein when Amy and her parents want to attend a seminar on student finance and bursaries, they may get to the lecture hall to find it full and they may be turned away. Their experience for events mentioned above may be "Upset", as she needs a bursary to attend university and now, she can't find out about them.

However, if Amy or her parents may have access to the system 110, the system 110 may deploy multiple external and internal systems to generate a seamless experience for Amy. For example, the system 110 may deploy the "University website Open Day App" to assist Amy to sign up for the open day through the university website using social media integration and downloads the app. The system 110 may deploy university scheduling and room booking, Google Maps® Integration, and event management tools for planning the day for Amy and her parents built around Amy's preferences and Amy may add the talk on student finance to her itinerary, this registers her for the seminar. The system 110 may deploy Smart parking IoT with Google Maps® Integration to show them where parking is available on site and how many spaces are available in each location. The system 110 may deploy variable data printing, personalized paper prospectus, personalized digital prospectus, or the like so that based on Amy's registration for the day she may be able to pick up a personalized paper prospectus she ordered online or download it to her phone. The system 110 may provide an Event management tool to hold her ticket for the student finance seminar and she checks in at the door. The system 110 may create a curated positive experience for Amy based on her preferences and requirements.

In an example, Clark may a 21-year-old person, who may be a third-year undergraduate who has just finished his exams. He may have volunteered to help out with the geology department on the open days this year. In a scenario wherein, Clark may not have access to system 110, there may be situation wherein, Clark has been to open days before when he was applying and had an "ok" experience although he wished he had had a more representative view of the Mathematics course he was on in his first year. He might have started off taking a geology course if he was better informed. Clark spends the day answering prospective student's questions with the program director in a lab demonstration in the department. He feels that although he's talking to some students there are others who haven't found him. Later in the day, Clark may move to a different part of the campus to represent one of his extra-curricular societies. He may find himself asking if students may be interested rather than them approaching him directly. As the day may be coming to a close and he is helping pack up a prospective student approaches him. She has been pointed his way by a friend of hers who knows Clark. She has found it quite difficult to connect with people who have studied geology on the day and is a bit sad she has only managed to find him now. This entire scenario could have been made seamless with the deployment of the system 110. The system 110 may deploy a student records system CRM App when Clark signs up as a volunteer to support the open day and his details are passed to the open day app. The system 110 may deploy the student records system CRM App such that students may be able to identify him and nudge him on the app if they would like to have a conversation. They can also see where he may be able to meet with them. The system 110 may deploy the student records system CRM App such that students who may be interested in his extra-curricular activity category may interact with him on the app and find him to ask him questions. The system 110 may deploy various social media platforms when Clark may be packing up and is nudged by a few students who are looking to chat with a geology student, he may pass on his contact details so they may keep in touch.

Figure 3:
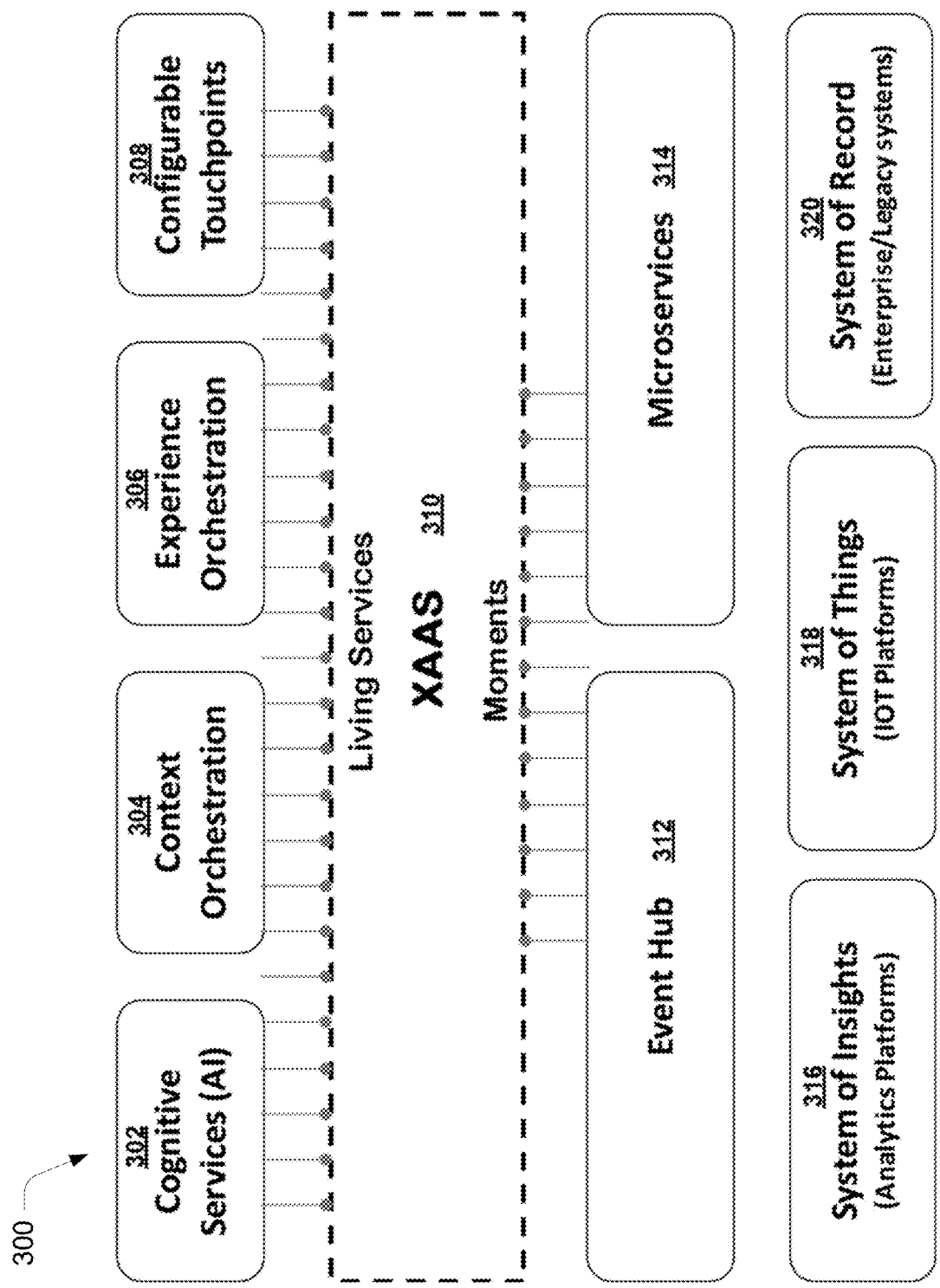
FIG. 3 illustrates a flow diagram of a conceptual architecture of a digital orchestration system, according to an example embodiment of the present disclosure.

FIG. 3 illustrates a flow diagram of a conceptual architecture 300 of the digital orchestration system 110, according to an example embodiment of the present disclosure. The conceptual architecture 300 may include an environment wherein various components and services may be amalgamated in the system 110. The system 110 may include a cognitive service component 302, a context orchestration 304, an experience orchestration 306, a plurality of configurable touch points 308, a living services component 310, an event hub 312, a microservices component 314. The conceptual architecture 300 may further include a system of insights 316, a system of things 318, and a system of record 320. The cognitive service component 302, the context orchestration 304, the experience orchestration 306, and the plurality of configurable touch points 308 may be coupled to the living services component 310. The event hub 312, and the microservices component 314 may be coupled to the living services component 310. The cognitive service component 302, the context orchestration 304, the experience orchestration 306, the plurality of configurable touch points 308, the event hub 312, and the microservices component 314 may allow the system 110 to choreograph the user experiences for the end-users by analyzing business moments, understanding contextual data, applying rules and equations that may lead to personalized actions. The living services component 310 may deliver the user experiences on to different channels or digital channels such as mobile applications, augmented reality platforms, virtual reality platforms, various build-operate-transfer platforms (BOT), various messenger platforms, and social platforms.

The system of insights 316 may be an analytics platform, the system of things 318 may be an IoT platform, and the system of record may be an enterprise system or a legacy system. The living services component 310 may allow to mash up data from the system of insights 316, the system of things 318, and the system of record 320 to create real-time data-driven personalized experiences for various end-users using the system 110.

Figure 4:
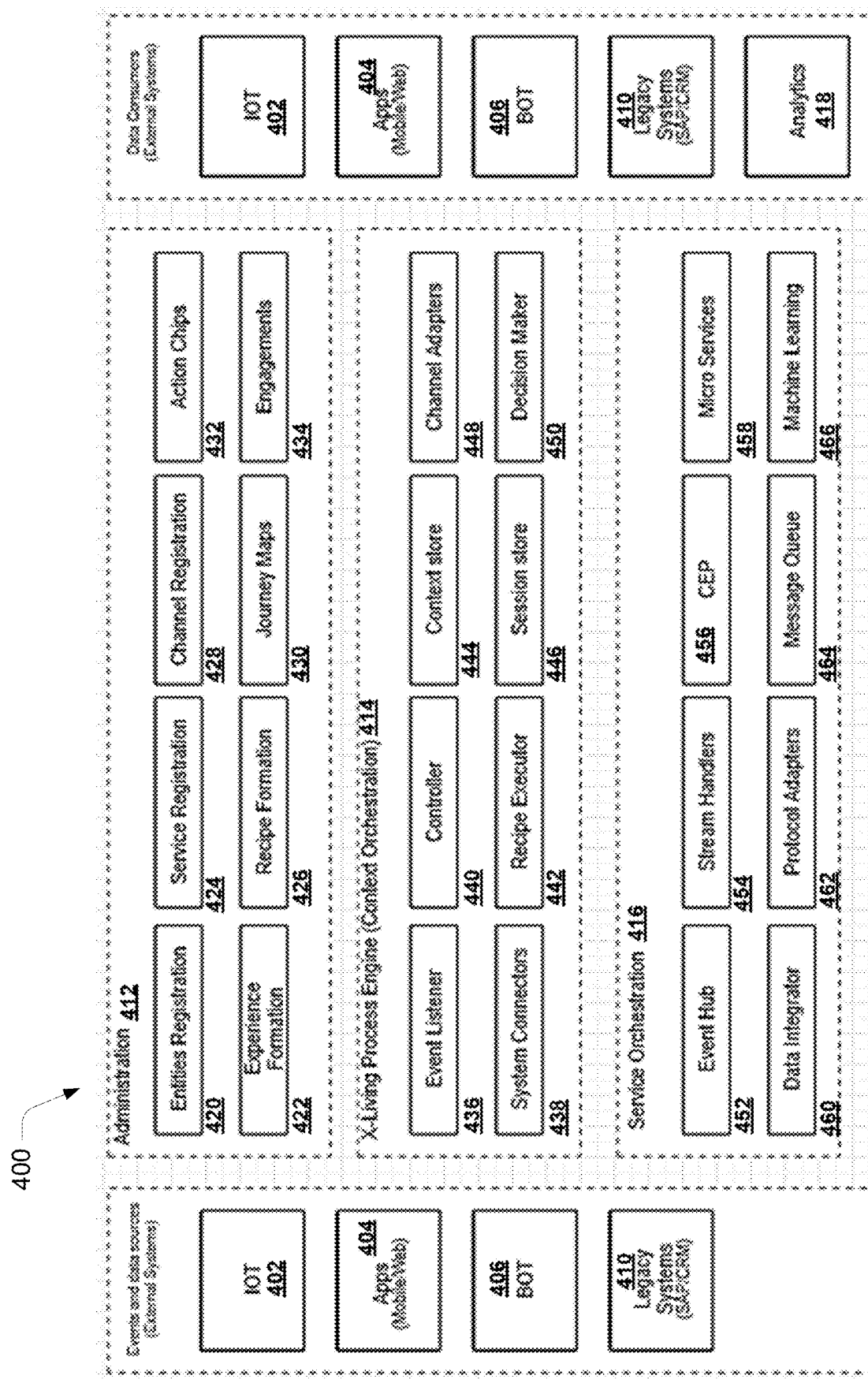
FIG. 4 illustrates a flow diagram of a logical architecture of a digital orchestration system, according to an example embodiment of the present disclosure.

FIG. 4 illustrates a flow diagram of a logical architecture 400 of the digital orchestration system 110, according to an example embodiment of the present disclosure. The logical architecture 400 may include event sources and data sources such as an IoT component 402, a mobile application component 404, a BOT component 406, a legacy systems component 410, and an analysis component 418.

The logical architecture 400 may include an administrative portal layer 412, an orchestration process layer 414, and a service orchestration layer 416. The administrative portal layer 412 may include an entity registration component 420, a service registration component 424, an experience formation component 422, a recipe formation component 426, a channel registration component 428, a journey map 236 creation component 430, an action chip 432, and an engagements component 434. The administrative portal layer 412 may allow registering entities through the entity registration component 420 and data schema like events, context objects, services through the service registration component 424, channels through the channel registration component 428 and actions through the action chip 432. The administrative portal layer 412 may allow creating the unique journey map 236 tree structure 430 with engagements 434, moments and recipes 426.

The orchestration process layer 414 may include an event listener 436, a set of system connectors 438, a controller 440, a recipe executor 442, a context store 444, a session store 446, a set of channel adapters 448, and a decision tree maker component 450. The orchestration process layer 414 may deploy the event listener 436 to listen to incoming events, decision tree maker component 450 to control executions, recipe executor 442 may execute the configures recipes, the internal context data store 444, and the set of channel adapters 448 may connect with the different external systems such as the IoT component 402, the mobile application component 404, the BOT component 406, the legacy systems component 410, and the analysis component 418 to access the data.

The service orchestration layer 416 may include an event hub 452, a stream handler 454, a complex event processor (CEP) 456, a microservices component 458, a data integrator 460, a protocol adapter 462, a message queue 464, and machine learning component 466. The event hub 452 may process a stream of events along with the stream handler 454. The message queue 464 may queue the events before processing. The protocol adapter 462 may handle communication over different protocols and the machine learning component 466 may improve decision makings.

Figure 5:
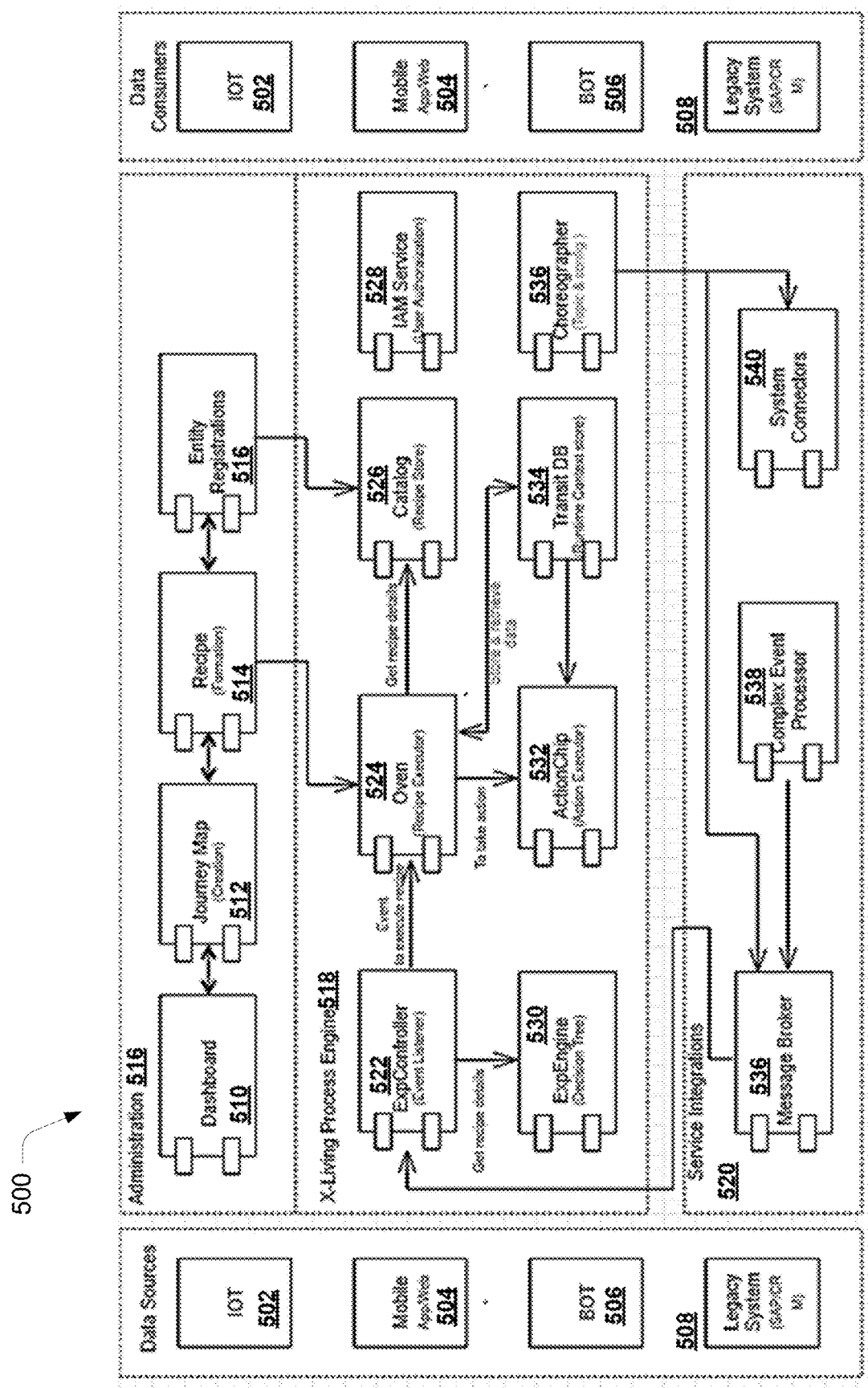
FIG. 5 illustrates a flow diagram of a physical architecture of a digital orchestration system, according to an example embodiment of the present disclosure.

FIG. 5 illustrates a flow diagram of a physical architecture 500 of the digital orchestration system 110, according to an example embodiment of the present disclosure. The physical architecture 500 may include an IoT component 502, a mobile application 504, a BOT component 506, and a legacy system 508. The IoT component 502, the mobile application 504, the BOT component 506, and the legacy system 508 may be present in an external environment from the system 110. The IoT component 502, the mobile application 504, the BOT component 506, and the legacy system 508 may be the plurality of data sources 206. The IoT component 502, the mobile application 504, the BOT component 506, and the legacy system 508 may be and interface with the end-user of the system 110. The physical architecture 500 may further include an administration component 516, a living process component 518, and a service integration component 520. The administration component 516 may include an administration layer that may be implemented in angular JS to support features like an experience dashboard 510, an entity registration 516, a journey map 236 512 and a recipe formation 514 functionalities. The experience dashboard 510 may provide for authorization and authentication. The experience dashboard 510 may support user authentication functionality to onboard a user on to project workspace. The entity registration 516 platform may allow the user to register different entities such as context, services, system and constant. The entity registration 516 may also allow a user to register events and actions. The journey map 512 platform may allow the user to create the journey map 236 of the end customer along with engagements, moments and recipes. The recipe formation 514 platform may allow creating different recipes for different business moments. The recipe formation 514 may consist of event, equation to mash-up data between different entities, rules, and actions to be performed.

The living process component 518 may be a framework of microservices that may be implemented in Node.js® and uses Mongo, SQL database, and Redis cache systems. Each of the microservices functionality may include an experience controller 522, an oven 524, a catalog 526, an IAM service 528, an ExpEngine 530, an action chip 532, a transit database 534, and a choreographer 536. The experience controller 522 may orchestrate microservices to execute the overall experience configured through the journey map 236 512. It is the first service in the framework which may get invoked by backend services to pass on the event and event data. The experience controller 522 may obtain input events.

Once an event occurs, the experience controller 522 may check with the ExpEngine 530 (decision tree) to ask for the next best action.

The ExpEngine 530 may hold the journey map 236 configurations, decision tree, event hierarchy and respective actions to be as configured by the user. In the run-time, when an event may get triggered the ExpEngine 530 may use the contextual data to take the next best action to execute (explained in further detail by way of subsequent Figs.). The experience controller 522 may invoke the oven 524 to execute the recipe 248. The oven 524 may execute the recipe 248 as per configurations stored in JSON format. The recipe 248 JSON structure may contain services details, JSON path mapping to bind data between different services, IFTTT, and equations information execute (explained in further detail by way of subsequent Figs.). The catalog 526 may be a service developed to manage and storage entities and their definitions. The catalog 526 may support create, read, update, and delete (CRUD) operations. The catalog 526 may store Project workspace, Journey map 236 and recipe 248 rules information which may get used during runtime execution for experience construction and experience execution. The transit database 534 may hold the context data, intermediate service response data, needed to solve the recipe 248 during the execution of recipes. The transit database 534 may use key-value pairs with instance id of the object as a key to map the data between different service executions. The recipe execution may lead to action or the plurality of actions 246. The action chip 532 component may take care of executing these actions by using system connectors. For example, an Email, SMS, MMS, push notification, a map view, gallery view, text view, app link, deep-link, and the like. The IAM service 528 may handle user account registration and authentication to get access to a sandbox environment. The choreographer 536 may be important to service. In an "event-driven microservice architecture", choreography may be preferred over orchestration for lower coupling (explained in detail by subsequent Figs.). In an event-driven microservice architecture, each service may observe its environment and acts on events autonomously. Once an event may occur that matters to the service, the service may perform the appropriate action. The choreographer 536 may be a service, upon creation of new experiences, choreographs event-driven digital experience orchestration platform microservices by creating topics, orchestrating producers and consumers. it also configures system connector services.

The service integration component 520 may include 3rd party components that may be integrated to communicate to the external systems and system 110 connector service implementations. The service integration component 520 may include a message broker 536, a complex event processor 538, a system connector 540. The message broker 536 may mediate communication between the external system and framework and supports publish subscribed event framework. In an example, Kafka and WSO2 MB may be the frameworks used. The complex event processor (CEP) 538 may support complex event processing to generate events based on queries and provides APIs to get stream and data information. In an example, WSO2 CEP may be used. The system connector 540 may comprise out of the box service connectors such as inbound-outbound connectors to a different system of records 320 or service providers to get context data or perform actions. In an example, these may be implemented in Node.js® programs. The message broker 536, the complex event processor 538, and the system connector 540 may be explained in detail by way of subsequent Figs.

Figure 6:
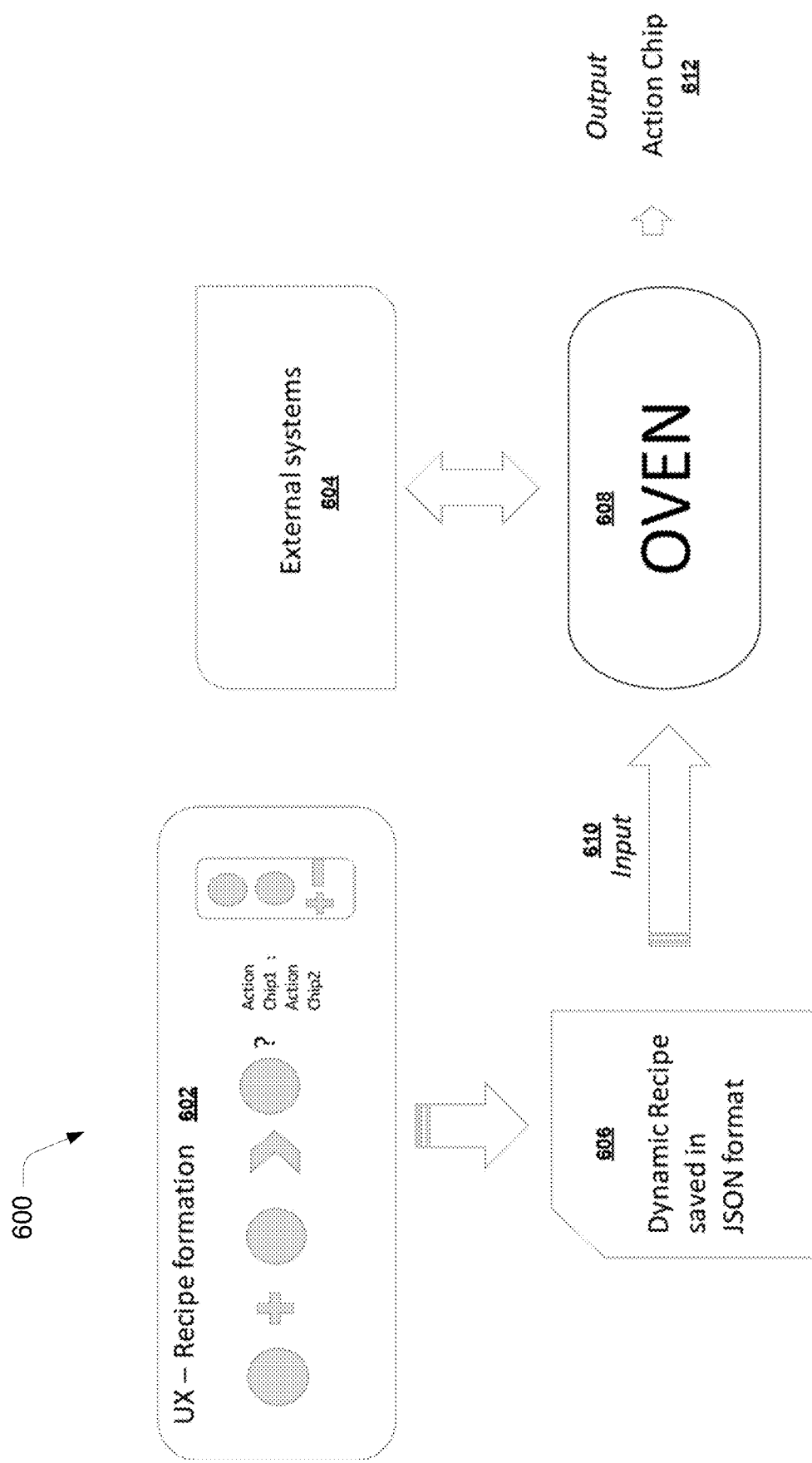
FIG. 6 illustrates various components of a recipe executor as deployed by a digital orchestration system, according to an example embodiment of the present disclosure.

FIG. 6 illustrates various components of a recipe executor 600 as deployed by the digital orchestration system 110, according to an example embodiment of the present disclosure. The recipe executor 600 may be the same as the recipe executor 150 mentioned by way of FIG. 1 and FIG. 2. The recipe executor 150 may include a recipe formation component 602. The recipe formation component 602 may create the recipes as described above by way of FIG. 1 and FIG. 2. The recipe executor 150 may further include a data storage 606. The data storage 606 may save the recipe 248 during recipe execution. In an example, the dynamic recipe 248 may be saved in a JSON format in a MongoDb by deployment of the data storage 606 (described by way of subsequent Figs). The recipe executor may include an oven 608. The oven 608 may receive an input from an external system 604 (described above by way of FIGS. 3-4). The oven 608 may receive an input 610 from the data storage 606. The data storage 606 may provide the plurality of rules 250 to the oven 606. As mentioned above, the recipe 248 constituted by the plurality of rules 250 may be used to pull relevant orchestration data 204 from the plurality of data domains 240 in order to execute an action from the plurality of actions 246 in response to an event from the plurality of events 212 for offering a user service from the plurality of user services 216 across a user interaction stage from the plurality of user interaction stages 238. The oven 608 may provide an output to an action chip 612.

Figure 7:
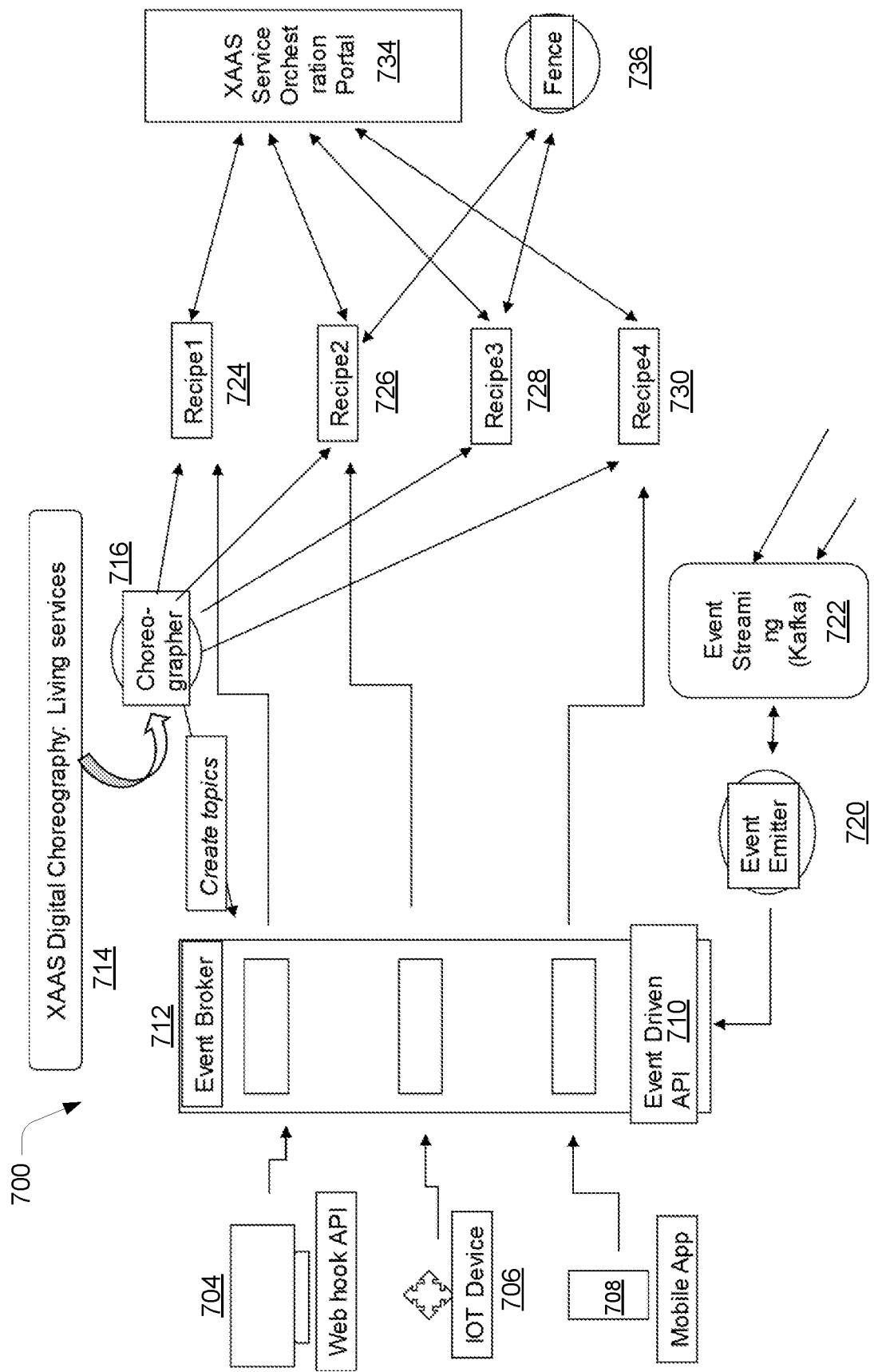
FIG. 7 illustrates a flow diagram of an event-driven architecture of a digital orchestration system, according to an example embodiment of the present disclosure.

FIG. 7 illustrates a flow diagram of an event-driven microservices architecture 700 of the digital orchestration system 110, according to an example embodiment of the present disclosure. The system 110 may include a web book API 704, an IoT device 706, a mobile application 708. The web book API 704, the IoT device 706, the mobile application 708 may be present an external environment from the system 110 and be loosely coupled to the same. The web book API 704, the IoT device 706, the mobile application 708 may provide input for event generation to an event broker 712. The event broker 712 may include various event-driven API 712. The event-driven API 712 may allow an end-user to subscribe to the system 110 for accessing the event broker 712. The system 110 may further include a living services component 714 that may include a choreographer 716 (both described by way of FIG. 5). The choreographer 716 may choreograph the event-driven microservices through the recipe executor. The choreographer 716 may create various topics and provide input to the event broker 712. The event broker 712 may also receive input from an event emitter 720 that may be connected to an event streaming Kafka (described as event catalog above). The event broker 712 and the choreographer 716 may lead to the creation of a recipe 1 724, a recipe 2 726, a recipe 3 728, and a recipe 4 730. The recipe 1 724, the recipe 2 726, the recipe 3 728, and the recipe 4 730 may be coupled to a service orchestration portal 734. The service orchestration portal 734 may include various SOAP-based API services. The recipe 1 724, the recipe 2 726, the recipe 3 728, and the recipe 4 730 may be coupled to for example, a fence 736. In an example, the fence 736 may be a microservice that may be event-driven based on the requirement of an end-user. The recipe 1 724, the recipe 2 726, the recipe 3 728, and the recipe 4 730 may be coupled to various microservices that may be restful and event-driven based on the requirement of an end-user.

In an example, the event emitter 720 may emit the events to the specific Kafka queues, which may have consumers waiting to receive events. Whenever any new event occurs, the corresponding consumers may be getting notified to process those events. The event emitter 720 may forget the events after firing. It may be no more waiting for the consumers to complete their whole processing which makes them free to emit the next set of events. It follows the fire and forgets mechanism resulting in faster execution of events while handling a bulk of events. The system 110 may also implement an exploratory data analysis (EDA) for experience orchestration. The EDA in digital orchestration system 110 may choreograph the events and digital services in a loosely coupled manner to create a new experience dynamically and most importantly improving the scalability of the application. In an example, to implement EDA in digital orchestration system 110, Apache Kafka may be used as the middleware event manager.

Figure 8:
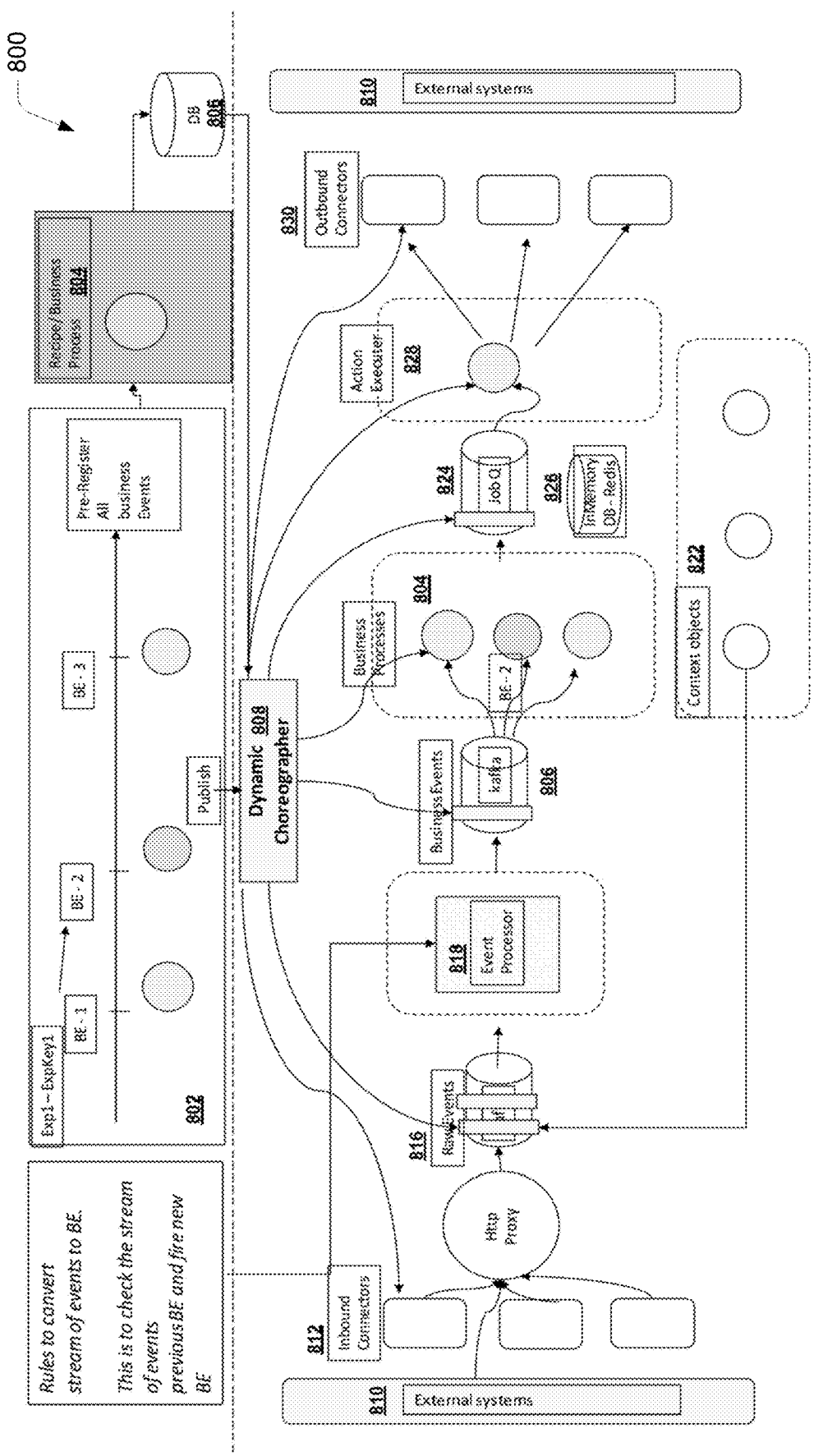
FIG. 8 illustrates a flow diagram of an event-driven architecture of a digital orchestration system, according to an example embodiment of the present disclosure.

FIG. 8 illustrates a flow diagram of an event-driven architecture 800 of the digital orchestration system 110, according to an example embodiment of the present disclosure. The system 110 may include a multitude of events 802 processed through a processor 804 and pre-registered to a database 806. The system 110 may include a dynamic choreographer 808. The dynamic choreographer 808 may configure to a set of inbound connectors 812, and a set of outbound connectors 830. The set of inbound connectors 812 and the set of outbound connectors 830 may be coupled to an external system 810. The external system 810 may generate a raw event stream 816 through various sources (mentioned above) and through various context objects 822. The raw event stream 816 may be stored over Kafka medium. The raw event stream 816 may provide input to an event processor 818. The event processor 818 may provide input to the processor 804, the database 806. The processor 804 may provide input to a job monitoring system 824. The job monitoring system 824 may be linked to an action executor 828. The action executor 828 may be linked to the set of outbound connectors 830. The dynamic choreographer 808 may configure to the processor 804, the database 806, the raw event stream 816. In an example, inbound connectors 812 may be the connectors to the external systems 810 which may read the data from those systems and trigger run time events/streams. Streams also flow from end-user devices. These events may be passed to project/experience specific Kafka topics. The event may then get processed and processed events may get passed to another Kafka topic of specific experience like the Job Q 824. The recipe 248 attached to these processed events gets executes by the oven component and actions (JobCard) may get triggered on the Kafka queue. The action executor 828 may receive the job card and performs the actions by invoking various outbound connectors 830 to perform/trigger the actions. All the data may be stored onto a transit database (also referred to as transitDB in this document) 826.

Figure 9:
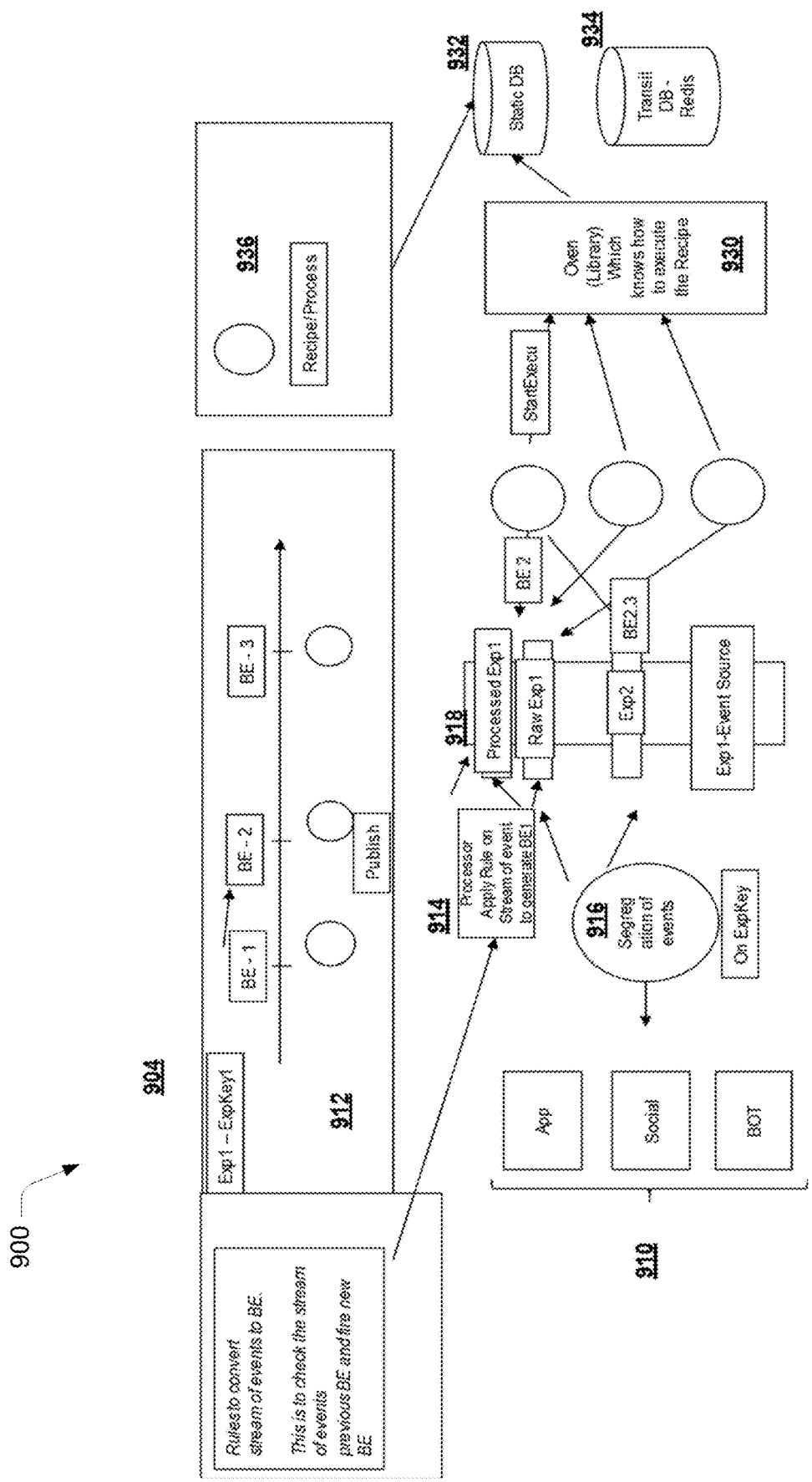
FIG. 9 illustrates a flow diagram for dynamic experience choreography generated by deploying a digital orchestration system, according to an example embodiment of the present disclosure.

FIG. 9 illustrates a flow diagram for dynamic experience choreography 900 generated by deploying the digital orchestration system 110, according to an example embodiment of the present disclosure. The system 110 may include a multitude of events 912 processed through a processor 936 and pre-registered to a database 932. The system 110 may include a processor 914 that may apply the plurality of rules 250 over the plurality of the event to generate the event sequence 230. In an example, the system 110 may segregate various events from the plurality of events 212 based on input obtained from an external environment 910. In an example, the system 110 may obtain a list of raw events from the external environment 910. The processor 914 may process the raw events and update the same to the plurality of events 212 as processed events 918. The processed events 918 may be stored into an oven library 930. The oven library 930 may be coupled to the database 932 and a transit database 934. The processed events 918 may result in creation of the recipe 248, which may be executed by the recipe executor 140.

Figure 10:
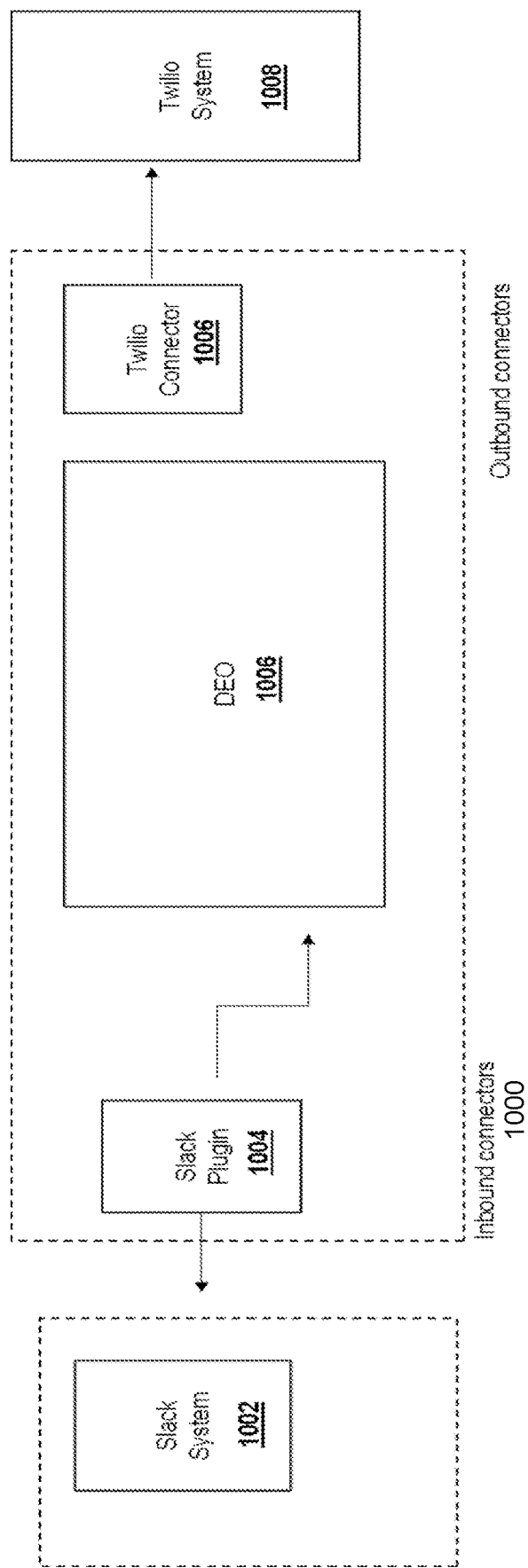
FIG. 10 illustrates various components of an inbound connector, and an outbound connector as deployed by a digital orchestration system, according to an example embodiment of the present disclosure.

FIG. 10 illustrates various components of an inbound connector 1000 as deployed by the digital orchestration system 110, according to an example embodiment of the present disclosure. The inbound connector 1000 may plugins to different data sources, which may register a webhook with those to get the data. The inbound connector 1000 may include a slack system 1002. The slack system 1002 may be coupled to a slack plugin 1004 to get the slack message. The slack plugin 1004 may provide an input to a Digital Experience Orchestration (DEO) system 1006 that may be system 110. The system 110 may be coupled to a Twilio connector 1006. The Twilio connector 1006 may be coupled to a Twilio system 1008. The Twilio connector 1006 may receive, for example, an SMS.

Figure 11:
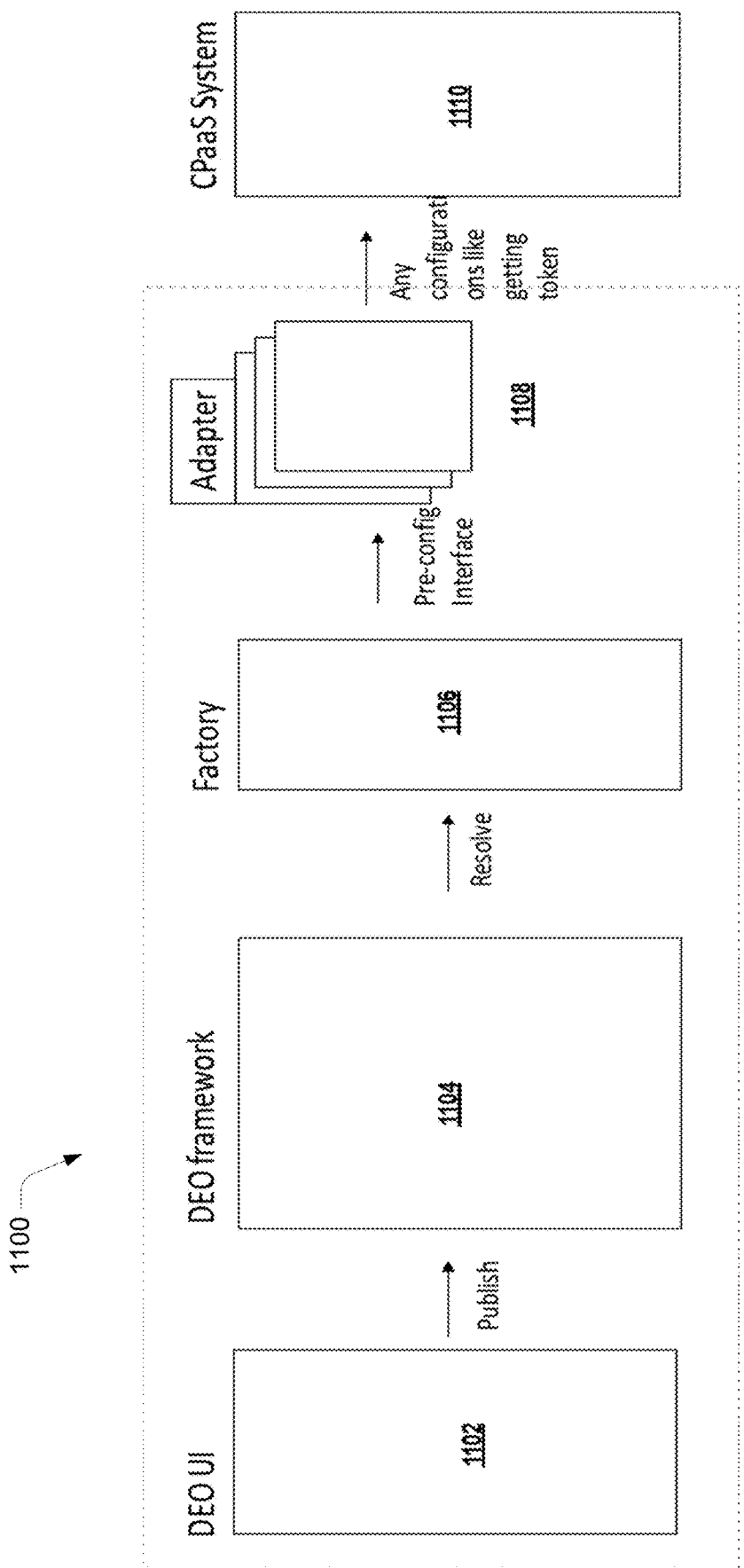
FIG. 11 illustrates a flow diagram for the integration of an output generated by the deployment of a digital orchestration system with various Internet Of Things (loT) systems, according to an example embodiment of the present disclosure.

FIG. 11 illustrates a flow diagram 1100 for the integration of an output generated by the deployment of the digital orchestration system 110 with the various Internet of Things (IoT) systems, according to an example embodiment of the present disclosure. As mentioned above, the system 110 may be configured for service integration with various external systems. The flow diagram 1100 integration of an output generated by the deployment of the digital orchestration system 110 with a connected platforms as-a-service (CPaaS) IoT system 1110. The system 110 includes a DEO user interface 1102, a DEO framework 1104, a factory 1106, an adapter 1108, and a CPaaS system 1110. In an example, a user may publish a recipe 248 through the DEO user interface 1102 on the DEO framework 1104. The DEO framework 1104 may get the adapter object 1108 from the factory 1106 and invokes pre-configuration API of the adapter 1108 and passes all runtime configuration details to the CPaaS system 1110.

Figure 12:
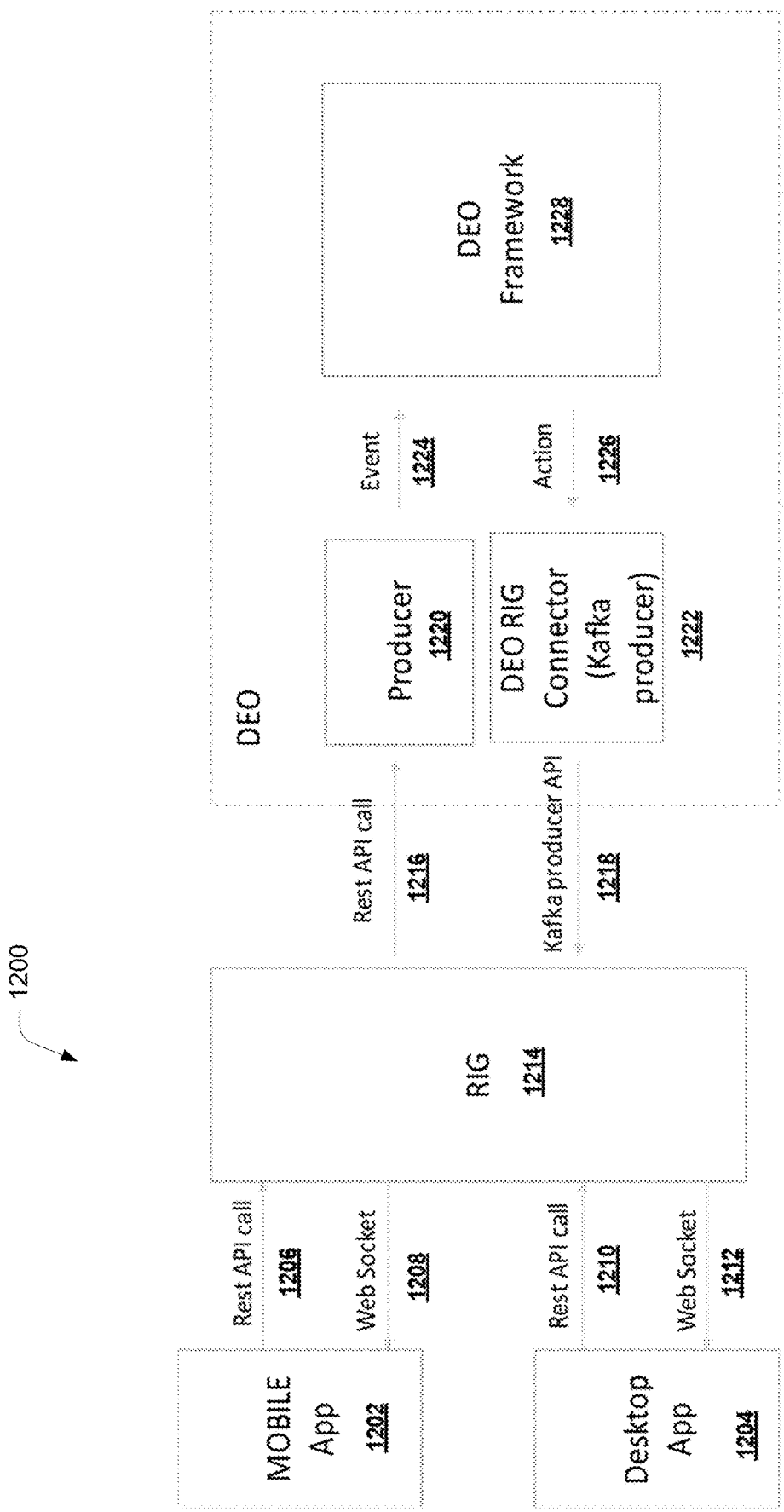
FIG. 12 illustrates a flow diagram for the integration of an output generated by the deployment of a digital orchestration system with reactive interaction gateway, according to an example embodiment of the present disclosure.

FIG. 12 illustrates a flow diagram 1200 for the integration of an output generated by the deployment of the digital orchestration system 110 with reactive interaction gateway (RIG), according to an example embodiment of the present disclosure. The flow diagram 1200 illustrates a bi-directional data connection. The system 110 may be coupled to a mobile application 1202, and a desktop application 1204. The mobile application 1202 may interact with a RIG component 1214 through a rest API call 1206 and a web socket 1208. The desktop application 1204 may interact with the RIG component 1214 through a rest API call 1210 and a web socket 1212. The RIG component 1214 may interact with the system 110 through a rest API call 1216, and a Kafka producer API 1218. The system may include a framework 1228, a producer 1220, a DEO RIG connector 1222. The DEO RIG connector 1222 may be a Kafka producer. The producer 1220 may interact with the framework 1228 based on an event 1224. The DEO RIG connector 1222 may receive communication from the framework 1228 based on an action 1226.

Figure 13A:
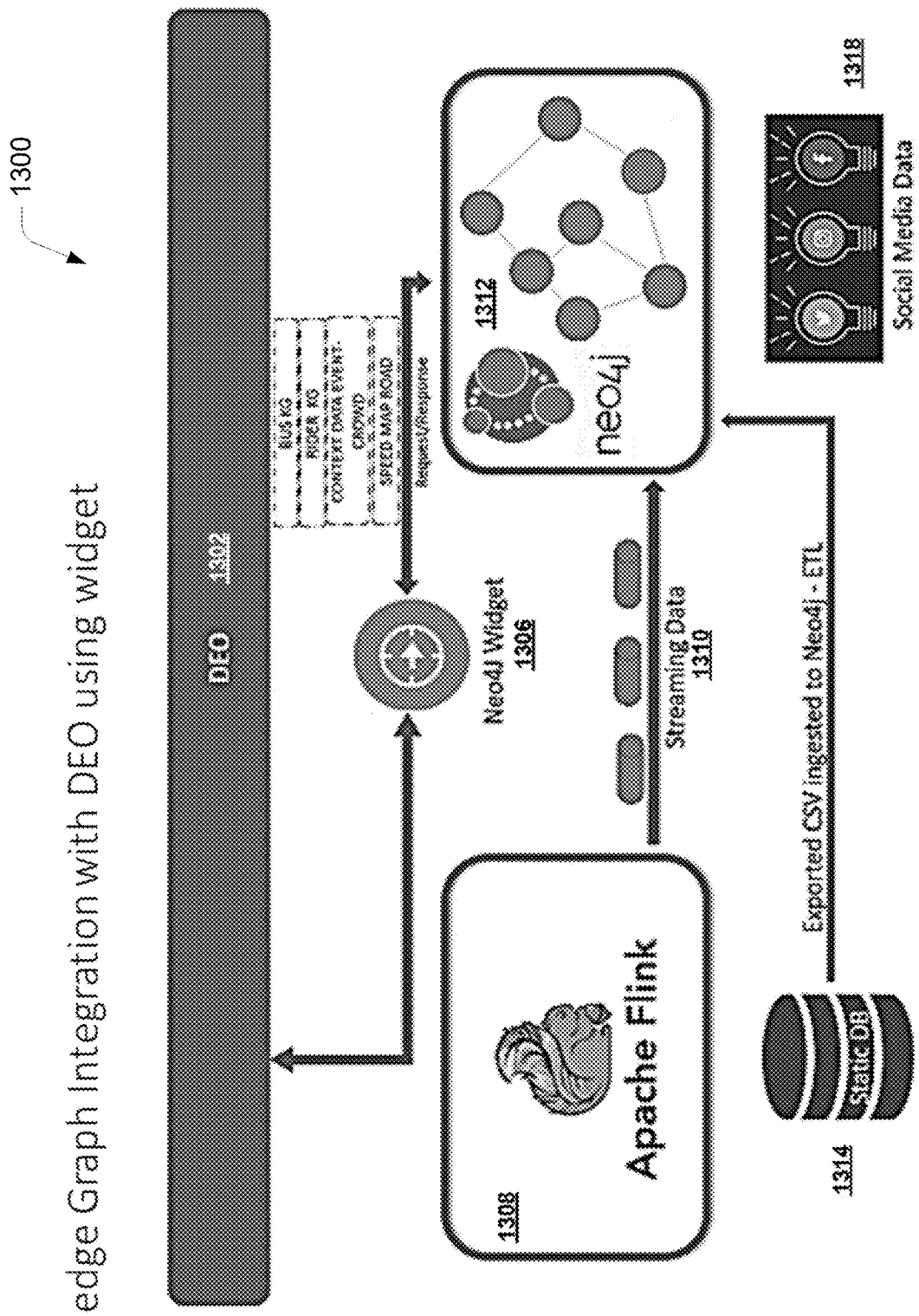
FIGS. 13A and 13B illustrate pictorial representations of integration of a knowledge graph with a digital orchestration system, according to an example embodiment of the present disclosure.
Figure 13B:
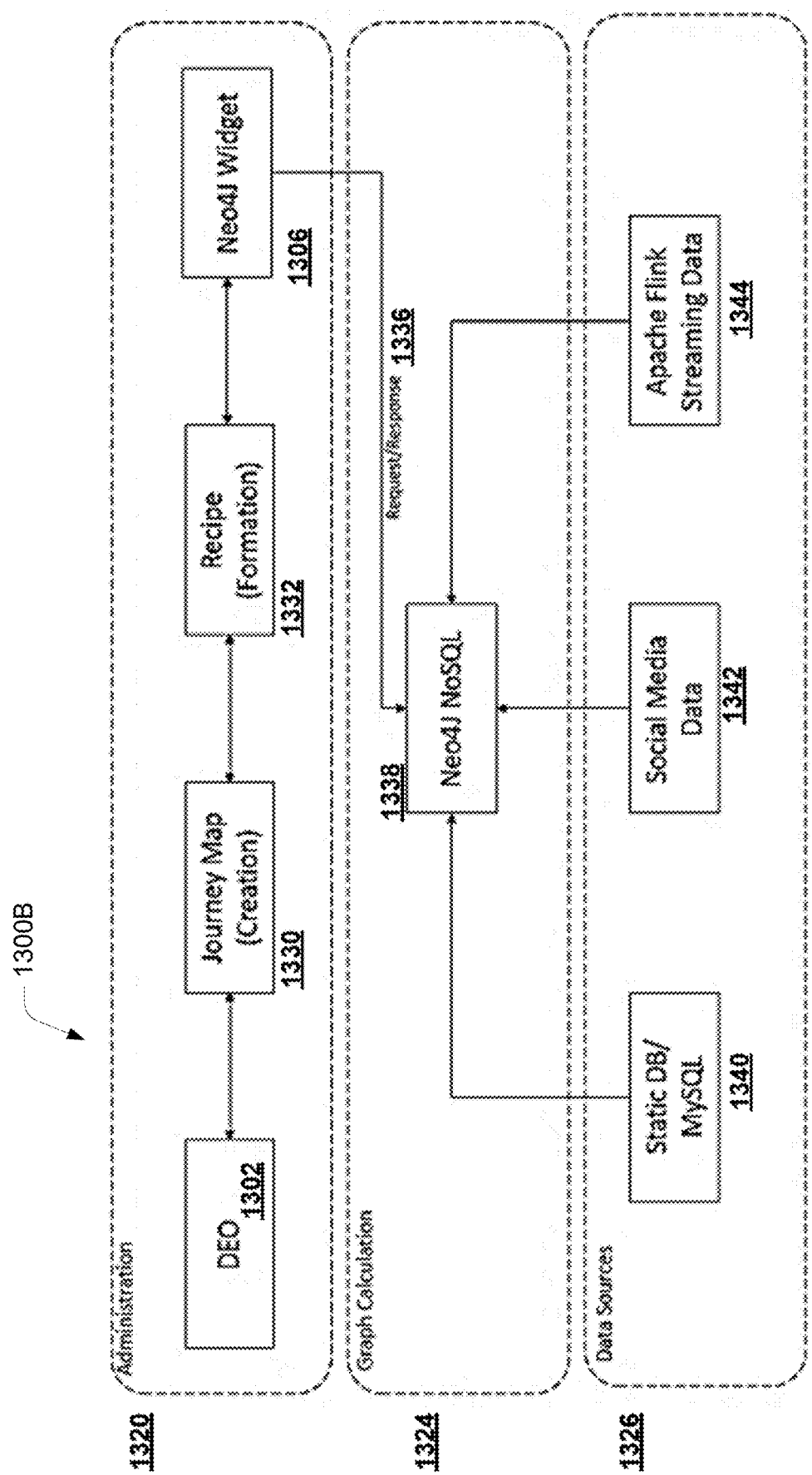

FIGS. 13A and 13B illustrate pictorial representations 1300A and 1300B of integration of a knowledge graph with the digital orchestration system 110, according to an example embodiment of the present disclosure. A DEO 1302 may be illustrated in the FIG. 13A. The DEO 1302 may be the system 110. The system 110 may be coupled to a Neo4J widget 1306. The Neo4J widget 1306 may receive data from an Apache Flink streaming platform 1308, a static database 1314, and from social media 1318. The Apache Flink streaming platform 1308 may stream data in real-time onto the Neo4J widget 1306. As mentioned above, the system 110 may update the orchestration data 204, the plurality of events 212, and the plurality of actions 246 on a real-time basis through the real-time data streamed onto the Neo4J widget 1306 by the Apache Flink 1308.

In an example, the knowledge graph with the digital orchestration system 110 may be done in three layers such as an administrative layer 1320, a graph calculation layer 1824, and a data source layer 1326. The administrative layer 1320 may include the DEO 1302, a journey map 1330, a recipe formation 1332, and the Neo4J widget 1306. The graph calculation layer 1824 may include a Neo4JNoSQL 1338 that may execute an interaction 1336 with the Neo4J widget 1306. The data sources layer 1326 may include a static database 1340, a social media database 1342, and the Apache Flink streaming data 1344.

Figure 14:
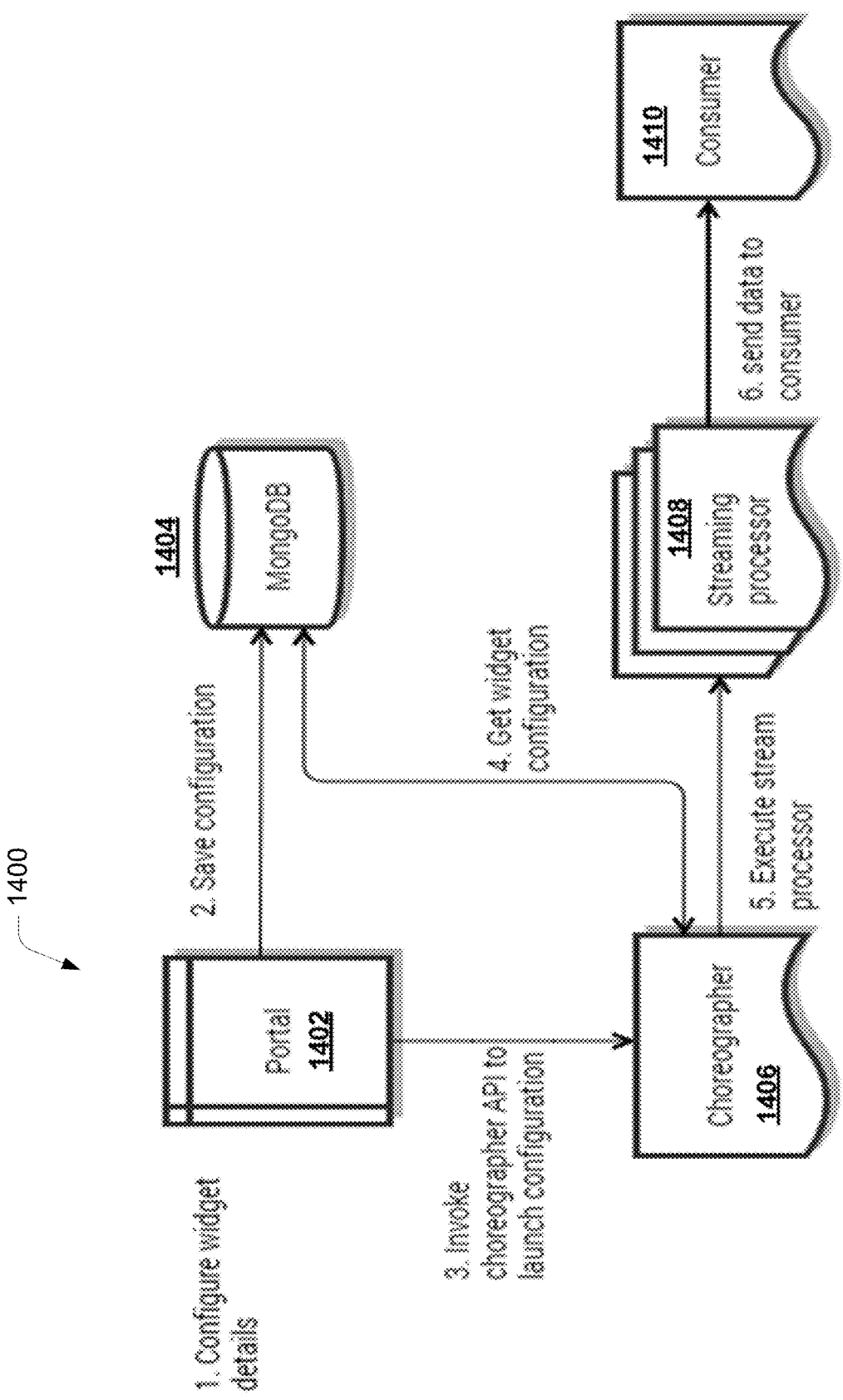
FIG. 14 illustrates a pictorial representation of a streaming widget as deployed by a digital orchestration system, according to an example embodiment of the present disclosure.

FIG. 14 illustrates a pictorial representation 1400 of a streaming widget as deployed by the digital orchestration system 110, according to an example embodiment of the present disclosure. The system 110 may process the raw events, using streaming widgets as described above. The system 110 may configure a widget portal 1402. The system 110 has a widget configuration facility to manipulate and extract meaningful data from upcoming streams. The widget may be codeless and may just be configured and prepared to process the raw stream. The system 110 may save the configuration in a MongoDB Database 1404. The portal 1402 may invoke choreographer API to launch configuration through a choreographer 1406. The choreographer 1406 may get widget configuration from the MongoDB Database 1404. The choreographer 1406 may execute a function to invoke a streaming processor 1408. The streaming processor 1408 may send data to an end-user 1410. In an example, the streaming widget may be a UI builder to create the dynamic streaming processor 1408. In an example, Kafka APIs may be used to manipulate streaming data. This UI widget may be used to configure operations required to build the stream processor 1408. In an example, an operation such as filter, flatMap, groupBy may be executed and saved into the MongoDB database 1404 in the form of a JSON file. A user may launch stream processor 1408 at any time for different configurations from the dashboard. In an example, to launch these configurations, the system 110 may deploy Node.js® API called Stream choreographer. The Node.js® API may read configuration JSON from the Mongo database 1404 and pass as a command-line argument while executing stream processor 1408.

Figure 15:
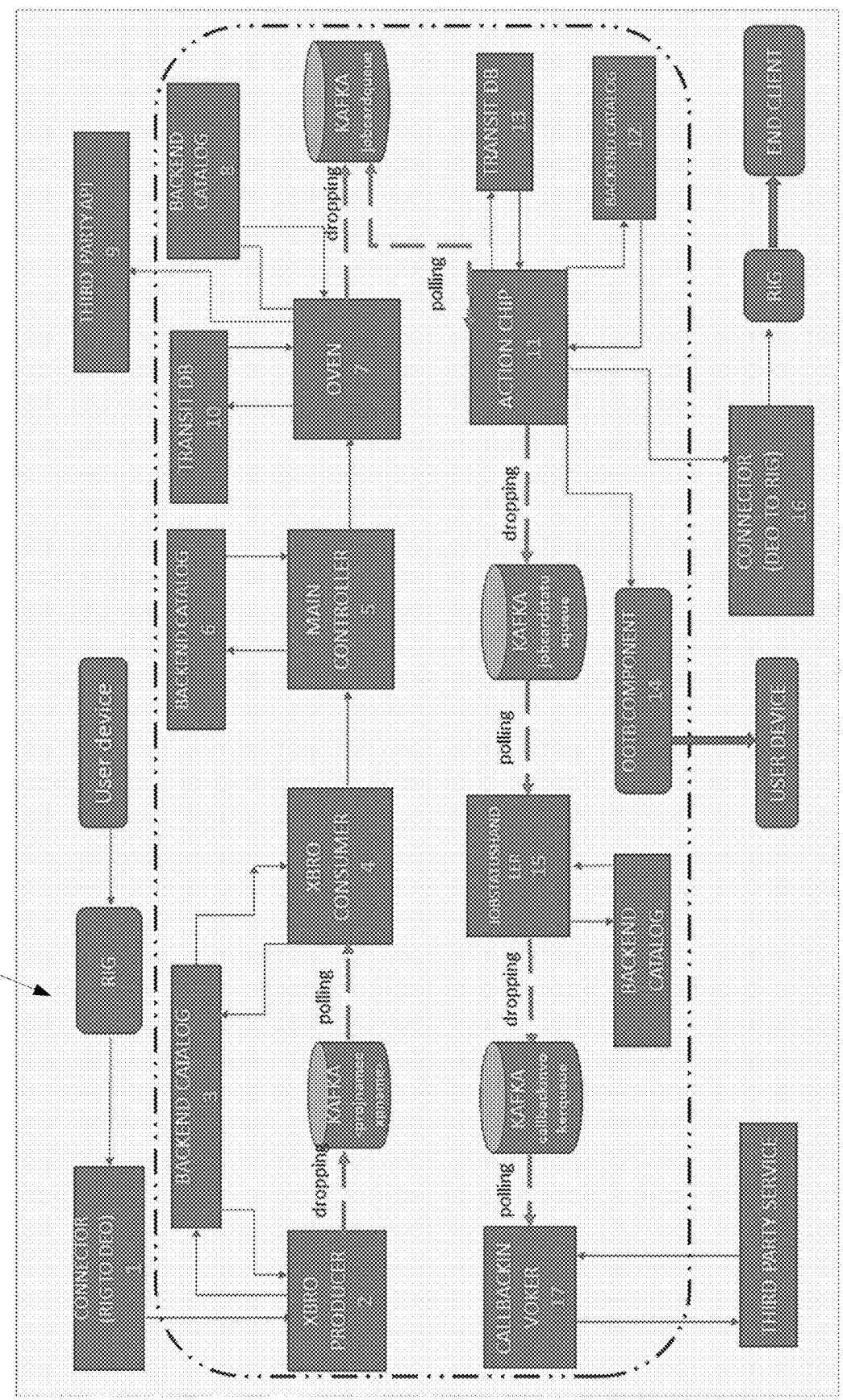
FIG. 15 illustrates a pictorial representation of a component interaction diagram of a digital orchestration system, according to an example embodiment of the present disclosure.

FIG. 15 illustrates a pictorial representation 1500 of a component interaction diagram of the digital orchestration system 110, according to an example embodiment of the present disclosure. The pictorial representation of 1500 may explain the flow of events and component interactions. In an example, the following steps may occur in real-time. A client application on a user device 1506 may send an event/stream of data to RIG 1504. The Inbound connector 1502 of RIG may get this event and using a backend catalog 1510 and a producer 1512 including HTTP API drops into Kafka topic 1514. A consumer reads this event and event data through messaging broker (XBRO) 1516 and passes to a controller 1520. The controller 1520 may check the configuration and identifies the recipe 248 configured for this event from a backend catalog 1518. The controller 1520 may communicate with an oven 1524 to execute the recipe 248. The oven component 1524 may read the recipe 248 configurations and executes the recipe 248 steps by invoking and gathering data from various systems such as a third-party API 1508, a backend catalog 1526 and a transit database 1522. The oven 1524 may solve the expression and figure out action to be performed based on real-time contextual data. The oven 1524 may drop the action as a job card to a Kafka queue 1528. The oven 1524 may store the runtime data in the transit database 1522. An action chip or action handler 1542 may read the job card and performs the action using runtime data stored in transit database 1522. The action handler 1542 may use a set of outbound connectors 1540 to perform the actions.

Figure 16:
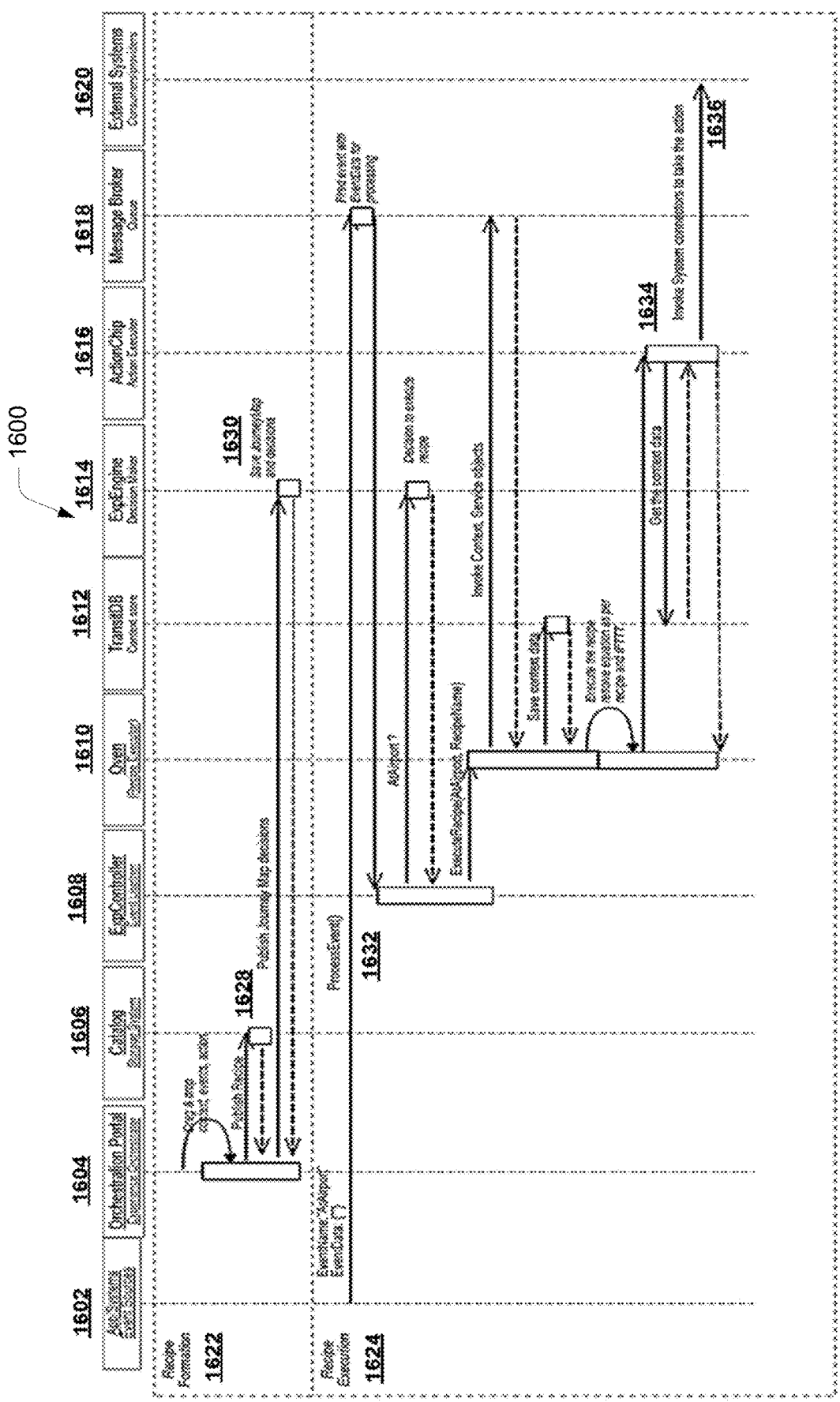
FIG. 16 illustrates a pictorial representation of a run-time interaction view of a digital orchestration system, according to an example embodiment of the present disclosure.

FIG. 16 illustrates a pictorial representation 1600 of a run time interaction view of the digital orchestration system 110, according to an example embodiment of the present disclosure. The system 110 may include an event source 1602, an orchestration portal 1604, a catalog 1606, an experience controller 1608, an oven 1610, a transit database 1612, an experience engine 1614, an action chip 1616, a message broker 1618, and an external system 1620. The event source 1602, the orchestration portal 1604, the catalog 1606, the experience controller 1608, the oven 1610, the transit database 1612, the experience engine 1614, the action chip 1616, the message broker 1618, and the external system 820 may be loosely coupled to each other for performing various functions of the system 110 as illustrated. The aforementioned components may work in tandem to accomplish a recipe formation 1622 and a recipe execution 1624. The aforementioned components may facilitate a publishing action 1628 for a recipe 248, saving action 1630 for the journey map 236. The aforementioned components may process an event 1632, retrieve associated data 1634 from the plurality of data domains 240, and perform an invocation 1636 on various connectors to take action.

Figure 17:
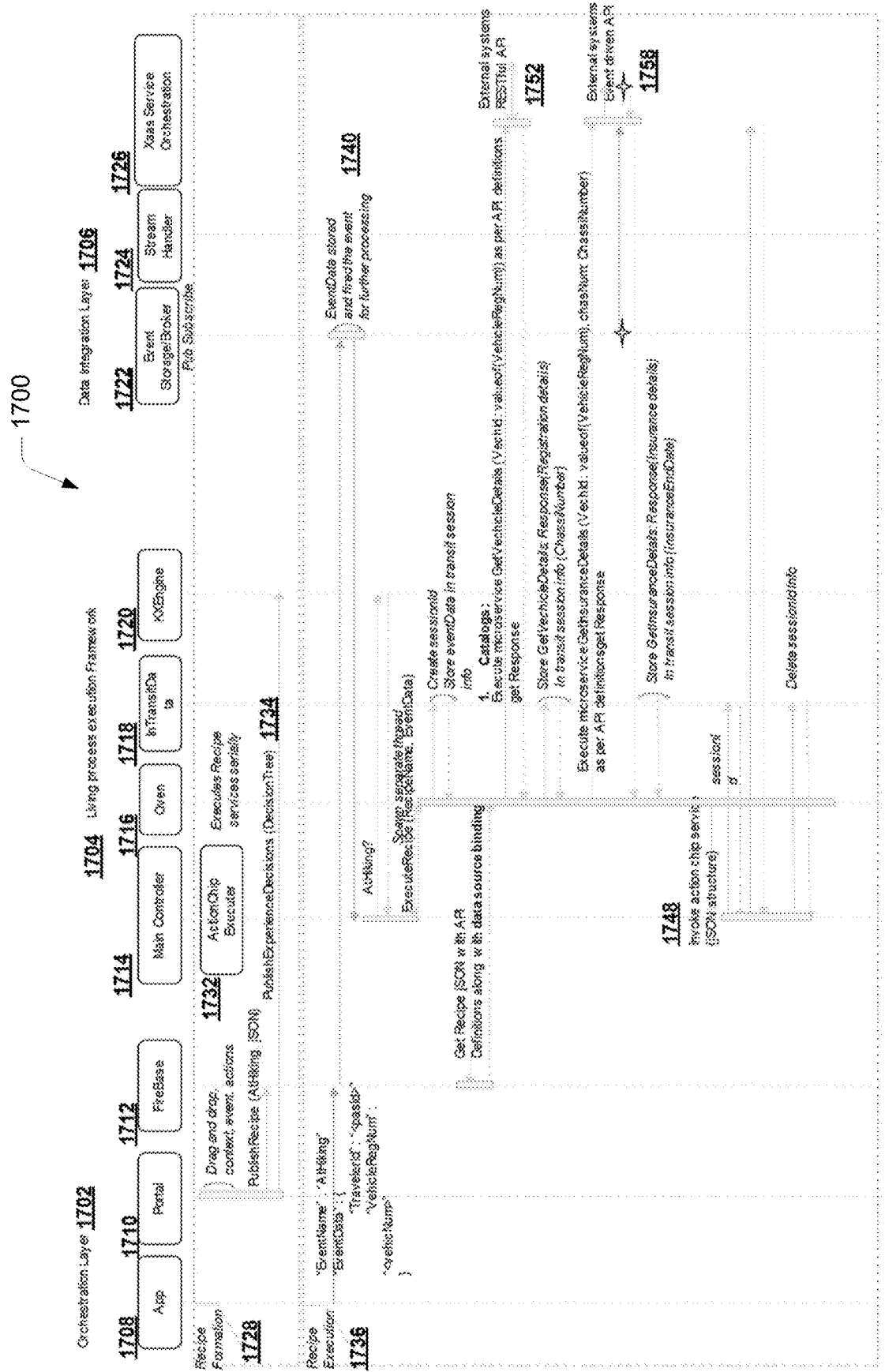
FIG. 17 illustrates a flow diagram for an exemplary run time interaction as deployed by a digital orchestration system, according to an example embodiment of the present disclosure.

FIG. 17 illustrates a flow diagram 1700 for an exemplary run time interaction as deployed by the digital orchestration system 110, according to an example embodiment of the present disclosure. The system 110 may include an orchestration layer 1702, a living process layer 1704, a data integration layer 1706. The orchestration layer 1702 may include an application 1708, a portal 1710, a firebase 1712. The living process layer 1704 may include a main controller 1714, an oven 1716, a transit database 1718, a KXEngine 1720, and an action chip executor 1732. The data integration layer 1706 may include event broker 1722, a stream handler 1724, and a XAAs Service orchestration 1726. All the aforementioned components may have been explained by way of various Figs in this document. In an example, the aforementioned components may work in tandem to accomplish a recipe formation 1728 and a recipe execution 1736. The aforementioned components may facilitate creating a decision tree 1734 for a recipe 248 and store all recipe 248 data and associated event data in a database 1740. The aforementioned components may process a recipe 248 and a set of restful API 1752, and a set of event-driven API across various external systems to invoke an action 1748.

Figure 18:
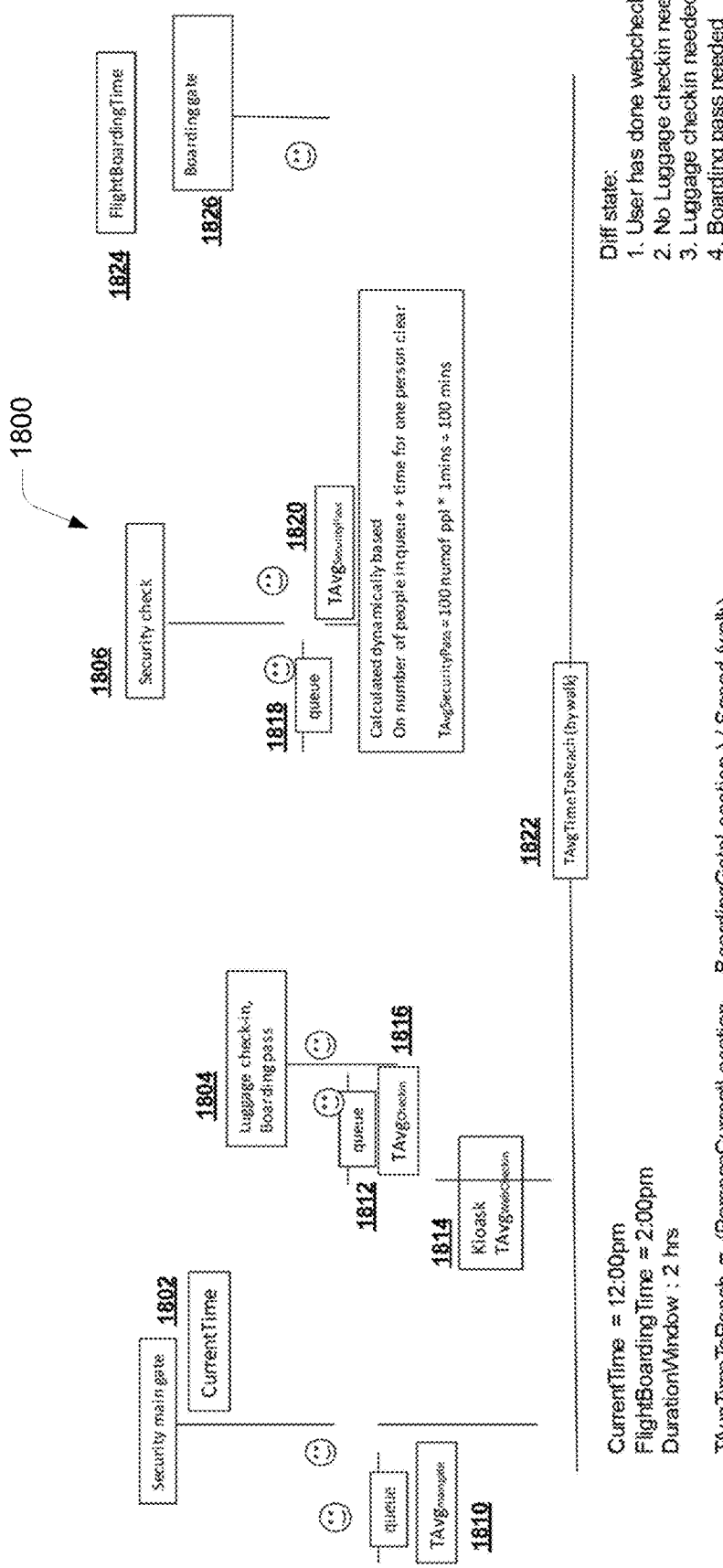
FIG. 18 illustrates a flow diagram for content aggregation for practicing an exemplary embodiment for deploying a digital orchestration system for consumers traveling through an airport, according to an example embodiment of the present disclosure.

FIG. 18 illustrates a flow diagram 1800 for content aggregation for practicing an exemplary embodiment for deploying the digital orchestration system 110 for consumers traveling through an airport, according to an example embodiment of the present disclosure. The example explained by the FIGS. 18-25 may be the example mentioned above, wherein the user service may be to provide a communication alert to a user when a user may be delayed for boarding a flight from an airport. For such a user service the plurality of events 212 may include calculating the time at across the plurality of user interaction stages 238, for example, the time required to reach the airport, time required for the security check-in, the time required for commuting up to a boarding terminal. The user of the system may want to further provide, for example, en-route shopping services. The plurality of actions 246 may include comparing the flight departure time with the current time. The plurality of actions 246 may further include comparing the time required to complete each of the plurality of user interaction stages 238 with the flight departure time. As mentioned above, the recipe creator 140 may create a recipe 248 for each of the plurality of actions 246. The recipe executor 150 may implement the second cognitive learning operation 252 to identify a multitude of recipes from the recipe 248 database pertaining to each of plurality of actions 246 including comparing the time required to complete each of the plurality of user interaction stages 238 with the flight departure time. The multitude of recipes may include a recipe 248 for time calculation at each of the plurality of user interaction stages 238 involved herein, a recipe 248 for delay alert generation for a user at airport security, a recipe 248 for an 'ample time for shopping' alert generation, a recipe 248 for 'no time for shopping' alert generation, a recipe 248 for 'food pick up' alert generation, a recipe 248 for 'no time to eat' alert generation, and the like. In accordance with various embodiments of the present disclosure, the recipe executor 150 may execute a recipe 248 from the multitude of recipes associated with the action prompted through the action activator 254 based on a result from any of the plurality of user interaction stages 238 for an individual end-user. For example, the recipe executor 150 may implement the second cognitive learning operation 252 to detect the location of the individual end-user, which may be for example, at the security check-in counter of an airport. The recipe executor 150 may retrieve the recipe 248 for calculating the time required to navigate the security check-in counter and reach the boarding terminal. Further, the recipe executor 150 may retrieve the recipe 248 to compare the time calculated above with a boarding gate closing time. The recipe executor 150 may implement the second cognitive learning operation 252 to decide a recipe 248 to implement from the recipe 248 for delay alert generation for a user at airport security, the recipe 248 for an 'ample time for shopping' alert generation, the recipe 248 for 'no time for shopping' alert generation, the recipe 248 for 'food pick up' alert generation, the recipe 248 for 'no time to eat' alert generation, and the like based on the location of individual end-user. In an example, the recipe executor 150 may obtain an end-user input 244 from the individual end-user for executing a recipe 248 from the multitude of recipes.

The flow diagram 1800 illustrates the calculation of time required across time required to reach the airport, time required for the security check-in, the time required for commuting up to a boarding terminal. In an example, an end-user may be a security gate wherein a current waiting time may be 1802. The system 110 may update the waiting time to give a new waiting time in 1810. When the end-user may reach the luggage security check area 1804 a queue waiting time may be 1812. The system may update the waiting time as time progresses to generate new waiting time in 1816. The system 110 may also direct the end-user towards a web check-in kiosk 1814. The system 110 may calculate a time 1822 that may be required to walk up to the boarding gates. When the end-user may reach a security check area 1806, the system 110 may calculate a waiting time 1818 and calculate an approximate time 1820 to pass the queue at the security check area 1806. The system may generate an alert for the user for a flight boarding time 1824 and a time needed to walk up to the boarding gate 1826.

Figure 19:
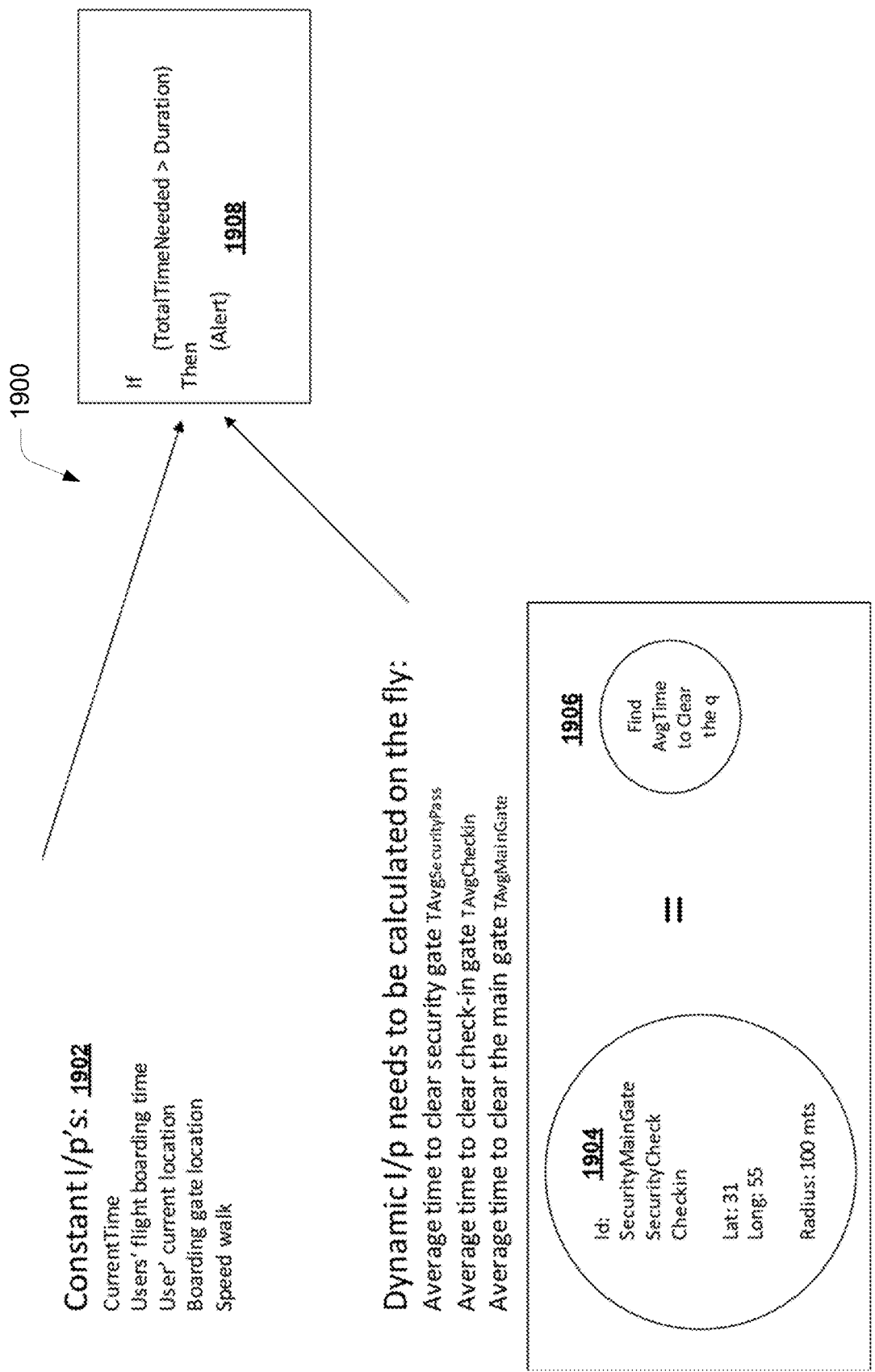
FIG. 19 illustrates a flow diagram for an amalgamation of constant and dynamic data objects for practicing an exemplary embodiment for deploying a digital orchestration system for consumers traveling through an airport, according to an example embodiment of the present disclosure.

FIG. 19 illustrates a flow diagram for an amalgamation of constant and dynamic data objects for configuring a queue for practicing an exemplary embodiment for deploying the digital orchestration system 110 for consumers traveling through an airport, according to an example embodiment of the present disclosure. In the example, illustrated by way of FIG. 18, there may be a constant time component 1902 such as the time to walk up to the boarding gate 1826 or the flight boarding time, and a dynamic time component 1904, such as the time required to navigate various queues. The system 110 may calculate an average time 1906 of each time parameter across various stages such as the boarding gate 1802, the luggage check 1804, the security check 1806, and the like. The system 110 may implement the artificial intelligence component 218, the first cognitive learning operation 220, and the second cognitive learning operation 252 to decide of the average time 1906 may be greater than the constant time component 1902, the system may generate an alert for the end-user.

Figure 20:
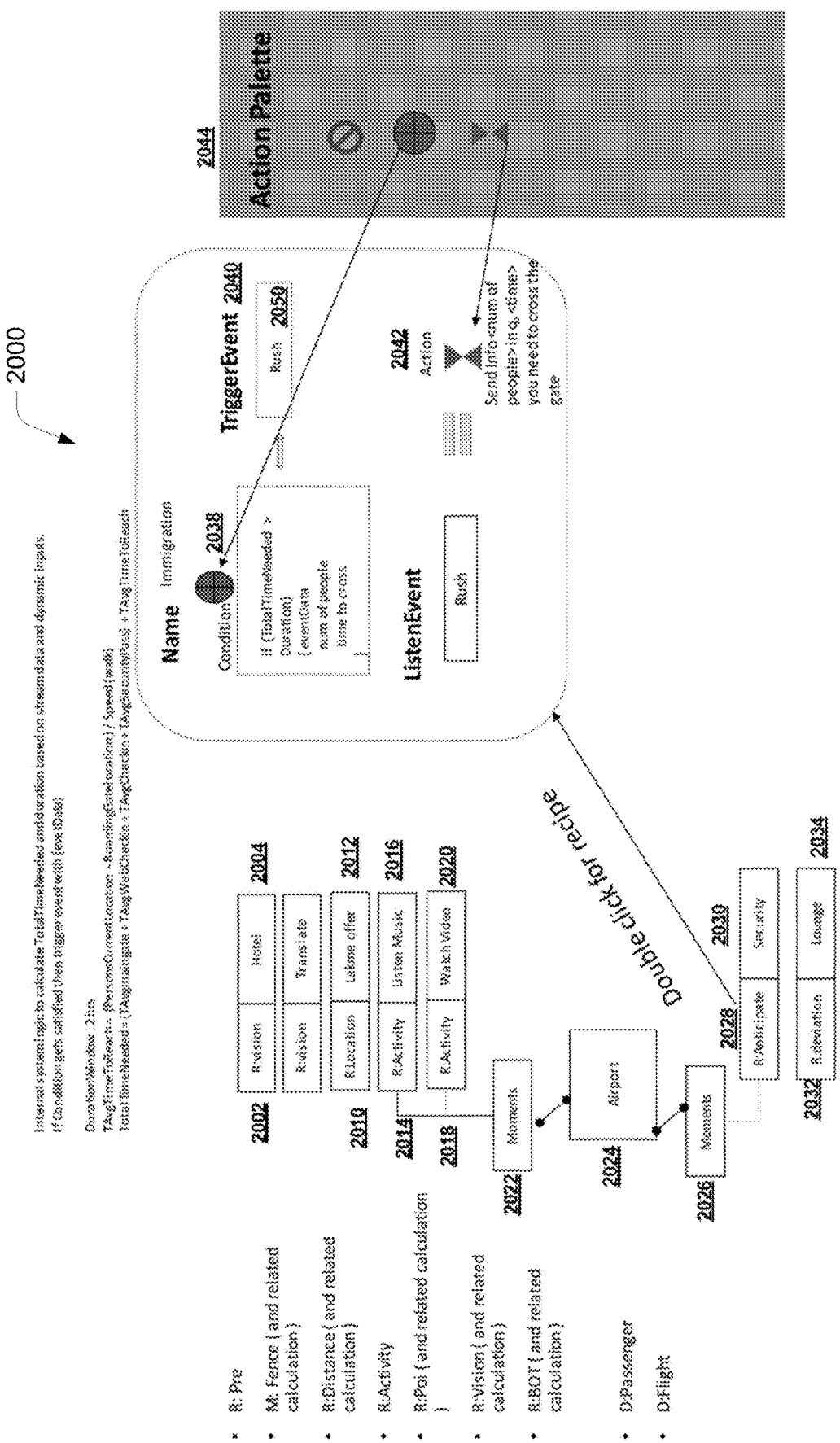
FIG. 20 illustrates a flow diagram for a plurality of events and a plurality of actions for practicing an exemplary embodiment for deploying a digital orchestration system for consumers traveling through an airport, according to an example embodiment of the present disclosure.

FIG. 20 illustrates a flow diagram for a plurality of events 212 and a plurality of actions 246 for practicing an exemplary embodiment for deploying the digital orchestration system 110 for consumers traveling through an airport, according to an example embodiment of the present disclosure. In the example, illustrated by FIGS. 18-19, the end-user may be at an airport and if the average time 1906 may be less than the constant time component 1902 then, the system 110 may detect various events for offering the plurality of user services 216 to the end-user. For example, a vision component 2002 of the system 110 may detect a hotel and push an offer 2004 to the end-user, a location component 2010 may detect a store and push an offer 2012 to the end-user, an activity component 2014 may push a notification 2016 for listening to music, an activity component 2018 may push a notification 2020 for watching a video. The activity component 2014 and the activity component 2018 may be referred to as a set of moments 2022. The system 110 may detect the location to an airport 2024 and retrieve the data related to a set of moments 2026 from the plurality of data domains 240. The set of moments 2026 may include an anticipation component 2028, and a deviation component 2032. The anticipation component 2028 and the deviation component 2032 may include various recipes like the recipe 248. The anticipation component 2028 may anticipate the security check timing as described above, while an end-user may be engaged with the set of moments 2022. In an example, wherein the time required to reach the boarding terminal 1826 may be greater than time required for engaging in the set of moments 2022 or the set of moments 2026, the anticipation component 2028 may trigger an event 2040, which may pertain to generation of a rush notification 2050 from an action palette 2044. The deviation component 2032 may provide a notification 2034 pertaining to, for example, a lounge visit. The deviation component 2032 may provide allied services to a user if there may be spare time.

Figure 21:
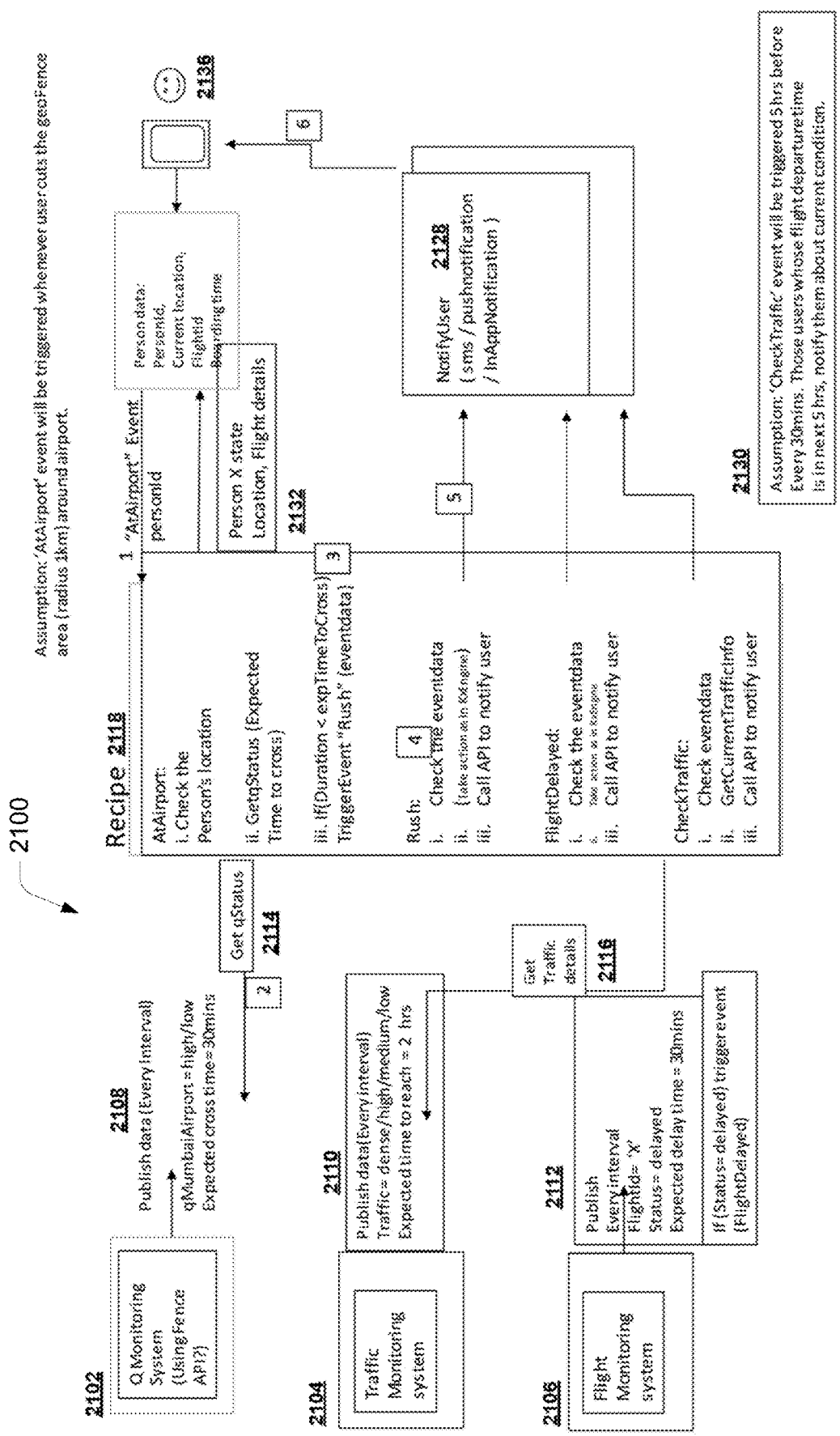
FIG. 21 illustrates a flow diagram for a logical component interaction view for practicing an exemplary embodiment for deploying a digital orchestration system for consumers traveling through an airport, according to an example embodiment of the present disclosure.

FIG. 21 illustrates a flow diagram 2100 for a logical component interaction view for practicing an exemplary embodiment for deploying the digital orchestration system 110 for consumers traveling through an airport, according to an example embodiment of the present disclosure. The system 110 may include a queue monitoring system 2102, a traffic monitoring system 2104, and a flight monitoring system 2106 for performing various time check and generate various notifications such as a flight delay notification 2112, a traffic data information 2110, and a queue information 2108 as listed above and illustrated in FIG. 21. The monitoring system 2102, the traffic monitoring system 2104, and the flight monitoring system 2106, along with a location 2132 of a person 2136, the flight delay notification 2112, the traffic data information 2110, and the queue information 2108 may be used by the system 110 to create a recipe 2118. The system 110 may generate notifications 2128 for an end-user through various external systems described above. In an example, the system 110 may work on assumption 2130 that 'CheckTraffic' event will be triggered 5 hrs before the flight and again every 30 mins to notify them about the current conditions.

Figure 22:
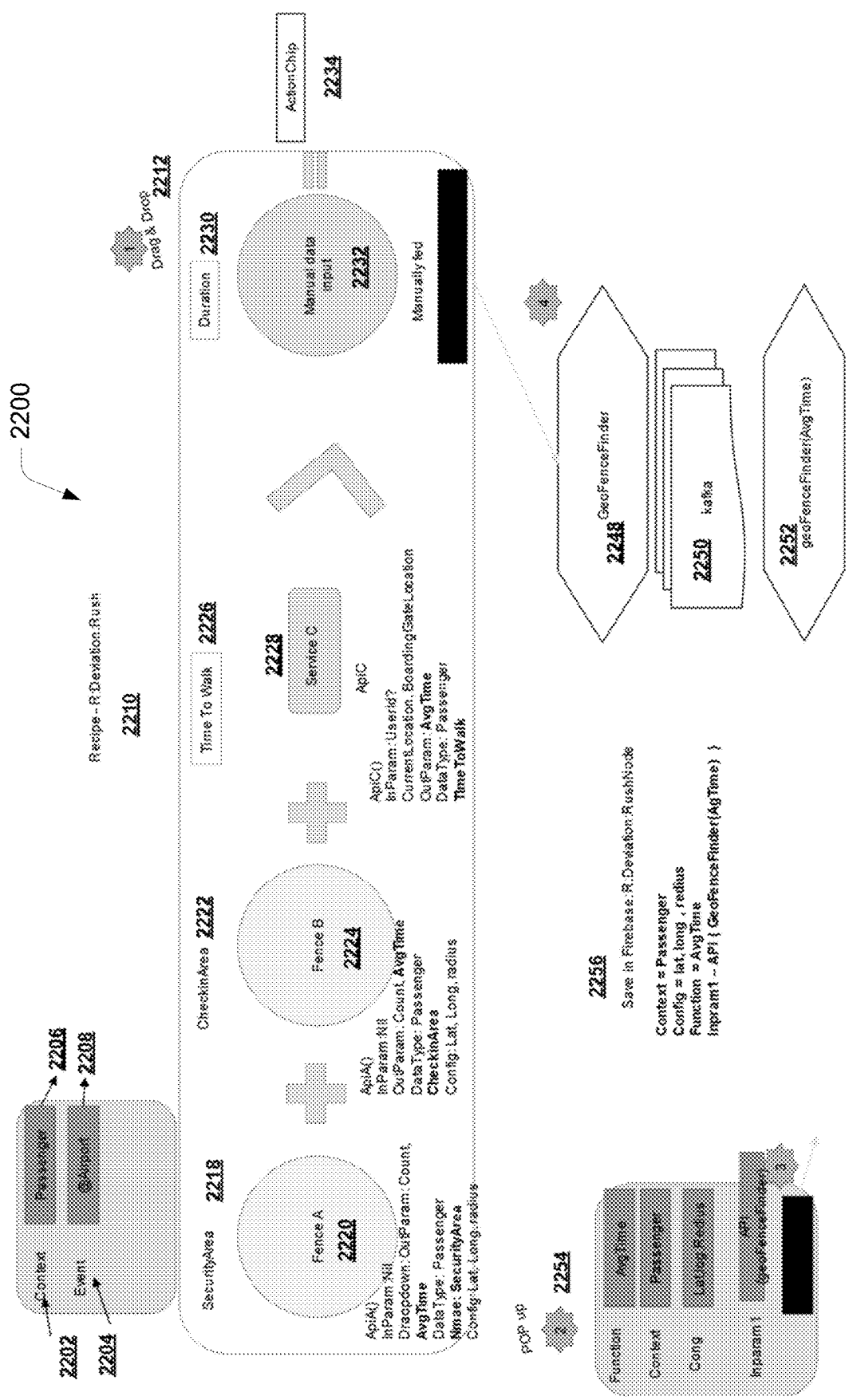
FIG. 22 illustrates a flow diagram generation of various services as an exemplary embodiment for deploying a digital orchestration system for consumers traveling through an airport, according to an example embodiment of the present disclosure.

FIG. 22 illustrates a flow diagram 2200 generation of various services as an exemplary embodiment for deploying the digital orchestration system 110 for consumers traveling through an airport, according to an example embodiment of the present disclosure. In the illustrated example, a passenger 2206 may be at an airport 2208, wherein the passenger 2206 may be a context 2202, and the airport 2208 may be an event. As mentioned above, a system may drag and drop various services such as those that may be offered at the security area into a fence 2220, those than may be offered at check-in area into a fence 2224, an additional services 2228. The fence may be a component to separate the plurality of user interaction stages 238. The system 110 may calculate a time to walk 2226. The system 110 may have a corresponding API for each of the fence 2224, fence 2226, and additional services 2228. The user of the system 110 may deploy a drag and drop mechanism 2212 for providing a manual data input 2232. In an example, the system 110 may generate a pop up-service platform 2254 while receiving the manual data input 2232 using the drag and drop mechanism 2212. The system 110 may perform operations over the datapoints associated with the plurality of domains associated with the each of the fence 2224, fence 2226, and additional services 2228 and send the output for the same to an action ship 2234 (the action chip described above). The system 110 may work on an assumption 'AtAirport' event will be triggered whenever the user cuts the geofence area (radius 1 km) around the airport. The user may provide the manual data input 2232 for configuring a geofence area finder 2248. The geofence area finder 2248 may be stored in Kafka 2250. The system 110 may deploy the geofence area finder 2248 stored in Kafka 2250 to generate a geoFenceFinder(AvgTime) 2252.

Figure 23:
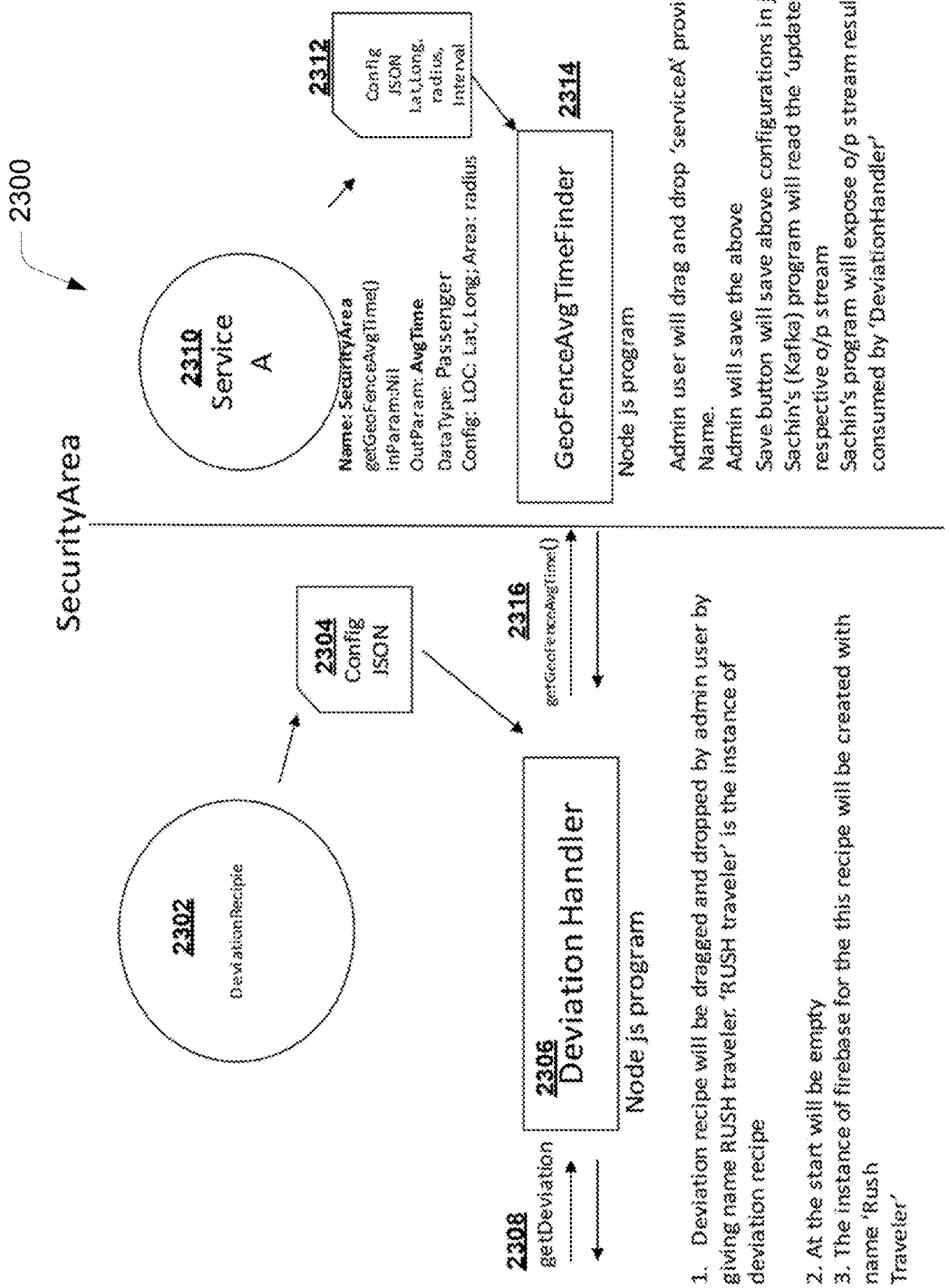
FIG. 23 illustrates a flow diagram of a dynamic change in a selection of recipes for a consumer based on a consumer location as an exemplary embodiment for deploying a digital orchestration system for consumers traveling through an airport, according to an example embodiment of the present disclosure.

FIG. 23 illustrates a flow diagram 2300 of a dynamic change in the selection of recipes for a consumer based on a consumer location as an exemplary embodiment for deploying the digital orchestration system 110 for consumers traveling through an airport, according to an example embodiment of the present disclosure. In the illustrated example, there may be a service A 2310 and a deviation recipe 248 2302 from the service A 2310 related to the geofence area finder 2248. The system 110 may implement a configuration 2312 to configure JSON for a Latitude, Longitude, radius, and Interval to execute a function geoFenceAvg time Finder 2314. The system 110 may implement a configuration 2304 to configure JSON for implementing a deviation handler function 2306. The system may compare the function geoFenceAvg time Finder 2314 and the deviation handler function 2306 to decide upon a retrieving a deviation recipe 2308. For example, the deviation recipe 2308 may be a rush passenger wherein the passenger may not have enough time to navigate the services configured as illustrated in FIG. 22 and might require a deviation from the event loop.

Figure 24:
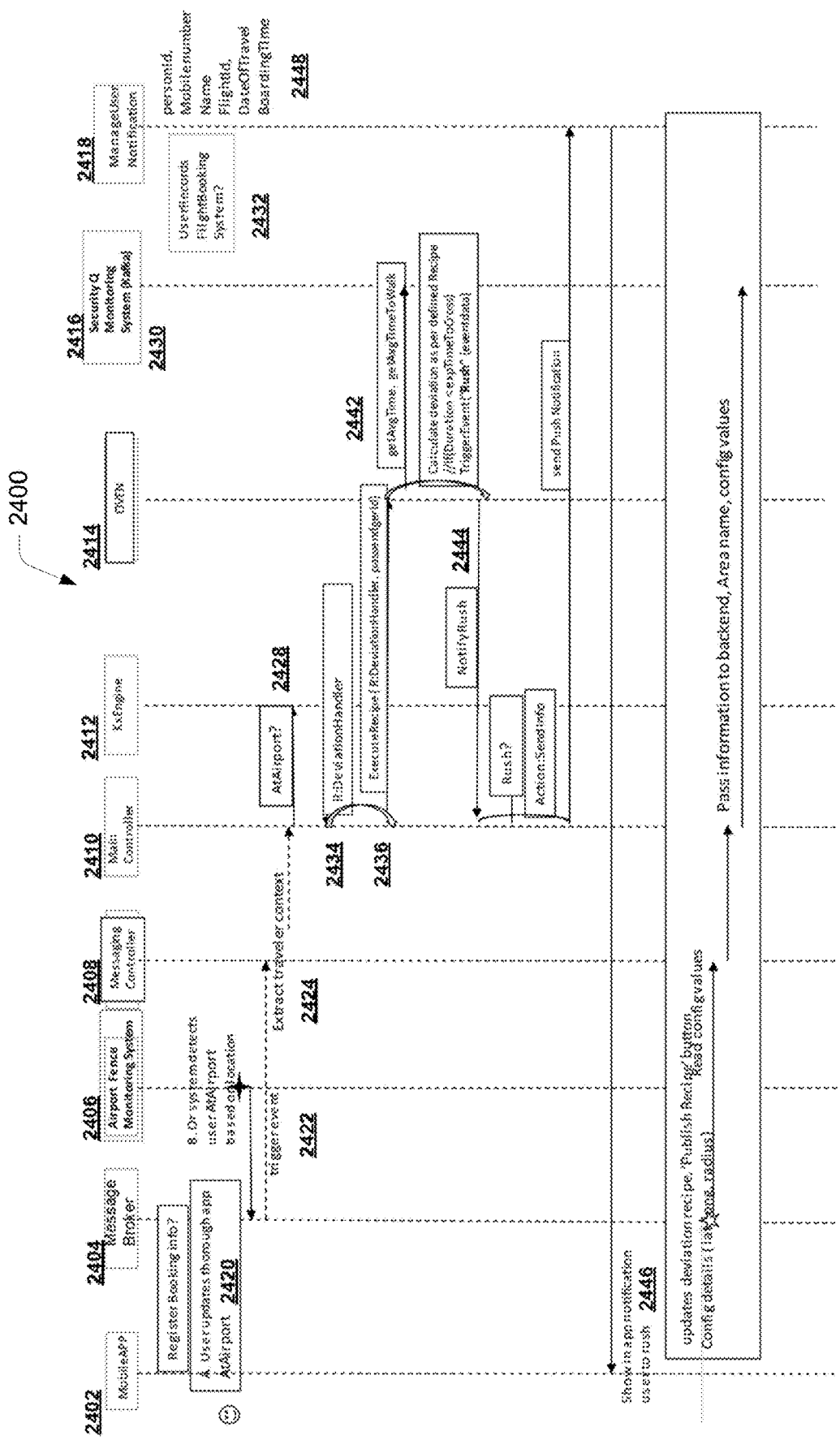
FIG. 24 illustrates a flow diagram for a run time interaction view for an exemplary embodiment for deploying a digital orchestration system for consumers traveling through an airport, according to an example embodiment of the present disclosure.

FIG. 24 illustrates a flow diagram 2400 for a run time interaction view for an exemplary embodiment for deploying the digital orchestration system 110 for consumers traveling through an airport, according to an example embodiment of the present disclosure. The flow diagram 2400 may include a mobile application 2402, a message broker 2404, an airport fence monitoring system 2406, a message controller 2408, a main controller 241, a Kx engine 2412, an oven 2414, security queue monitoring system 2416 and a user notification 2418. The mobile application 2402 may be used as an interface between the end-user and the system. In accordance with various embodiments of the present disclosure, various components from the mobile application 2402, the message broker 2404, the airport fence monitoring system 2406, the message controller 2408, the main controller 241, the Kx engine 2412, the oven 2414, security queue monitoring system 2416 and the user notification 2418 may be interconnected with each other. In an example, the message broker 2404 may deploy the Kafka algorithm. The aforementioned inter-connected components may be used to trigger an event 2422, extract a traveler context 2424, detect a location 2428, such as an airport, detect a deviation situation 2464, execute a deviation recipe 2436 to generate a notification 2444 for a rush passenger. The aforementioned inter-connected components may be used to calculate various time checks 2442 and send a notification 2446 to a user.

The user notification 2418 may include a personal record 2432 of an end-user and a personal information 2448 of the end-user that may be used to authenticate a user and to personalize user experience. The personal record 2432 of an end-user and the personal information 2448 of the end-user may be deployed by the system 110 to ensure that the system 110 may be scalable to any number of users for generating personalized user experiences.

Figure 25:
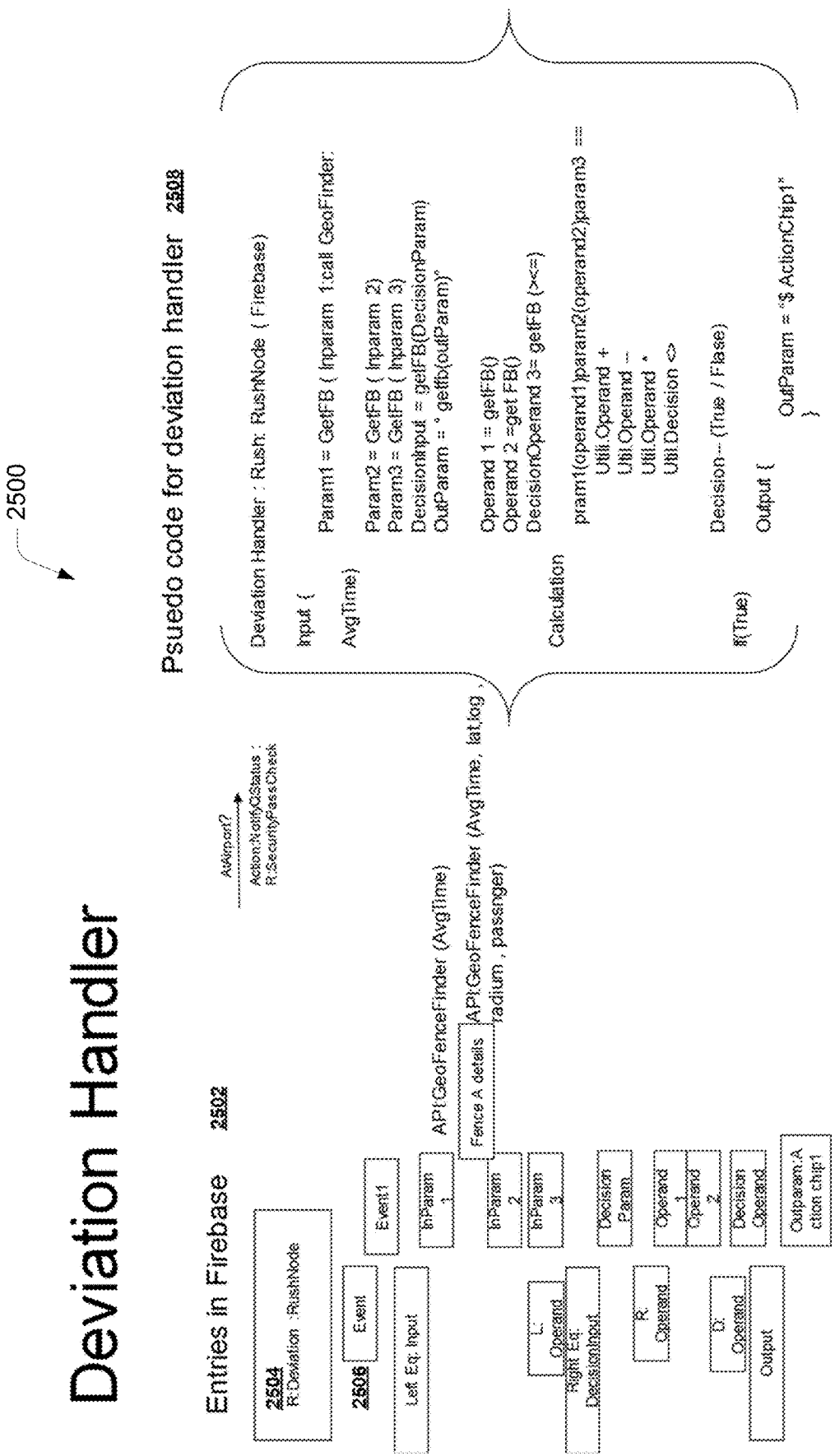
FIG. 25 illustrates a flow diagram of a deviation handler for an exemplary embodiment for deploying a digital orchestration system for consumers traveling through an airport, according to an example embodiment of the present disclosure.

FIG. 25 illustrates a flow diagram of a deviation handler 2500 for an exemplary embodiment for deploying the digital orchestration system 110 for consumers traveling through an airport, according to an example embodiment of the present disclosure. In an example, the deviation handler 2500 may include various entries for deviation in a firebase 2502. For example, a deviation recipe 248 may be stored in the firebase 2502 for a rush passenger as described above. The system 110 may detect an event 2506 that may pertain to fetching the deviation recipe 248 as described above. The FIG. 25 may also illustrate an embodiment code 2508 for the deviation recipe 2504 for the rush passenger.

Figure 26:
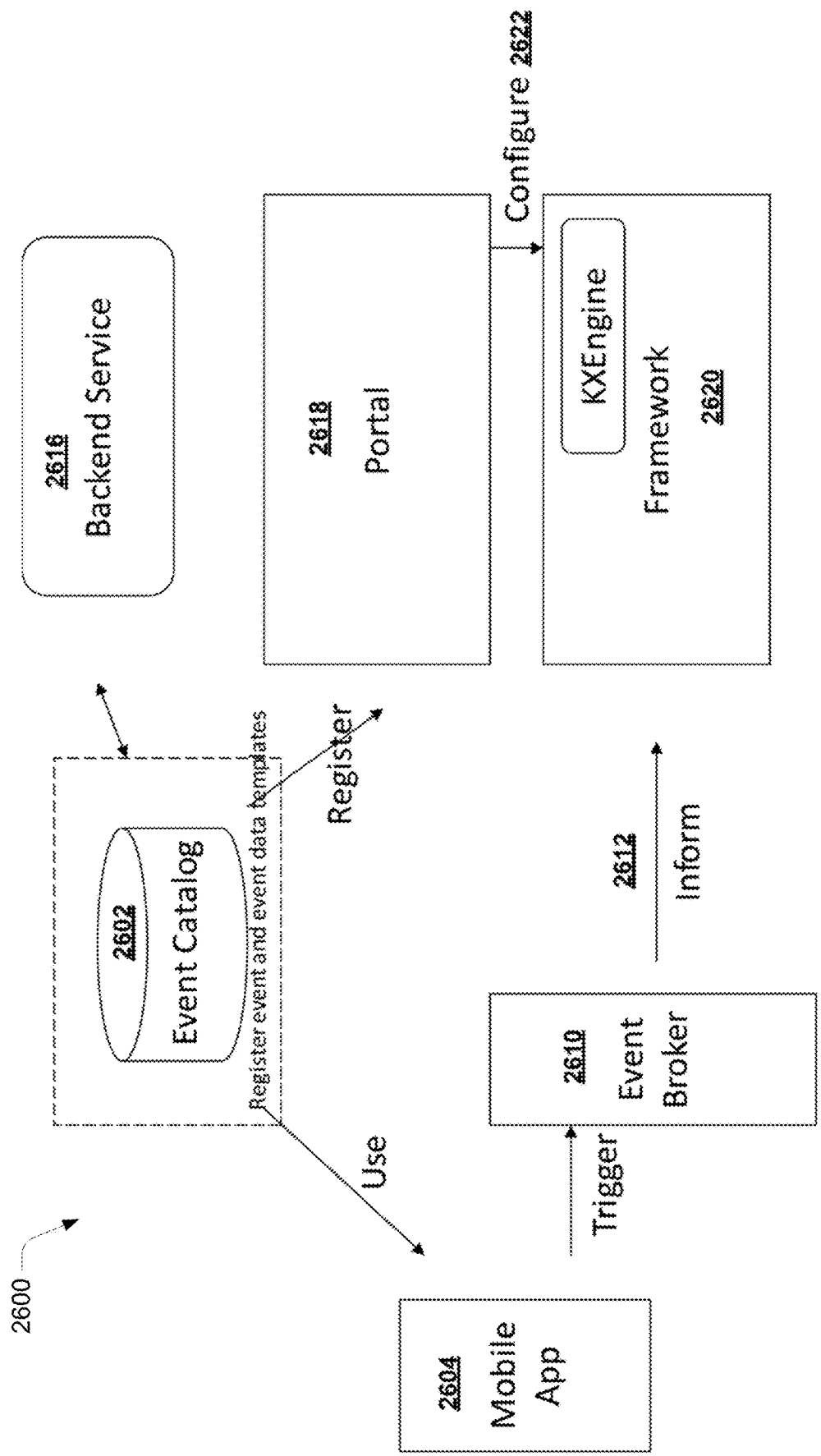
FIG. 26 illustrates a flow diagram of a sequence architecture of a digital orchestration system, according to an example embodiment of the present disclosure.

FIG. 26 illustrates a flow diagram 2600 of a sequence architecture of the digital orchestration system 110, according to an example embodiment of the present disclosure. The system 110 may include an event catalog 2602. The event catalog 2602 may register an event and associated data templates. The event catalog 2602 may be connected to a backend services 2616. The event catalog 2602 may be used by a mobile application 2604 to trigger an action from the event broker 2610. The system 110 may further include a portal 2618 that may receive event registration from the event catalog 2602. The portal 2618 and the event broker 2610 may configure a framework 2620. The framework 2620 may include KXEngine.

Figure 27:
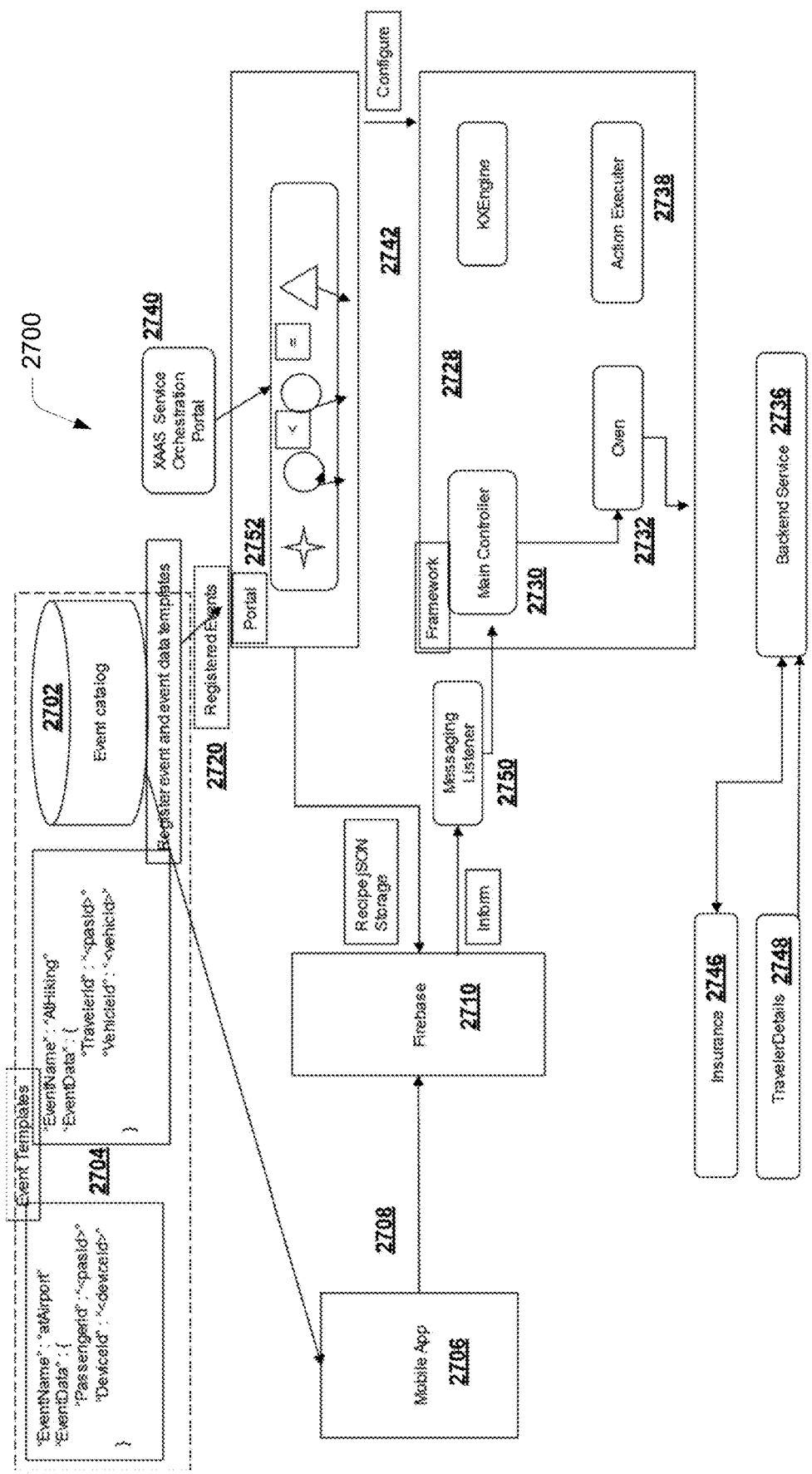
FIG. 27 illustrates a flow diagram of an event-driven architecture of a digital orchestration system, according to an example embodiment of the present disclosure.

FIG. 27 illustrates a flow diagram 2700 of an event-driven architecture of the digital orchestration system 110, according to an example embodiment of the present disclosure. The FIG. 27 shows a magnified view of the FIG. 26. The system 110 may include an event catalog 2702. The event catalog 2702 may register events 2720 and associated data templates 2704. The event catalog 2702 may be connected to a backend services 2716. In an example, the backend services 2716 may include a travel insurance 2746, and traveler details 2748 in case of an end-user may be traveling.

The event catalog 2702 may be used by a mobile application 2706 to trigger an action using the action activator 254. The mobile application 2706 may be linked to a firebase 2710. The firebase 2710 may be the event broker 2610. The system 110 may further include a portal 2752 that may receive event registration from the event catalog 2702. The mobile application 2704 may communicate with the portal 2752. The portal 2752 may be a XAAS service orchestration portal and may further include the plurality of rules 250 for creating the recipe 248. The portal 2718 and the firebase 2710 may configure a framework 2728. The framework 2720 may include KXEngine, a main controller 2730, an oven 2732, and an action executor 2738. The firebase 2710 may be in communication with a listener for messages 2750, which may be coupled to the framework 2720 as well.

Figure 28:
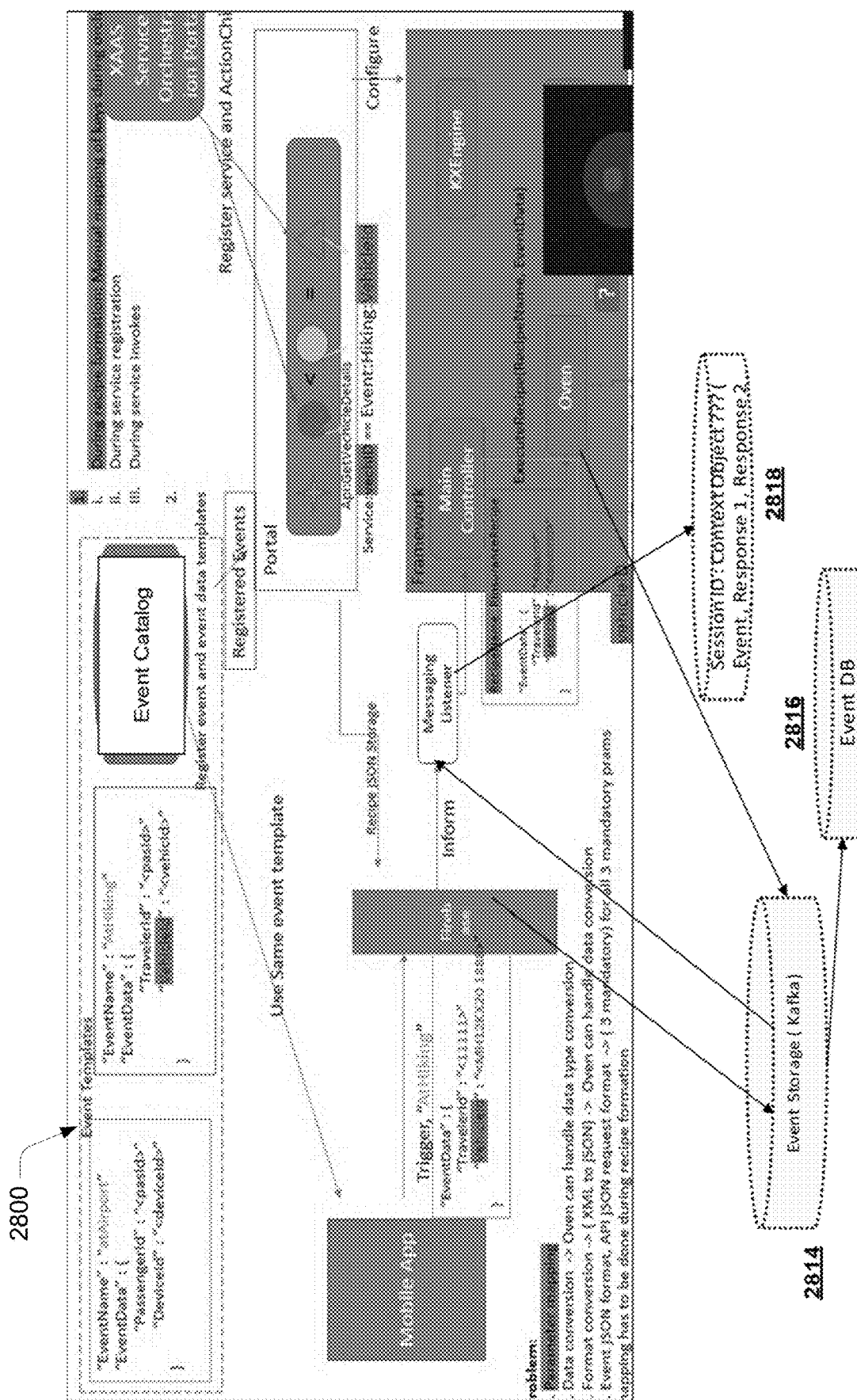
FIG. 28 illustrates a flow diagram of an event-driven architecture of a digital orchestration system, according to an example embodiment of the present disclosure.

FIG. 28 illustrates a flow diagram 2800 of an event-driven architecture of the digital orchestration system 110, according to an example embodiment of the present disclosure. The FIG. 28 may be described by referring to FIG. 27. The firebase 2710 may be coupled to an event storage database 2814 that may be Kafka based. The listener for messages 2750 may be coupled to a database 2818 for retrieving and storing information. The listener for messages 2750 may also obtain input from the database 2818. The oven 2732 may be in communication with the database 2818. In an example, the database 2818 may be connected to an event storage database 2816.

Figure 29:
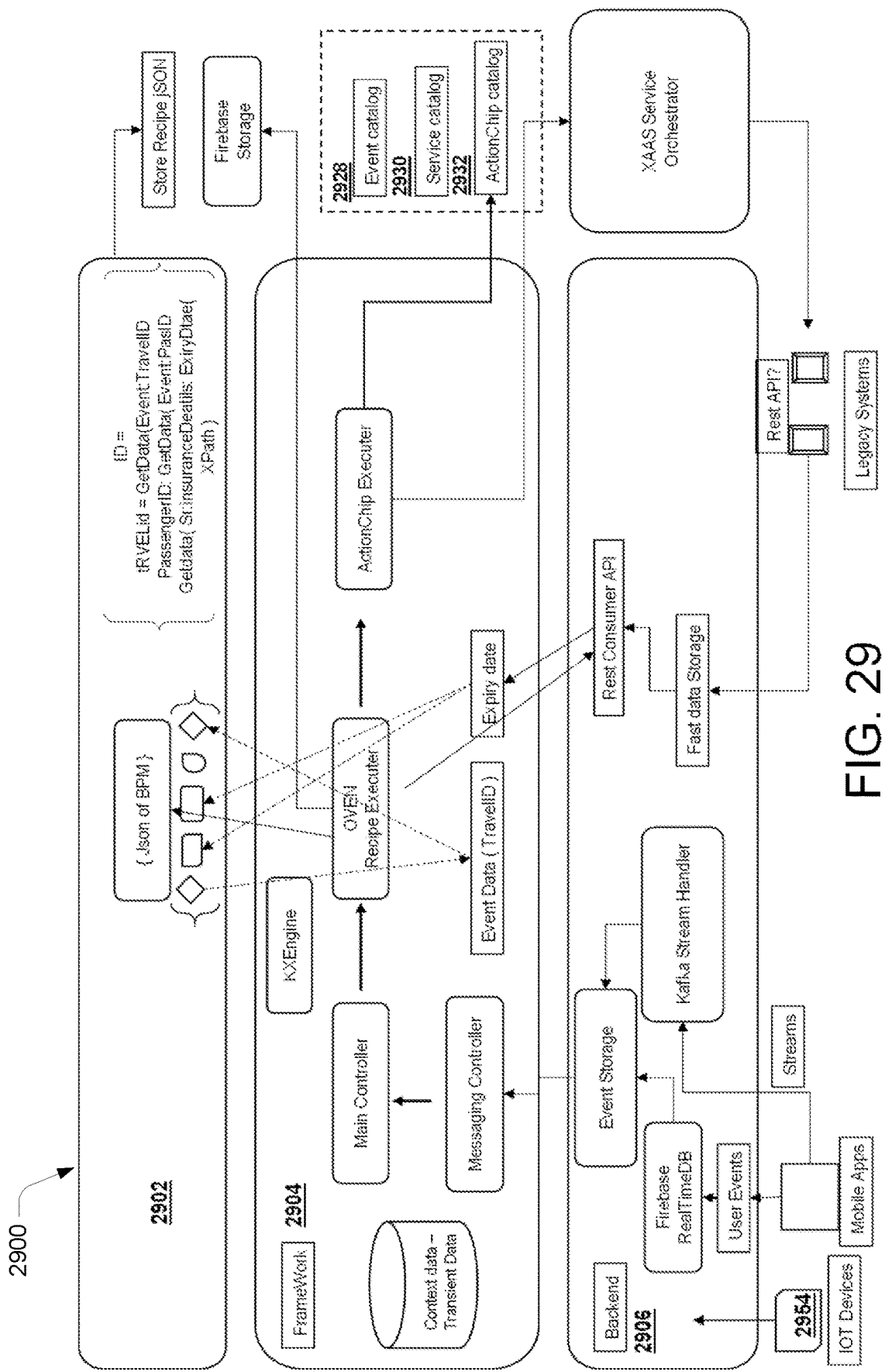
FIG. 29 illustrates a flow diagram of an event-driven architecture of a digital orchestration system, according to an example embodiment of the present disclosure.

FIG. 29 illustrates a flow diagram 2900 of an event-driven architecture of the digital orchestration system 110, according to an example embodiment of the present disclosure. The flow diagram 2900 illustrates a portal 2902, a framework 2904, a backend services catalog 2906. The components illustrated in the FIG. 29 have been explained in detail by way of various Figs. in this document and would not be repeated herein.

FIGS. 30-41 illustrate various two major functionalities involved in the digital orchestration system 110. The first functionality may be to choreograph the experience (mentioned above by way of experience construction) and second may be to execute the experience (mentioned above by way of experience execution) in real-time. FIGS. 30-41 may include various steps along with the background logic part for the experience construction and the experience execution. The flow diagrams illustrated in FIGS. 30-41 may be read in conjunction with the description for FIGS. 42A-42Z, which include a pictorial representation of various steps carried out by a user onto the system 110 for experience construction and experience execution.

Figure 30:
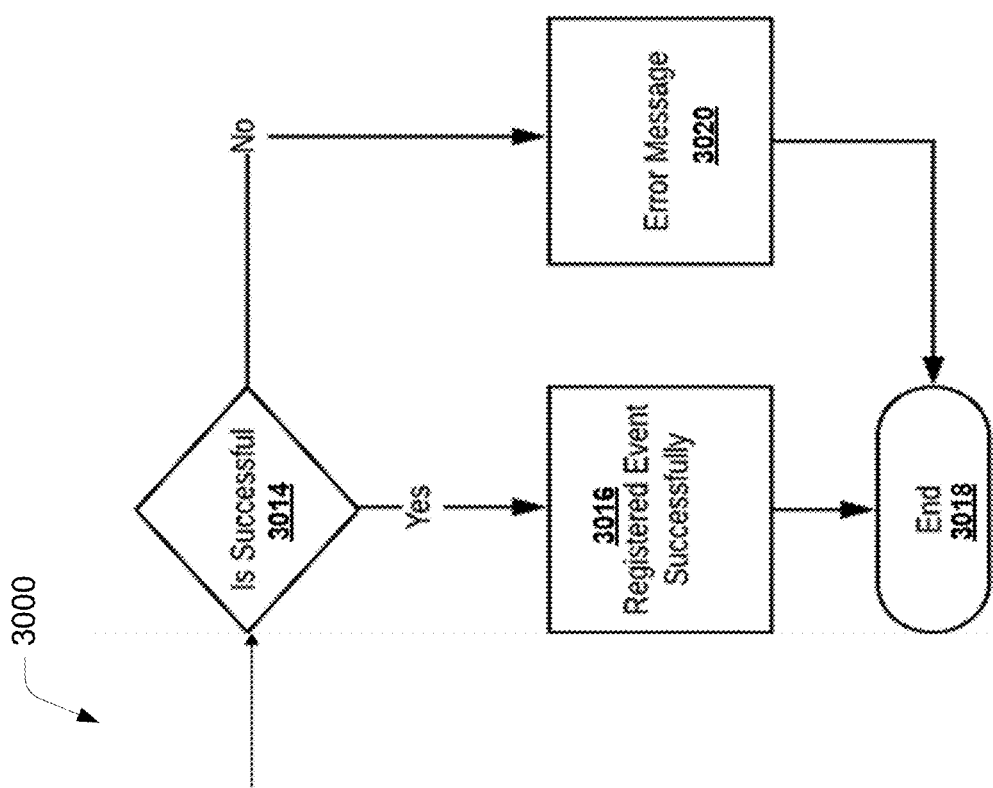
FIG. 30 illustrates a flow diagram for an event registration using a digital orchestration system, according to an example embodiment of the present disclosure.
Figure 30:
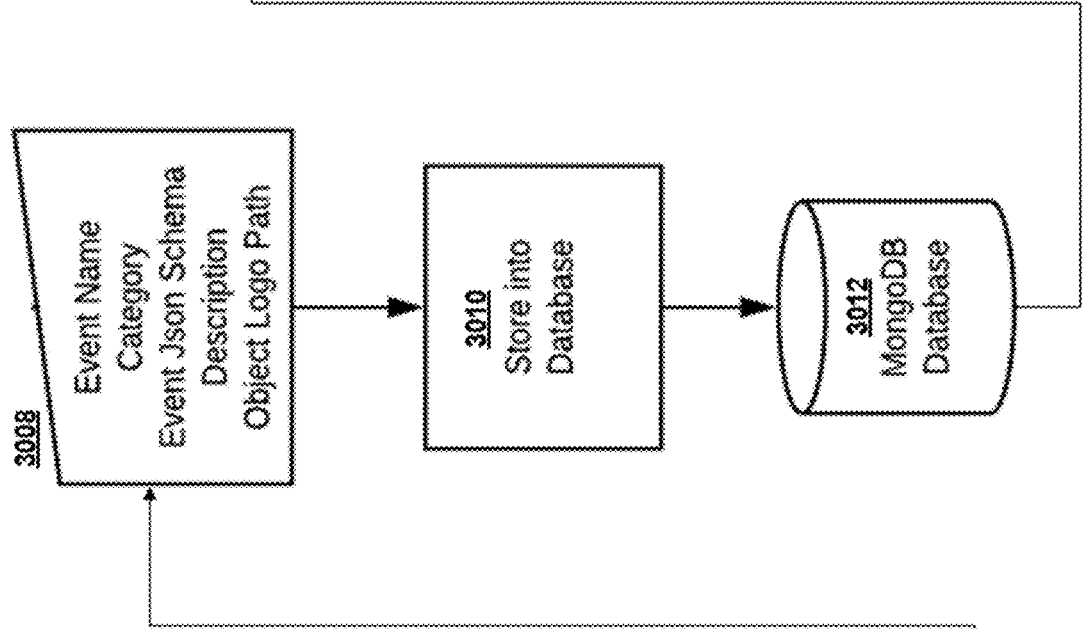

FIG. 30 illustrates a flow diagram 3000 for an event registration using the digital orchestration system 110, according to an example embodiment of the present disclosure. As mentioned above, the system 110 (also referred to as the "platform portal") may allow the user to register entities needed to create different recipes. The flow diagram 3000 illustrates the registration logic part of the system 110 for registration of a new event. In accordance with an embodiment of the present disclosure, the events may be the triggers from an external system to the system 110. The user may register event names and their payload structure formats. The flow diagram 3000 includes a start component 3002 followed by a step 3004 wherein the user may register a new event. The step 3004 may be followed by a step 3006 for entering various mandatory fields. The step 3006 may be followed by a step 3008 that may include examples of the mandatory fields required by the step 3006. The mandatory fields may include an event name, an event category, an event JSON schema, an event description, and an object logo path. The system 110 may store all the information entered by way of the mandatory fields into a database at step 3010. The database may be a Mongo database as illustrated by way of step 3012. The MongoDB is a cross-platform document-oriented database program. The system 110 may execute a decision at step 3014 wherein the system 110 may decide if the storage onto the Mongo database may be successful. In an example, wherein the storage onto the MongoDB database may be successful, the system 110 may execute a step 3016 wherein an event may be registered successfully. In an example, wherein the storage onto the Mongo database may not be successful, the system 110 may execute a step 3020 wherein an error message may be shown to the user. The system 110 may execute a step 3018 to stop the registration of the new event.

Figure 31A:
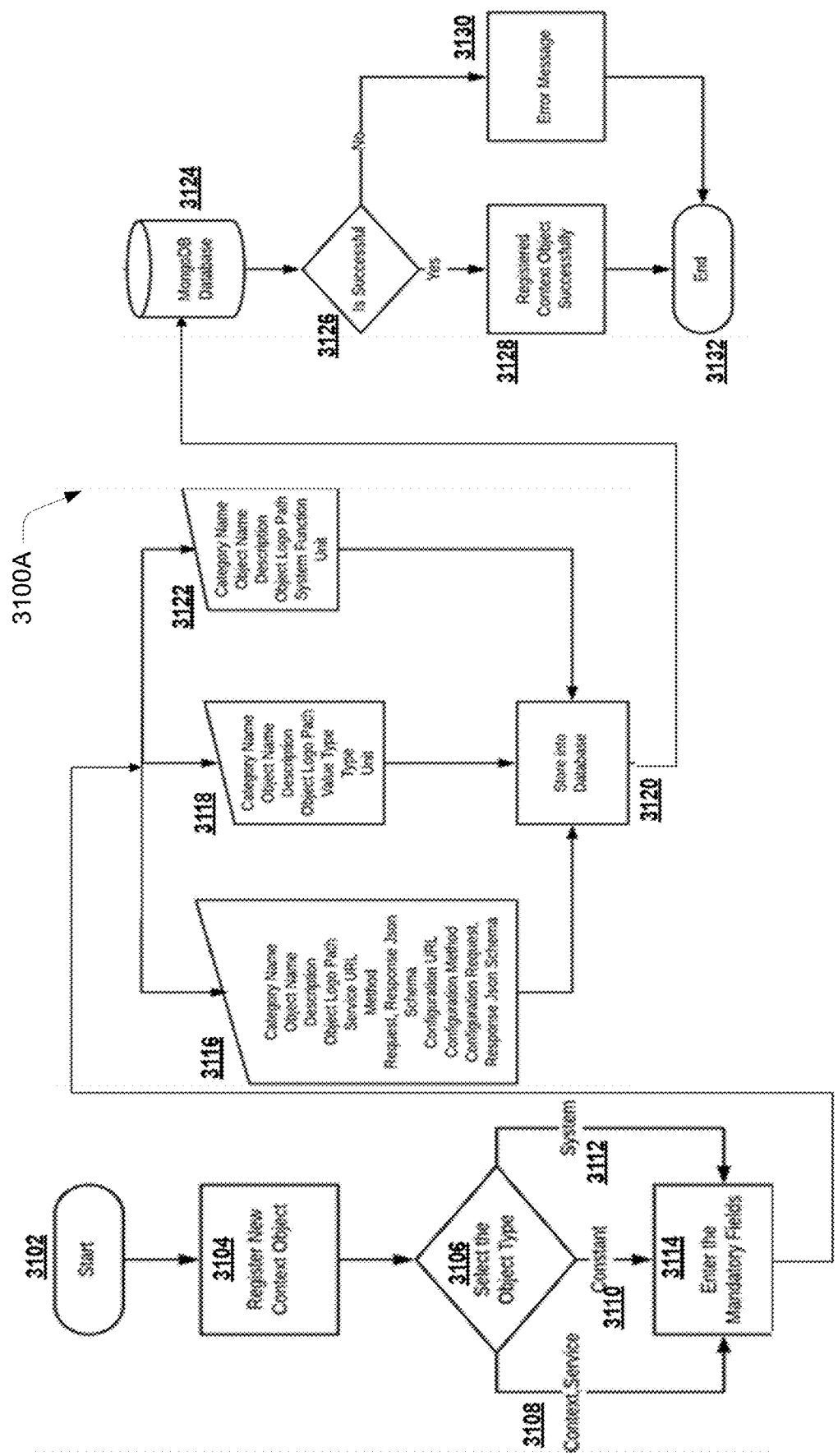
FIG. 31A illustrates a flow diagram for a context registration using a digital orchestration system, according to an example embodiment of the present disclosure.

FIG. 31A illustrates a flow diagram 3100A for a context registration using the digital orchestration system 110, according to an example embodiment of the present disclosure. In accordance with an embodiment of the present disclosure, there may be four types of contextual objects that may be needed to build the recipe 248. The context objects may be a context-based object, a system 110 based contextual objects, a service-based contextual object, a constant contextual object. The context-based objects may be objects which bring contextual data such as for example, the plurality of actions 246 related to the context of an event from the plurality of events 212. The user may need to register runtime API and config API along with needed input and output parameters. The system 110 based contextual object may include objects that may be needed to execute system 110 functionalities such as for example, the plurality of actions 246 related to time, date and the like. The user may need to register system 110 functionality APIs e.g. current time, current date, and the like as a part of the system 110 based contextual object. The service-based contextual objects may be the objects which may bring data from a legacy system, SAP/CRM or enterprise database system, invoke services like sending a push notification, SMS, email and the like. The system 110 may allow to write plugins with standard interfaces, to connect to a different external system, and register these plugins. The constant contextual objects may be register different constant type object to use as a constant during recipe 248 creation. The user may create constant objects such as for example, the plurality of actions 246 for describing a unit of time, weight, distance and the like. In an example, the user may create custom type constant contextual objects such as various integers. The flow diagram 3100A illustrates the context registration using the digital orchestration system 110. The system 110 may execute a step 3102 to start the process of the context registration. The system 110 may register a new context object at a step 3104. The system 110 may execute a decision at step 3106, wherein the context object type may be selected. The system 110 may execute a step 3108 for wherein, the context object type may be context-based objects and service-based contextual objects. The system 110 may execute a step 3110 wherein, the context object type may be a constant contextual object. The system 110 may execute a step 3112 wherein, the context object type may be system 110 based contextual object. The system 110 may execute a step 3114 after the step 3108, the step 3110, and the step 3112 wherein, the user may be required to enter mandatory fields related to the context object. The system 110 may execute a step 3116, a step 3118 and a step 3122 that may include examples of the mandatory fields required by the step 3114 as illustrated. The system 110 may store all the information entered by way of the mandatory fields into a database at step 3120. The database may be a MongoDB database as illustrated by way of step 3124. The MongoDB is a cross-platform document-oriented database program. The system 110 may execute a decision at step 3126 wherein the system 110 may decide if the storage onto the MongoDB database may be successful. In an example, wherein the storage onto the MongoDB database may be successful, the system 110 may execute a step 3128 wherein a context object may be registered successfully. In an example, wherein the storage onto the Mongo database may not be successful, the system 110 may execute a step 3130 wherein an error message may be shown to the user. The system 110 may execute a step 3132 to stop the registration of the new context object.

FIG. 31B illustrates a flow diagram 3100B for an action registration using the digital orchestration system 110, according to an example embodiment of the present disclosure. In accordance with various embodiments of the present disclosure, actions may include the action objects, which may be those objects needed to take different actions like push notification, invoke BOT, messaging, call, service now, and the like. The system 110 may allow creating plugins with standard interfaces to create newer action objects to perform different actions. The flow diagram 3100B illustrates the action object registration using the digital orchestration system 110. The system 110 may execute a step 3134 to start the process of the action registration. The system 110 may register a new action object at a step 3136. The system 110 may execute a step 3138 wherein, the user may be required to enter mandatory fields related to the action object. The system 110 may execute a step 3140 that may include examples of the mandatory fields required by step 3138 as illustrated. The system 110 may store all the information entered by way of the mandatory fields into a database at step 3142. The database may be a MongoDB database as illustrated by way of step 3144. MongoDB is a cross-platform document-oriented database program. The system 110 may execute a decision at step 3146 wherein the system 110 may decide if the storage onto the MongoDB database may be successful. In an example, wherein the storage onto the MongoDB database may be successful, the system 110 may execute a step 3148 wherein a context object may be registered successfully. In an example, wherein the storage onto the MongoDB database may not be successful, the system 110 may execute a step 3150 wherein an error message may be shown to the user. The system 110 may execute a step 3152 to stop the registration of the new action object.

Figure 32:
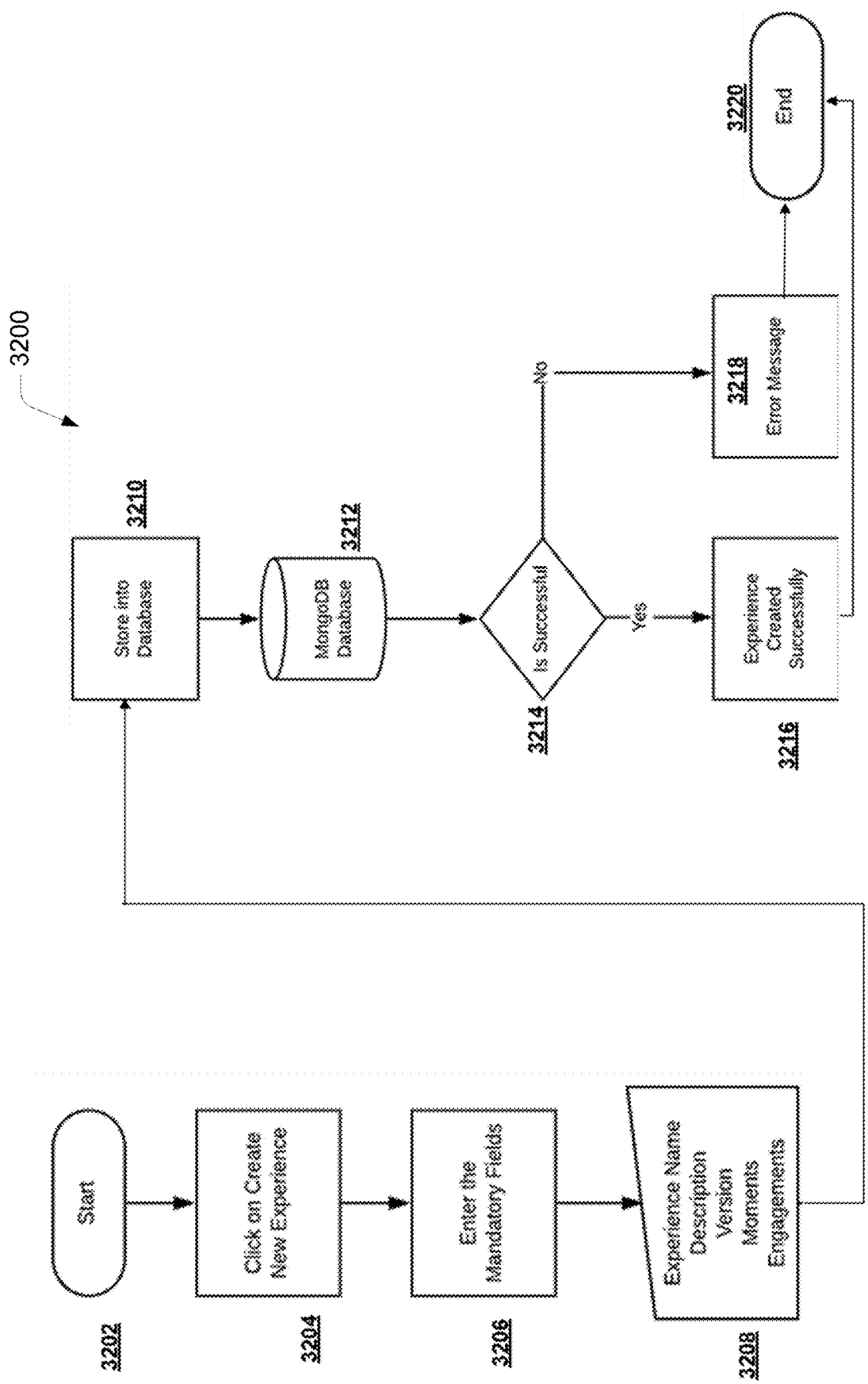
FIG. 32 illustrates a flow diagram for the creation of a new experience using a digital orchestration system, according to an example embodiment of the present disclosure.

FIG. 32 illustrates a flow diagram 3200 for the creation of a new experience using the digital orchestration system 110, according to an example embodiment of the present disclosure. The flow diagram 3200 illustrates the new experience created using the digital orchestration system 110. The system 110 may execute a step 3202 to start the process of the new experience creation. The user may click on 'create new experience' at a step 3204. The system 110 may execute a step 3206 wherein, the user may be required to enter mandatory fields related to the new experience creation. The system 110 may execute a step 3208 that may include examples of the mandatory fields required by the step 3206 as illustrated. The system 110 may store all the information entered by way of the mandatory fields into a database at step 3210. The database may be a Mongo database as illustrated by way of step 3212. The MongoDB is a cross-platform document-oriented database program. The system 110 may execute a decision at step 3214 wherein the system 110 may decide if the storage onto the MongoDB database may be successful. In an example, wherein the storage onto the MongoDB database may be successful, the system 110 may execute a step 3216 wherein a new experience creation may be registered successfully. In an example, wherein the storage onto the MongoDB database may not be successful, the system 110 may execute a step 3218 wherein an error message may be shown to the user. The system 110 may execute a step 3220 to stop the registration of the new experience creation.

Figure 33:
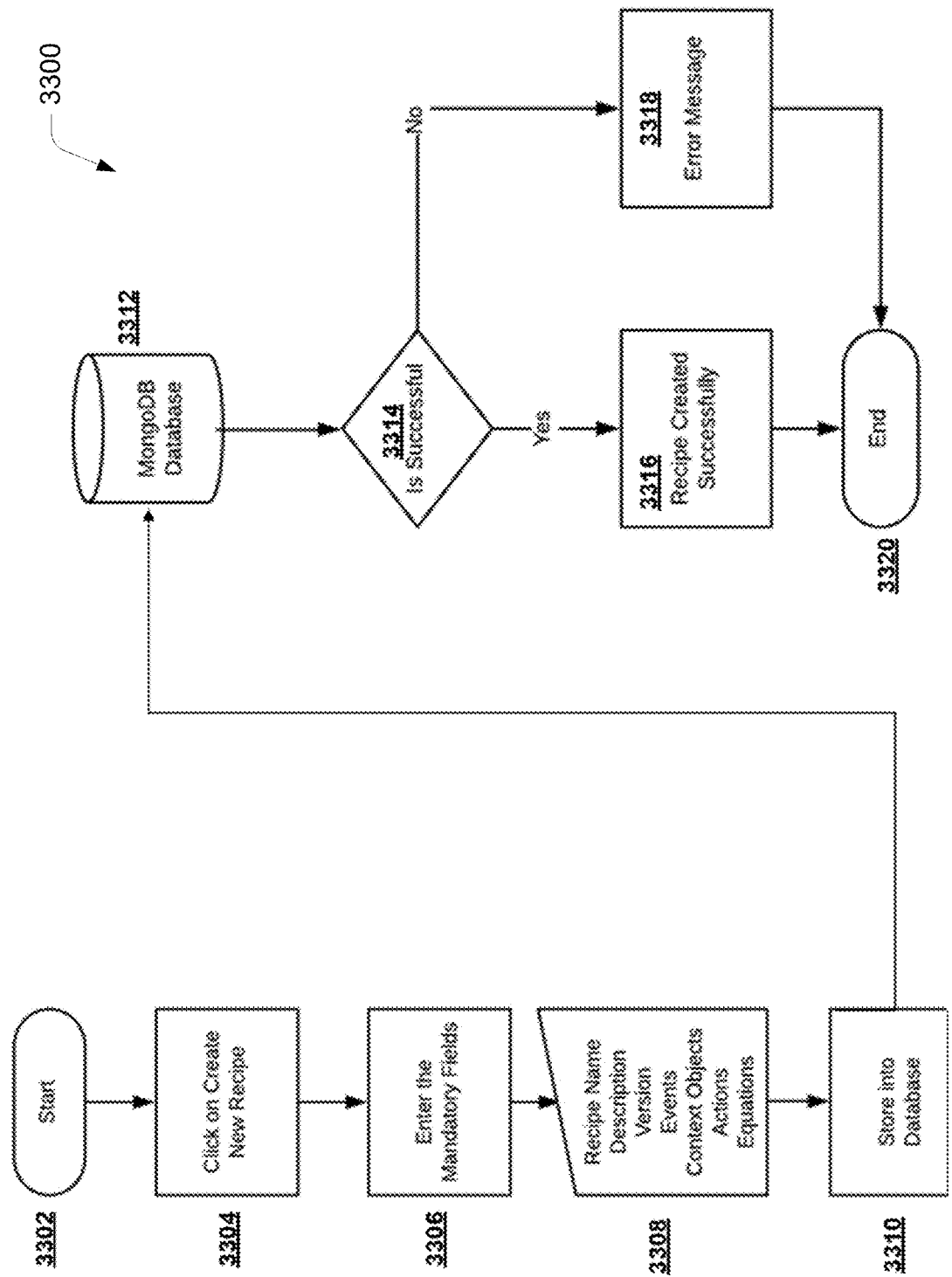
FIG. 33 illustrates a flow diagram for the creation of a new recipe using a digital orchestration system, according to an example embodiment of the present disclosure.

FIG. 33 illustrates a flow diagram 3300 for the creation of a new recipe 248 using the digital orchestration system 110, according to an example embodiment of the present disclosure. The flow diagram 3300 illustrates the new recipe 248 creation using the digital orchestration system 110. The system 110 may execute a step 3302 to start the process of the new recipe 248 creation. The user may click on 'create new recipe 248' at a step 3304. The system 110 may execute a step 3306 wherein, the user may be required to enter mandatory fields related to the new recipe 248 creation. The system 110 may execute a step 3308 that may include examples of the mandatory fields required by the step 3306 as illustrated. The system 110 may store all the information entered by way of the mandatory fields into a database at step 3310. The database may be a MongoDB database as illustrated by way of step 3312. The MongoDB is a cross-platform document-oriented database program. The system 110 may execute a decision at step 3314 wherein the system 110 may decide if the storage onto the MongoDB database may be successful. In an example, wherein the storage onto the MongoDB database may be successful, the system 110 may execute a step 3316 wherein a new recipe 248 creation may be registered successfully. In an example, wherein the storage onto the Mongo database may not be successful, the system 110 may execute a step 3318 wherein an error message may be shown to the user. The system 110 may execute a step 3320 to stop the registration of the new recipe 248 creation.

Figure 34:
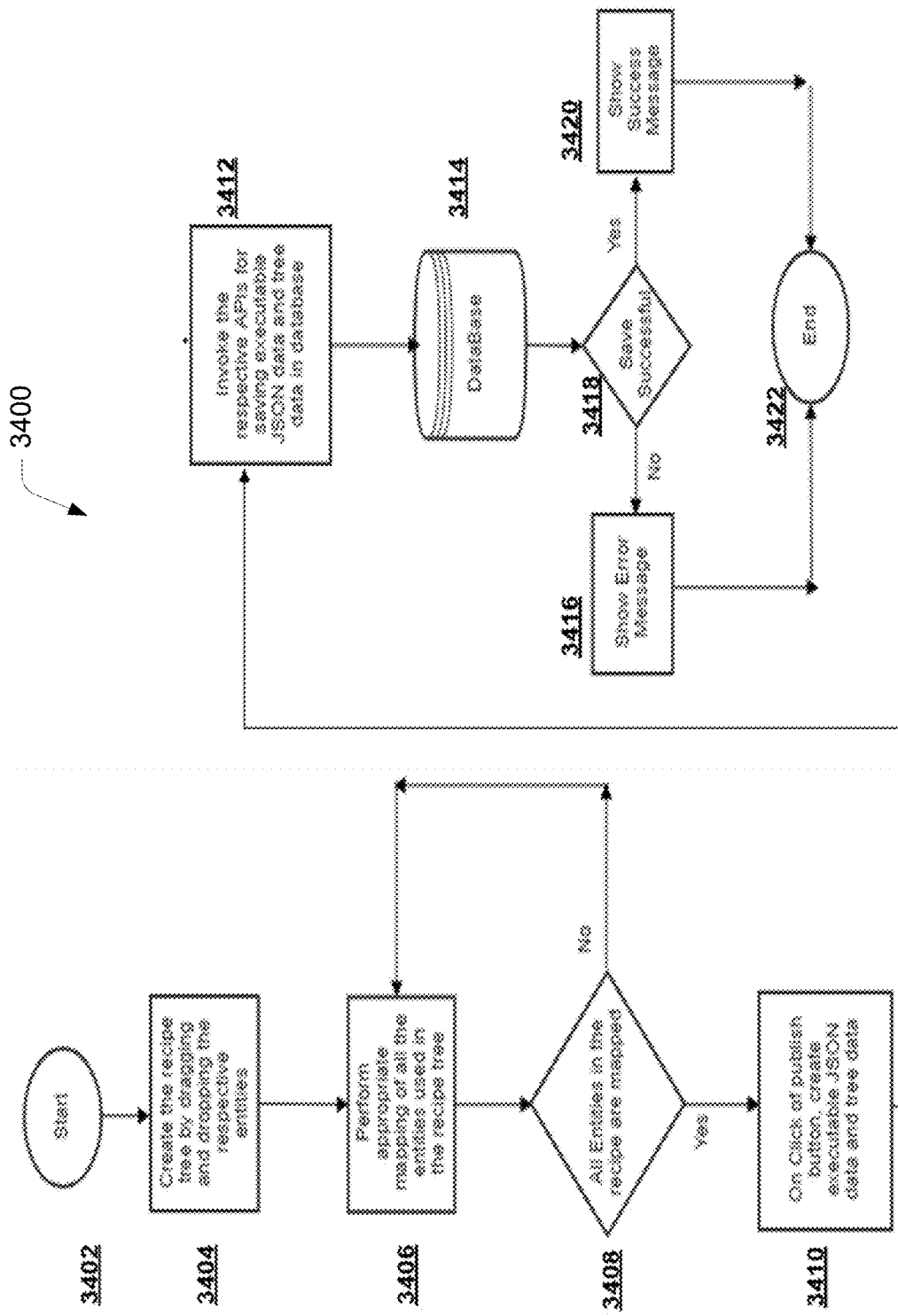
FIG. 34 illustrates a flow diagram for forming and publishing a new recipe using a digital orchestration system, according to an example embodiment of the present disclosure.

FIG. 34 illustrates a flow diagram 3400 for forming and publishing a new recipe 248 using the digital orchestration system 110, according to an example embodiment of the present disclosure. In accordance with various embodiments of the present disclosure, the system 110 may publish the recipe 248 in the recipe sequence 228, and the event sequence 230. The flow diagram 3400 illustrates the recipe formation and publishing using the digital orchestration system 110. The system 110 may execute a step 3402 to start the process of the recipe formation. The user may create a recipe tree by dragging and dropping various entities at a step 3404. The system 110 may execute a step 3406 wherein, the system 110 may perform appropriate mapping of all the entities used in the recipe tree. The system 110 may execute a decision at a step 3408, wherein the system 110 may check if all the entities stated above may be mapped. In an example, wherein the check if all the entities stated above may be mapped may be successful, the system 110 may execute a step 3410 wherein the user may click on 'publish recipe 248' button for creating an executable JSON data and tree data. In an example, wherein the check if all the entities stated above may be mapped may not be successful, the system 110 may execute the step 3406 again.

The system 110 may invoke the respective API's for saving executable JSON data and tree data in a database step 3412. The database may be as illustrated by way of step 3414. The system 110 may execute a decision at step 3418 wherein the system 110 may decide if the storage onto the database may be successful. In an example, wherein the storage and saving onto the database may be successful, the system 110 may execute a step 3420 wherein the system 110 may show a success message. In an example, wherein the storage and saving onto the database may not be successful, the system 110 may execute a step 3416 wherein an error message may be shown to the user. The system 110 may execute a step 3422 to stop the process of the forming and publishing a new recipe 248.

Figure 35:
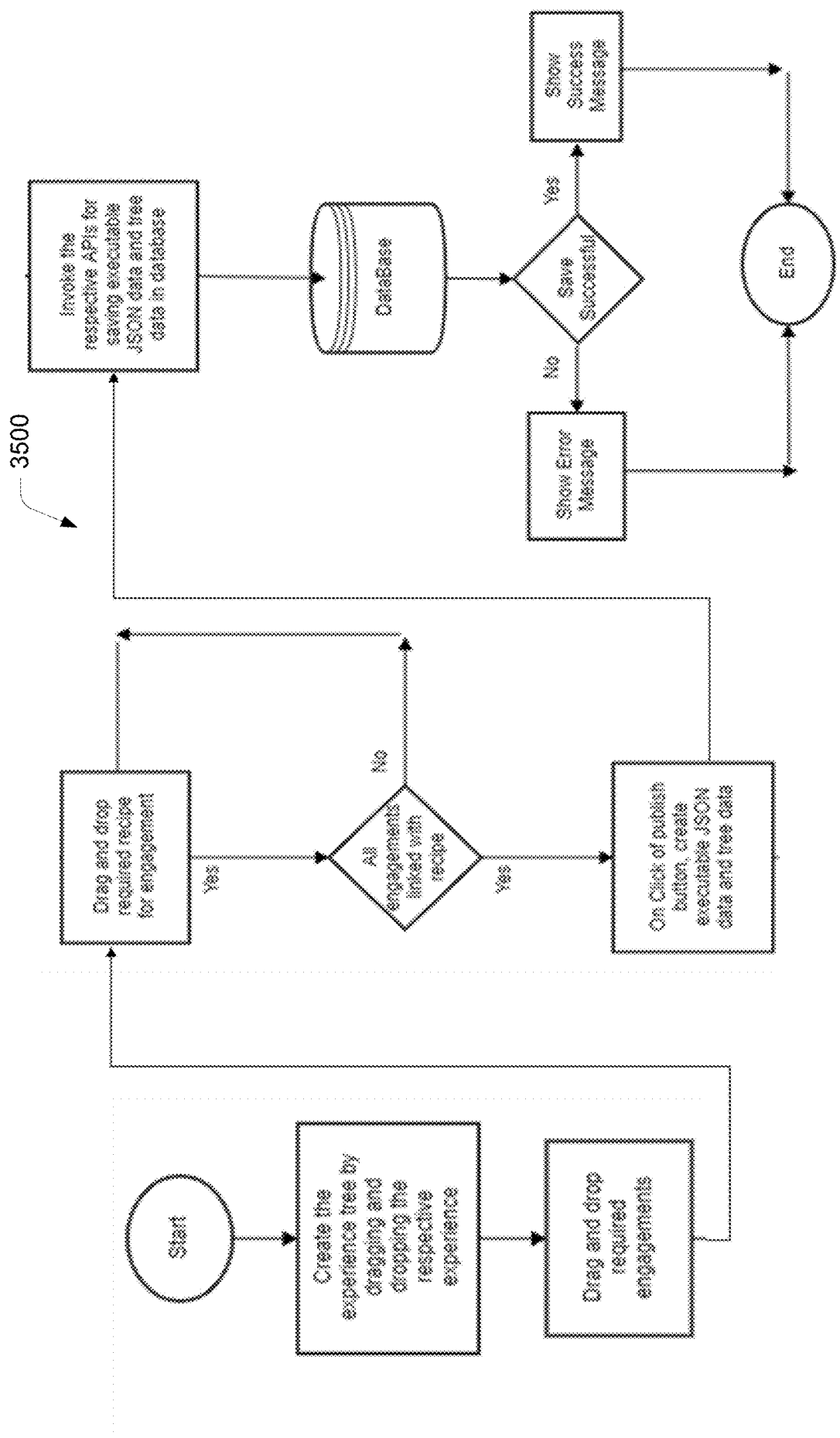
FIG. 35 illustrates a flow diagram for forming and publishing a new experience using a digital orchestration system, according to an example embodiment of the present disclosure.

FIG. 35 illustrates a flow diagram for forming and publishing a new experience using the digital orchestration system 110, according to an example embodiment of the present disclosure. FIG. 35 illustrates a flow diagram 3500 for forming and publishing a new experience using the digital orchestration system 110, according to an example embodiment of the present disclosure. The flow diagram 3500 illustrates the experience formation and publishing using the digital orchestration system 110. The system 110 may execute a step 3502 to start the process of the experience formation. The user may create the experience tree by dragging and dropping various entities at a step 3504. The system 110 may execute a step 3506 wherein, the user may drag and drop the plurality of events 212, and the plurality of services as required. The system 110 may execute a step 3508, wherein the user may drag and drop the recipe 248 associated with each of the plurality of events 212 to offer the associated the plurality of services. The system 110 may execute a decision at a step 3510 to check if all the plurality of events 212, and the plurality of services from the step 3506 may be linked to a recipe 248. In an example, wherein all the plurality of events 212, and the plurality of services from the step 3506 may be linked to a recipe 248, the system 110 may execute a step 3512 wherein the user may click on 'publish' button for creating an executable JSON data and tree data. In an example, wherein all the plurality of events 212, and the plurality of services from the step 3506 may not be linked to a recipe 248, the system 110 may execute the step 3508 again.

The system 110 may invoke the respective API's for saving executable JSON data and tree data in a database step 3514. The database may be as illustrated by way of step 3516. The system 110 may execute a decision at step 3520 wherein the system 110 may decide if the storage onto the database may be successful. In an example, wherein the storage and saving onto the database may be successful, the system 110 may execute a step 3522 wherein the system 110 may show a success message. In an example, wherein the storage and saving onto the database may not be successful, the system 110 may execute a step 3518 wherein an error message may be shown to the user. The system 110 may execute a step 3524 to stop the process of the forming and publishing a new experience.

Figure 36:
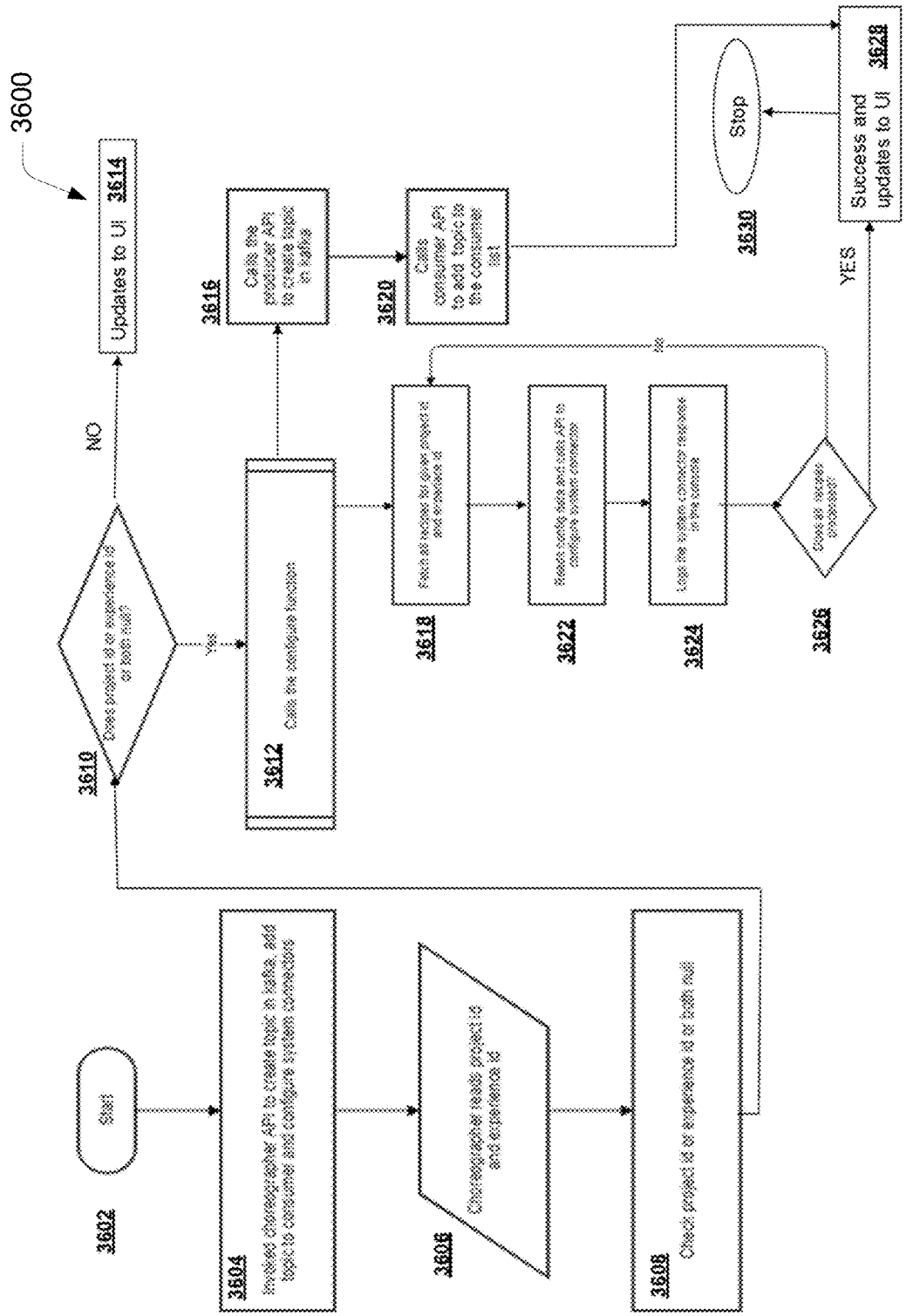
FIG. 36 illustrates a flow diagram for choreographing the runtime architecture elements using a digital orchestration system, according to an example embodiment of the present disclosure.

FIG. 36 illustrates a flow diagram 3600 for choreographing the runtime architecture elements for experience execution using the digital orchestration system 110, according to an example embodiment of the present disclosure. The system 110 may execute a step 3602 to start the process of the experience execution. The system 110 may invoke choreographer API to create a topic in Kafka, add the topic to consumers and add the system 110 connectors. The system 110 may execute a step 3604 wherein, the choreographer may read the 'project id' and the 'experience id' as created by processes described above. The system 110 may check at step 3608 if the 'project id' and the 'experience id' or both null. The system 110 may execute a decision at step 3610 to decide if the 'project id' and the 'experience id' or both null. In an example, wherein the check for the 'project id' and the 'experience id' or both null may be positive, the system 110 may execute a step 3612. In an example, wherein the check, the 'project id' and the 'experience id' or both null may be negative, the system 110 may execute a step 3614, wherein the system 110 may update the user interface.

The step 3612 may invoke a configure function. The configure function may call the producer API to create a topic in Kafka at step 3616. The step 3616 may be followed by a step 3620 wherein the system 110 may call the consumer API to add a topic to the consumer list. The system 110 may report success and may update the user interface at the step 3628 followed by the 3620. The configure function may also retrieve all recipes for a 'project id' and the 'experience id' at step 3618. The step 3618 may be followed by a step 3622 wherein, the system 110 may configure data and may call API to configure system 110 connector. The system 110 may log the system 110 connector response in the console at a step 3624. The system 110 may execute a decision at step 3626 wherein, the system 110 may check if all recipes may be processed. In an example, wherein check if all recipes may be processed may be positive, the system 110 may report success and may update the user interface at the step 3628. In an example, wherein, the check if all recipes may be processed may be negative, the system 110 may execute the step 3618 again. The system 110 may execute the step 3630 to stop the process of experience execution. Once the user may publish the experience below (FIGS. 37-41) are major activities takes place during experience execution.

Figure 37:
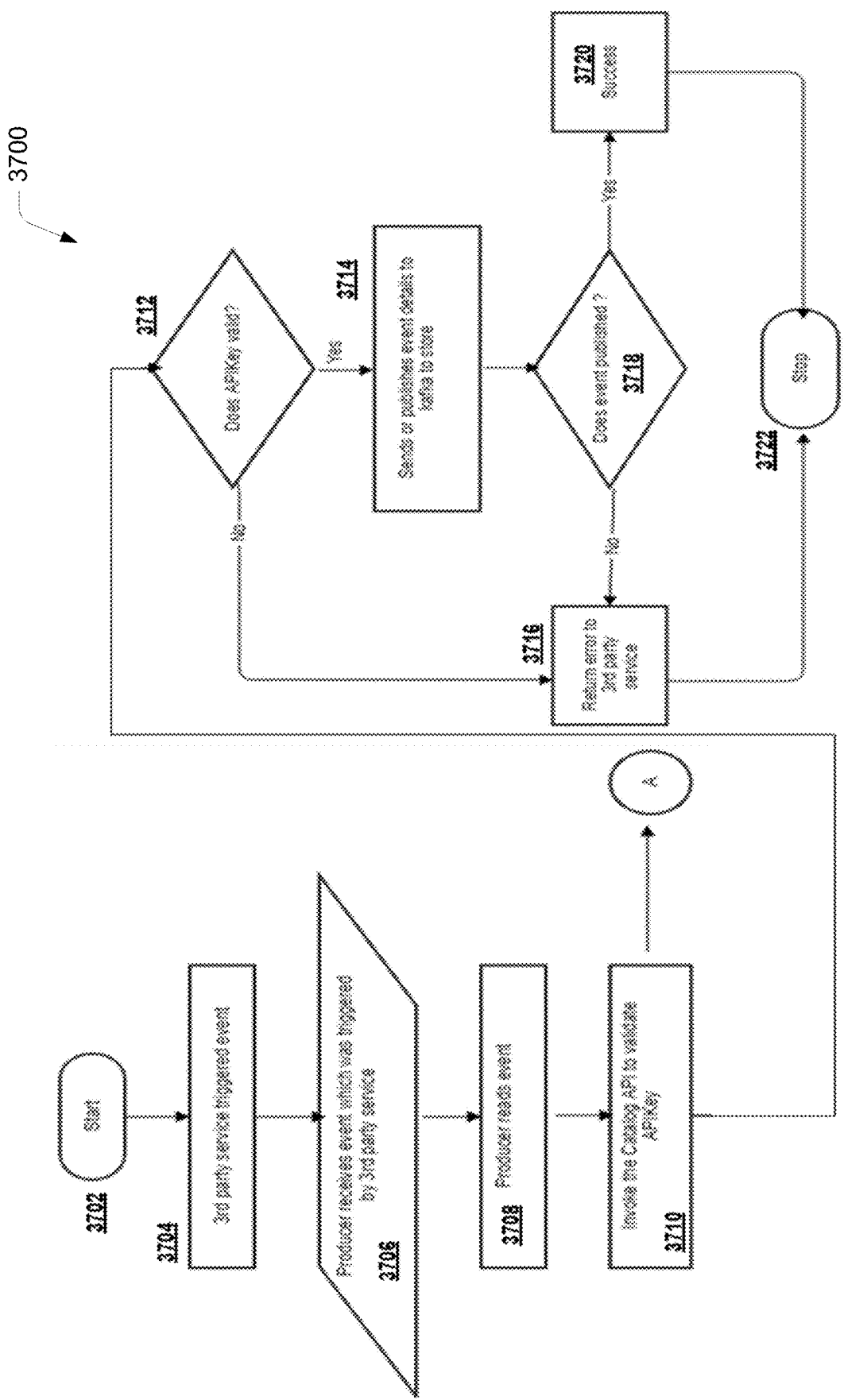
FIG. 37 illustrates a flow diagram for deploying an action activator using a digital orchestration system, according to an example embodiment of the present disclosure.

FIG. 37 illustrates a flow diagram 3700 for deploying the action activator 254 using the digital orchestration system 110, according to an example embodiment of the present disclosure. In an example, all the events triggered by an external system may get dropped into a messaging broker (XBRO) component developed using Kafka as a message queue. The flow diagram 3700 depicts the logical implementation to publish and consume the event received in the Kafka queue topic. The system 110 may execute a step 3702 to start the process of deployment of the action activator 254. The system 110 may execute a step 3704 wherein, a third-party service triggered event may be detected. The producer or the user of the system 110 may receive the third-party service triggered event at step 3706. The producer may read the event at step 3708. The system 110 may invoke the catalog API to validate the API key. The system 110 may execute a decision at step 3712 to check for the validation of the API key. In an example, wherein the validation of the API key may be successful, the system 110 may execute a step 3714 to send or publish event details to Kafka to store. In an example, wherein the validation of the API key may not be successful, the system 110 may execute a step 3716, wherein an error message may be returned to the third-party service, which may have triggered the event. The system 110 may execute a decision at a step 3718 followed by the step 3714, to check if the event may have been published. In an example, wherein the check if the event may have been published may be positive, the system 110 may report success at step 3720. In an example, wherein the check if the event may have been published may be negative, the system 110 may execute the step 3716 and return an error message to the third-party service, which may have triggered the event. The system 110 may execute a step 3722 to stop the process of deployment of the action activator 254.

Figure 38:
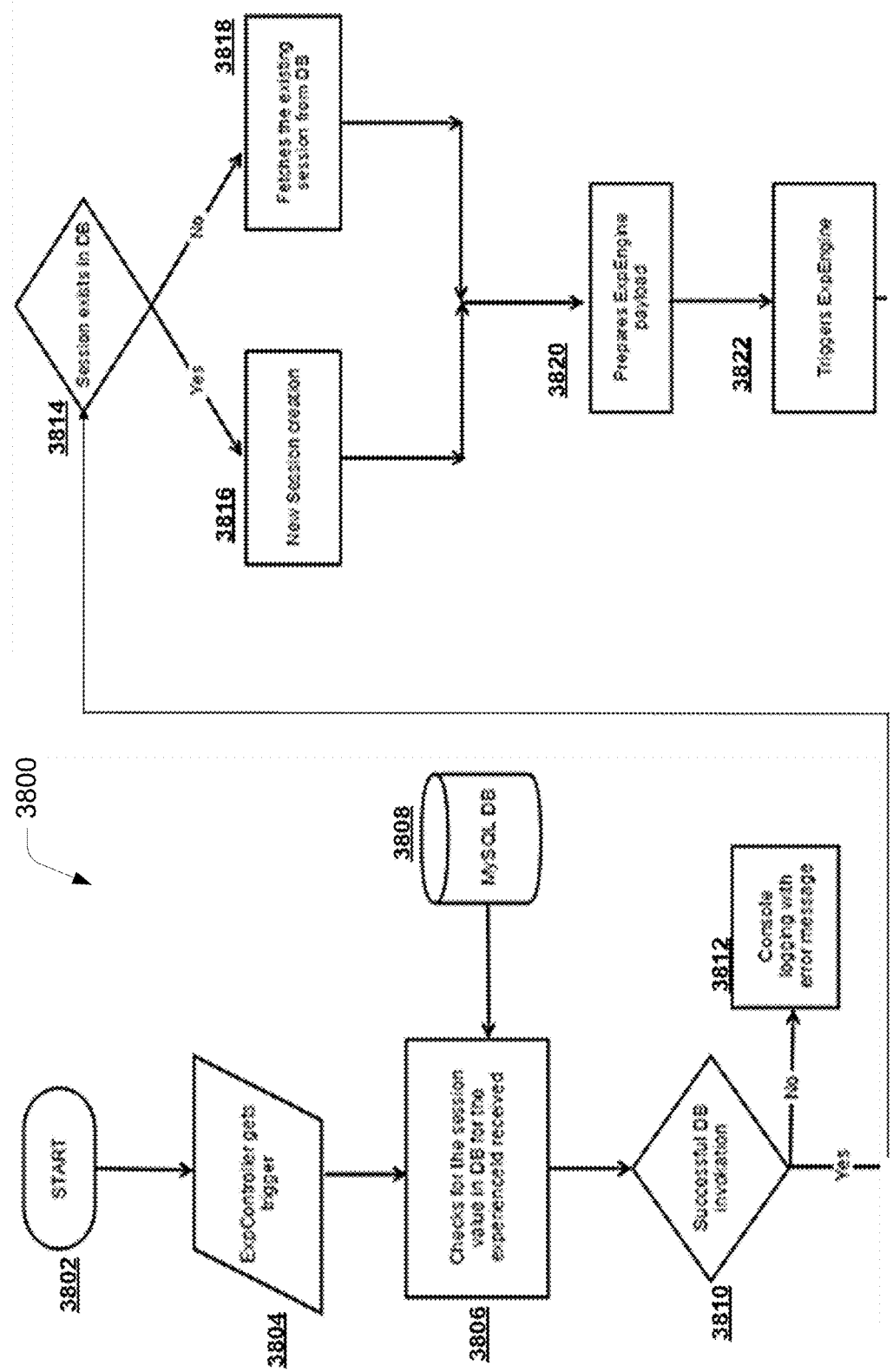
FIG. 38 illustrates a flow diagram for invoking a recipe selection session using a digital orchestration system, according to an example embodiment of the present disclosure.

FIG. 38 illustrates a flow diagram 3800 for invoking a recipe 248 selection session using the digital orchestration system 110, according to an example embodiment of the present disclosure. Once the events may get triggered to the controller it may take logical steps as mentioned in flow diagram 3800 to get the correct recipe 248 needs to be executed and passes the control to the oven (recipe executor 150). The system 110 3800 may execute a step 3802 to start a process of recipe 248 selection. The step 3802 may be followed by a step 3804 wherein, the Exp controller may get triggered. The system 110 may execute a step 3806 thereafter to check for the session value in a database 3808 for the experience id received. The database 3808 may be a MySQL database. MySQL is an open-source relational database management system 110. The system 110 may execute a decision at a step 3810 to check for successful database invocation. In an example, wherein the database invocation may not be successful, the system 110 may execute a step 3812 wherein, an error message may be logged onto the console. In an example, wherein the database invocation may be successful, the system 110 may execute a decision at a step 3814 to check if the associated session may exist in the database 3808. In an example, wherein the check if the associated session may exist in the database 3808 may be successful, the system 110 may execute a step 3818 for fetching the existing session from the database 3808. In an example, wherein, the check if the associated session may exist in the database 3808 may not be successful, the system 110 may execute a step 3816 to create a new session. The system 110 may execute a step 3820 after the step 3816, and the step 3818. The system 110 may prepare ExpEngine payload at the step 3820. The system 110 may trigger the ExpEngine at a step 3822.

Figure 39:
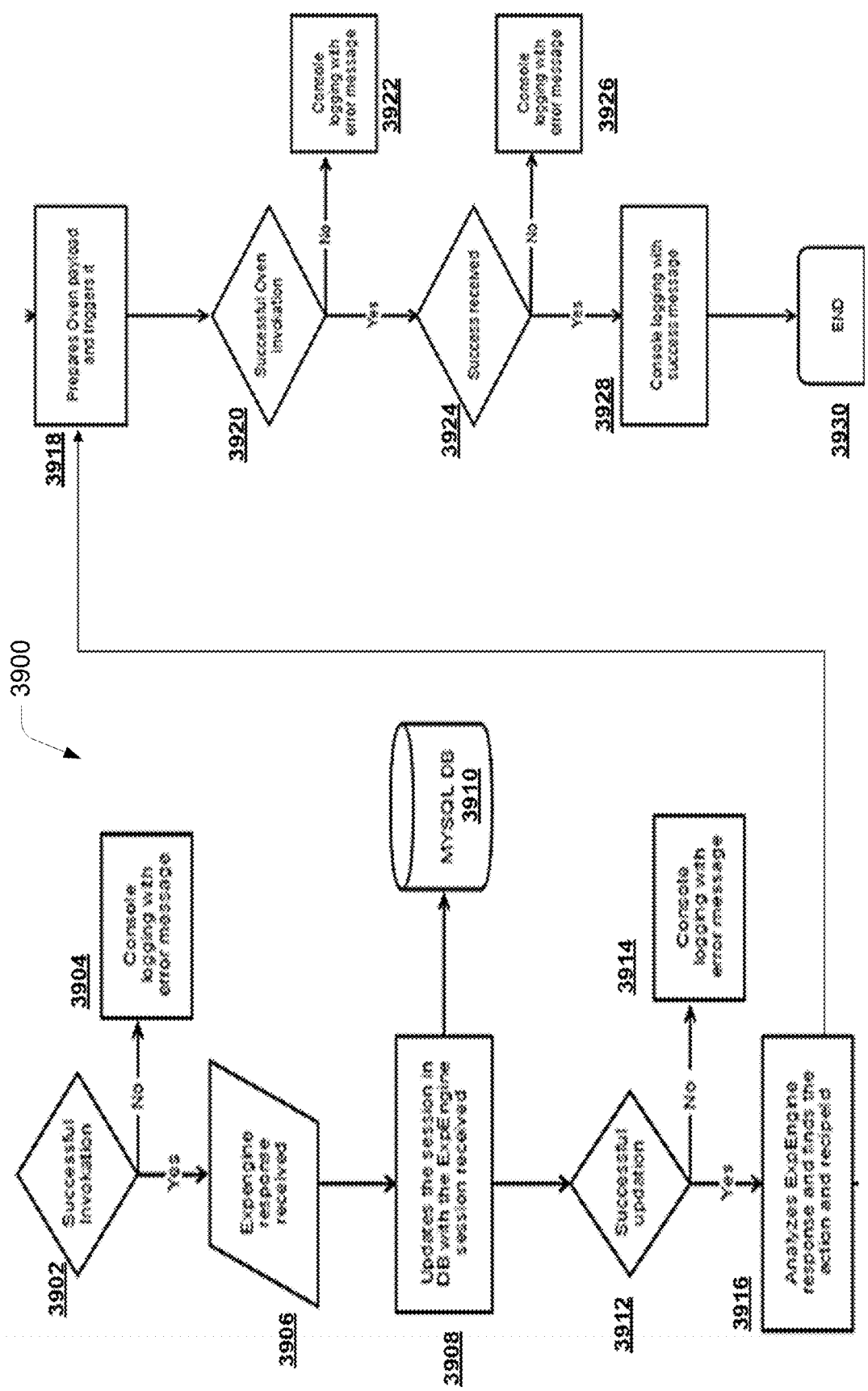
FIG. 39 illustrates a flow diagram for selecting a recipe after invoking a recipe selection session using a digital orchestration system, according to an example embodiment of the present disclosure.

FIG. 39 illustrates a flow diagram 3900 for selecting a recipe 248 after invoking a recipe 248 selection session using the digital orchestration system 110, according to an example embodiment of the present disclosure. The system 110 may execute a step 3902 after the execution of the step 3822. The system 110 may execute a decision at the step 3902 to check for the successful invocation of the ExpEngine. In an example, wherein the check may negative, the system 110 may execute a step 3904 for logging an error message into the console. In an example, wherein the check may be positive, the system 110 may execute the step 3906 to receive engine response. The system 110 may execute a step 3908, wherein the system 110 may update the session in a database 3910. The database 3910 may be a MySQL database. MySQL is an open-source relational database management system 110. The system 110 may execute a decision at a step 3912 thereafter, to check for a successful updating of the database 3910. In an example, wherein the check may be negative, the system 110 may implement a step 3914 for logging an error message into the console. In an example, wherein, the check may be positive, the system 110 may execute a step 3916 to analyze the ExpEngine response and find an associated action and an identification number for the recipe 248 corresponding to the associated action. The system 110 may execute a step 3918 thereafter to prepare the recipe executor 150 payload and trigger the same. The system 110 may execute a decision at step 3920 thereafter, to check for a successful invocation of the oven. In an example, wherein the oven may not be invoked successfully, the system 110 may implement a step 3922 for logging an error message into the console. In an example, wherein the oven may be invoked successfully, the system 110 may implement a decision at step 3924 to check if success may be received by oven invocation. In an example, wherein the success may not be achieved, the system 110 may implement a step 3926 for logging an error message into the console. In an example, wherein the success may be achieved, the system 110 may execute a step 3928 for logging a success message into the console. The system 110 may execute a step 3930 to end the process of selecting a recipe 248.

Figure 40:
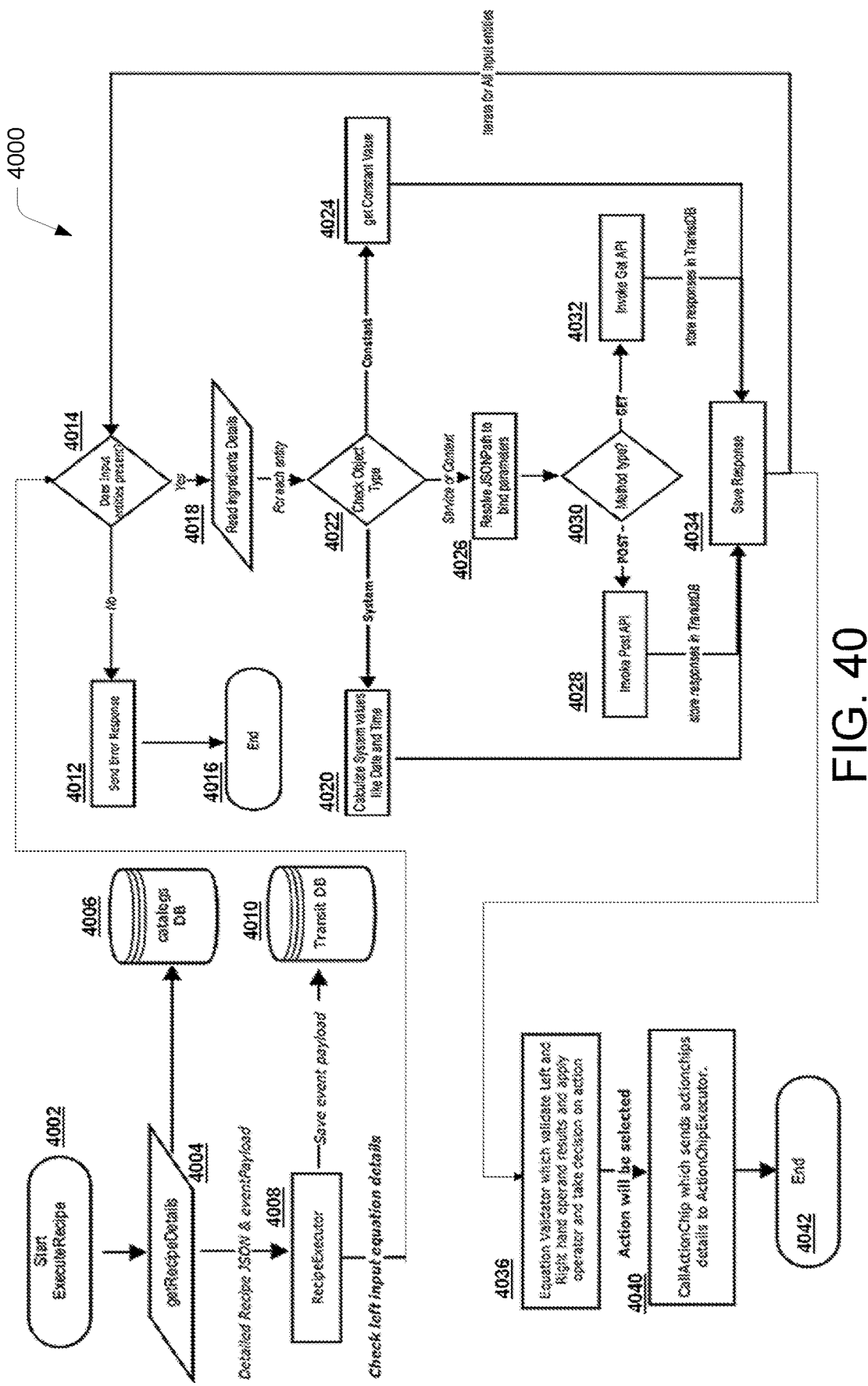
FIG. 40 illustrates a flow diagram for recipe execution logic using a digital orchestration system, according to an example embodiment of the present disclosure.

FIG. 40 illustrates a flow diagram 4000 for recipe execution logic using the digital orchestration system 110, according to an example embodiment of the present disclosure. In an example, the recipe executor may execute the recipe 248 by following the process described herein. The system 110 may execute a step 4002 to start a process of recipe implementation. The system 110 may execute a step 4004 wherein a function rgetrecipedetails' may be implemented from a catalog database 4006. The recipe 248 details may include a detailed recipe JSON file and an event payload. The recipe executor 150 may save the event payload into a transit database 4010. The transit database 4010 may a temporary database created by the system 110 wherein the orchestration data 204 that may in transit may be saved. The recipe executor 150 may check for recipe equation details. The recipe equation details may include referring to the plurality of rules 250 related to each recipe 248. The system 110 may implement a decision at a step 4014 to check all the input entities related to a recipe 248 that may be available. In an example, wherein the check may be negative, the system 110 may implement a step 4012 for logging an error message into the console. The system 110 may implement a step 4016 to end the process thereafter. In an example, wherein the check may be positive, the system 110 may implement a step 4018 for reading all relevant orchestration data 204 details for each entity. The system 110 may implement a decision thereafter, at step 4022 to check an object type. In an example, wherein the object type may be a system 110 based contextual object, the system 110 may implement a step 4020 to calculate values like date and time. The system 110 may execute the step 4034 thereafter to save the output from the step 4020. In an example, wherein the object type may be a constant based contextual object, the system 110 may implement a step 4024 to get a constant value. The system 110 may execute the step 4034 thereafter to save the output from the step 4024. In an example, wherein the object type may be a context-based contextual object or service-based contextual object, the system 110 may implement a step 4026 to resolve JSONPath to bind parameters. The system 110 may execute a decision at a step 4030 thereafter to decide for a method type for resolving the JSONPath to bind parameters. In an example, the system 110 may implement a step 4032 to invoke GET API details. In an example, the system 110 may implement a step 4028 to invoke POST API details. The system 110 may execute the step 4034 thereafter to save the output from the step 4032 and the step 4028.

The system 110 may execute a step 4036 activate a recipe validator that may validate operation results and apply the operator and take a decision on action. The system 110 may select an action based on the output of the step 4036. The system 110 may implement a function 'CallActionChip' at a step 4040 which may send the action chip details to the 'ActionChipExecutor'. The system 110 may implement a step 4042 to stop the recipe execution.

Figure 41A:
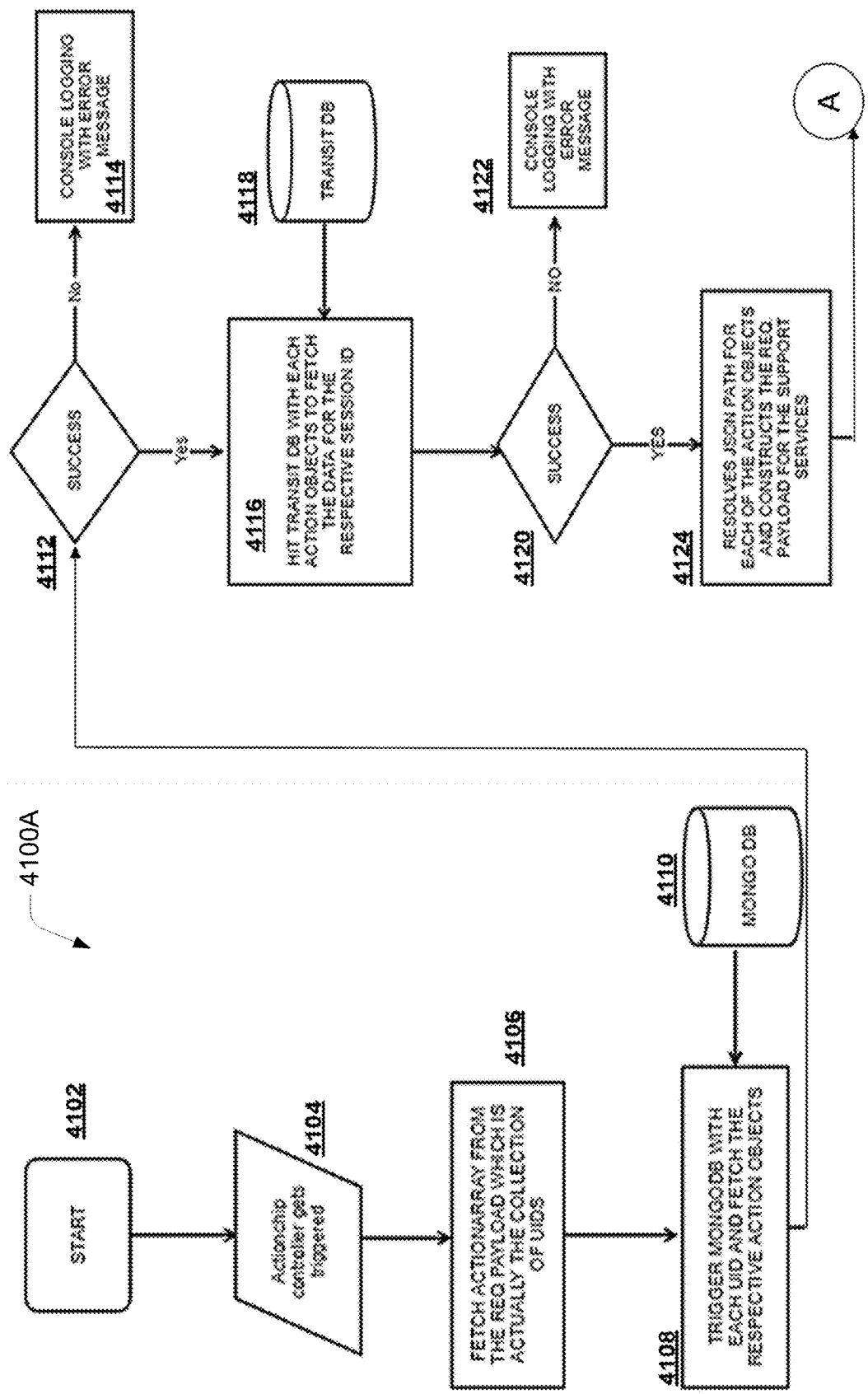
FIGS. 41A and 41B illustrate a flow diagram for executing an action using a digital orchestration system, according to an example embodiment of the present disclosure.
Figure 41B:
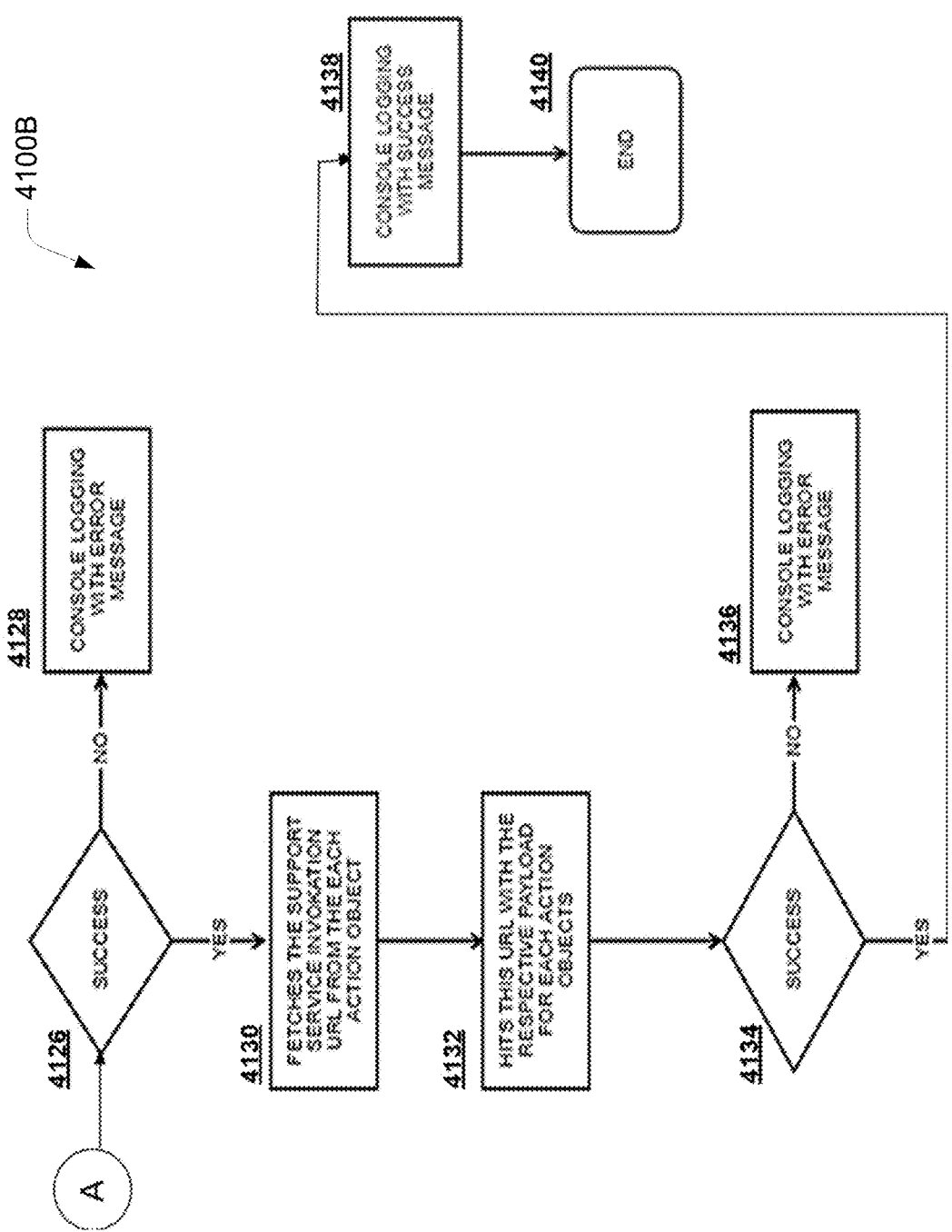

FIGS. 41A and 41B illustrate a flow diagram 4100A and 4100B for executing an action using the digital orchestration system 110, according to an example embodiment of the present disclosure. The Actionchip executor may execute the action by invoking system connectors, below flow diagram 4100 may show the logical steps taken by the system 110. The system 110 may execute a step 4102 to start the process of action execution. As mentioned above, the recipe executor 150 may execute the plurality of actions 246 based on the event result 226. The system 110 may execute a step 4104 to trigger the Actionchip controller. The system 110 may execute a step 4106 to fetch an action array from the required payload which may be a collection of various UIDs. The system 110 may execute a step 4108 to trigger a Mongo Database 4110 with each UID and fetch the respective action objects. The system 110 may execute a decision thereafter at step 4112 to check for success in triggering the Mongo Database 4110. In an example, wherein the check may be negative, the system 110 may execute a step 4114 for logging an error message into the console. In an example, wherein the check may be positive, the system 110 may execute a step 4116 to hit a transit database 4118 with each of the action objects to fetch the data for the respective session ID. The system 110 may execute a decision thereafter at step 4120 to check for success. In an example, wherein the check may be negative, the system 110 may execute a step 4122 for logging an error message into the console. In an example, wherein the check may be positive, the system 110 may execute a step 4124 to resolve the JSON path for each of the action objects and constructs the required payload for the support services. In an example, the payload may the orchestration data 204 associated with the plurality of user services 216, the plurality of events 212, the plurality of user interaction stages 238, the plurality of actions 246 and the like.

The system 110 may execute decision at a step 4126 thereafter to check for success. In an example, wherein the check may be negative, the system 110 may execute a step 4128 for logging an error message into the console. In an example, wherein the check may be positive, the system 110 may execute a step 4130 to fetch the support service invocation Uniform Resource Locator (URL) with the respective payload for each action object. The system 110 may execute a step 4132 to hit the aforementioned URL with the respective payload from each action object. The system 110 may execute decision at a step 4134 thereafter to check for success. In an example, wherein the check may be negative, the system 110 may execute a step 4136 for logging an error message into the console. In an example, wherein the check may be positive, the system 110 may execute a step 4138 for logging a success message into the console. The system 110 may execute a step 4140 to stop the process of action execution.

Figure 42A:
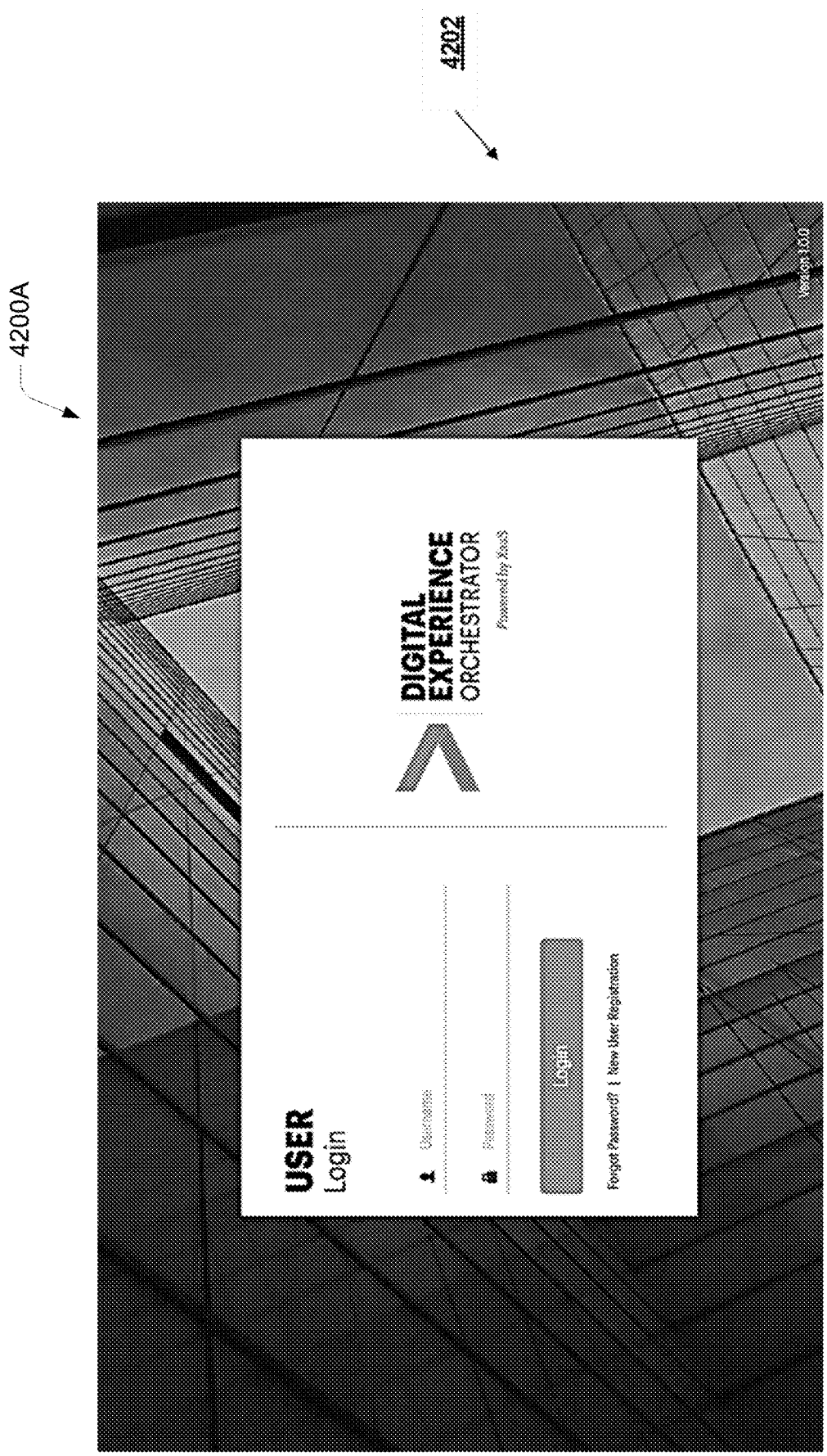
FIG. 42A illustrates a pictorial representation of a graphical user interface as deployed by a digital orchestration system, according to an example embodiment xof the present disclosure.

FIG. 42A illustrates a pictorial representation 4200A of a graphical user interface 2402 as deployed by the digital orchestration system 110, according to an example embodiment of the present disclosure. The user of the system 110 may access a landing page through the graphical user interface 2402. The graphical user interface 2402 may include a login area, a new user registration portal and an option to retrieve a unique authentication code as mentioned above.

Figure 42B:
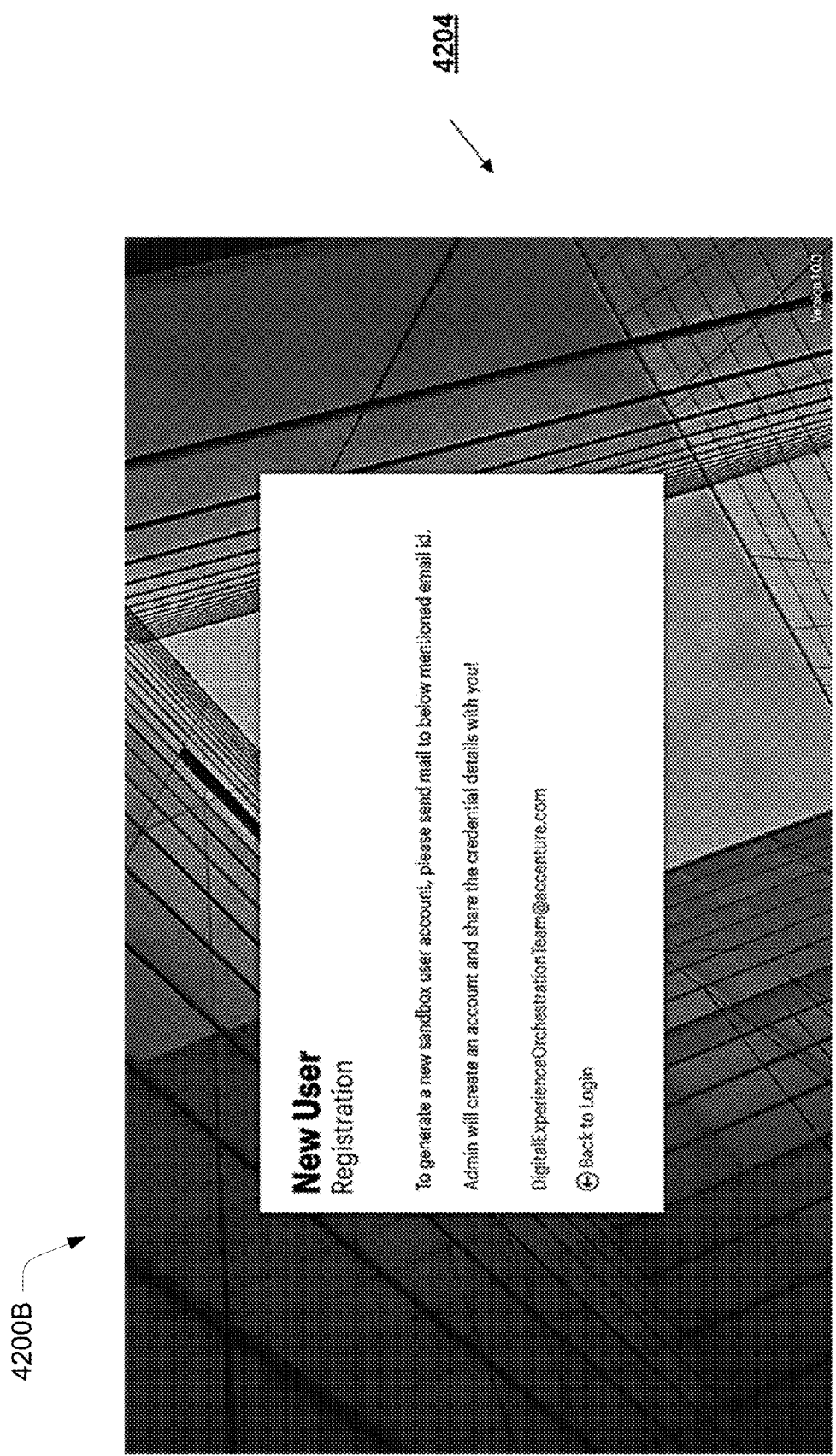
FIG. 42B illustrates a pictorial representation of a new user registration portal as deployed by a digital orchestration system, according to an example embodiment of the present disclosure.

FIG. 42B illustrates a pictorial representation 4200B of a new user registration portal 4204 as deployed by the digital orchestration system 110, according to an example embodiment of the present disclosure. In accordance with various embodiments of the present disclosure, in order to use the new user registration portal 4204, a user may need to have an account within the system 110. The user may be required to create an account through the 'New User Registration' functionality as illustrated in the FIG. 42B. In an example, this may be done by clicking on the 'New User Registration' option below the 'Login' button as illustrated in the FIG. 42B. A user may go back to the 'Login page' from the 'New User Registration' page by clicking on the 'Back to Login' text link.

Figure 42C:
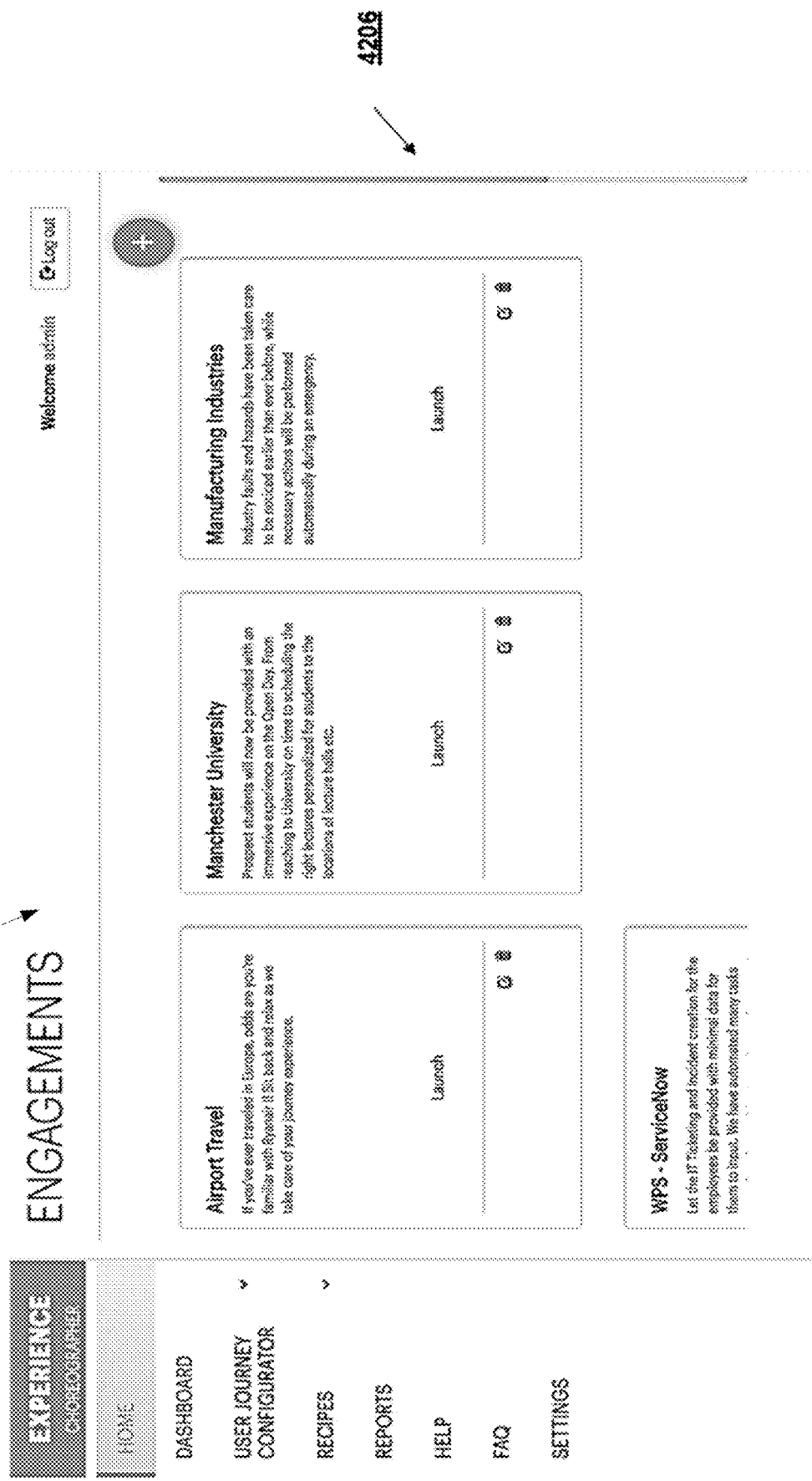
FIG. 42C illustrates a pictorial representation of a user homepage as deployed by a digital orchestration system, according to an example embodiment of the present disclosure.

FIG. 42C illustrates a pictorial representation 4200C of a user homepage 4206 as deployed by the digital orchestration system 110, according to an example embodiment of the present disclosure. In accordance with various embodiments of the present disclosure, the homepage may look as illustrated in the FIG. 4203.

Figure 42D:
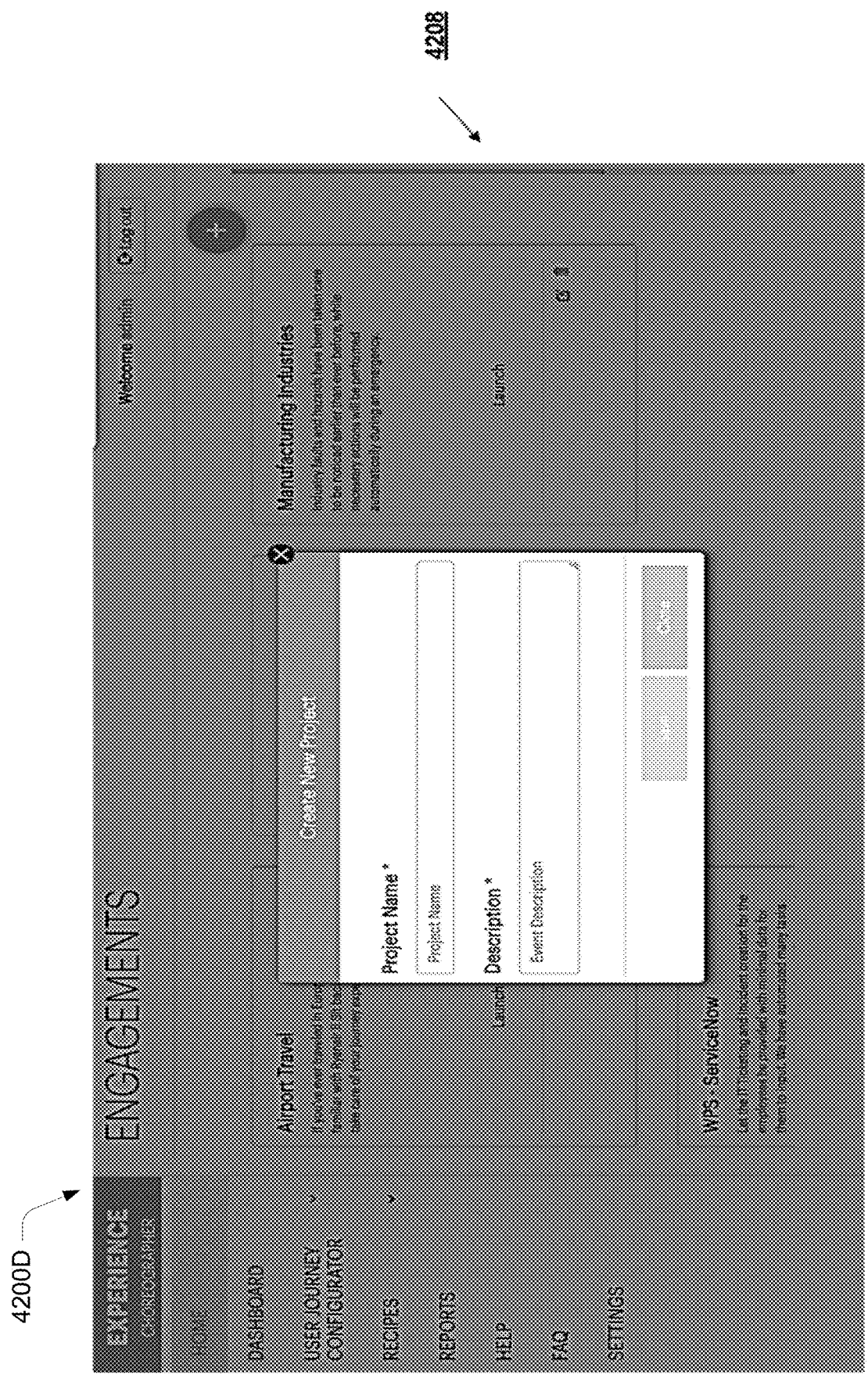
FIG. 42D illustrates a pictorial representation of the creation of a new project as deployed by a digital orchestration system, according to an example embodiment of the present disclosure.

FIG. 42D illustrates a pictorial representation 4200D of a creation 4208 of a new project as deployed by the digital orchestration system 110, according to an example embodiment of the present disclosure. In accordance with various embodiments of the present disclosure, a user may add new projects on this page. A user may need to click on the '+' icon on the top right. On clicking, an 'Add New Project' dialog box should open.

Figure 42E:
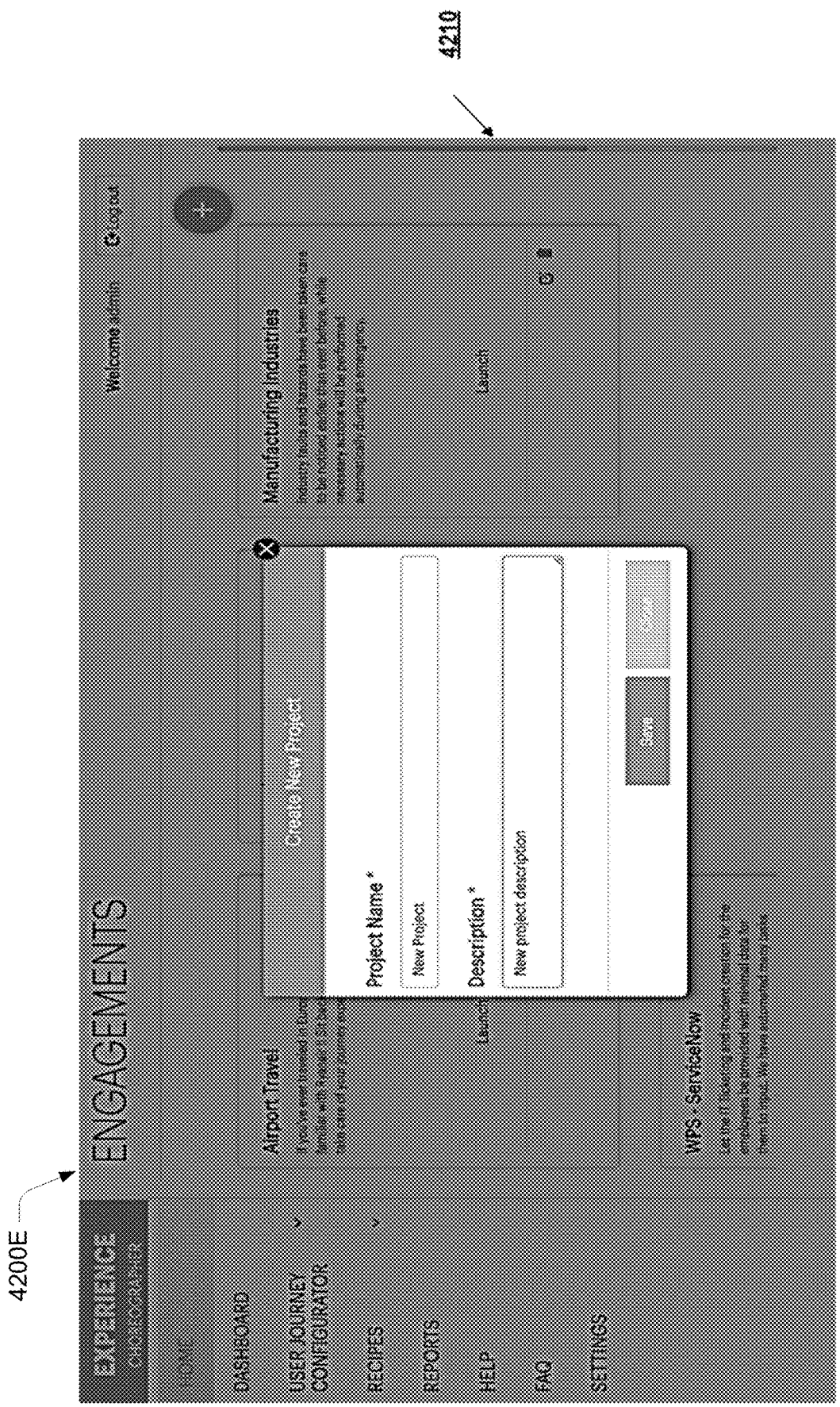
FIG. 42E illustrates a pictorial representation of entering a project name and description as deployed by a digital orchestration system, according to an example embodiment of the present disclosure.

FIG. 42E illustrates a pictorial representation 4200E of an entering action 4210 a project name a description as deployed by the digital orchestration system 110, according to an example embodiment of the present disclosure. A user may need to enter a Project name & an associated description for the project name. A user may need to click "save" for saving the Project name and the associated description.

Figure 42F:
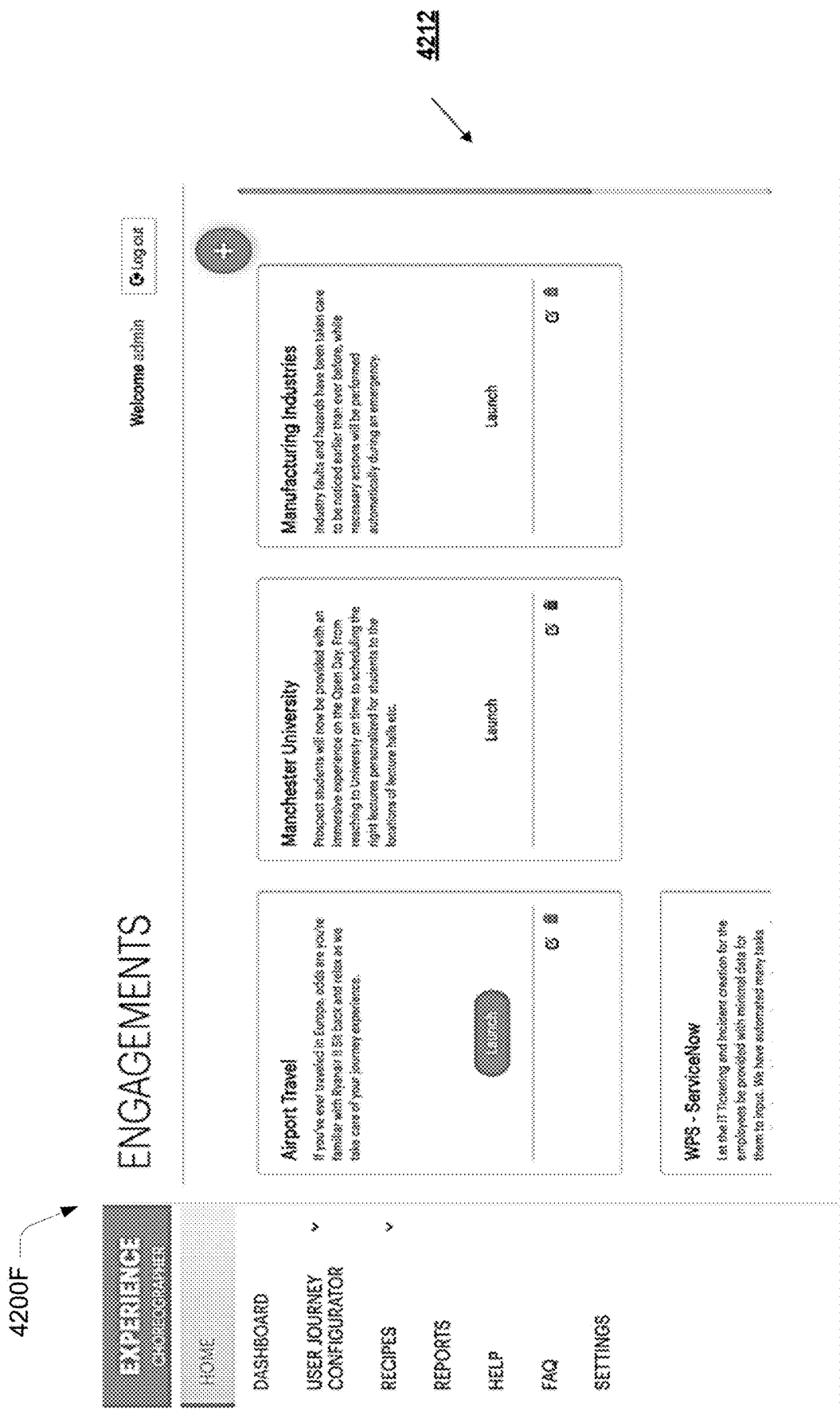
FIG. 42F illustrates a pictorial representation of a project launch as deployed by a digital orchestration system, according to an example embodiment of the present disclosure.

FIG. 42F illustrates a pictorial representation 4200F of a project launch 4212 as deployed by the digital orchestration system 110, according to an example embodiment of the present disclosure. The Homepage may show all projects created under an individual user account. A user may need to click on the 'Launch' button on the desired project card to open the dashboard of the particular project.

Figure 42G:
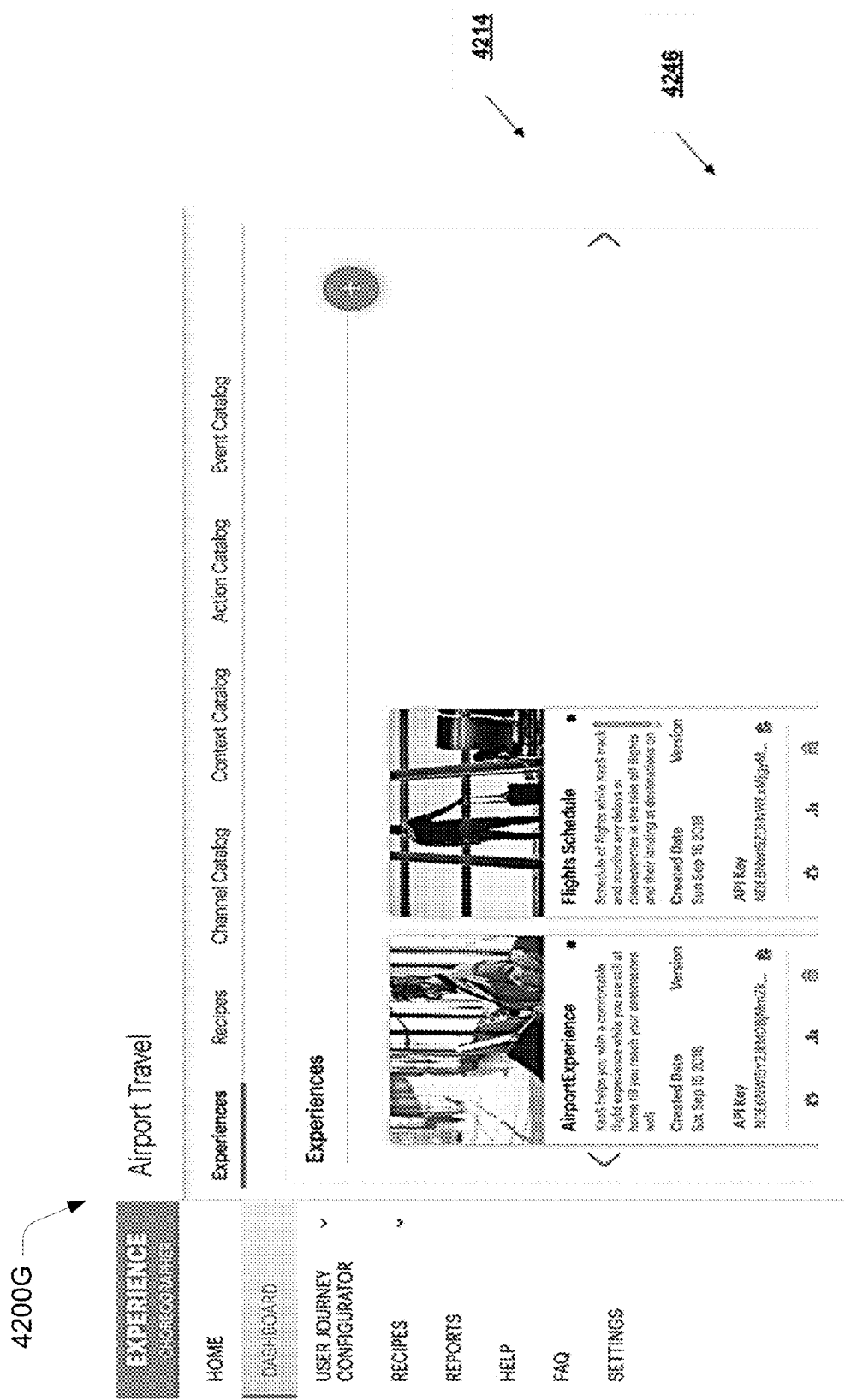
FIG. 42G illustrates a pictorial representation of an entity portal and a portal for creation of a new user experience as deployed by a digital orchestration system, according to an example embodiment of the present disclosure.

FIG. 42G illustrates a pictorial representation 4200G of an entity portal 4214 as deployed by the digital orchestration system 110, according to an example embodiment of the present disclosure. The entity portal 4214 may comprise five (5) sections. The entity portal 4214 may be illustrated as a 'dashboard' in the pictorial representation illustrated in the FIG. 42G. In an example, the five sections may include an experience section, a recipe section, a channel catalog, an action catalog, and an event catalog. Additionally, each section may be responsible for different kinds of objects or entities. A user may click on the category tabs on the entity portal 4214 to switch between the sections. FIG. 42G illustrates a creation 4246 of user experience as deployed by the digital orchestration system 110, according to an example embodiment of the present disclosure. The user experience may be defined as any real-time activity which may be performed by any end-user. The constituents of the user experience may be engagements including a pre-experience engagement, an on-experience engagement, a post-experience engagement, and the like. Additionally, there may be a predictive moment and a proactive moment (described by way of FIG. 42W) associated with each of these engagements. For each of the moments, there may be a recipe 248 linked.

Figure 42H:
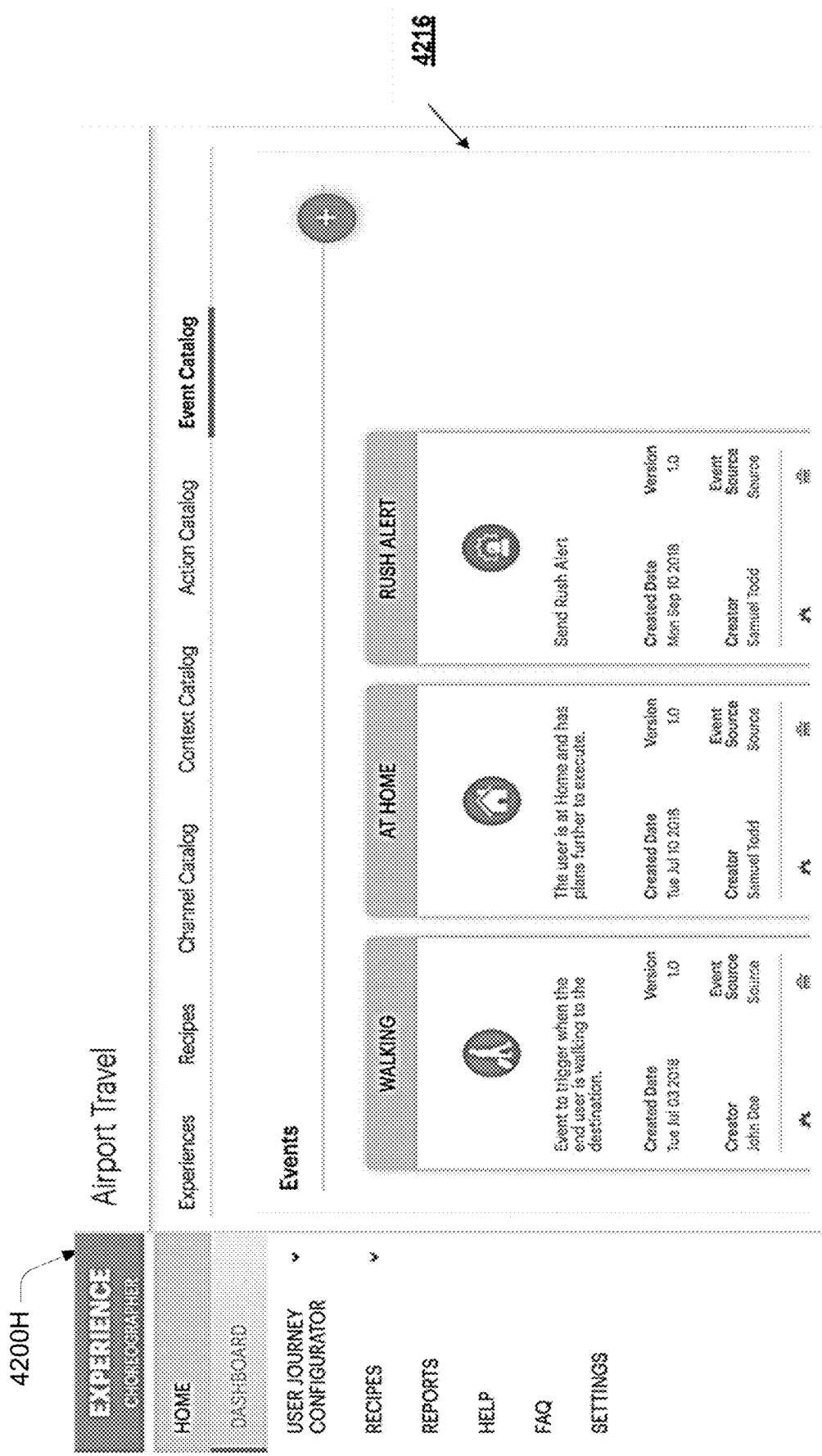
FIG. 42H illustrates a pictorial representation of creating a new event as deployed by a digital orchestration system, according to an example embodiment of the present disclosure.

FIG. 42H illustrates a pictorial representation 4200H of a creation 4216 of a new event as deployed by the digital orchestration system 110, according to an example embodiment of the present disclosure. A user may create event objects under the 'Event Catalog' section. A user may click on the '+' icon on the top right in the 'Event Catalog' section to open the 'Event Object creation' dialog box as illustrated.

Figure 42I:
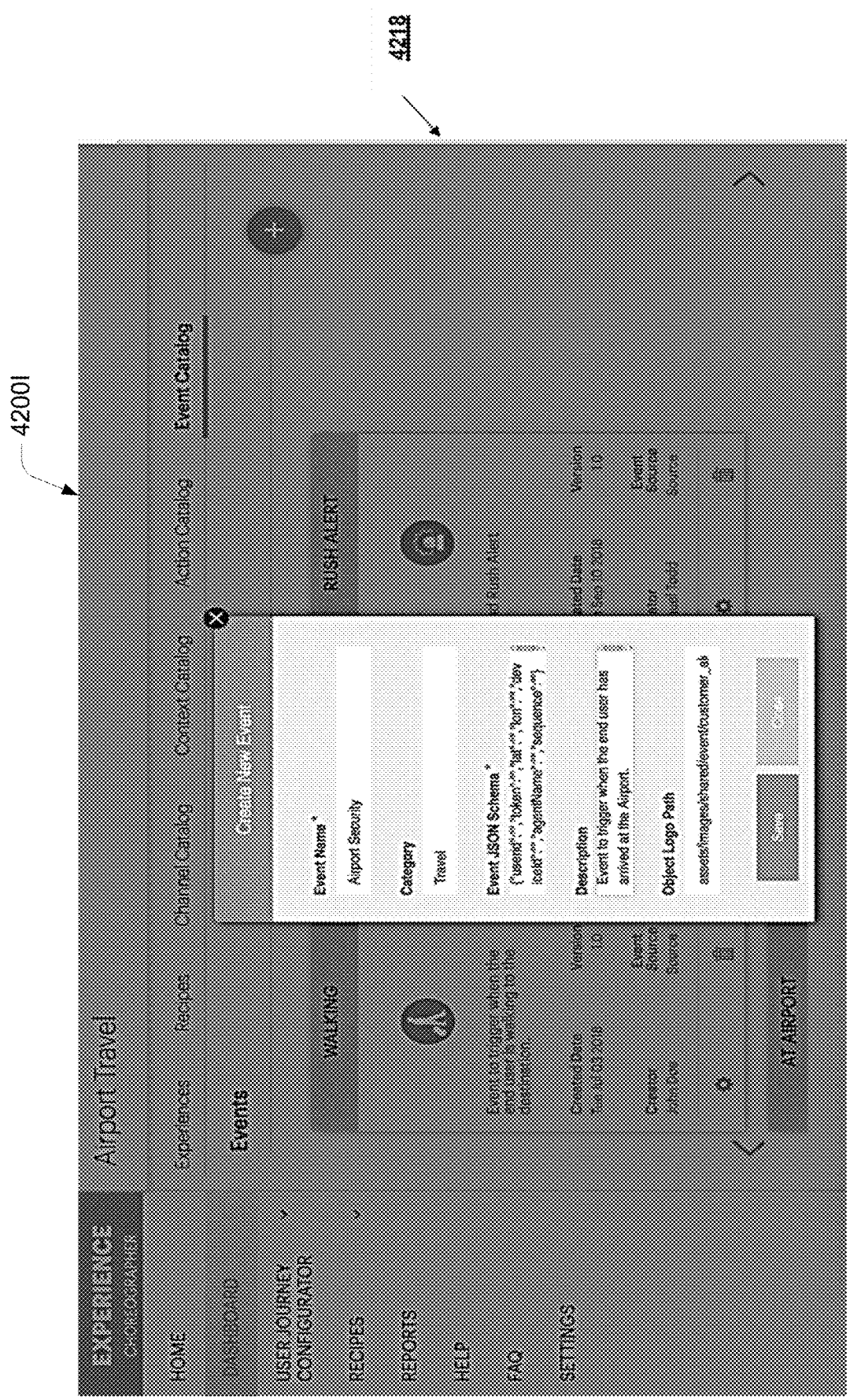
FIG. 42I illustrates a pictorial representation of a dialog box for creating a new event as deployed by a digital orchestration system, according to an example embodiment of the present disclosure.

FIG. 42I illustrates a pictorial representation 4200I of a dialog box 4218 for creating a new event as deployed by the digital orchestration system 110, according to an example embodiment of the present disclosure. A user may be required to fill in the required details in the dialog box 4218 and then click on 'Save' to create the object.

Figure 42J:
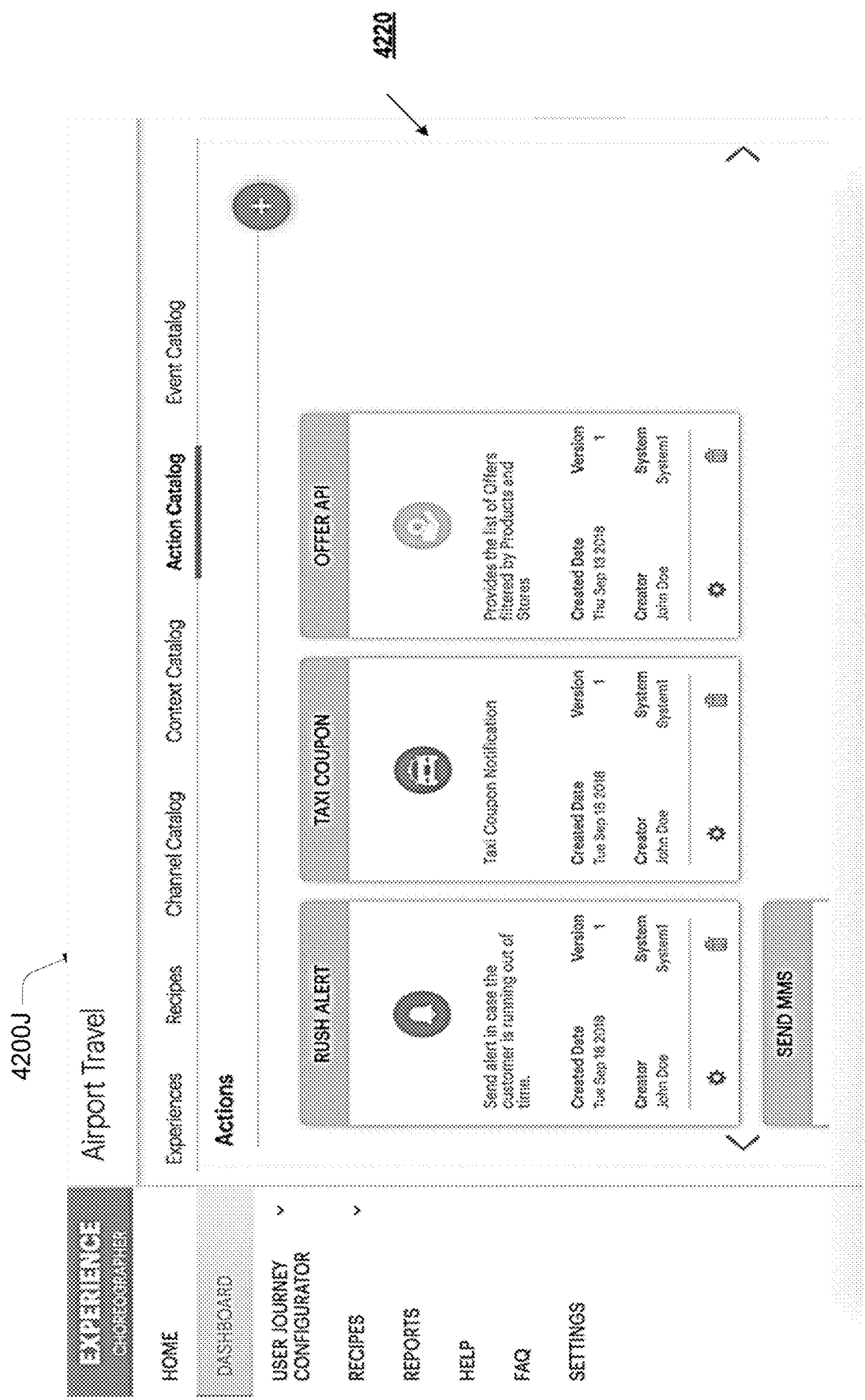
FIG. 42J illustrates a pictorial representation of creating a new action as deployed by a digital orchestration system, according to an example embodiment of the present disclosure.

FIG. 42J illustrates a pictorial representation 4200J of a creation 4220 of a new action as deployed by the digital orchestration system 110, according to an example embodiment of the present disclosure. A user may create Action objects under the 'Action Catalog' section. The user may be required to click on the '+' icon on the top right in the 'Action Catalog' section to open the 'Action Object creation' dialog box as illustrated.

Figure 42K:
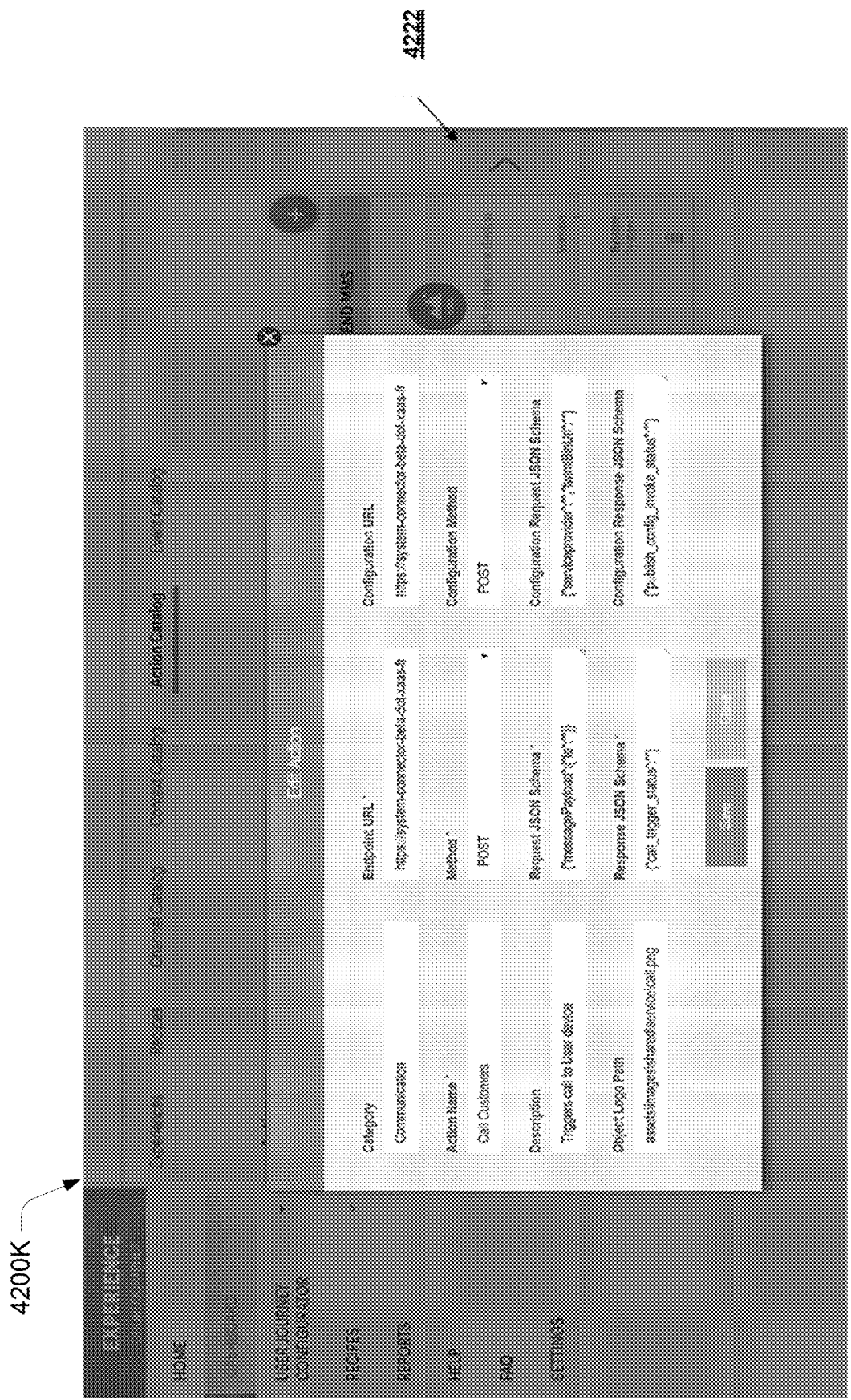
FIG. 42K illustrates a pictorial representation of a dialog box for creating a new action as deployed by a digital orchestration system, according to an example embodiment of the present disclosure.

FIG. 42K illustrates a pictorial representation 4200K of a dialog box 4222 for creating a new action as deployed by the digital orchestration system 110, according to an example embodiment of the present disclosure. In an example, the following pop-up window may open to provide the necessary fields required to create the Action object. The action object may include a multitude of runtime parameters and a multitude of configuration parameters. The multitude of runtime parameters and a multitude of configuration parameters may define the context of the action from the plurality of actions 246 as mentioned above.

Figure 42L:
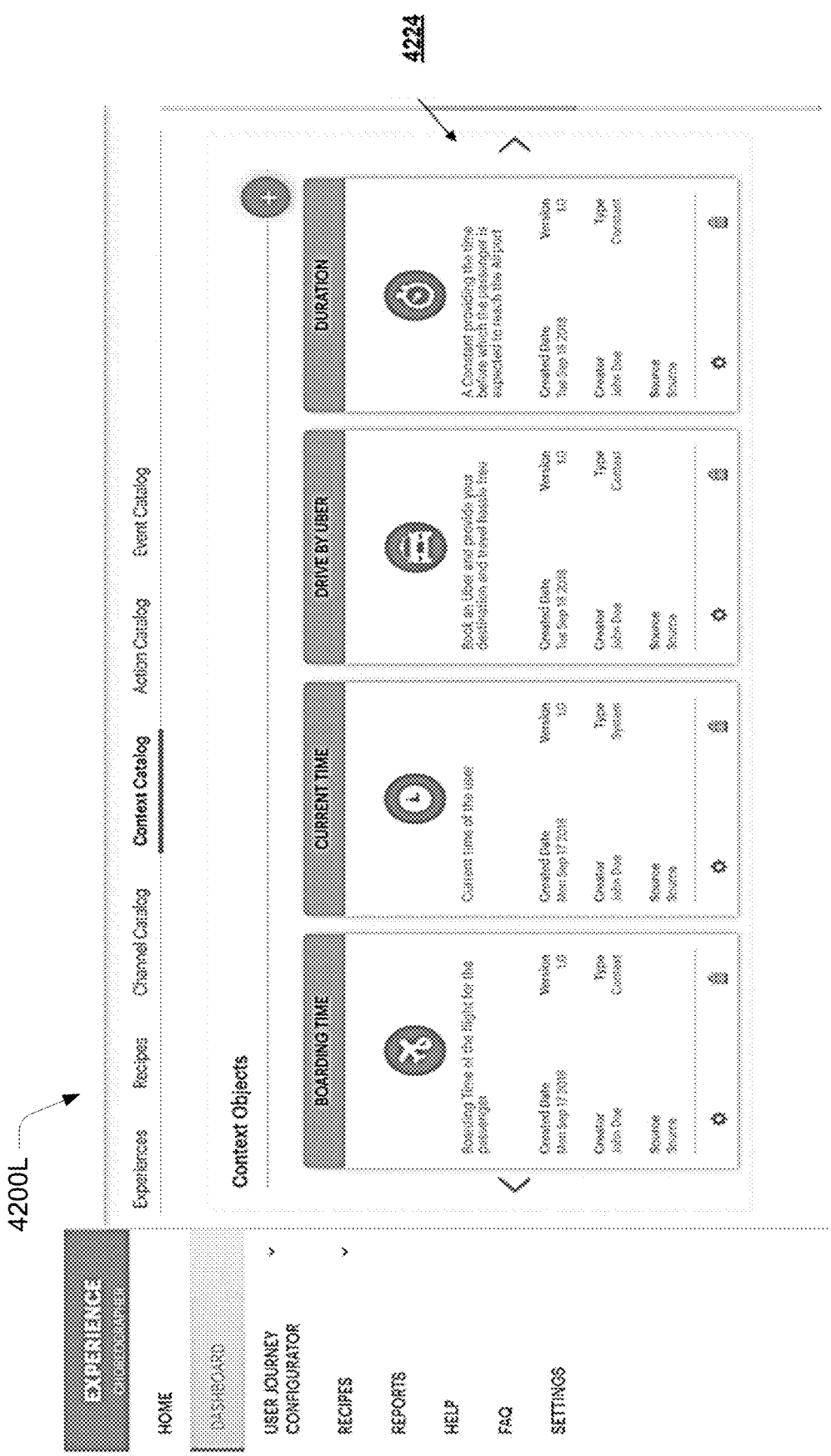
FIG. 42L illustrates a pictorial representation for registering a context object as deployed by a digital orchestration system, according to an example embodiment of the present disclosure.

FIG. 42L illustrates a pictorial representation 4200L for a registration 4224 of a context object as deployed by the digital orchestration system 110, according to an example embodiment of the present disclosure. A user may create context objects under the 'Context Catalog' section. A user may click on the '+' icon on the top right in the 'Context Catalog' section to open the 'Context Object creation' dialog box. In an example, the context objects may be of four (4) types namely, a context, a service, a system, and a constant.

Figure 42M:
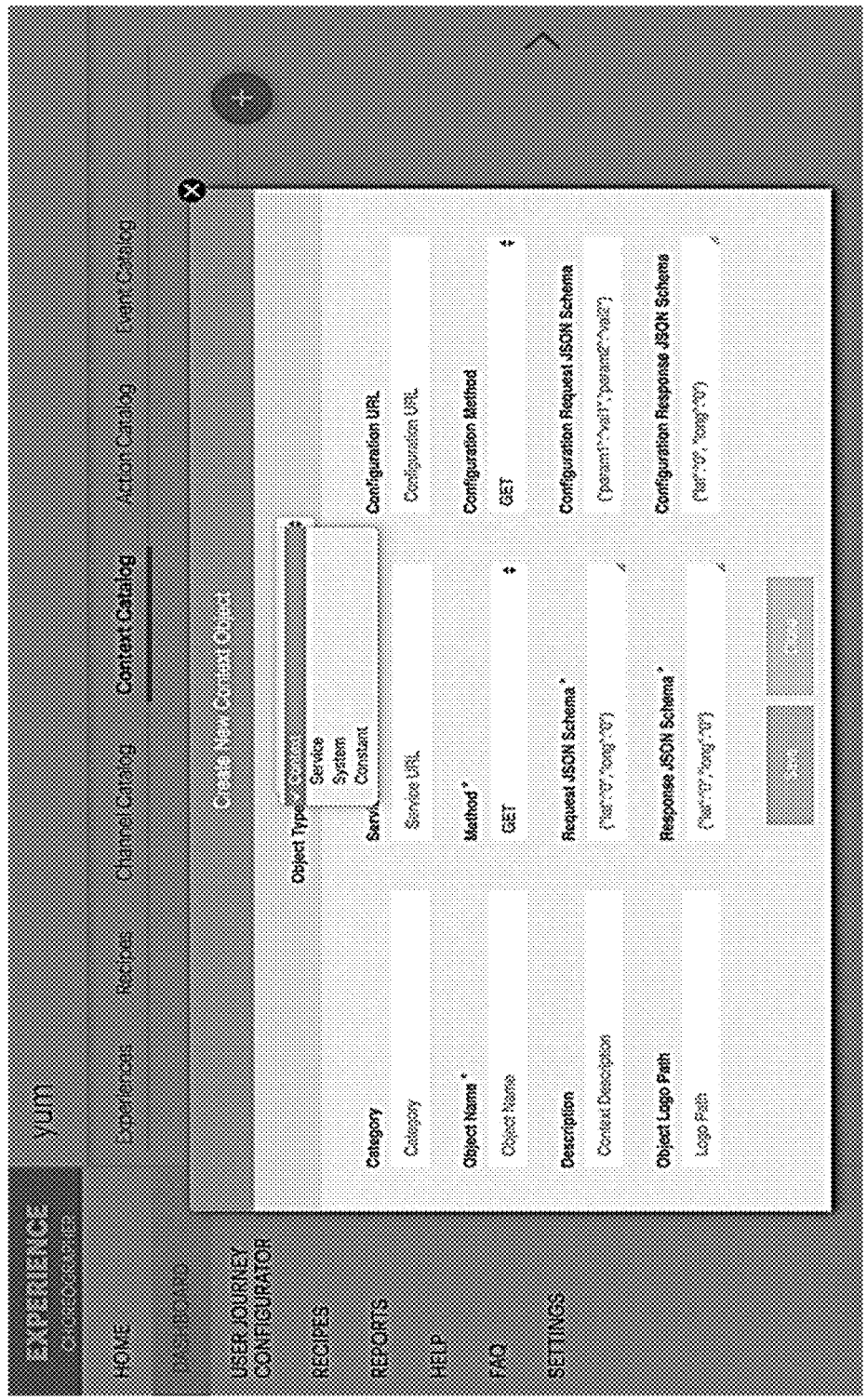
FIG. 42M illustrates a pictorial representation of a dialog box for selecting an object type as deployed by a digital orchestration system, according to an example embodiment of the present disclosure.

FIG. 42M illustrates a pictorial representation 4200M of a dialog box 4226 for selecting an object type as deployed by the digital orchestration system 110, according to an example embodiment of the present disclosure. A user may select the context object (as mentioned above) type to create by clicking on the 'Object Type' dropdown list in the dialog box as illustrated.

Figure 42N:
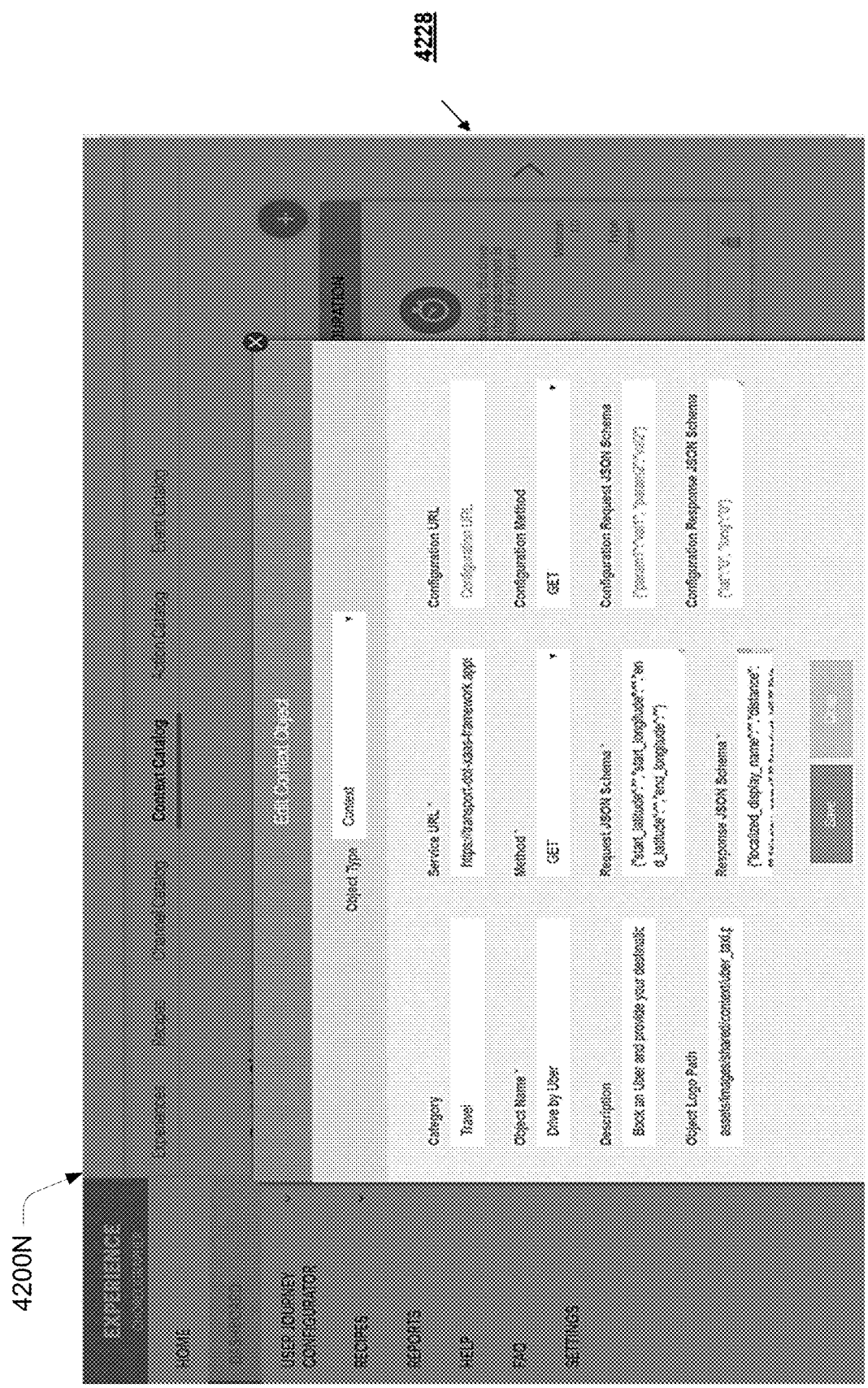
FIG. 42N illustrates a pictorial representation of a dialog box for registering a context object as deployed by a digital orchestration system, according to an example embodiment of the present disclosure.

FIG. 42N illustrates a pictorial representation 4200N of a dialog box 4228 for registering a context object as deployed by the digital orchestration system 110, according to an example embodiment of the present disclosure. The information fields for creating a context type context object and a service type context object are the same. The object may include a multitude of runtime parameters and a multitude of configuration parameters. In an example, the context type may have a multitude of configuration parameters to be provided. In an example, the service objects may have a multitude of configuration parameters as optional.

Figure 42O:
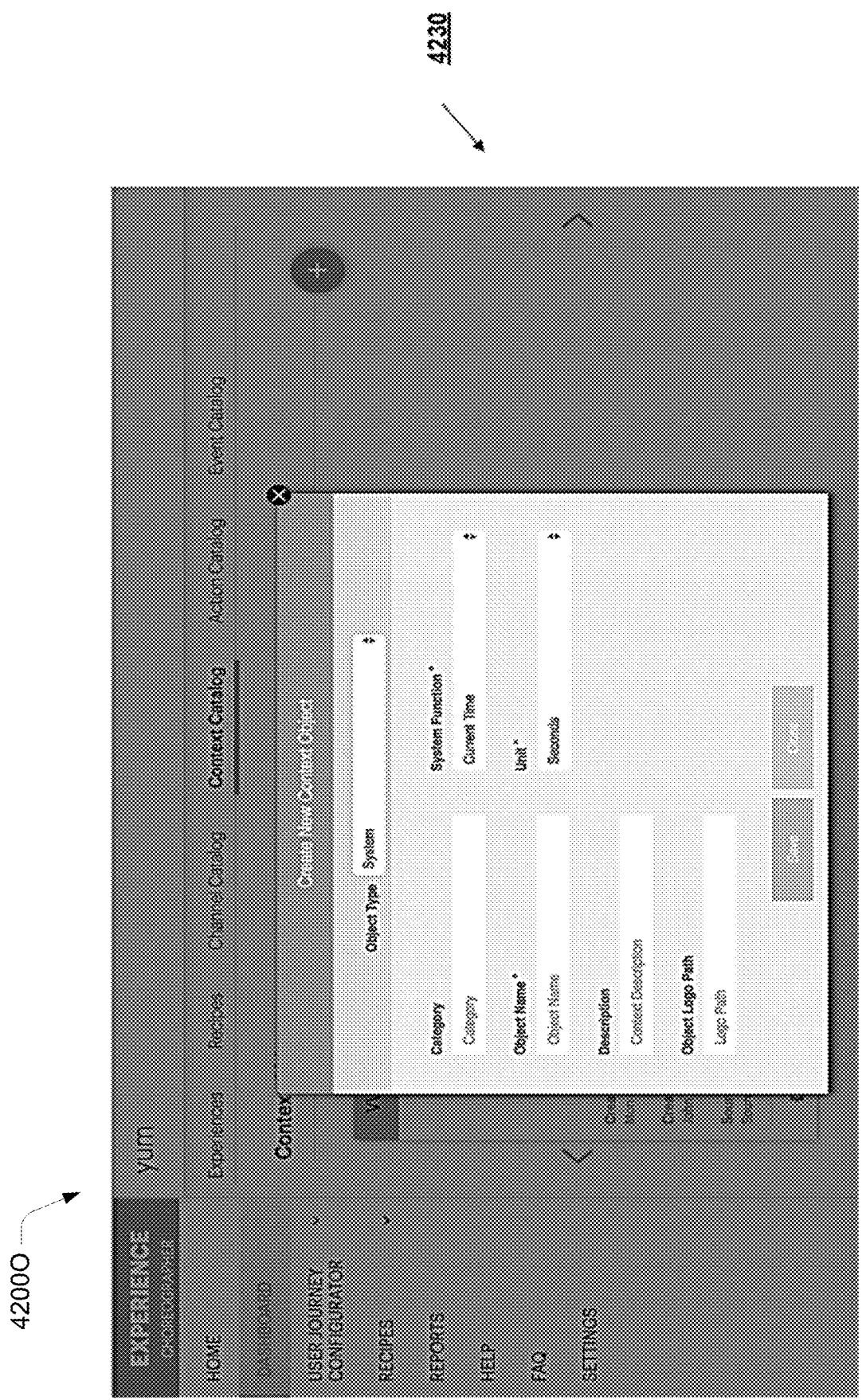
FIG. 42O illustrates a pictorial representation for fetching details from a plurality of sources as deployed by a digital orchestration system, according to an example embodiment of the present disclosure.

FIG. 42O illustrates a pictorial representation 4200O for a retrieval 4230 of details from a plurality of sources as deployed by the digital orchestration system 110, according to an example embodiment of the present disclosure. The system type context object may comprise the category of context objects, which may fetch details from the system 110 such as a current time on a real-time basis, a current date on a real-time basis and the like.

Figure 42P:
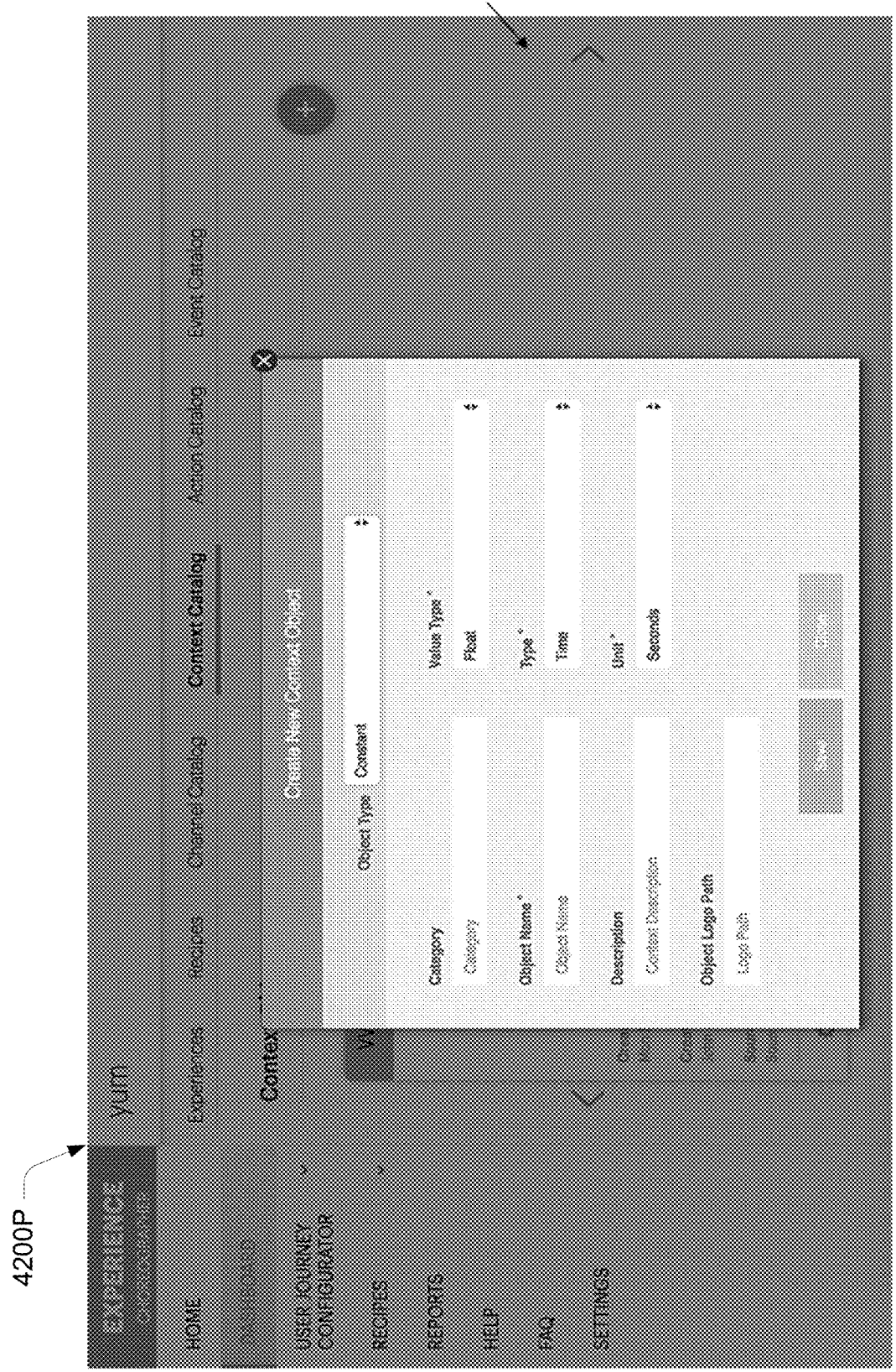
FIG. 42P illustrates a pictorial representation for registering a context object with a pre-defined value as deployed by a digital orchestration system, according to an example embodiment of the present disclosure.

FIG. 42P illustrates a pictorial representation 4200P for a registration 4232 of a context object with a pre-defined value as deployed by the digital orchestration system 110, according to an example embodiment of the present disclosure. The context object with a pre-defined value that may act as a constant value may be referred to as the constant context object (as mentioned above). The constant value may be used by the system 110 for comparing values from different context objects for the desired action. The constant context object may include, for example, a weight, a time, a distance, a temperature, or any other custom value.

Figure 42Q:
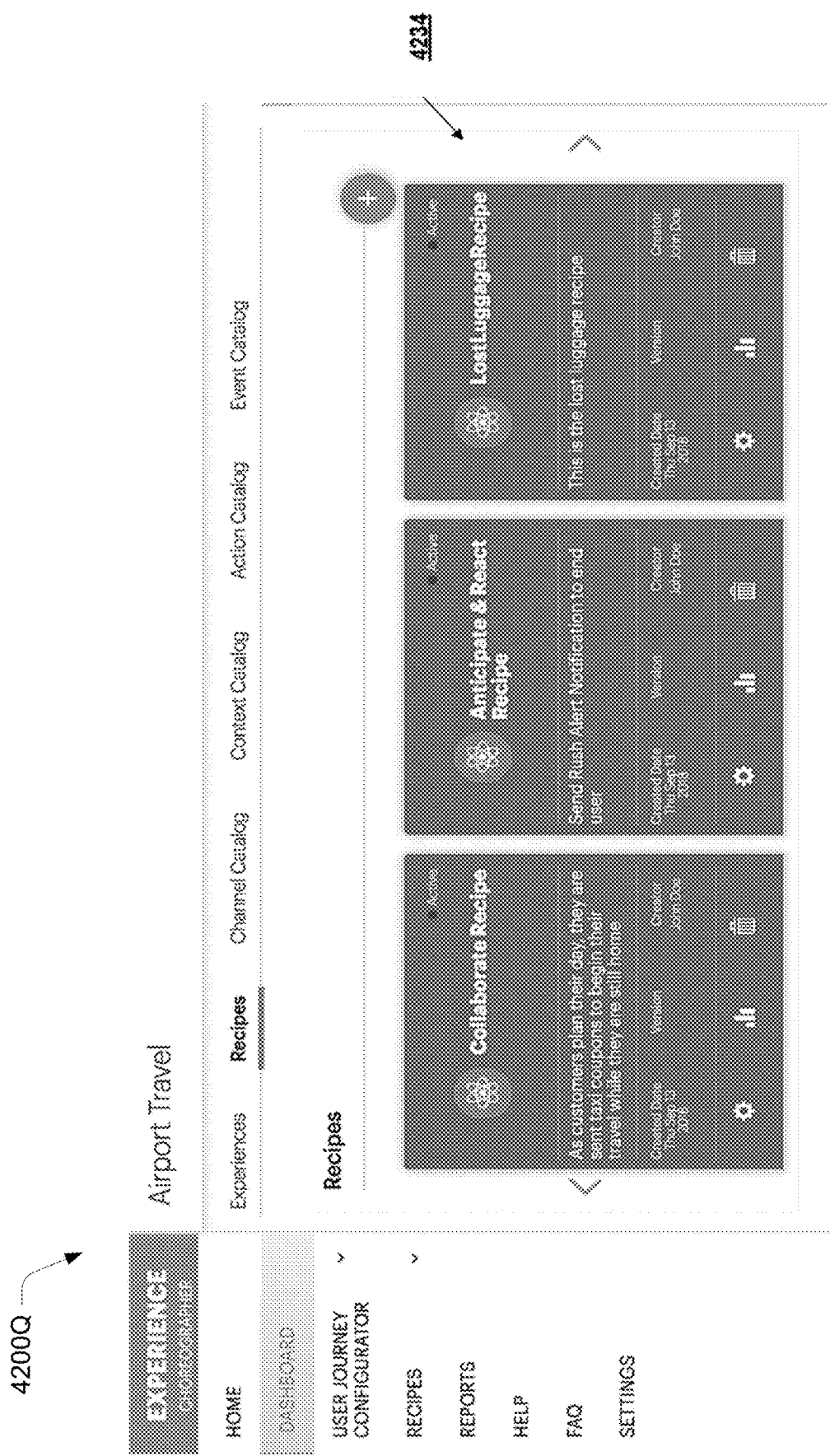
FIG. 42Q illustrates a pictorial representation of the creation of new recipes as deployed by a digital orchestration system, according to an example embodiment of the present disclosure.

FIG. 42Q illustrates a pictorial representation 4200Q of a creation 4234 of new recipes as deployed by the digital orchestration system 110, according to an example embodiment of the present disclosure. As mentioned above, a recipe 248 can be defined as an equation which is created by using business catalog objects and a combination of mathematical and logical operators. The recipe 248 may create a meaningful relation among the business context objects and based on the output of an equation, the final action may be decided. The recipe 248 should consist of an event, at least one business context object and an action. Thus, the user may complete the creation of event, action & context objects before creating a recipe 248.

Figure 42R:
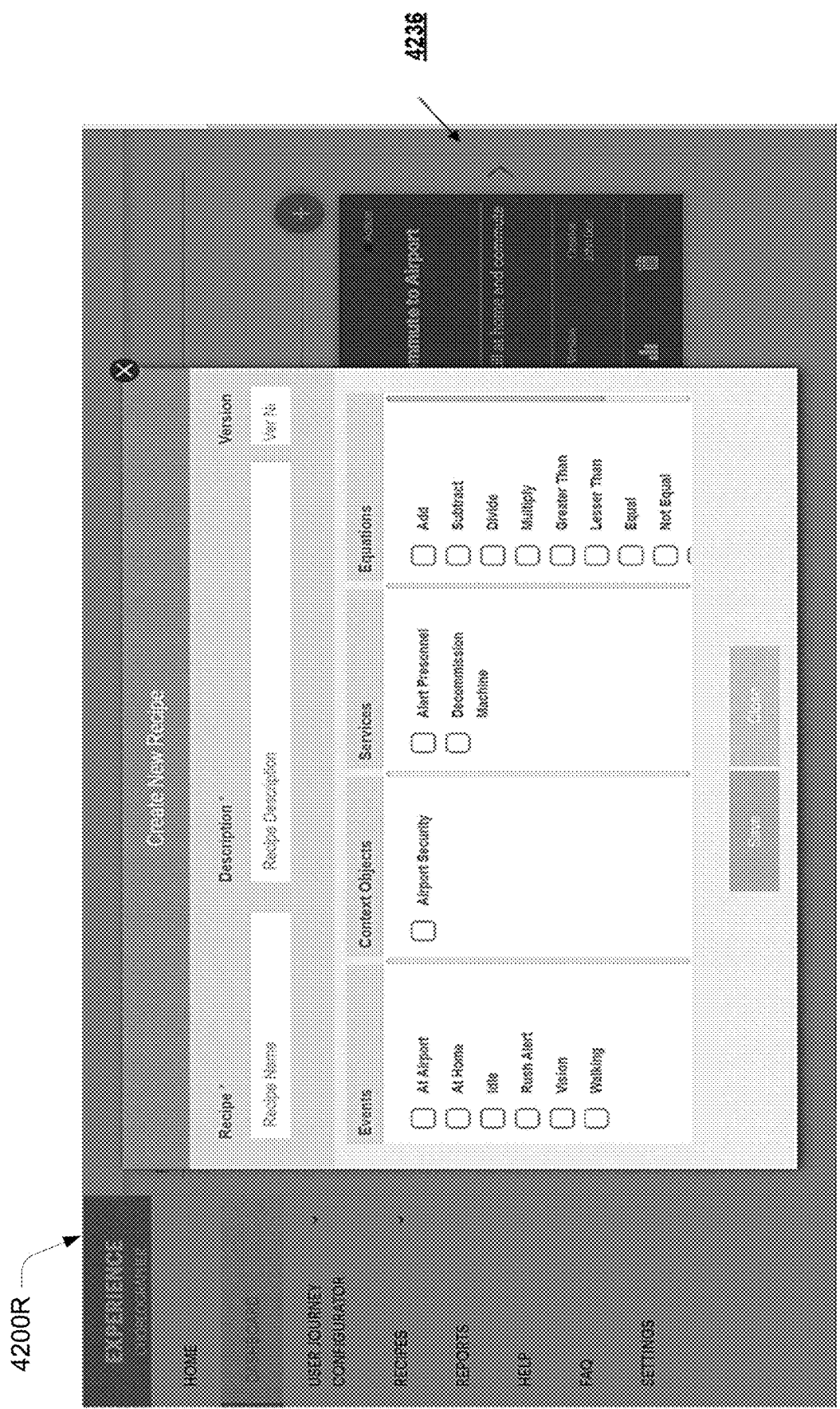
FIG. 42R illustrates a pictorial representation of the creation of new recipes as deployed by a digital orchestration system, according to an example embodiment of the present disclosure.

FIG. 42R illustrates a pictorial representation 4200R of a creation 4236 of new recipes as deployed by the digital orchestration system 110, according to an example embodiment of the present disclosure. A user may create a new recipe 248 by clicking on the '+' button on the top right in the Recipes section. In an example, the recipe 248 creation dialog box should open as illustrated.

Figure 42S:
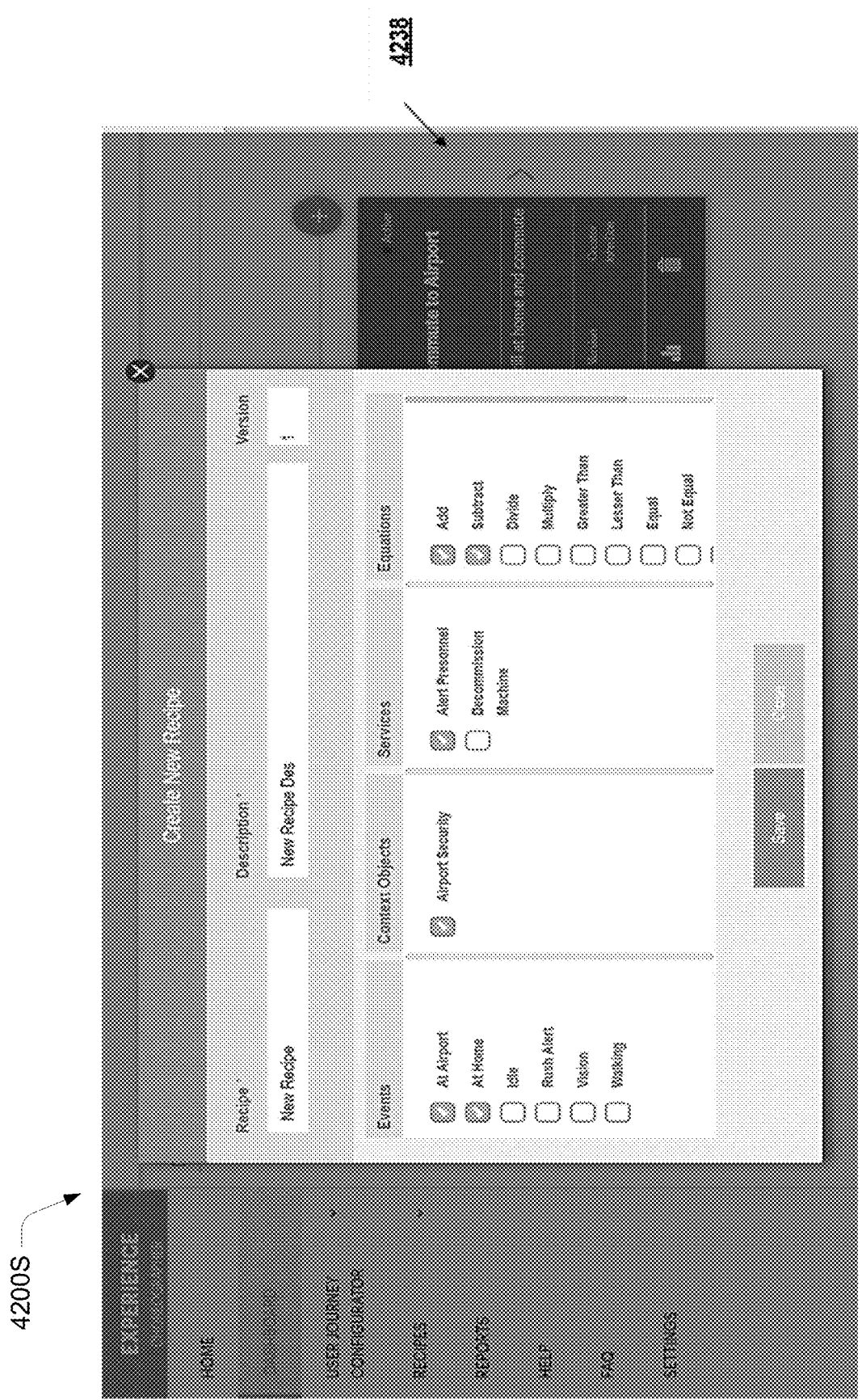
FIG. 42S illustrates a pictorial representation of entity selection for the creation of new recipes as deployed by a digital orchestration system, according to an example embodiment of the present disclosure.

FIG. 42S illustrates a pictorial representation 4200S of entity selection 4238 for the creation of new recipes as deployed by the digital orchestration system 110, according to an example embodiment of the present disclosure. A user may view the already created events, context objects, action objects listed in the dialog box. you can select the objects you want to include in the new recipe 248. The user may select the logic functions for example, such as add, subtract, equal, less than equal, and the like that may be required to create the logic equation for the new recipe 248. After the user may have clicked on 'Save', the recipe 248 may get created and the user may see it in the 'Recipes section'. In an example, the user may double click on the new recipe 248 card that may be shown in the Recipe 248 section, such action may, for example, open the 'Recipe 248 Configurator' screen as illustrated by the FIG. 42T.

Figure 42T:
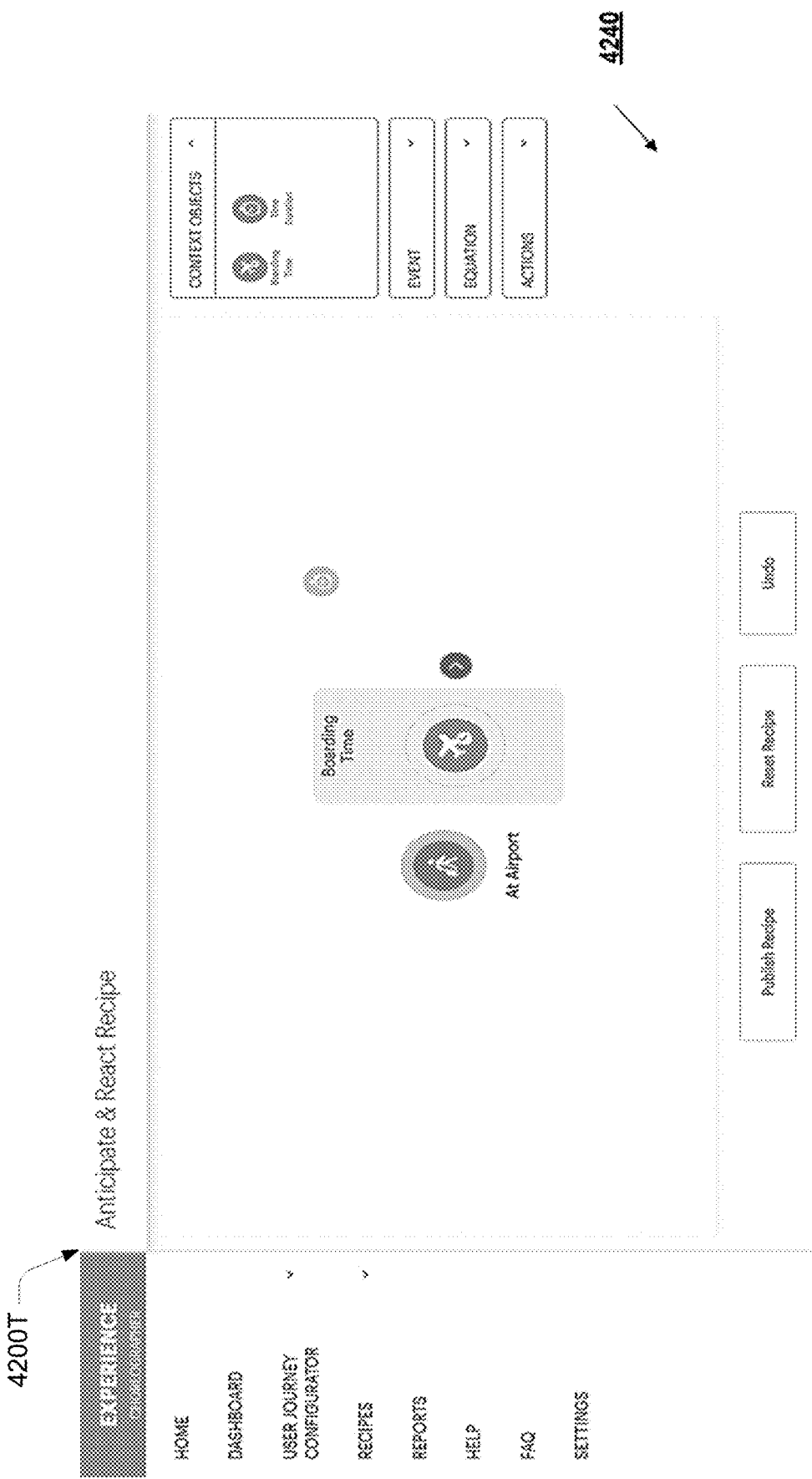
FIG. 42T illustrates a pictorial representation of the creation of new recipes as deployed by a digital orchestration system, according to an example embodiment of the present disclosure.

FIG. 42T illustrates a pictorial representation 4200T of a creation 4240 of new recipes as deployed by the digital orchestration system 110, according to an example embodiment of the present disclosure. A user may create a logic equation for the recipe 248 in the 'Recipe 248 Configurator' screen. This screen may initially be blank for a new recipe 248. The user may view the objects selected during the recipe 248 creation in the right pane. The boxes may be categorized by object type—context objects, event, equation, actions. A user may browse the objects in every category by expanding the box. In an example, the user may create the recipe equation by deploying drag and drop mechanism over the required objects from selected catalog objects in the right pane. In an example, the event object may always be the first object in the equation.

FIG. 42U illustrates a pictorial representation 4200U of a mapping 4242 of object parameters for the creation of new recipes as deployed by the digital orchestration system 110, according to an example embodiment of the present disclosure. The objects may be required to have their parameters mapped. In an example, the data mapping may be done through any of the objects in the equation to open the 'Data Mapping pop-up window' as illustrated. In an example, to run the recipe 248 successfully, the context objects used in the recipe 248 may have a proper mapping for "request" and "response" JSON. This may be required for the APIs which will be invoked to fetch the real-time data. In an example, on clicking a context object in the recipe 248, the data mapping window may open. The user may select parameters in the "From Response JSON" section and map it to the corresponding "To request JSON" parameter. The data mapping window may have separate tabs for the objects included in the equation. A user may switch between the tabs to do the data mapping for the objects.

Figure 42V:
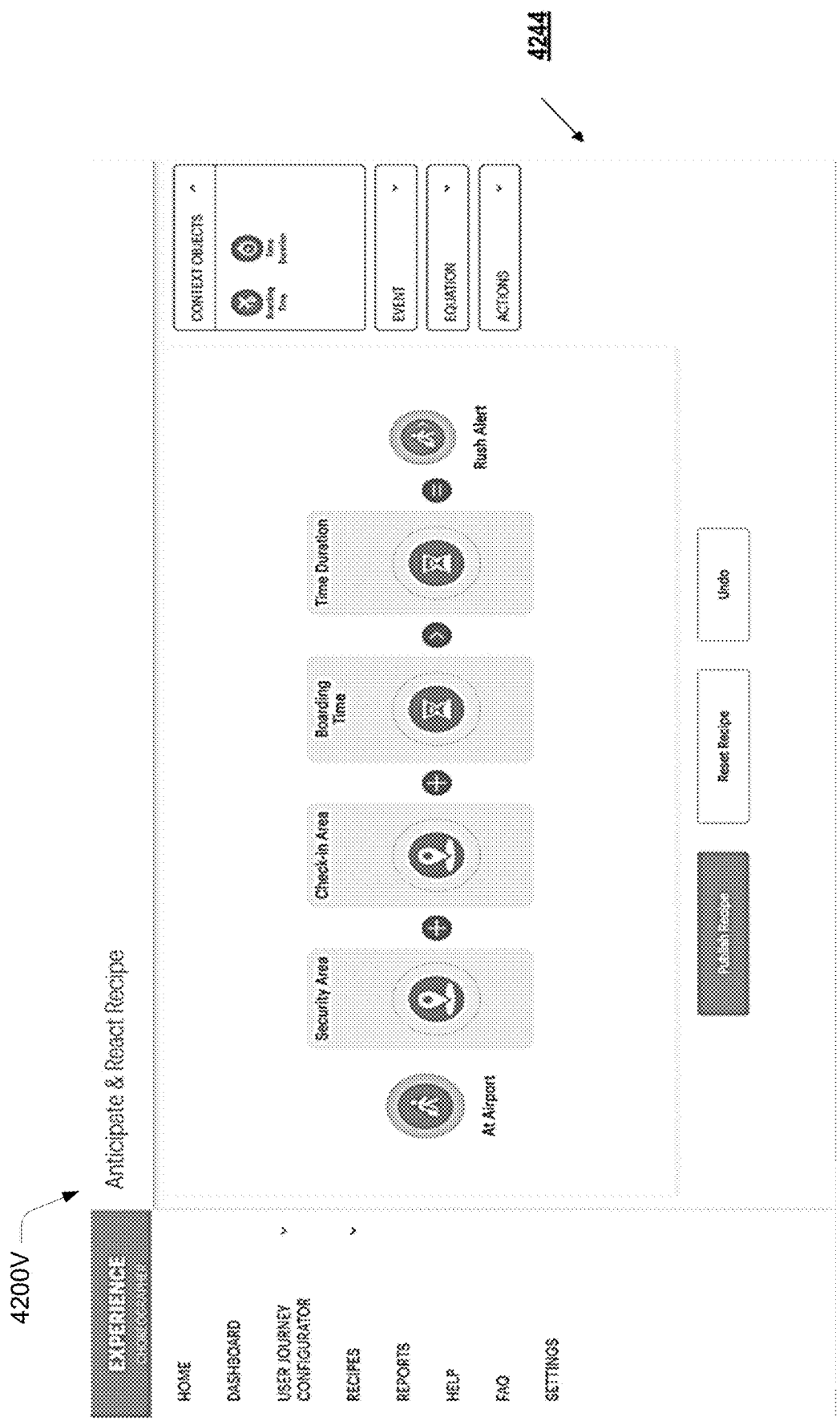
FIG. 42V illustrates a pictorial representation of publishing of new recipes as deployed by a digital orchestration system, according to an example embodiment of the present disclosure.

FIG. 42V illustrates a pictorial representation 4200V of a publishing 4244 of new recipes as deployed by the digital orchestration system 110, according to an example embodiment of the present disclosure. In an example, once a recipe 248 may be created, and the recipe equation may have been formed using catalog objects and the context and service objects parameters have been mapped, then a user may publish the recipe 248 to save the recipe equation and the context objects with data mappings in the database. In an example, a modification to a recipe 248 may only get updated into the system 110 after the user may have published the modification made in the recipe 248.

Figure 42W:
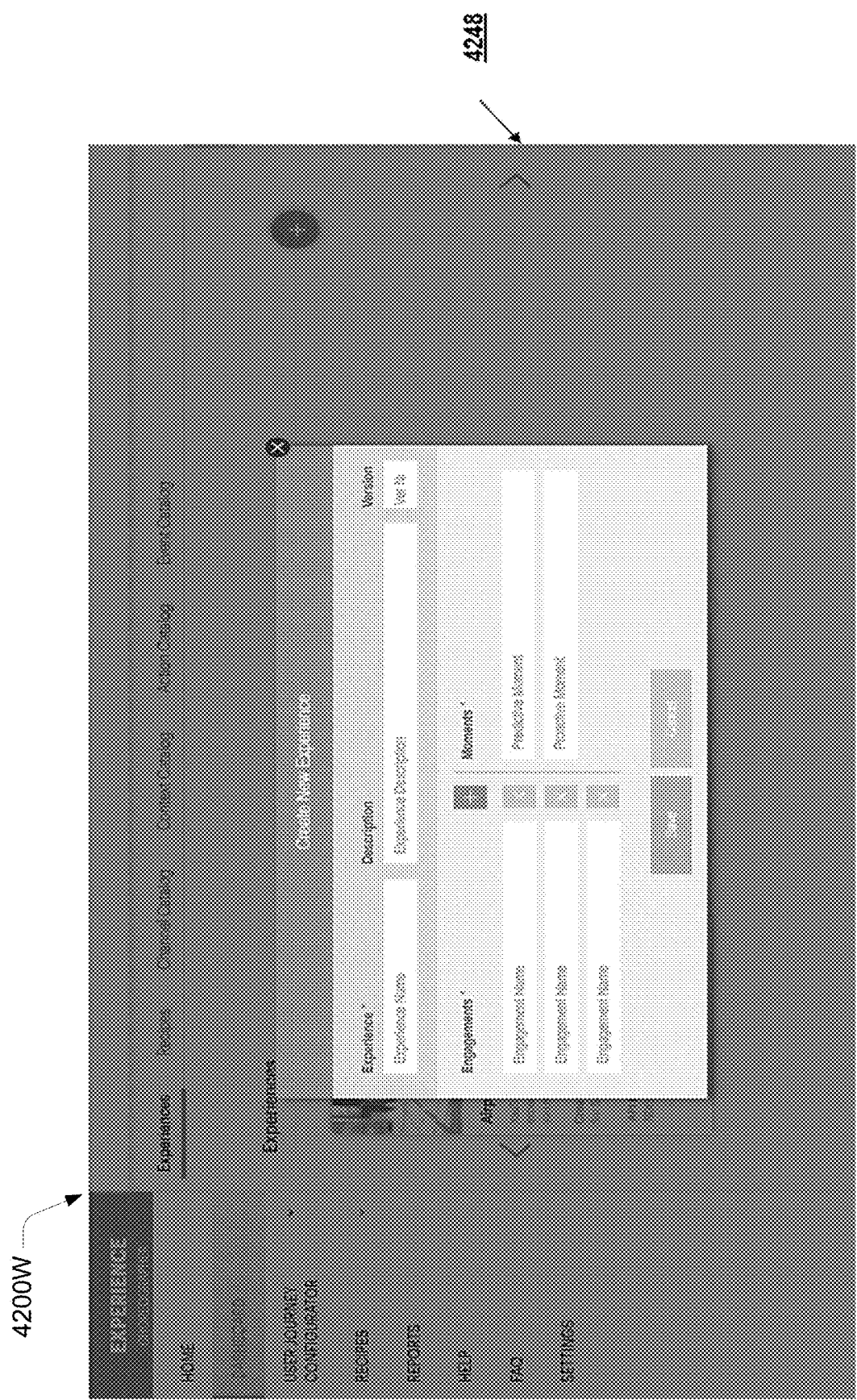
FIG. 42W illustrates a pictorial representation of the creation of a new user experience as deployed by a digital orchestration system, according to an example embodiment of the present disclosure.

FIG. 42W illustrates a pictorial representation 4200W of a creation 4248 of a new user experience as deployed by the digital orchestration system 110, according to an example embodiment of the present disclosure. In an example, a user may create a new experience by clicking on the '+' button on the top right in the experiences section. The experience creation dialog box may open up as illustrated. The user may enter the experience name & description along with engagements and moments. The user may add multiple engagements, but the moments may only be of two types the predictive moment and the proactive moment. The Predictive moment may be an action implemented before the engagement and the proactive moment may be an action implemented after the engagement. In an example, after the new experience may be created, the user may double click on it to open the 'user experience configurator' screen. Over the 'user experience configurator' screen, the user may add and use multiple recipes to configure the user journey/experience, depending on the desired outcome. In an example, a user may deploy the drag and drop mechanism to map the recipes to the user experience tree shown. All the recipes created may be viewed in the side panel on the right side as illustrated.

Figure 42X:
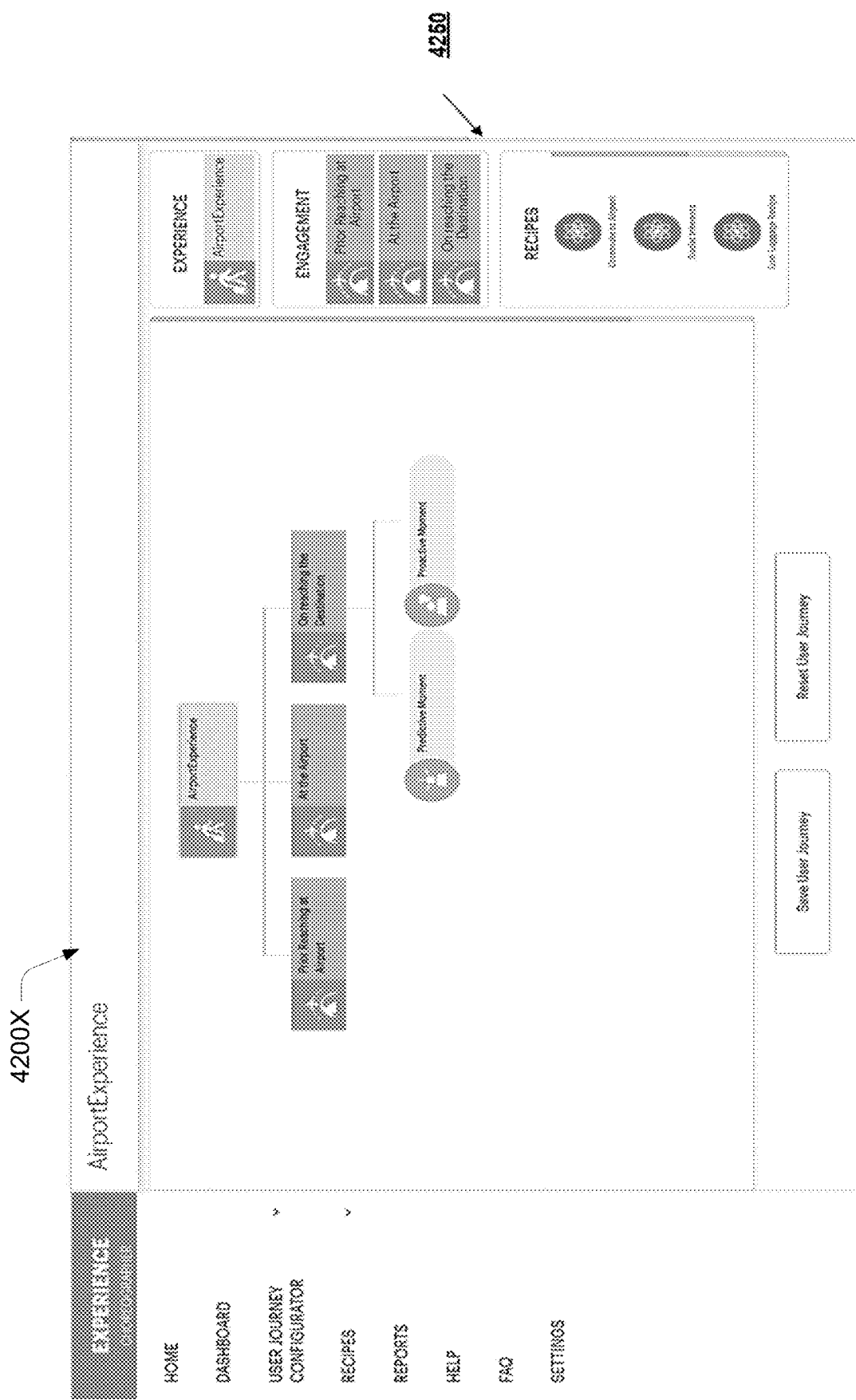
FIG. 42X illustrates a pictorial representation of the creation of a journey map as deployed by a digital orchestration system, according to an example embodiment of the present disclosure.

FIG. 42X illustrates a pictorial representation 4200X of a creation 4250 of a journey map 236 as deployed by the digital orchestration system 110, according to an example embodiment of the present disclosure. A journey map 236 may be a pictorial representation of the user experience. The journey map 236 may include an experience tree. The journey map 236 may illustrate the engagements, the predictive moments and the proactive moment under every engagement. Additionally, the journey map 236 may illustrate the associated recipe 248 with each moment. The user may deploy the drag and drop mechanism onto the listed recipe 248 on a moment to link with it. After the user may have added the recipe 248 to the experience tree, the user may also edit the recipe equation from this screen. The user may click on 'Edit' shown next to the added recipe 248 and the user may be redirected to the 'recipe configurator' screen. A user may click on 'Save User Journey' after all required changes may have been done.

Figure 42Y:
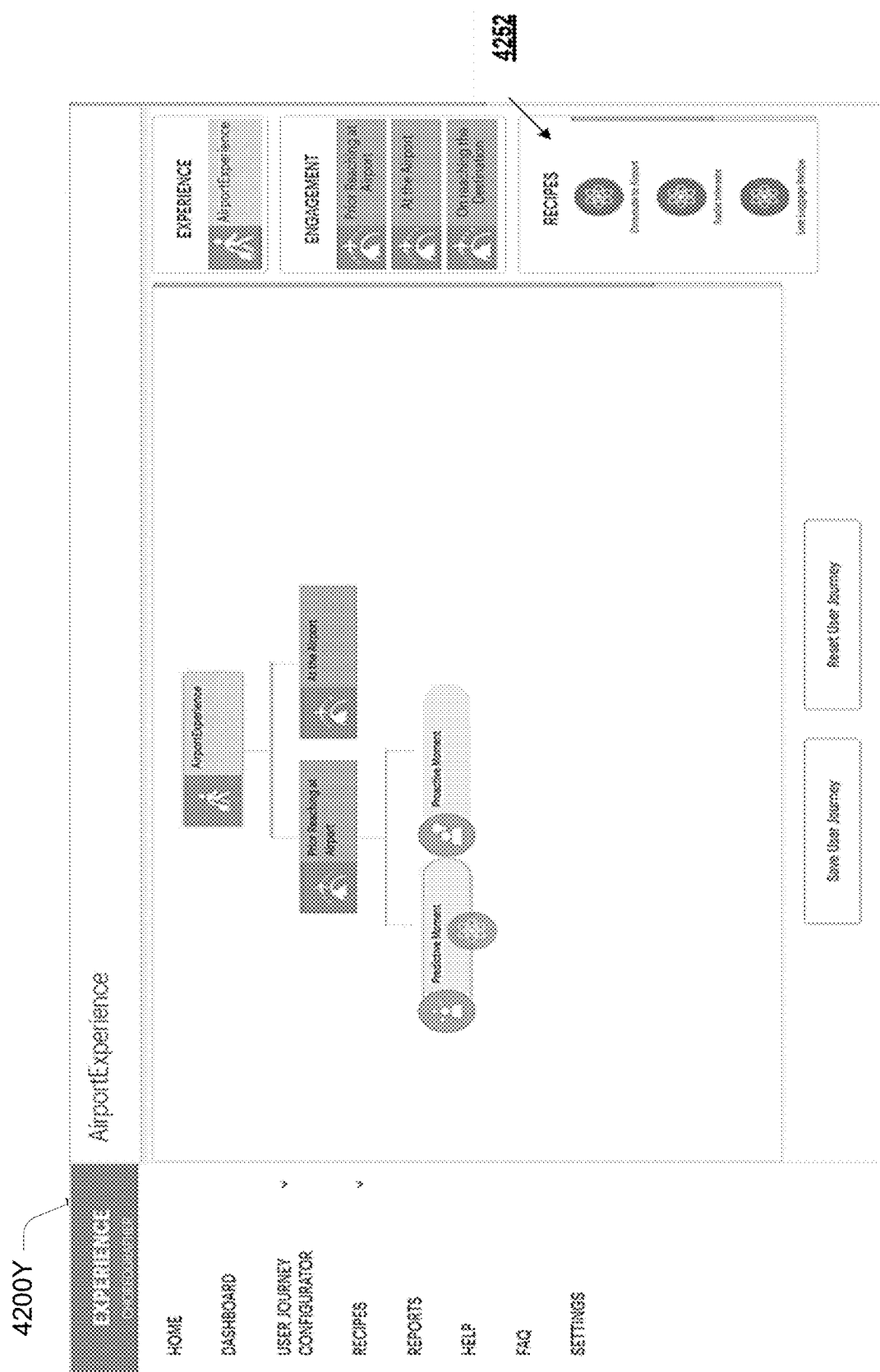
FIG. 42Y illustrates a pictorial representation of a dialog box for obtaining user input for the creation of a journey map as deployed by a digital orchestration system, according to an example embodiment of the present disclosure.

FIG. 42Y illustrates a pictorial representation 4200Y of a dialog box 4252 for obtaining user input 244 for the creation of a journey map 236 as deployed by the digital orchestration system 110, according to an example embodiment of the present disclosure. In an example, the user input 244 may be obtained using the drag and drop mechanism. The user may deploy the drag and drop mechanism for the recipe 248 under the engagement and their respective moments, depending upon when the recipes are to be triggered to perform a certain defined action.

Figure 42Z:
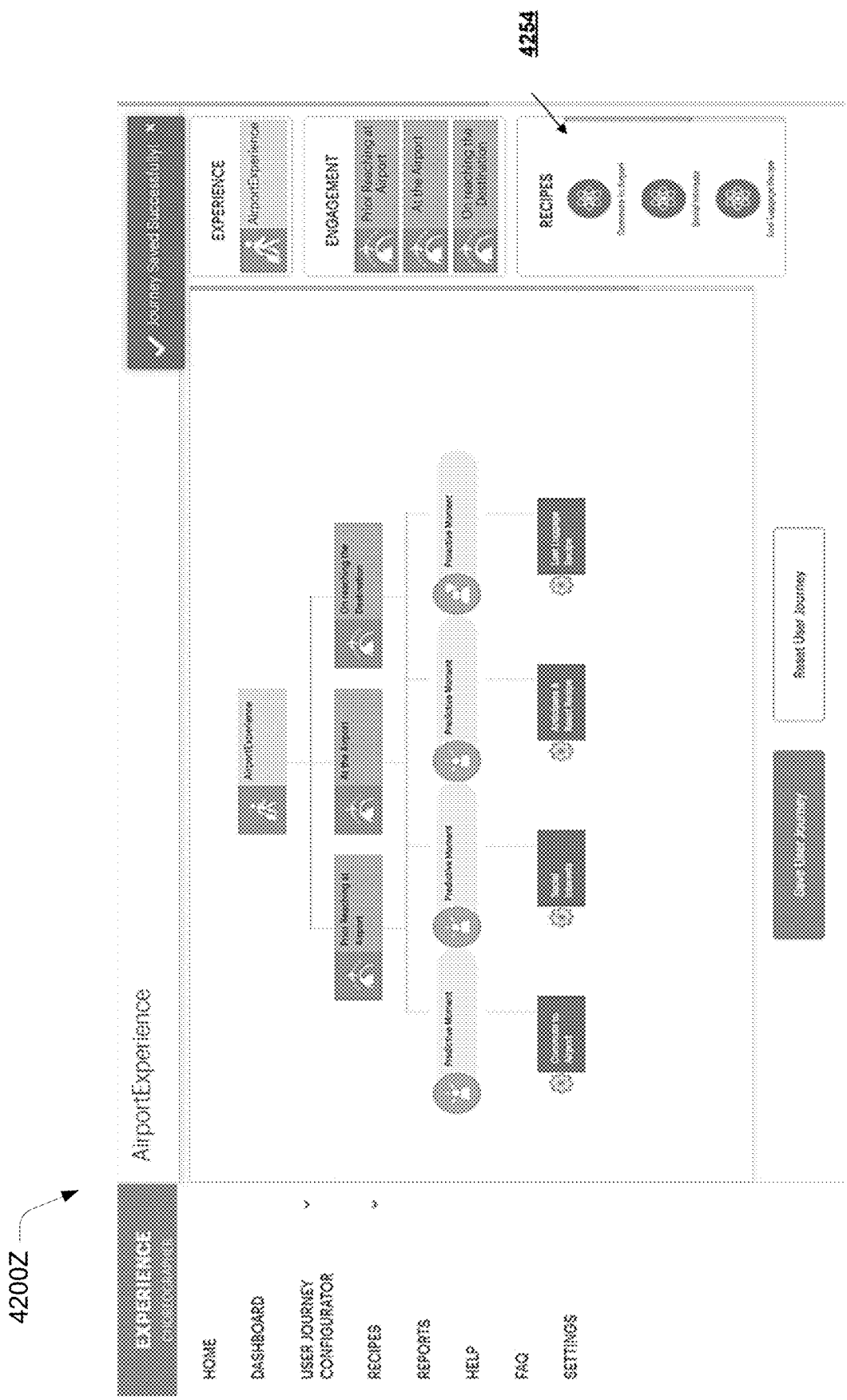
FIG. 42Z illustrates a pictorial representation of saving a user experience as deployed by a digital orchestration system, according to an example embodiment of the present disclosure.

FIG. 42Z illustrates a pictorial representation 4200Z of a saving action 4254 for the user experience as deployed by the digital orchestration system 110, according to an example embodiment of the present disclosure. In an example, the user may Save the Journey map 236 to a database after the user experience may have been created. In an example, the user may create the user experience for the plurality of users as mentioned above.

Figure 43:
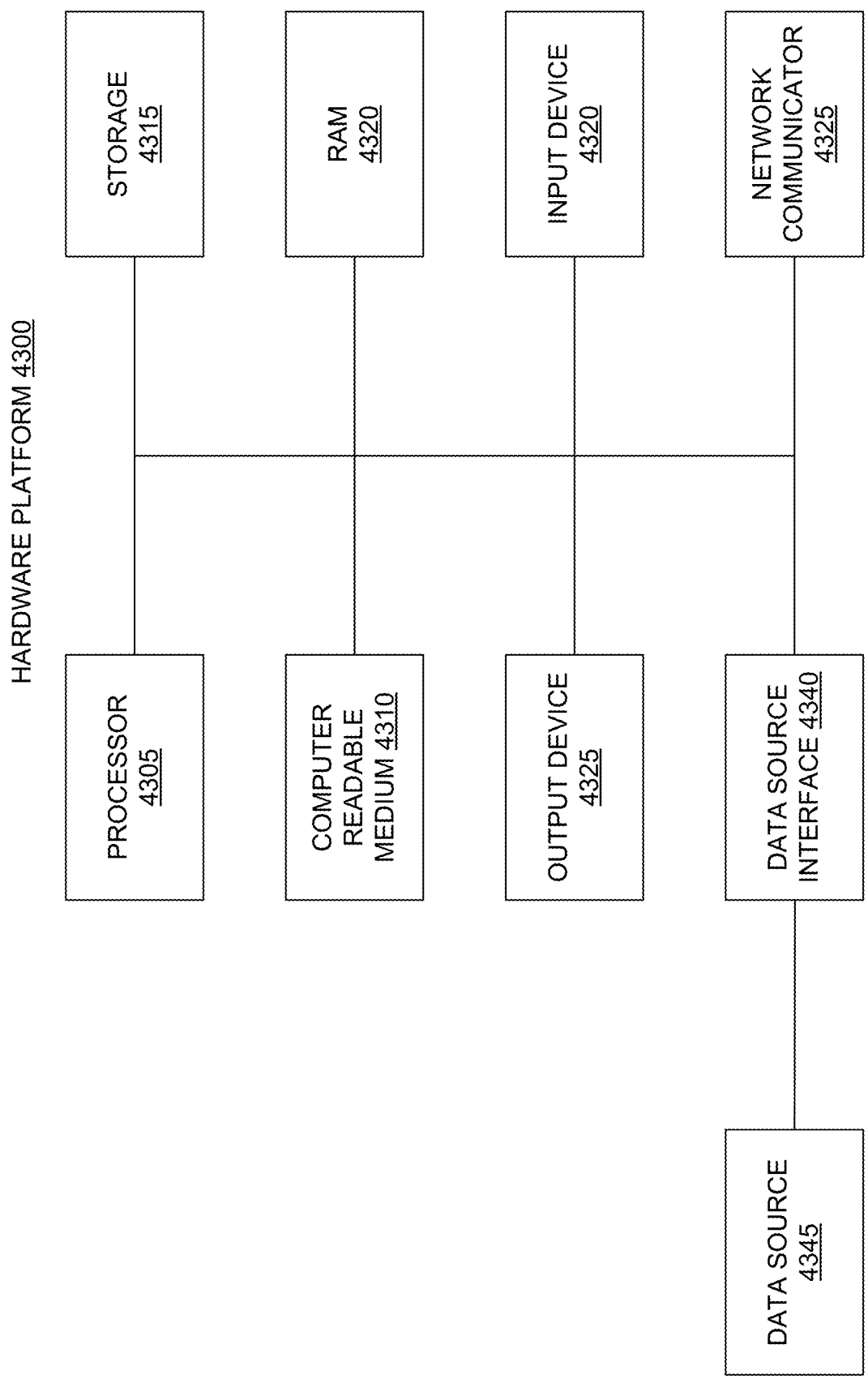
FIG. 43 illustrates a hardware platform for the implementation of a digital orchestration system, according to an example embodiment of the present disclosure.

FIG. 43 illustrates a hardware platform 4300 for implementation of the system 110, according to an example embodiment of the present disclosure. Particularly, computing machines such as but not limited to internal/external server clusters, quantum computers, desktops, laptops, smartphones, tablets and wearables which may be used to execute the system 110 or may have the structure of the hardware platform 4300. The hardware platform 4300 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over FIG. 43, the hardware platform 4300 may be a computer system 4300 that may be used with the examples described herein. The computer system 4300 may represent a computational platform that includes components that may be in a server or another computer system. The computer system 4300 may execute, by a processor (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 4300 may include a processor 4305 that executes software instructions or code stored on a non-transitory computer-readable storage medium 4310 to perform methods of the present disclosure. The software code includes, for example, instructions to gather data and documents and analyze documents. In an example, the content aggregator 130, the recipe creator 140, the recipe executor and the modeler 160 may be software codes or components performing these steps.

The instructions on the computer-readable storage medium 4310 are read and stored the instructions in storage 4315 or in random access memory (RAM) 4320. The storage 4315 provides a large space for keeping static data where at least some instructions could be stored for later execution. The stored instructions may be further compiled to generate other representations of the instructions and dynamically stored in the RAM 4320. The processor 4305 reads instructions from the RAM 4320 and performs actions as instructed.

The computer system 4300 further includes an output device 4325 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 4300 further includes input device 4330 to provide a user or another device with mechanisms for entering data and/or otherwise interact with the computer system 4300.

The input device may include, for example, a keyboard, a keypad, a mouse, or a touchscreen. In an example, the output of the recipe creator 140 and the modeler 160 may be displayed on the output device 4325. Each of these output devices 4325 and input devices 4330 could be joined by one or more additional peripherals. In an example, the output device 4325 may be used to display the results of the experience orchestration requirement 202.

A network communicator 4335 may be provided to connect the computer system 4300 to a network and in turn to other devices connected to the network including other clients, servers, data stores, and interfaces, for instance. A network communicator 4335 may include, for example, a network adapter such as a LAN adapter or a wireless adapter. The computer system 4300 includes a data source interface 4340 to access data source 4345. A data source is an information resource. As an example, a database of exceptions and rules may be a data source. Moreover, knowledge repositories and curated data may be other examples of data sources.

Figure 44A:
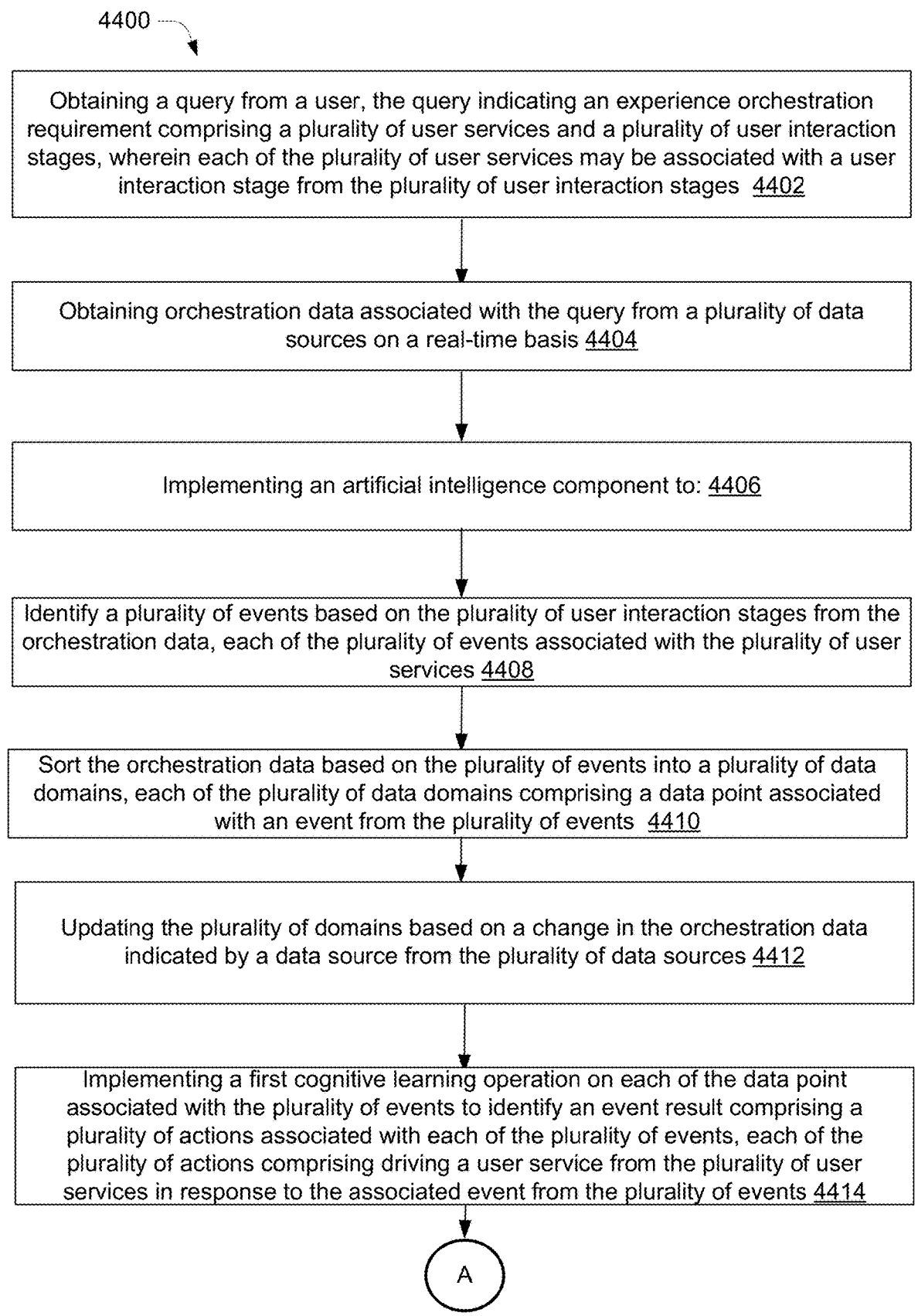
FIGS. 44A, 44B, and 44C illustrate a process flowchart for a digital orchestration system, according to an example embodiment of the present disclosure.
Figure 44B:
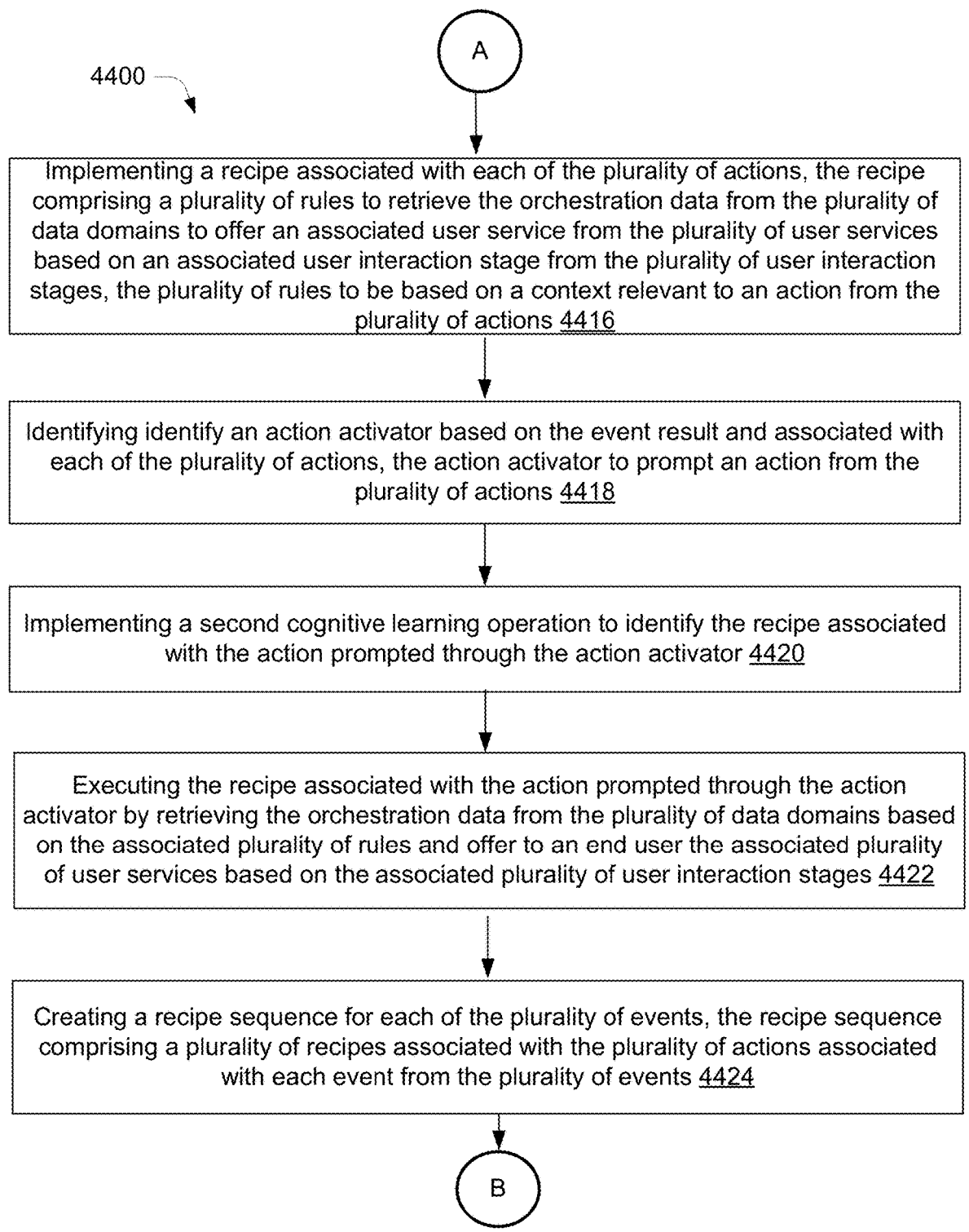
Figure 44C:
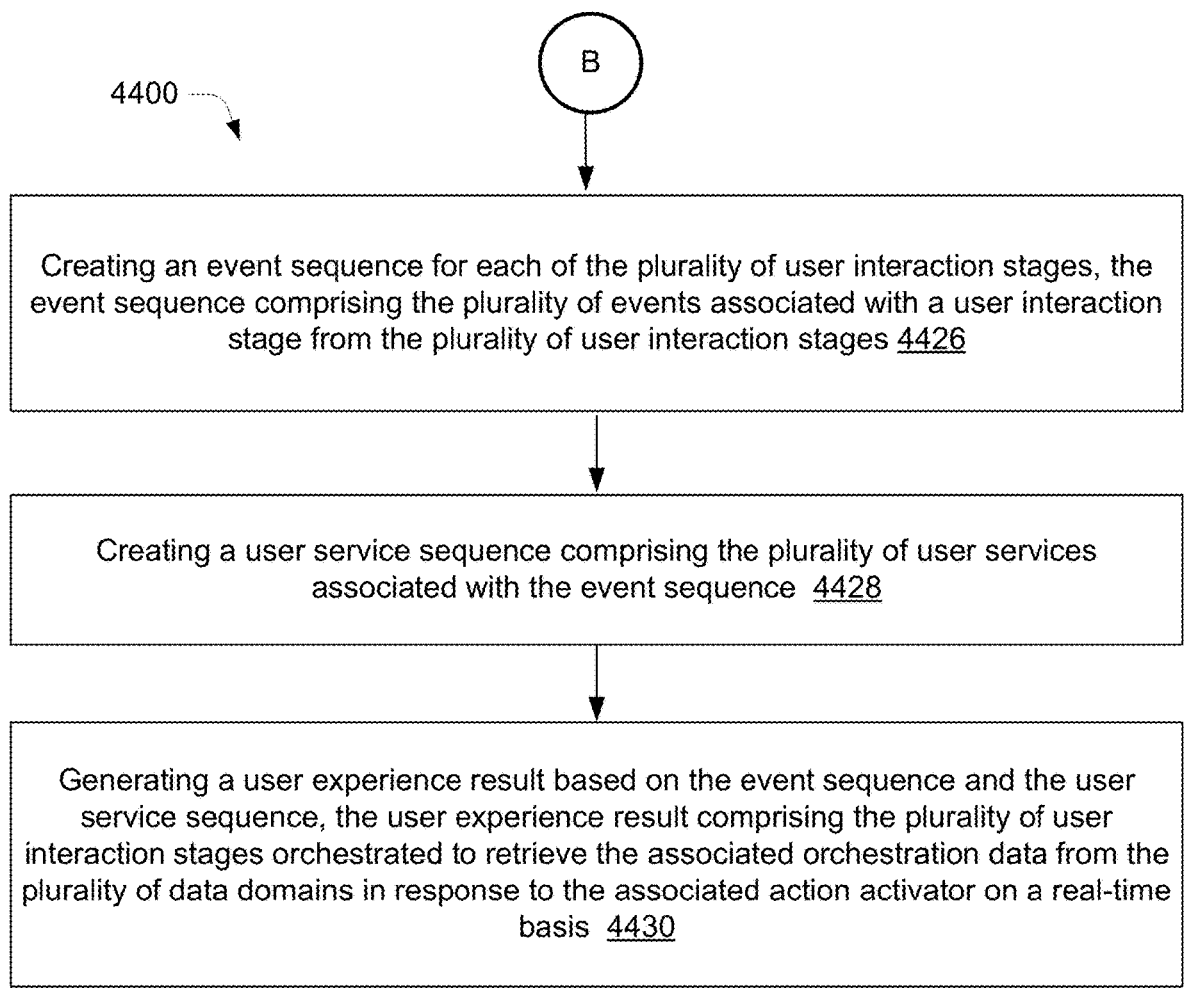

FIGS. 44A and 44B illustrate a method 4400 for the digital orchestration system 110 according to an example embodiment of the present disclosure.

It should be understood that method steps are shown here for reference only and other combinations of the steps may be possible. Further, the method 4400 may contain some steps in addition to the steps shown in FIG. 44A and FIG. 44B. For the sake of brevity, construction and operational features of the system 100 which are explained in detail in the description of FIGS. 1-15 are not explained in detail in the description of FIG. 44. The method 1000 may be performed by a component of the system 110, such as the processor 120, the content aggregator 130, the recipe creator 140 and the modeler 160.

At block 4402, a query may be obtained from a user. The query may indicate an experience orchestration requirement 202 comprising a plurality of user services 216 and a plurality of user interaction stages 238. Each of the plurality of user services 216 may be associated with a user interaction stage from the plurality of user interaction stages 238.

At block 4404, orchestration data 204 associated with the query may be obtained from a plurality of data sources 206 on a real-time basis.

At block 4406, the artificial intelligence component 218 may be implemented.

At block 4408, the artificial intelligence component 218 may be implemented to identify a plurality of events 212 based on the plurality of user interaction stages 238 from the orchestration data 204, wherein each of the plurality of events 212 may be associated with the plurality of user services 216

At block 4410, the artificial intelligence component 218 may be implemented to sort the orchestration data 204 based on the plurality of events 212 into a plurality of data domains 240, wherein each of the plurality of data domains 240 may be comprising a data point 242 associated with an event from the plurality of events 212

At block 4412, the artificial intelligence component 218 may be implemented to update the plurality of domains based on a change in the orchestration data 204 as indicated by a data source from the plurality of data sources 206

At block 4414, the first cognitive learning operation 220 may be implemented on each of the data points 242 associated with the plurality of events 212 to identify an event result 226 comprising a plurality of actions 246 associated with each of the plurality of events 212. Each of the plurality of actions 246 may include driving a user service from the plurality of user services 216 in response to the associated event from the plurality of events 212

At block 4416, a recipe 248 associated with each of the plurality of actions 246 may be created. The recipe 248 may be comprising a plurality of rules 250 to retrieve the orchestration data 204 from the plurality of data domains 240 to offer an associated user service from the plurality of user services 216 based on an associated user interaction stage from the plurality of user interaction stages 238. The plurality of rules 250 may be based on a context relevant to an action from the plurality of actions 246.

At block 4418, an action activator 254 may be identified based on the event result 226 and associated with each of the plurality of actions 246. The action activator 254 may prompt action from the plurality of actions 246.

At block 4420, a second cognitive learning operation 252 may be to identify the recipe 248 associated with the action prompted through the action activator 254.

At block 4422, the recipe 248 associated with the action prompted through the action activator 254 may be implemented by retrieving the orchestration data 204 from the plurality of data domains 240 based on the associated plurality of rules 250 and offer to an end-user the associated plurality of user services 216 based on the associated plurality of user interaction stages 238.

At block 4424, a recipe sequence 228 may be created for each of the plurality of events 212. The recipe sequence 228 comprising a plurality of recipes associated with the plurality of actions 246 associated with each event from the plurality of events 212.

At block 4426, an event sequence 230 may be created for each of the plurality of user interaction stages 238. The event sequence 230 may be comprising the plurality of events 212 associated with a user interaction stage from the plurality of user interaction stages 238.

At block 4428, a user service sequence 232 may be created comprising the plurality of user services 216 associated with the event sequence 230.

At block 4430, a user experience result 234 may be generated based on the event sequence 230 and the user service sequence 232. The user experience result 234 comprising the plurality of user interaction stages 238 orchestrated to retrieve the associated orchestration data 204 from the plurality of data domains 240 in response to the associated action activator 254 on a real-time basis.

In an example, the method 4400 may further include updating the event result 226 and the recipe 248 based on the update in the plurality of data domains 240 indicated by a change in the orchestration data 204 indicated by a data source from the plurality of data sources 206. The method 4400 may further comprise updating the recipe sequence 228 based on the updated event result 226 and update the event sequence 230 based on a change in the plurality of user interaction stages 238. The method 4400 may further comprise creating a unique journey map 236 for an individual end-user comprising the user experience result 234 with the plurality of user interaction stages 238, the associated event sequence 230, and the associated recipe sequence 228 applicable to the individual end-user. The method 4400 may further comprise obtaining user input 244 to implement a first cognitive learning operation 220 on each of the data points 242. The method 4400 may further comprise implementing the second cognitive learning operation 252 to identify a multitude of recipes associated with the action prompted through the action activator 254. The method 4400 may further comprise executing a recipe 248 from the multitude of recipes associated with the action prompted through the action activator 254 based on a result from any of the plurality of user interaction stages 238 for an individual end-user.

In an example, the method 4400 may be practiced using a non-transitory computer-readable medium. In an example, the method 4400 may be a computer-implemented method.

The present disclosure provides for the digital orchestration system 110 that may enable a user to create dynamic industry-agnostic experiences by the formation of journey map, engagements, moments and recipes just by registering entities like events, context, services, and actions, dragging for configuring objects. Furthermore, the present disclosure may categorically analyze various parameters that may have an impact on the choreography of newer experiences by leveraging mashed up data services across different systems along with real-time contexts like presence, location, vision, artificial intelligence, analytic insights and the like. The system may push new mashed-up data and services to a customer's channels of preference.

One of ordinary skill in the art will appreciate that techniques consistent with the present disclosure are applicable in other contexts as well without departing from the scope of the disclosure. Accordingly, the system may be present an ability to seamlessly integrate new services and implementation thereof over the existing executing platform in a user-friendly manner.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
a display screen;
a processor;
a content aggregator coupled to the processor, the content aggregator to:
obtain a query from a user, the query indicating an experience orchestration requirement comprising a plurality of user services and a plurality of user interaction stages, each of the plurality of user interaction stages comprising a plurality of digital touchpoints to allow interaction for a user with a digital environment, wherein each of the plurality of user services is associated with a user interaction stage from the plurality of user interaction stages;
obtain orchestration data associated with the query from a plurality of data sources on a real-time basis;
implement an artificial intelligence component to:
identify a plurality of events based on the plurality of user interaction stages from the orchestration data, each of the plurality of events associated with the plurality of user services, wherein the plurality of events includes calculating a time of completing each of the plurality of user services; and
sort the orchestration data based on the plurality of events into a plurality of data domains, each of the plurality of data domains comprising a data point associated with an event from the plurality of events; and
update the plurality of domains based on a change in the orchestration data indicated by a data source from the plurality of data sources;

a recipe creator coupled to the processor, the recipe creator to:
implement a first cognitive learning operation on each of the data points associated with the plurality of events to identify an event result comprising a plurality of actions associated with each of the plurality of events, each of the plurality of actions comprising:
comparing the time of completing the at least one of the plurality of user services with a time of a specific event; and
driving a user service from the plurality of user services based on the comparison; and
create a recipe associated with each of the plurality of actions, the recipe comprising a plurality of rules to retrieve the orchestration data from the plurality of data domains to offer an associated user service from the plurality of user services based on an associated user interaction stage from the plurality of user interaction stages, the plurality of rules to be based on a context relevant to an action from the plurality of actions;
a recipe executor coupled to the processor, the recipe executor to:
identify an action activator based on the event result and associated with each of the plurality of actions, the action activator to prompt an action from the plurality of actions;
implement a second cognitive learning operation to:
identify a current location of an end-user; and
identify the recipe associated with the action prompted through the action activator, wherein the identification of the recipe is based on the current location of the end-user;
implement the recipe associated with the action prompted through the action activator by retrieving the orchestration data from the plurality of data domains based on the associated plurality of rules; and
offer to the end-user the associated plurality of user services based on the associated plurality of user interaction stages; and
a modeler coupled to the processor, the modeler to:
create an event sequence for each of the plurality of user interaction stages, the event sequence comprising the plurality of events associated with a user interaction stage from the plurality of user interaction stages;
create a user service sequence comprising the plurality of user services associated with the event sequence;
generate a user experience result based on the event sequence and the user service sequence, the user experience result comprising the plurality of user interaction stages orchestrated to retrieve the associated orchestration data from the plurality of data domains in response to the associated action activator on a real-time basis;
create a journey map for the end-user, the journey map comprising the user experience result with the plurality of user interaction stages, the event sequence, and a recipe sequence applicable to the end-user; and
display the journey map on the display screen.

2. The system as claimed in claim 1, wherein the recipe creator is to update the event result and the recipe based on the update in the plurality of data domains indicated by a change in the orchestration data indicated by a data source from the plurality of data sources.

3. The system as claimed in claim 2, wherein the modeler is to:
- create the recipe sequence for each of the plurality of events, the recipe sequence comprising a plurality of recipes associated with the plurality of actions associated with each event from the plurality of events; and
- update the recipe sequence based on the updated event result and update the event sequence based on a change in the plurality of user interaction stages.

4. The system as claimed in claim 1, wherein the recipe creator is to obtain user input to implement the first cognitive learning operation on each of the data points.

5. The system as claimed in claim 1, wherein the recipe executor is to implement the second cognitive learning operation to identify a multitude of recipes associated with the action prompted through the action activator.

6. The system as claimed in claim 5, wherein the recipe executor is to execute a recipe from the multitude of recipes associated with the action prompted through the action activator based on a result from any of the plurality of user interaction stages for the end-user.

7. A method comprising:
- obtaining, by a processor, a query from a user, the query indicating an experience orchestration requirement comprising a plurality of user services and a plurality of user interaction stages, each of the plurality of user interaction stages comprising a plurality of digital touchpoints to allow interaction for a user with a digital environment, wherein each of the plurality of user services is associated with a user interaction stage from the plurality of user interaction stages;
- obtaining, by the processor, orchestration data associated with the query from a plurality of data sources on a real-time basis;
- implementing, by the processor, an artificial intelligence component to:
  - identify a plurality of events based on the plurality of user interaction stages from the orchestration data, each of the plurality of events associated with the plurality of user services, wherein the plurality of events includes calculating a time of completing each of the plurality of user services; and
  - sort the orchestration data based on the plurality of events into a plurality of data domains, each of the plurality of data domains comprising a data point associated with an event from the plurality of events;
- updating, by the processor, the plurality of domains based on a change in the orchestration data indicated by a data source from the plurality of data sources;
- implementing, by the processor, a first cognitive learning operation on each of the data points associated with the plurality of events to identify an event result comprising a plurality of actions associated with each of the plurality of events, each of the plurality of actions comprising:
  - comparing the time of completing the at least one of the plurality of user services with a time of a specific event; and
  - driving a user service from the plurality of user services based on the comparison;
- creating, by the processor, a recipe associated with each of the plurality of actions, the recipe comprising a plurality of rules to retrieve the orchestration data from the plurality of data domains to offer an associated user service from the plurality of user services based on an associated user interaction stage from the plurality of user interaction stages, the plurality of rules to be based on a context relevant to an action from the plurality of actions;
- identifying, by the processor, an action activator based on the event result and associated with each of the plurality of actions, the action activator to prompt an action from the plurality of actions;
- implementing, by the processor, a second cognitive learning operation to:
  - identify a current location of an end-user; and
  - identify the recipe associated with the action prompted through the action activator, wherein the identification of the recipe is based on the current location of the end-user;
- implementing, by the processor, the recipe associated with the action prompted through the action activator by retrieving the orchestration data from the plurality of data domains based on the associated plurality of rules;
- offer to the end-user the associated plurality of user services based on the associated plurality of user interaction stages;
- creating, by the processor, an event sequence for each of the plurality of user interaction stages, the event sequence comprising the plurality of events associated with a user interaction stage from the plurality of user interaction stages;
- creating, by the processor, a user service sequence comprising the plurality of user services associated with the event sequence; and
- generating, by the processor, a user experience result based on the event sequence and the user service sequence, the user experience result comprising the plurality of user interaction stages orchestrated to retrieve the associated orchestration data from the plurality of data domains in response to the associated action activator on a real-time basis;
- creating, by the processor, a journey map for the end-user, the journey map comprising the user experience result with the plurality of user interaction stages, the event sequence, and a recipe sequence applicable to the end-user; and
- displaying, by the processor, the journey map on a display screen.

8. The method as claimed in claim 7, wherein the method further comprises updating, by the processor, the event result and the recipe based on the update in the plurality of data domains indicated by a change in the orchestration data indicated by a data source from the plurality of data sources.

9. The method as claimed in claim 8, wherein the method further comprises:
- create the recipe sequence for each of the plurality of events, the recipe sequence comprising a plurality of recipes associated with the plurality of actions associated with each event from the plurality of events; and
- updating, by the processor, the recipe sequence based on the updated event result and update the event sequence based on a change in the plurality of user interaction stages.

10. The method as claimed in claim 7, wherein the method further comprises obtaining, by the processor, user input to implement the first cognitive learning operation on each of the data points.

11. The method as claimed in claim 7, wherein the method further comprises implementing, by the processor, the second cognitive learning operation to identify a multitude of recipes associated with the action prompted through the action activator.

12. The method as claimed in claim 11, wherein the method further comprises executing, by the processor, a recipe from the multitude of recipes associated with the action prompted through the action activator based on a result from any of the plurality of user interaction stages for the end-user.

13. A non-transitory computer readable medium including machine readable instructions that are executable by a processor to:
  obtain a query from a user, the query indicating an experience orchestration requirement comprising a plurality of user services and a plurality of user interaction stages, each of the plurality of user interaction stages comprising a plurality of digital touchpoints to allow interaction for a user with a digital environment, wherein each of the plurality of user services is associated with a user interaction stage from the plurality of user interaction stages;
  obtain orchestration data associated with the query from a plurality of data sources on a real-time basis;
  implement an artificial intelligence component to:
    identify a plurality of events based on the plurality of user interaction stages from the orchestration data, each of the plurality of events associated with the plurality of user services, wherein the plurality of events includes calculating a time of completing each of the plurality of user services; and
    sort the orchestration data based on the plurality of events into a plurality of data domains, each of the plurality of data domains comprising a data point associated with an event from the plurality of events;
  update the plurality of domains based on a change in the orchestration data indicated by a data source from the plurality of data sources;
  implement a first cognitive learning operation on each of the data points associated with the plurality of events to identify an event result comprising a plurality of actions associated with each of the plurality of events, each of the plurality of actions comprising:
    comparing the time of completing the at least one of the plurality of user services with a time of a specific event; and
    driving a user service from the plurality of user services based on the comparison;
  create a recipe associated with each of the plurality of actions, the recipe comprising a plurality of rules to retrieve the orchestration data from the plurality of data domains to offer an associated user service from the plurality of user services based on an associated user interaction stage from the plurality of user interaction stages, the plurality of rules to be based on a context relevant to an action from the plurality of actions;
  identify an action activator based on the event result and associated with each of the plurality of actions, the action activator to prompt an action from the plurality of actions;
  implement a second cognitive learning operation to:
    identify a current location of an end-user; and
    identify the recipe associated with the action prompted through the action activator, wherein the identification of the recipe is based on the current location of the end-user;
  implement the recipe associated with the action prompted through the action activator by retrieving the orchestration data from the plurality of data domains based on the associated plurality of rules; and
  offer to the end-user the associated plurality of user services based on the associated plurality of user interaction stages;
  create an event sequence for each of the plurality of user interaction stages, the event sequence comprising the plurality of events associated with a user interaction stage from the plurality of user interaction stages;
  create a user service sequence comprising the plurality of user services associated with the event sequence;
  generate a user experience result based on the event sequence and the user service sequence, the user experience result comprising the plurality of user interaction stages orchestrated to retrieve the associated orchestration data from the plurality of data domains in response to the associated action activator on a real-time basis;
  create a journey map for the end-user, the journey map comprising the user experience result with the plurality of user interaction stages, the event sequence, and a recipe sequence applicable to the end-user; and
  display the journey map on a display screen.

14. The non-transitory computer-readable medium of claim 13, wherein the processor is to update the event result and the recipe based on the update in the plurality of data domains indicated by a change in the orchestration data indicated by a data source from the plurality of data sources.

15. The non-transitory computer-readable medium of claim 14, wherein the processor is to:
  create the recipe sequence for each of the plurality of events, the recipe sequence comprising a plurality of recipes associated with the plurality of actions associated with each event from the plurality of events; and
  update the recipe sequence based on the updated event result and update the event sequence based on a change in the plurality of user interaction stages.

16. The non-transitory computer-readable medium of claim 13, wherein the processor is to obtain user input to implement the first cognitive learning operation on each of the data points.

17. The non-transitory computer-readable medium of claim 13, wherein the processor is to implement the second cognitive learning operation to identify a multitude of recipes associated with the action prompted through the action activator and execute a recipe from the multitude of recipes associated with the action prompted through the action activator based on a result from any of the plurality of user interaction stages for the end-user.

* * * * *